US012478084B2

(12) United States Patent
Wang et al.

(10) Patent No.: US 12,478,084 B2
(45) Date of Patent: Nov. 25, 2025

(54) COMPOSITIONS OF STEVIOL GLYCOSIDES AND/OR MULTIGLYCOSYLATED DERIVATIVES THEREOF

(71) Applicants: EPC Natural Products Co., Ltd., Beijing (CN); SWEET GREEN FIELDS USA, LLC, Bellingham, WA (US); SWEET GREEN FIELDS INTERNATIONAL CO., LTD., Hong Kong (CN)

(72) Inventors: Hansheng Wang, Beijing (CN); Xin Shi, Beijing (CN); Jingang Shi, Beijing (CN); Mel Clinton Jackson, Honolulu, HI (US)

(73) Assignees: Tate & Lyle Technology Limited, London (GB); EPC Natural Products LTD., Beijing (CN)

( * ) Notice: Subject to any disclaimer, the term of this patent is extended or adjusted under 35 U.S.C. 154(b) by 979 days.

(21) Appl. No.: 16/405,677

(22) Filed: May 7, 2019

(65) Prior Publication Data

US 2019/0289890 A1 Sep. 26, 2019

Related U.S. Application Data

(63) Continuation-in-part of application No. 15/204,479, filed on Jul. 7, 2016, now Pat. No. 10,517,321.

(60) Provisional application No. 62/668,553, filed on May 8, 2018, provisional application No. 62/262,060, filed on Dec. 2, 2015, provisional application No. 62/190,964, filed on Jul. 10, 2015.

(51) Int. Cl.
*A23L 27/30* (2016.01)
*A23L 27/00* (2016.01)

(52) U.S. Cl.
CPC ............... *A23L 27/36* (2016.08); *A23L 27/30* (2016.08); *A23L 27/88* (2016.08)

(58) Field of Classification Search
CPC ........... A23L 27/36; A23L 27/88; A23L 27/30
See application file for complete search history.

(56) References Cited

U.S. PATENT DOCUMENTS

| | | | | |
|---|---|---|---|---|
| 10,517,321 | B2 | 12/2019 | Jackson | |
| 2010/0166679 | A1 | 7/2010 | Abelyan et al. | |
| 2010/0189861 | A1 | 7/2010 | Abelyan et al. | |
| 2010/0267847 | A1 | 10/2010 | Yoshinaka et al. | |
| 2011/0195169 | A1 | 8/2011 | Markosyan et al. | |
| 2012/0157553 | A1 | 6/2012 | Dewis et al. | |
| 2012/0214751 | A1* | 8/2012 | Markosyan | A61Q 11/00 514/23 |
| 2012/0214752 | A1 | 8/2012 | Markosyan | |
| 2013/0071537 | A1* | 3/2013 | Shi | C07H 15/256 536/18.1 |
| 2013/0136838 | A1 | 5/2013 | San Miguel et al. | |
| 2013/0203867 | A1 | 8/2013 | Tezuka et al. | |
| 2013/0316043 | A1* | 11/2013 | Purkayastha | A23L 2/02 426/660 |
| 2013/0337115 | A1 | 12/2013 | Markosyan | |
| 2013/0337138 | A1 | 12/2013 | Purkayastha et al. | |
| 2014/0010917 | A1* | 1/2014 | Purkayastha | C12P 19/18 426/549 |
| 2014/0017378 | A1 | 1/2014 | Purkayastha et al. | |
| 2014/0023750 | A1* | 1/2014 | Purkayastha | C12P 19/56 426/549 |
| 2014/0030381 | A1* | 1/2014 | Markysyan | A23L 2/60 426/48 |
| 2015/0223505 | A1 | 8/2015 | Markysyan | |
| 2015/0359251 | A1 | 12/2015 | Jackson et al. | |
| 2016/0088865 | A1 | 3/2016 | Berry | |
| 2016/0192684 | A1 | 7/2016 | Chaturvedula et al. | |
| 2017/0006906 | A1 | 1/2017 | Jackson | |
| 2017/0156385 | A1 | 6/2017 | Shi | |
| 2018/0000142 | A1 | 1/2018 | Shi et al. | |
| 2018/0116266 | A1 | 5/2018 | Jackson | |

FOREIGN PATENT DOCUMENTS

| | | | |
|---|---|---|---|
| WO | 2012128775 | 9/2012 | |
| WO | 2013036768 | 3/2013 | |
| WO | WO-2013058871 A1 * | 4/2013 | A21D 2/18 |
| WO | 2014022456 | 2/2014 | |
| WO | 2014/172055 A2 | 10/2014 | |
| WO | 2014/197898 A1 | 12/2014 | |
| WO | 2015/015210 A1 | 2/2015 | |
| WO | 2015/042344 A1 | 3/2015 | |
| WO | 2016073740 A1 | 5/2016 | |

(Continued)

OTHER PUBLICATIONS

Okada, et al., "Glucosylation of Sucrose Laurate with Cyclodextrin Glucanotransferase", Bioscience, Biotechnology, and Biochemistry, May 22, 2014, vol. 71, pp. 826-829.

(Continued)

*Primary Examiner* — Nikki H. Dees
*Assistant Examiner* — Andrew E Merriam
(74) *Attorney, Agent, or Firm* — Michael Ye; Kalos Athena Wang PLLC

(57) ABSTRACT

The present application provides compositions comprising one or more glycosylated steviol glycosides (GSGs) and/or one or more steviol glycosides (SGs). In other aspects, the present application provides methods for (1) preparing SG/GSG compositions; (2) enhancing the sweetness of an orally consumable composition; and (3) improving the taste profile or flavor of an orally consumable composition, among other things.

33 Claims, 47 Drawing Sheets

(56) References Cited

FOREIGN PATENT DOCUMENTS

| | | | |
|---|---|---|---|
| WO | 2016074761 | A1 | 5/2016 |
| WO | 2016130609 | A1 | 8/2016 |
| WO | 2016144175 | A1 | 9/2016 |
| WO | 2017/214026 | | 12/2017 |

OTHER PUBLICATIONS

International Search Report and Written Opinion of the International Searching Authority issued in International Application No. PCT/US19/31196 mail date Aug. 30, 2019.
Chinese Office Action for CN 201680040107.6, mailed Nov. 23, 2021.
Progress in Medicinal Chemistry vol. 2, Peng Sixun, Chemical Industry Press, pp. 108-109, Dec. 31, 2002).
Written Opinion, PCT/US2016/041454, mailed Jan. 19, 2017.
International Search Report, PCT/US2016/041454, mailed Oct. 21, 2016.
International Search Report and Written Opinion of PCT/US19/31196, mailed Aug. 30, 2019.
4. Perera et al. "Approaches towards the separation, modification, identification and scale up purification of tetracyclic diterpene glycosides from Stevia rebaudiana (Bertoni) Bertoni", Molecules, 26(7): 1915 (2021).

* cited by examiner

COMPOSITIONS OF STEVIOL GLYCOSIDES AND/OR MULTIGLYCOSYLATED DERIVATIVES THEREOF

This application is a continuation-in-part application to U.S. patent application Ser. No. 15/204,479, filed Jul. 7, 2016, which claims priority from U.S. Provisional Patent Application No. 62/190,964, filed Jul. 10, 2015, and U.S. Provisional Patent Application No. 62/262,060, filed Dec. 2, 2015. This application also claims priority to U.S. Provisional Application No. 62/668,553, filed May 8, 2018. The contents of the above cited references are incorporated herein in their entirety for all purposes.

FIELD

The present application generally relates to sweetening and flavoring compositions and, in particular, to sweetening and flavoring compositions comprising steviol glycosides and/or multiglycosylated steviol glycosides.

BACKGROUND

Steviol glycosides (SGs) are high intensity sweeteners widely used in food and beverage products. A number of SGs have been isolated and identified, such as stevioside (ST), rebaudioside A (RA), rebaudioside C (RC), and rebaudioside D (RD).

SGs generally have poor solubility. In addition, the taste of some SGs, such as RA, also needs improvement. Therefore, there exists a need in the food and beverage industry for SG compositions with improved solubilities and improved taste profiles.

SUMMARY

In one aspect, a composition of the present application comprises one or more steviol glycosides (SGs).

In another aspect, a composition of the present application comprises one or more glycosylated steviol glycosides (GSGs).

In another aspect, a composition of the present application comprises one or more SGs and one or more GSGs.

In some embodiments, the one or more SGs are selected from Table A or Table B. In certain embodiments, the one or more SGs comprise at least one SG selected from the group consisting of Related SG#1, SG-4, iso-steviolbioside, Related SG#3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, SG-Unk4, SG-Unk5, rebaudioside I3, SG-Unk6, rebaudioside Q, rebaudioside Q2, rebaudioside Q3, rebaudioside I2, rebaudioside T1, Related SG#4, rebaudioside V, rebaudioside V2, rebaudioside Y, 15α-OH-rebaudioside M, rebaudioside O2, and combinations thereof.

In some embodiments, the one or more SGs are provided as a *Stevia* extract selected from the group consisting of RA20, RA40, RA50, RA60, RA80, RA 90, RA95, RA97, RA98, RA99, RA99.5, RB8, RB10, RB15, RC15, RD6 and combinations thereof. The one or more SGs may conform to at least one SG-group selected from the group consisting of SG-1G, SG-2G, SG-3G, SG-4G, SG-5G, SG-6G, SG-1G1R, SG-2G1R, SG-3G1R, SG-4G1R, SG-5G1R, SG-6G1R, SG-1G1X, SG-2G1X, SG-3G1X, SG-4G1X, SG-5G1X, and combinations thereof.

In some embodiments, the one or more SGs comprise at least one SG having a molecular weight less than equal to or less than 965 daltons or equal to or less than 804 daltons.

In other embodiments, the one or more SGs comprise at least one SG having a molecular weight greater than 804 daltons; greater than 965 daltons; equal to or greater than 1127 daltons; or equal to or greater than 1259 daltons.

The one or more SGs are present in the composition in a total amount of 0.1-99.5 wt % of the composition. In certain embodiments, the one or more SGs comprise less than 25% of the composition by weight, between 10-25% of the composition by weight, or between 14-16% of the composition by weight.

In some embodiments, the one or more GSGs comprise at least one GSG representing a further glycosylation product of an SG from Table A or Table B. In some embodiments, the one or more GSGs comprise at least one GSG representing a further glycosylation product of an SG selected from the group consisting of Related SG#1, SG-4, iso-steviolbioside, Related SG#3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, SG-Unk4, SG-Unk5, rebaudioside I3, SG-Unk6, rebaudioside Q, rebaudioside Q2, rebaudioside Q3, rebaudioside I2, rebaudioside T1, Related SG#4, rebaudioside V, rebaudioside V2, rebaudioside Y, 15α-OH-rebaudioside M, rebaudioside O2, and combinations thereof.

In some embodiments, the one or more GSGs comprise one or more additional glucose moieties and are selected from the group consisting of: GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-4G-1, GSG-4G-2, GSG-5G-1, and combinations thereof.

In some embodiments, the one or more GSGs comprise one or more additional glucose moieties and are selected from the group consisting of: GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, and combinations thereof.

In some embodiments, the one or more GSGs comprise one or more rhamnose moieties, one or more deoxyhexose moieties, or a combination thereof.

In certain particular embodiments, the one or more GSGs are selected from the group consisting of: GSG-1G1R-1, GSG-1G1R-2, GSG-2G1R-1, GSG-1G1R-3, GSG-2G1R-2, GSG-3G1R-1, GSG-1G1R-4, GSG-2G1R-3, GSG-3G1R-2, GSG-4G-1R-1, GSG-1G1R-5-1, GSG-2G1R-4, GSG-3G1R-3a, GSG-3G1R-3b, GSG-4G1R-2, GSG-5G1R-1, and combinations thereof.

In other embodiments, the one or more GSGs are selected from the group consisting of: GSG-3G1R-3a, GSG-3G1R-3b, GSG-4G1R-2, GSG-4G1R-3, GSG-4G1R-4, GSG- 4G1R-6, GSG-5G1R-4, GSG-6G1R-1a, GSG-6G1R-1b, GSG-6G1R-2, and combinations thereof.

In some embodiments, the one or more GSGs comprise one or more xylose moieties, arabinose moieties, or a combination thereof.

In certain particular embodiments, the one or more GSGs are selected from the group consisting of: GSG-1G1X-1, GSG-1G1X-2, GSG-1G1X-3, GSG-1G1X-4, GSG-2G1X-1, GSG-2G1X-2, GSG-2G1X-3, GSG-3G1X-1, GSG-3G1X-2, GSG-4G1X-1, and combinations thereof.

In certain particular embodiments, the one or more GSGs are selected from the group consisting of: GSG-3G1X-4, GSG-3G1X-5, GSG-4G1X-1, GSG-4G1X-2, GSG-4G1X-3, GSG-4G1X-4, and combinations thereof.

In some embodiments, at least one of the one or more GSGs has a molecular weight less than equal to or less than 1128 daltons; less than equal to or less than 966 daltons; or less than equal to or less than 804 daltons.

In other embodiments, at least one of the one or more GSGs has a molecular weight greater than 1128 daltons; equal to or greater than 1260 daltons; equal to or greater than 1422 daltons; equal to or greater than 1746 daltons; or equal to or greater than 1922 daltons.

The one or more GSGs may be present in the composition in a total amount of 0.1-99.5% of the composition by weight. In some embodiments, the one or more GSGs comprise are 50-70% of the composition by weight or 55-65% of the composition by weight.

The composition may further comprise one or more dextrins. In some embodiments, the dextrins are selected from the group consisting of tapioca dextrin, potato dextrin, corn dextrin, yellow dextrin, white dextrin and borax dextrin. In other embodiments, the dextrin is a cyclodextrin or maltodextrin.

In some embodiments, the composition further comprises thaumatin.

Alternatively, or in addition, the composition may further comprise one or more salts. In some embodiments, the salts comprise one or more steviol glycoside salts. In some embodiments, the one or more steviol glycoside salts comprise a salt of steviolbioside. In other embodiments, the one or more steviol glycoside salts comprise a sodium salt of RB. In other embodiments, the one or more salts comprise NaCl and/or KCl.

The composition may further comprise one or more non-steviol glycoside sweeteners. In some embodiments, the non-steviol glycoside sweeteners comprise one or more sweeteners selected from the group consisting of cyclamates and salts thereof, sucralose, aspartame, saccharin and salts thereof, xylitol, acesulfame-K, neotame, N—[N-[3-(3-hydroxy-4-methoxyphenyl) propyl]-alpha-aspartyl]-L-phenylalanine 1-methyl ester (ANS9801), glycyrrhizin, thaumatin, monellin, and combinations thereof.

In other embodiments, the non-steviol glycoside sweeteners comprise one or more carbohydrate sweeteners and/or one or more non-carbohydrate sweeteners. In some embodiments, the composition comprises one or more carbohydrate sweeteners selected from the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

In other embodiments, the composition comprises one or more non-steviol glycoside sweeteners, wherein the one or more non-steviol glycoside sweeteners comprise a proteinaceous sweetener, such as thaumatin.

In one particular embodiment, an SG composition comprises 25-35 wt % Reb-A, 0.4-4 wt % Reb-B, 5-15 wt % Reb-C, 1-10 wt % Reb-D, 2-5 wt % Reb-F, 1-5 wt % Reb-K, and 20-40 wt % Stevioside. In some embodiments, the SG composition further comprises at least 20, at least 21, at least 22, at least 23 or at least 24 members selected from the group consisting of 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG#4, 0.01-0.5 wt % Rel SG#5, 0.01-0.4 wt % Reb-M, 0.01-0.4 wt % Reb-N, 0.01-0.4 wt % Reb-E, 0.01-0.4 wt % Reb-F1, 0.01-0.4 wt % Reb-Y, and combinations thereof.

In another embodiment, an SG-B composition comprises 45-55 wt % Reb-A, 20-40 wt % Stevioside, 2-6 wt % Reb-C, 0.5-3 wt % Reb-B, and 0.5-3 wt % Reb-D. In some embodiments, the SG-B composition further comprises one or more members selected from the group consisting of 0.1-3 wt % Related SG#5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, and combinations thereof. In some embodiments, the SG-B composition further comprises one or more members selected from the group consisting of 0.01-1 wt % Steviolbioside, 0.01-1 wt % Iso-steviolbioside, 0.01-1 wt % Stevioside-B, 0.01-1 wt % Related SG#3, 0.01-1 wt % Related SG#2, 0.01-1 wt % Reb-G, 0.01-1 wt % Reb-F, 0.01-1 wt % Reb-W, and combinations thereof.

In another embodiment, an SG-C composition comprises 35-45 wt % Reb-A, 10-25 wt % Stevioside, 4-12 wt % Reb-B, 4-12 wt % Dulcoside A, 0.5-4 wt % Reb-C, and 0.1-4 wt % Reb-O. In some embodiments, the SG-C composition further comprises 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG#3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, 0.01-1 wt % Dulcoside B, and combinations thereof.

In another embodiment, a GSG-A composition comprises (a) one or more SG-3G group members selected from the group consisting of: 1-10 wt % GSG-3G-2, 2-6 wt % GSG-3G-3, 0.5-3 wt % GSG-3G-4, 0.2-5 wt % GSG-3G-7, and 1-6 wt % GSG-3G-8; (b) one or more SG-4G group members selected from the group consisting of: 5-15 wt % GSG-4G-1, 1-2 wt % GSG-4G-2, 0.5-2.5 wt % GSG-4G-3, and 2-10 wt % GSG-4G-7; (c) one or more SG-5G group members selected from the group consisting of: 0.1-0.5 wt % GSG-5G-1, 0.05-0.5 wt % GSG-5G-2, 0.5-3 wt % GSG-5G-3, 0.05-0.5 wt % GSG-5G-4, and 0.2-4 wt % GSG-5G-5; (d) 0.1-2 wt % GSG-6G-3; (e) one or more SG-3G1R group members selected from the group consisting of: 0.5-5.5 wt % GSG-3G1R-3a and 2-6 wt % GSG-3G1R-3b; (f) one or more SG-4G1R group members selected from the group consisting of: 0.3-1.5 wt % GSG-4G1R-2, 0.05-1 wt % GSG-4G1R-3, 1-5 wt % GSG-4G1R-4, and 0.5-10 wt % GSG-4G1R-6; (g) 2-6 wt % GSG-5G-1R-4; (h) one or more SG-6G-1R group members selected from the group consisting of: 0.2-1.2 wt % GSG-6G1R-1a, 0.2-2 wt % GSG-6G1R-1b, and 0.3-2.5 wt % GSG-6G1R-2; (i) one or more SG-3G-1X group members selected from the group consisting of: 2-8 wt % GSG-3G1X-4 and 0.5-3 wt % GSG-3G1X-5; (j) one or more SG-4G1X group members selected from the group consisting of: 0.5-3 wt % GSG-4G1X-1, 0.5-3 wt % GSG-4G1X-2, 1-6 wt % GSG-4G1X-3, and 0.2-2 wt % GSG-4G1X-4; and (k) 1-4 wt % GSG-5G1X-1, wherein the composition comprises one or more GSGs from each of at least 8, 9, 10 or 11 groups set forth in (a)-(k).

In another embodiment, a GSG-B composition comprises (a) one or more SG-3G group members selected from the group consisting of: 2-10 wt % GSG-3G-2, 2-6 wt % GSG-3G-3, 0.5-2 wt % GSG-3G-4, 0.2-3 wt % GSG-3G-7, and 1-4 wt % GSG-3G-8; (b) one or more SG-4G group members selected from the group consisting of: 5-12 wt % GSG-4G-1, 0.3-1.5 wt % GSG-4G-2, 0.5-1.5 wt % GSG-4G-3, and 2.5-6 wt % GSG-4G-7; (c) one or more SG-5G group members selected from the group consisting of: 0.2-0.4 wt % GSG-5G-1, 0.05-0.4 wt % GSG-5G-2, 0.75-2 wt % GSG-5G-3, 0.05-0.3 wt % GSG-5G-4, and 0.4-4 wt % GSG-5G-5; (d) 0.1-2 wt % GSG-6G-3; (e) one or more SG-3G1R group members selected from the group consisting of: 0.2-3 wt % GSG-3G1R-3a and 1.5-5 wt % GSG-3G1R-3b; (f) one or more SG-4G1R group members selected from the group consisting of: 0.3-1 wt % GSG-4G1R-2, 0.05-0.75 wt % GSG-4G1R-3, 1-4 wt % GSG-4G1R-4, and 0.5-6.5 wt % GSG-4G1R-6; (g) 2.5-5 wt % GSG-5G1R-4; (h) one or more SG-6G1R group members selected from the group consisting of: 0.1-1 wt % GSG-6G1R-1a, 0.2-2 wt % GSG-6G1R-1b, and 0.3-2.5 wt % GSG-6G1R-2; (i) one or more SG-3G1X group members selected from the group consisting of: 2-5 wt % GSG-3G1X-4 and 0.5-2 wt % GSG-3G1X-5; (j) one or more SG-4GX group members selected from the group consisting of: 0.5-2 wt % GSG-4G1X-1, 0.5-2 wt % GSG-4G1X-2, 1.5-5 wt % GSG-4G1X-3, and 0.2-1.5 wt % GSG-4G1X-4; (k) 1-2.5 wt % GSG-5G1X-1, wherein the composition comprises one or more GSGs from each of at least 8, 9, 10 or 11 groups set forth in (a)-(k).

In some embodiments, the GSG-B composition further comprises Reb-D, Reb-M or both, wherein the content of Reb-D, Reb-M or both is present in the composition in a range from 1 wt % to 99 wt %.

In some embodiments, the GSG-B composition further comprises at least 4, 5, 6 or 7 unreacted steviol glycosides selected from the group consisting of: 1.5-12.5 wt % Reb-A, 0.2-1.5 wt % Reb-B, 0.5-4 wt % Reb-C, 0.3-1 wt % Reb-D, 0.1-2.5 wt % Reb-F, 0.05-2.5 wt % Rubusoside, and 1.5-6.5 wt % Stevioside.

In another embodiment, a GSG-C composition comprises: (a) one or more SG-3G group members selected from the group consisting of: 3-6 wt % GSG-3G-2, 1.5-3.5 wt % GSG-3G-3, 1-3 wt % GSG-3G-4, 2-5 wt % GSG-3G-7, and 2-5 wt % GSG-3G-8; (b) one or more SG-4G group members selected from the group consisting of: 6-10 wt % GSG-4G-1, 0.5-1.5 wt % GSG-4G-2, 1-3 wt % GSG-4G-3, and 3-6 wt % GSG-4G-7; (c) one or more SG-5G group members selected from the group consisting of: 0.2-0.4 wt % GSG-5G-1, 0.05-0.3 wt % GSG-5G-2, 1-2 wt % GSG-5G-3, 0.08-0.2 wt % GSG-5G-4, and 1.5-4.5 wt % GSG-5G-5; (d) 0.5-1.5 wt % GSG-6G-3; (e) one or more SG-3G1R group members selected from the group consisting of: 2-5 wt % GSG-3G1R-3a and 2-4 wt % GSG-3G1R-3b; (f) one or more SG-4G1R group members selected from the group consisting of: 0.3-1 wt % GSG-4G1R-2, 0.2-0.6 wt % GSG-4G1R-3, 1.5-4 wt % GSG-4G1R-4, and 3-10 wt % GSG-4G1R-6; (g) 2.5-5 wt % GSG-5G1R-4; (h) one or more SG-6G-1R group members selected from the group consisting of: 0.5-1.5 wt % GSG-6G1R-1a, 0.5-1.5 wt % GSG-6G1R-1b, and 0.5-2 wt % GSG-6G1R-2; (i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.3-1.5 wt % GSG-4G1X-1, 1-3.5 wt % GSG-4G1X-2, 1.5-4 wt % GSG-4G1X-3, and 0.5-2 wt % GSG-4G1X-4; and (k) 1.5-3 wt % GSG-5G1X-1, wherein the composition comprises one or more GSGs from each of at least 8, 9, 10 or 11 groups set forth in (a)-(k).

In some embodiments, the GSG-C composition further comprises at least 4, 5, 6 or 7 unreacted steviol glycosides selected from the group consisting of: 0.5-2.5 wt % Reb-A, 0.2-1 wt % Reb-B, 0.2-0.8 wt % Reb-C, 0.2-0.6 wt % Reb-D, 0.05-0.25 wt % Reb-F, 0.05-0.6 wt % Rubusoside, and 0.05-2 wt % Stevioside.

In another embodiment, a GSG-D composition comprises: (a) one or more SG-3G group members selected from the group consisting of: 5-15 wt % GSG-3G-2, 1-6 wt % GSG-3G-3, 0.5-3.5 wt % GSG-3G-4, 0.5-3.5 wt % GSG-3G-7, and 1.5-6 wt % GSG-3G-8; (b) one or more SG-4G group members selected from the group consisting of: 10-18 wt % GSG-4G-1, 0.5-3.5 wt % GSG-4G-2, 0.5-3.5 wt % GSG-4G-3, and 2-6 wt % GSG-4G-7; (c) one or more SG-5G group members selected from the group consisting of: 0.15-1.5 wt % GSG-5G-1, 0.05-1 wt % GSG-5G-2, 0.5-3.5 wt % GSG-5G-3, 0.05-0.35 wt % GSG-5G-4, and 0.1-1.5 wt % GSG-5G-5; (d) 0.3-2.5 wt % GSG-6G-3; (e) one or more SG-3G1R group members selected from the group consisting of: 0.5-2 wt % GSG-3G1R-3a and 3-5 wt % GSG-3G1R-3b; (f) one or more SG-4G1R group members selected from the group consisting of: 0.25-2.5 wt % GSG-4G1R-2, 0.05-1 wt % GSG-4G1R-3, 1-4 wt % GSG-4G1R-4, and 0.3-3 wt % GSG-4G1R-6; (g) 1.5-7.5 wt % GSG-5G1R-4; (h) one or more SG-6G1R group members selected from the group consisting of: 0.1-2 wt % GSG-6G1R-1a, 0.1-2 wt % GSG-6G1R-1b, and 0.1-2 wt % GSG-6G1R-2; (i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.5-5 wt % GSG-4G1X-1, 0.5-2.5 wt % GSG-4G1X-2, 1.5-6 wt % GSG-4G1X-3, and 0.5-2.5 wt % GSG-4G1X-4; and (k) 0.5-4.5 wt % GSG-5G1X-1, wherein the composition comprises one or more GSGs from each of at least 8, 9, 10 or 11 groups set forth in (a)-(k).

In some embodiments, the GSG-D composition further comprises at least 4, 5, 6 or 7 unreacted steviol glycosides selected from the group consisting of: 1-6 wt % Reb-A, 0.2-2 wt % Reb-B, 0.5-3.5 wt % Reb-C, 0.1-1.5 wt % Reb-D, 0.05-2 wt % Reb-F, 0.05-1 wt % Rubusoside, and 0.05-3.5 wt % Stevioside.

In other embodiments, the GSG-D composition comprises at least 4, 5, 6 or 7 unreacted steviol glycosides selected from the group consisting of: 3-10 wt % Reb-A, 0.05-2 wt % Reb-C, 0.05-2 wt % Reb-D, 0.05-1.5 wt % Reb-G, 0.05-0.5 wt % Reb-O, 0.05-0.5 wt % Rubusoside, and 0.05-4 wt % Stevioside.

In another embodiment, a GSG-E composition comprises: (a) one or more SG-3G group members selected from the group consisting of: 1-5 wt % GSG-3G-2, 1-5 wt % GSG-3G-3, 0.5-3 wt % GSG-3G-4, 0.5-4 wt % GSG-3G-7, and 2-6 wt % GSG-3G-8; (b) one or more SG-4G group members selected from the group consisting of: 5-12 wt % GSG-4G-1, 0.2-3 wt % GSG-4G-2, 0.2-3 wt % GSG-4G3, and 2-6 wt % GSG-4G-7; (c) one or more SG-5G group members selected from the group consisting of: 0.05-1.5 wt % GSG-5G-1, 0.05-1.5 wt % GSG-5G-2, 0.1-3 wt % GSG- 5G-3, 0.01-0.4 wt % GSG-5G-4, and 0.5-4 wt % GSG-5G-5; (d) 0.1-2 wt % GSG-6G-3; (e) one or more SG-3G1R group members selected from the group consisting of: 1-3 wt % GSG-3G1R-3a and 1-3 wt % GSG-3G1R-3b; (f) one or more SG-4G1R group members selected from the group consisting of: 0.1-2 wt % GSG-4G1R-2, 0.05-1 wt % GSG-4G1R-3, 1-3 wt % GSG-4G1R-4, and 5-10 wt % GSG-4G1R-6; (g) 2-6 wt % GSG-5G1R-4; (h) one or more SG-6G-1R group members selected from the group consisting of: 0.1-1 wt % GSG-6G1R-1a, 0.1-1 wt % GSG-6G1R-1b, and 0.2-2 wt % GSG-6G1R-2; (i) one or more SG-3G1X group members selected from the group consisting of: 1-4 wt % GSG-3G1X-4 and 0.5-2 wt % GSG-3G1X-5; (j) one or more SG-4G1X group members selected from the group consisting of: 0.2-1.5 wt % GSG-4G1X-1, 0.5-2.5 wt % GSG-4G1X-2, 1-3 wt % GSG-4G1X-3, and 0.3-2 wt % GSG-4G1X-4; and (k) 1-4 wt % GSG-5G1X-1, wherein the composition comprises one or more GSGs from each of at least 8, 9, 10 or 11 groups set forth in (a)-(k), In some embodiments, the GSG-E composition further comprises Reb-D, Reb-M or both, wherein the content of Reb-D, Reb-M or both is present in the composition in a range from 1 wt % to 99 wt %.

In some embodiments, the GSG-E composition further comprises at least 4, 5, 6 or 7 unreacted steviol glycosides selected from the group consisting of: 6-12 wt % Reb-A, 0.1-1.5 wt % Reb-B, 0.5-3.5 wt % Reb-C, 0.1-1.5 wt % Reb-D, 0.8-3 wt % Reb-F, 0.5-2.5 wt % Rubusoside, and 2-6 wt % Stevioside. In another embodiment, a GSG-F composition comprises: (a) one or more SG-3G group members selected from the group consisting of: 1-4 wt % GSG-3G-2, 1-4 wt % GSG-3G-3, 0.5-3 wt % GSG-3G-4, 0.5-3 wt % GSG-3G-7, and 0.5-3.5 wt % GSG-3G-8; (b) one or more SG-4G group members selected from the group consisting of: 3-8 wt % GSG-4G-1, 0.1-2 wt % GSG-4G-2, 0.1-2 wt % GSG-4G-3, and 1-4 wt % GSG-4G-7; (c) one or more SG-5G group members selected from the group consisting of: 0.05-1 wt % GSG-5G-1, 0.05-1 wt % GSG-5G-2, 0.3-3 wt % GSG-5G-3, 0.01-0.4 wt % GSG-5G-4, and 0.1-2 wt % GSG-5G-5; (d) 0.1-2 wt % GSG-6G-3; (e) one or more SG-3G1R group members selected from the group consisting of: 0.2-2 wt % GSG-3G1R-3a and 1-3 wt % GSG-3G1R-3b; (f) one or more SG-4G-1R group members selected from the group consisting of: 0.1-2 wt % GSG-4G1R-2, 0.05-1 wt % GSG-4G1R-3, 1-3 wt % GSG-4G1R-4, and 1-3 wt % GSG-4G1R-6; (g) 2-6 wt % GSG-5G1R-4; (h) one or more SG-6G-1R group members selected from the group consisting of: 0.05-1 wt % GSG-6G1R-1a, 0.05-1 wt % GSG-6G1R-1b, and 0.1-1.2 wt % GSG-6G1R-2; (i) one or more SG-3G1X group members selected from the group consisting of: 1-4 wt % GSG-3G1X-4 and 0.5-2 wt % GSG-3G1X-5; (j) one or more SG-4G1X group members selected from the group consisting of: 0.2-1.5 wt % GSG-4G1X-1, 0.5-2.5 wt % GSG-4G1X-2, 0.5-2.5 wt % GSG-4G1X-3, and 0.2-2 wt % GSG-4G1X-4; and (k) 1-3 wt % GSG-5G1X-1, wherein the composition comprises one or more GSGs from each of at least 8, 9, 10 or 11 groups set forth in (a)-(k).

In some embodiments, the GSG-F composition further comprises at least 4, 5, 6 or 7 unreacted steviol glycosides selected from the group consisting of: 15-25 wt % Reb-A, 0.05-1 wt % Reb-B, 1-3 wt % Reb-C, 0.1-1.5 wt % Reb-D, 0.8-3 wt % Reb-F, 0.3-2 wt % Rubusoside, and 6-12 wt % Stevioside.

In another aspect, an orally consumable composition comprises one or more SGs and/or GSGs according to the present application.

In some embodiments, the orally consumable composition is a sweetener. In other embodiments, the orally consumable composition is a flavoring agent.

In another aspect, a method for enhancing sweetness of an orally consumable composition comprises adding an effective amount of a sweetening composition to the orally consumable composition.

In another aspect, a method for improving the taste profile or flavor of an orally consumable composition comprises adding an effective amount of a sweetening composition to the orally consumable composition.

In another aspect, a method for preparing a GSG composition comprises the steps of: (a) dissolving a glucose-donor material in water to form a liquefied glucose-donor material; (b) adding a SG composition to liquefied glucose-donor material to obtain a reaction mixture; (c) adding an effective amount of an enzyme to the reaction mixture, wherein the enzyme catalyzes the transfer of glucose moieties from the glucose-donor molecule to SGs in the SG composition to the mixture; (d) incubating at a desired temperature for a desired length of reaction time to glycosylate SGs of the SG composition with glucose moieties present in the glucose-donor material; (e) inactivating the enzyme, (f) removing the enzyme from the reaction mixture; and (g) drying the resulting solution of GSGs, residual SGs and dextrins.

In some embodiments, the SG composition is a *Stevia* extract. In some embodiments, the ratio of the glucose-donor molecule to SG composition is between 10:90 and 90:10, between 20:80 and 80:20, between 30:70 and 70:30, or between 40:60 and 60:40 by weight.

In another aspect, a method for increasing the sweetness of an orally consumable composition comprises the step of adding an effective amount of one or more SGs and/or one or more GSGs to an orally consumable composition.

In a further aspect, a method for increasing a taste or flavor of an orally consumable composition comprises the step of adding an effective amount of one or more SGs and/or one or more GSGs to the orally consumable composition.

DETAILED DESCRIPTION

Definitions

Figure 1:
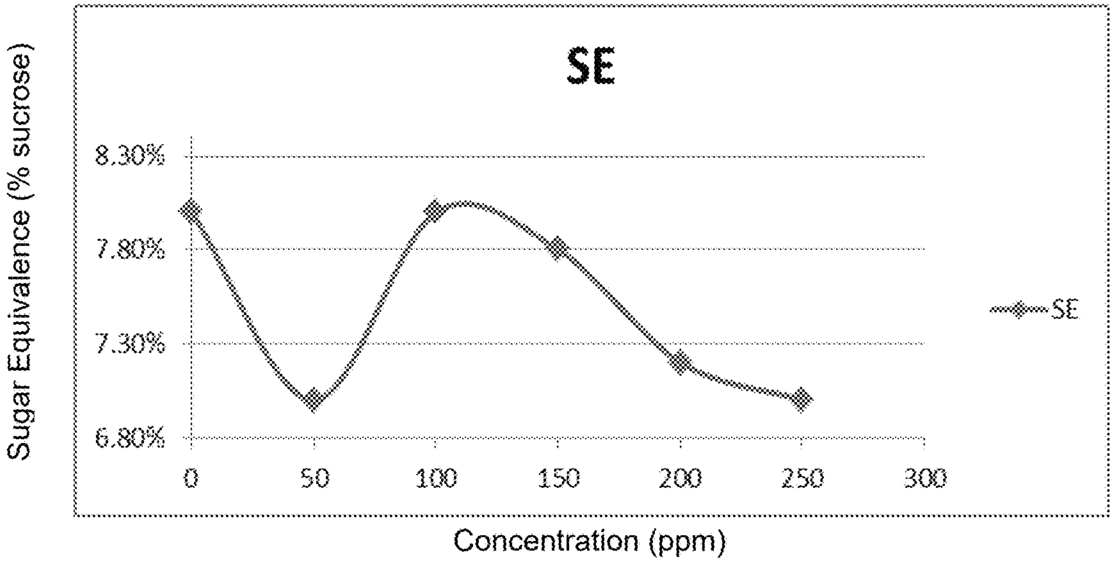
FIG. 1 is a graphical illustration showing sweetness plotted against the concentration of GSG-RA50.
Figure 2:
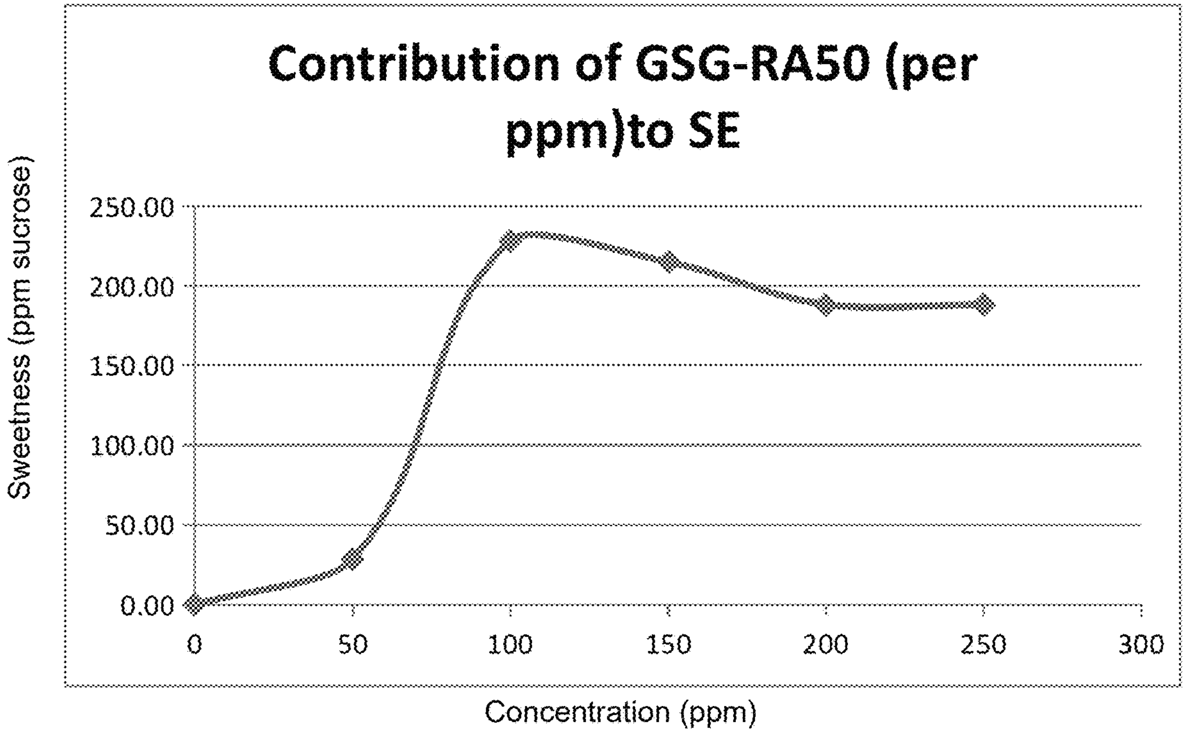
FIG. 2 is a graphical illustration showing the contribution of GSG-RA50 per ppm to SE.
Figure 3:
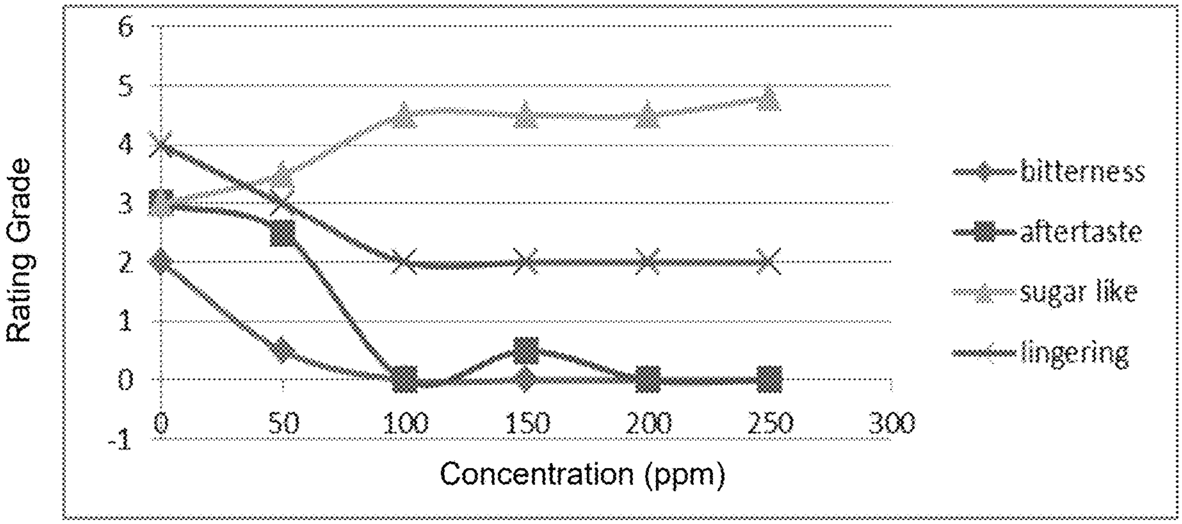
FIGS. 3-4 are graphical illustrations showing taste profiles of GSG-RA50/RA97 compositions.
Figure 4:
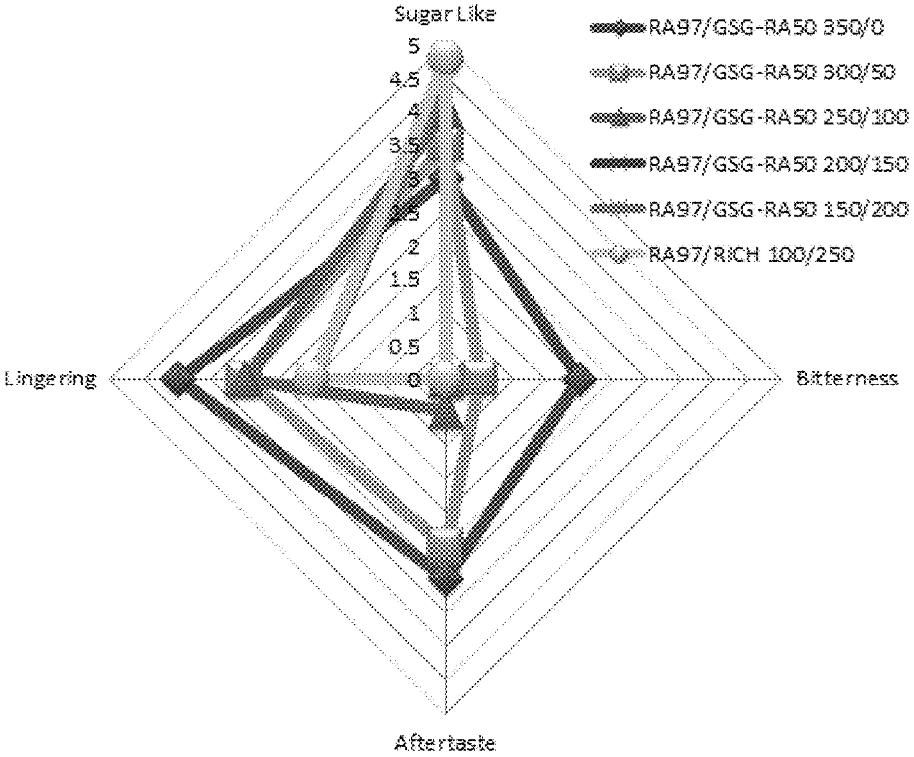
Figure 5:
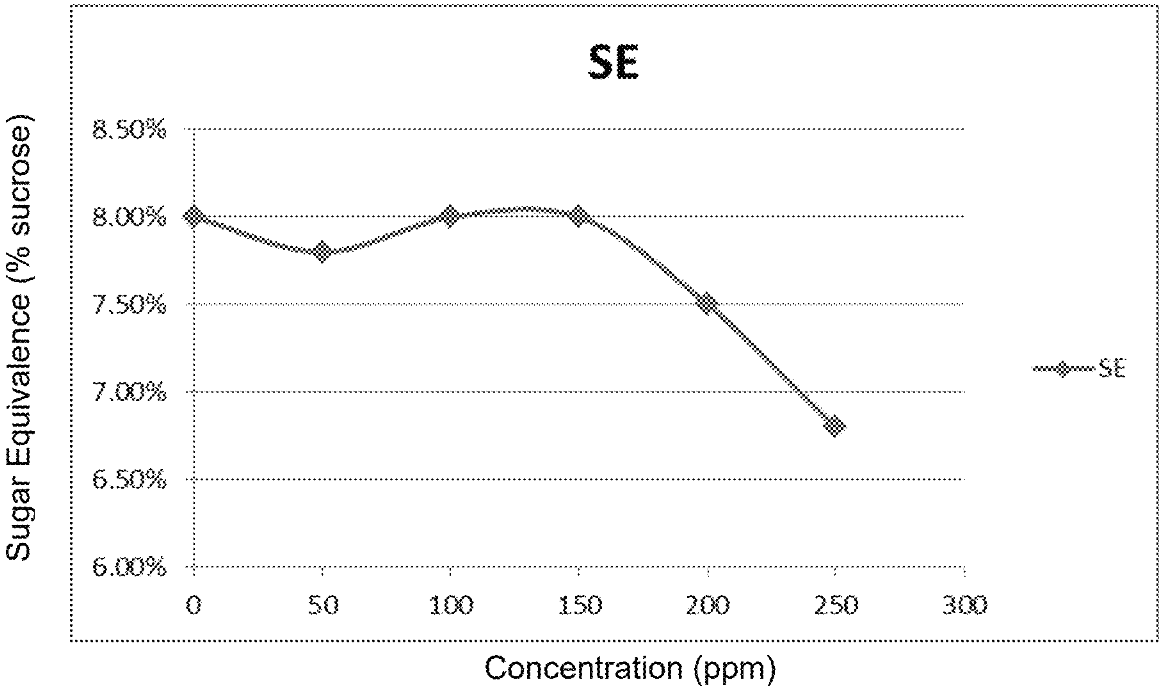
FIG. 5 is a graphical illustration showing sweetness plotted against the concentration of GSG-RA95.
Figure 6:
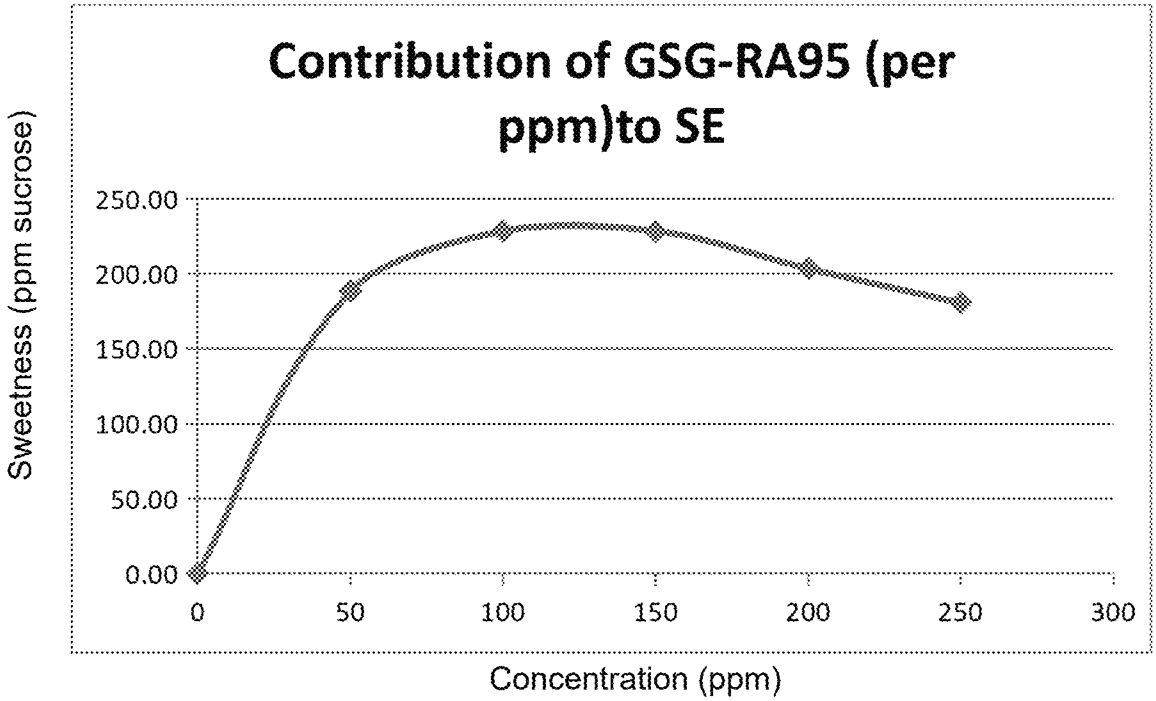
FIG. 6 is a graphical illustration showing the contribution of GSG-RA95 per ppm to SE.
Figure 7:
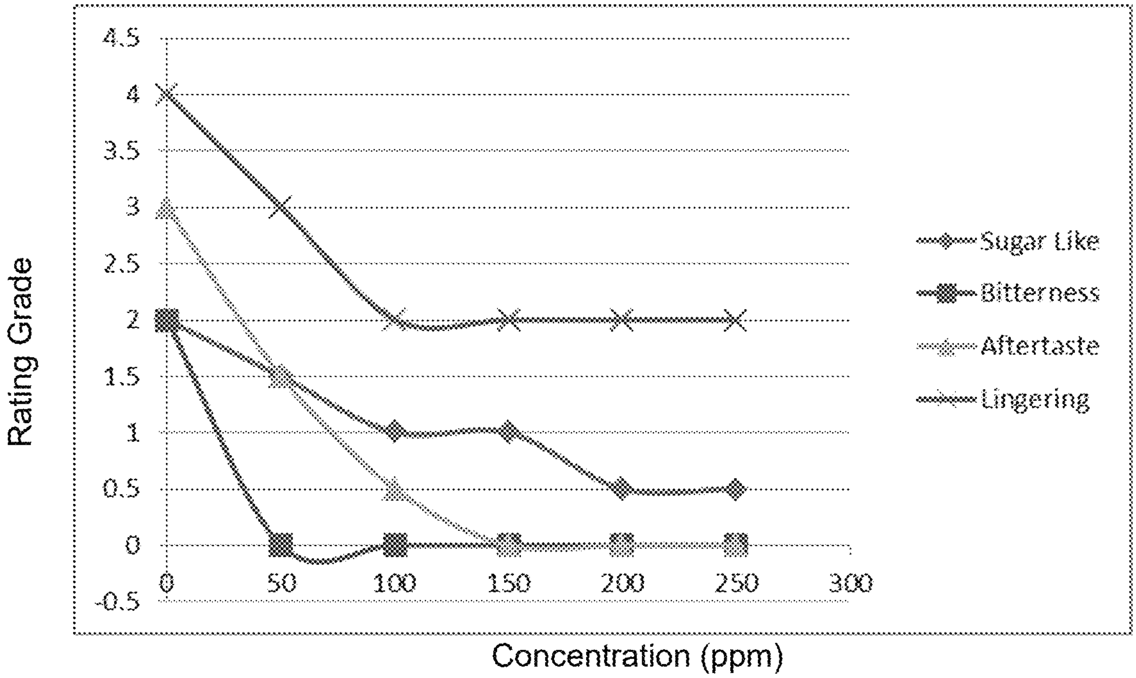
FIGS. 7-8 are graphical illustrations showing taste profiles of GSG-RA95/RA97 compositions.
Figure 8:
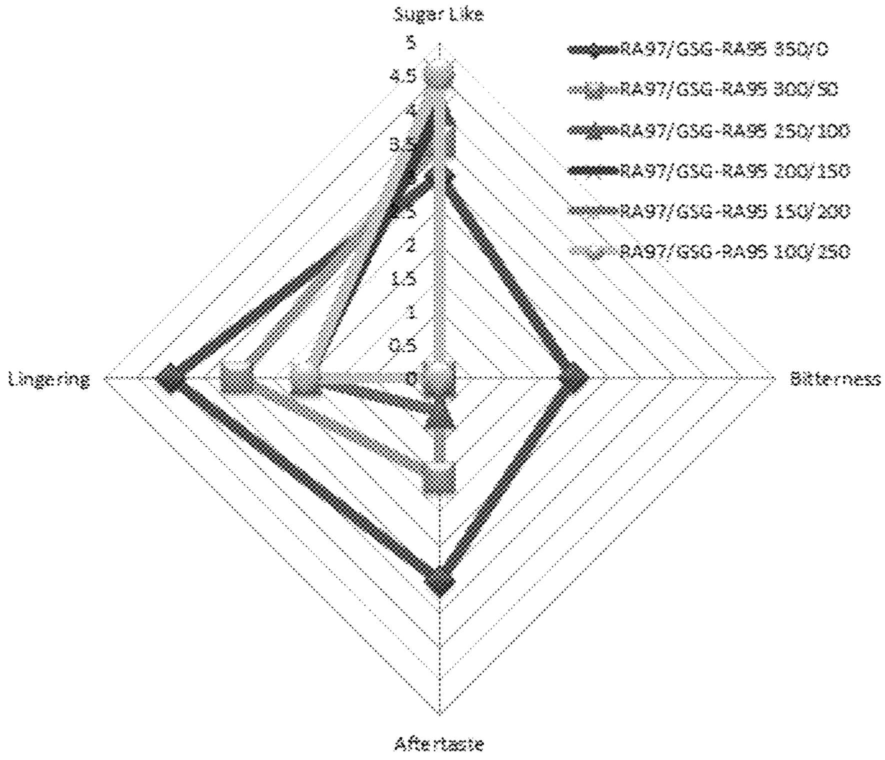

In the specification and in the claims, the terms "including" and "comprising" are open-ended terms and should be interpreted to mean "including, but not limited to . . . ". These terms encompass the more restrictive terms "consisting essentially of" and "consisting of."

It must be noted that as used herein and in the appended claims, the singular forms "a," "an," and "the" include plural reference unless the context clearly dictates otherwise. As well, the terms "a" (or "an"), "one or more" and "at least one" can be used interchangeably herein. It is also to be noted that the terms "comprising," "including," "characterized by" and "having" can be used interchangeably.

Unless defined otherwise, all technical and scientific terms used herein have the same meanings as commonly understood by one of ordinary skill in the art to which this application belongs. All publications and patents specifically mentioned herein are incorporated by reference in their entirety for all purposes including describing and disclosing the chemicals, instruments, statistical analyses and methodologies which are reported in the publications which might be used in connection with the application. All references cited in this specification are to be taken as indicative of the level of skill in the art. Nothing herein is to be construed as an admission that the application is not entitled to antedate such disclosure by virtue of prior application.

As used herein, the terms "steviol glycoside," or "SG" refers to a glycoside of steviol, a diterpene compound shown in Formula I, which is found in *Stevia* leaves. Non-limiting examples of steviol glycosides are shown in Tables A or B below. The *Stevia* glycosides for use in the present application are not limited by source or origin. Steviol glycosides may be extracted from *Stevia* leaves, synthesized by enzymatic processes or chemical syntheses, or produced by fermentation.

As used herein, the term "steviol glycoside composition" or "SG composition" refers to a composition comprising one or more SGs.

As used herein, the term "glycosylated steviol glycoside" or "GSG" refers to an SG with additional glucose residues added relative to the parental SGs present in e.g., *Stevia* leaves. A "GSG" may also be produced from any known or unknown SG by enzymatic synthesis, chemical synthesis or fermentation.

As used herein, the term "glycosylated steviol glycoside composition" or "GSG composition" refers to any material comprising one or more GSGs.

As used herein, the term "SG/GSG composition" refers to a generic composition that may comprise one or more SGs and/or one or more GSGs.

The phrase "*Stevia* starting material" or "raw material" means a material containing SGs of the plant *Stevia rebaudiana* or other species of the *Stevia* genus. In some embodiments, the *Stevia* starting material or raw material can be a crude extract, a purified extract, or a byproduct of a purification process. In other embodiments, the *Stevia* starting material comprises SGs that originated from a fermentation or enzymatic transformation process. A crude extract is typically the first dried product produced after processing harvested *Stevia* plant material. A purified extract contains a higher concentration of one or more SGs of interest than contained in a crude extract. A byproduct of a purification process typically is all or a portion of the waste stream from purifying SGs from crude extract or from an intermediate purity.

The phrase "total glycosides" refers to the total amount of GSGs and SGs in a composition.

An acronym of the type "YYxx" refers to a composition, where YY refers to a given (such as RA) or collection of compounds (e.g., SGs), where "xx" is typically a percent by weight number between 1 and 100 denoting the level of purity of a given compound (such as RA) or collection of compounds, where the weight percentage of YY in the dried product is equal to or greater than xx. The acronym "YYxx+WWzz" refers to a composition, where each one of "YY" and "WW" refers to a given compound (such as RA) or collection of compounds (e.g., SGs), and where each of "xx" and "zz" refers to a percent by weight number between 1 and 100 denoting the level of purity of a given compound (such as RA) or collection of compounds, where the weight percentage of YY in the dried product is equal to or greater than xx, and where the weight percentage of WW in the dried product is equal to or greater than zz.

Without specific description, the acronym "RAx" refers to a *Stevia* composition containing RA in amount of ≥x % and <(x+10)% with the following exceptions: The acronym "RA100" specifically refers to pure RA; the acronym "RA99.5" specifically refers to a composition where the amount of RA is ≥99.5 wt %, but <100 wt %; the acronym "RA99" specifically refers to a composition where the amount of RA is ≥99 wt %, but <100 wt %; the acronym "RA98" specifically refers to a composition where the amount of RA is ≥98 wt %, but <99 wt %; the acronym "RA97" specifically refers to a composition where the amount of RA is ≥97 wt %, but <98 wt %; the acronym "RA95" specifically refers to a composition where the amount of RA is ≥95 wt %, but <97 wt %; the acronym "RA85" specifically refers to a composition where the amount of RA is ≥85 wt %, but <90 wt %; the acronym "RA75" specifically refers to a composition where the amount of RA is ≥75 wt %, but <80 wt %; the acronym "RA65" specifically refers to a composition where the amount of RA is ≥65 wt %, but <70 wt %; the acronym; the acronym "RA20" specifically refers to a composition where the amount of RA is ≥15 wt %, but <30 wt %.

The acronym "GSG-RAxx" refers to a GSG composition prepared in an enzymatically catalyzed glycosylation process with RAxx as the starting SG material. More generally, acronyms of the type "GSG-YYxx" refer to a composition of the present application where YY refers to a compound (such as RA, RB, RC or RD), or a composition (e.g., RA20), or a mixture of compositions (e.g., RA40+RB8). For example, GSG-RA20 refers to the glycosylation products formed from RA20.

The phase "sensory profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness." A plurality of such human tasters is called a "sensory panel." In addition to sweetness, sensory panels can also judge the temporal profile of the other "basic tastes:" bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness."

The phrase "sucrose equivalence" or "SE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must have the same sweetness as a 12% sucrose soft drink, i.e., a diet soft drink must have a 12% SE. Soft drink dispensing equipment assumes an SE of 12%, since such equipment is set up for use with sucrose-based syrups.

The phrase "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness." A plurality of such human tasters is called a "sensory panel." In addition to sweetness, sensory panels can also judge the temporal profile of the other "basic tastes:" bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness."

The term "flavor" or "flavor characteristic," as used herein, is the combined sensory perception of the components of taste, odor, and/or texture. The term "enhance," as used herein, includes augmenting, intensifying, accentuating, magnifying, and potentiating the sensory perception of a flavor characteristic without changing the nature or quality thereof. The term "modify," as used herein, includes altering, varying, suppressing, depressing, fortifying and supplementing the sensory perception of a flavor characteristic where the quality or duration of such characteristic was deficient.

As used herein, the term "rebaudioside" can be abbreviated as "Reb" or "R." For example, the term "rebaudioside A" has the same meaning as "Reb A" and "RA." The same holds true for all rebaudiosides. Similarly, the term "dulcoside" can be abbreviated as "Dul" or "D," with reference to DA, DA1, or DB.

1. SG/GSG Compositions of the Present Application

In one aspect, the present application relates to a composition comprising (1) one or more SGs, and/or (2) one or more GSGs. In some embodiments, the composition further comprises one or more dextrins, one or more non-SG sweeteners, and/or one or more additional additives.

The inventors of the present application have discovered that the compositions of the present application have improved taste profiles and/or solubility over previously reported *Stevia* compositions.

A. SGs and SG Compositions

SGs are glycosides of steviol, a diterpene compound shown below in Formula I.

(I)

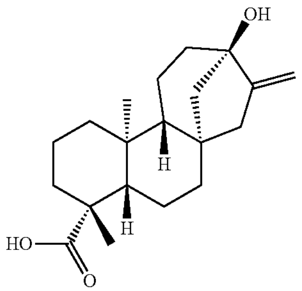

As shown in Formula II, SGs are comprised of steviol molecules glycosylated at the C13 and/or C19 position(s).

(II)

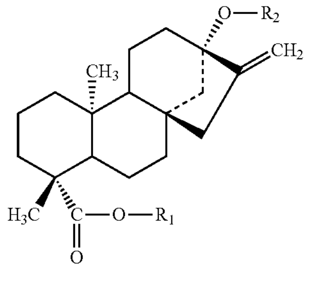

Table A provides a non-limiting list of about 80 SGs grouped according to the molecular weight.

TABLE A

SGs grouped by molecular weight (MW)

| SG Name | MW | # added Glc moieties mw = 180 | # added Rha/Deox Hex moieties mw = 164 | # added Xyl/Arab moieties mw = 150 | R1 (C-19) | R2 (C-13) | Backbone |
|---|---|---|---|---|---|---|---|
| Related SG#1 | 457 | — | | | | | |
| Steviol-monoside | 479 | 1 | | | H— | Glcβ1- | Steviol |
| Steviol-monoside A | 479 | 1 | 1 | | Glcβ1- | H— | |
| SG-4 | 611 | 1 | | 1 | H— | Xylβ(1-2)Glcβ1- | Steviol |
| Dulcoside A1 | 625 | 1 | 1 | | H— | Rhaα(1-2)Glcβ1- | Steviol |
| Iso-steviol-bioside | 641 | 2 | | | H— | Glcβ(1-2)Glcβ1- | Isosteviol |
| Reb-G1 | 641 | 2 | | | H— | Glcβ(1-3)Glcβ1- | Steviol |
| Rubusoside | 641 | 2 | | | Glcβ1- | Glcβ1- | Steviol |
| Steviolbioside | 641 | 2 | | | H— | Glcβ(1-2)Glcβ1- | Steviol |
| Related SG#3 | 675 | — | | | | | |
| Reb-F1 | 773 | 2 | | 1 | H— | Xylβ(1-2)[Glcβ(1-3)]Glcβ1- | Steviol |
| Reb-R1 | 773 | 2 | | 1 | H— | Glcβ(1-2)[Glcβ(1-3)]Xylβ1- | Steviol |
| Stevioside F (SG-1) | 773 | 2 | | 1 | Glcβ1- | Xylβ(1-2)Glcβ1- | Steviol |
| SG-Unk1 | 773 | 2 | | 1 | — | — | Steviol |
| Dulcoside A | 787 | 2 | 1 | | Glcβ1- | Rhaα(1-2)Glcβ1- | Steviol |
| Dulcoside B (JECFAC) | 787 | 2 | 1 | | H— | Rhaα(1-2)[Glcβ (1-3)]Glcβ1- | Steviol |
| SG-3 | 787 | 2 | 1 | | H— | 6-deoxyGlcβ(1-2)[Glcβ(1-3)]Glcβ1- | Steviol |
| Stevioside D | 787 | 2 | 1 | | Glcβ1- | Glcβ(1-2)6-deoxyGlcβ1- | |
| Iso-Reb B | 803 | 3 | | | H— | Glcβ(1-2)[Glcβ(1-3)]Glcβ1- | Isosteviol |
| Iso-Stevioside | 803 | 3 | | | Glcβ1- | Glcβ(1-2)Glcβ1- | Isosteviol |
| Reb B | 803 | 3 | | | H— | Glcβ(1-2)[Glcβ(1-3)]Glcβ1- | Steviol |
| Reb G | 803 | 3 | | | Glcβ1- | Glcβ(1-3)Glcβ1- | Steviol |
| Reb-KA | 803 | 3 | | | Glcβ(1-2)Glcβ1- | Glcβ1- | Steviol |
| SG-13 | 803 | 3 | | | Glcβ1- | Glcβ(1-2)Glcβ1- | Isomeric steviol (12α-hydroxy) |
| Stevioside | 803 | 3 | | | Glcβ1- | Glcβ(1-2)Glcβ1- | Steviol |
| Stevioside B (SG-15) | 803 | 3 | | | Glcβ(1-3)Glcβ1- | Glcβ1- | Steviol |
| Reb F | 935 | 3 | | 1 | Glcβ1- | Xylβ(1-2)[Glcβ(1-3)]Glcβ1- | Steviol |
| Reb R | 935 | 3 | | 1 | Glcβ1- | Glcβ(1-2)[Glcβ(1-3)]Xylβ1- | Steviol |
| SG-Unk2 | 935 | 3 | | 1 | — | — | Steviol |
| SG-Unk3 | 935 | 3 | | 1 | — | — | Steviol |
| Reb F3 (SG-11) | 935 | 3 | | 1 | Xylβ(1-6)Glcβ1- | Glcβ(1-2)Glcβ1- | Steviol |
| Reb F2 (SG-14) | 935 | 3 | | 1 | Glcβ1- | Glcβ(1-2)[Xylβ(1-3)]Glcβ1- | Steviol |
| Reb C | 949 | 3 | 1 | | Glcβ1- | Rhaα(1-2)[Glcβ(1-3)]Glcβ1- | Steviol |
| Reb C2/Reb S | 949 | 3 | 1 | | Rhaα(1-2)Glcβ1- | Glcβ(1-2)Glcβ1- | Steviol |
| Stevioside E (SG-9) | 949 | 3 | 1 | | Glcβ1- | 6-DeoxyGlcβ(1-2)[Glcβ(1-3)]Glcβ1- | Steviol |
| Stevioside E2 | 949 | 3 | 1 | | 6-DeoxyGlcβ1- | Glcβ(1-2)[Glcβ(1-3)]Glcβ1- | |
| SG-10 | 949 | 3 | 1 | | Glcβ1- | Glcα(1-3)Glcβ(1-2)[Glcβ(1-3])Glcβ1- | Steviol |
| Reb L1 | 949 | 3 | 1 | | H— | Glcβ(1-3)Rhaα(1-2)[Glcβ(1-3)]Glcβ1- | Steviol |
| SG-2 | 949 | 3 | 1 | | Glcβ1- | 6-deoxyGlcβ(1-2)[Glcβ(1-3)]Glcβ1- | Steviol |
| Reb A3 | 965 | 4 | | | Glcβ1- | Glcβ(1-2)[Fruβ(1- | |

TABLE A-continued

SGs grouped by molecular weight (MW)

| SG Name | MW | # added Glc moieties mw = 180 | # added Rha/Deox Hex moieties mw = 164 | # added Xyl/Arab moieties mw = 150 | R1 (C-19) | R2 (C-13) | Backbone |
|---|---|---|---|---|---|---|---|
| (SG-8) | | (1 Fru) | | | | 3)]Glcβ1- | |
| Iso-Reb A | 965 | 4 | | | Glcβ1- | Glcβ(1-2)[Glcβ(1-3)]Glcβ1- | Isosteviol |
| Reb A | 965 | 4 | | | Glcβ1- | Glcβ(1-2)[Glcβ(1-3)]Glcβ1- | Steviol |
| Reb A2 (SG-7) | 965 | 4 | | | Glcβ1- | Glcβ(1-6)[Glcβ(1-2)] Glcβ1- | Steviol |
| Reb E | 965 | 4 | | | Glcβ(1-2)Glcβ1- | Glcβ(1-2)Glcβ1- | Steviol |
| Reb H1 | 965 | 4 | | | H— | Glcβ(1-6)Glcβ(1-3)[Glcβ1-3)]Glcβ1- | Steviol |
| Related SG#2 | 981 | — | | | | | |
| Related SG#5 | 981 | — | | | | | |
| Reb U2 | 1097 | 4 | | 1 | Xylβ(1-2)[Glcβ(1-3)]Glcβ1- | Glcβ(1-2)Glcβ1- | |
| Reb T | 1097 | 4 | | 1 | Xylβ(1-2)Glcβ1- | Glcβ(1-2)[Glc(1-3)]Glcβ1- | |
| Reb W | 1097 | 4 | | 1 | Glcβ(1-2)[Araβ(1-3)]Glcβ1- | Glcβ(1-2)Glcβ1- | |
| Reb W2 | 1097 | 4 | | 1 | Araβ(1-2)Glcβ1- | Glcβ(1-2)[Glcβ(1-3)]Glcβ1- | |
| RebW3 | 1097 | 4 | | 1 | Araβ(1-6)Glcβ1- | Glcβ(1-2)[Glcβ(1-3)]Glcβ1- | |
| Reb U | 1097 | 4 | | 1 | Araα(1-2)-Glcβ1- | Glcβ(1-2)[Glcβ(1-3)]Glcβ1- | Steviol |
| SG-12 | 1111 | 4 | 1 | | Rhaα(1-2)Glcβ1- | Glcβ(1-2)[Glcβ(1-3)]Glcβ1- | Steviol |
| Reb H | 1111 | 4 | 1 | | Glcβ1- | Glcβ(1-3)Rhaα(1-2)[Glcβ(1-3)]Glcβ1- | Steviol |
| Reb J | 1111 | 4 | 1 | | Rhaα(1-2)Glcβ1- | Glcβ(1-2)[Glcβ(1-3)]Glcβ1- | Steviol |
| Reb K | 1111 | 4 | 1 | | Glcβ(1-2)Glcβ1- | Rhaα(1-2)[Glcβ(1-3)]Glcβ1- | Steviol |
| Reb K2 | 1111 | 4 | 1 | | Glcβ(1-6)Glcβ1- | Rhaα(1-2)[Glcβ(1-3)]Glcβ1- | Steviol |
| SG-Unk4 | 1111 | 4 | 1 | | — | — | Steviol |
| SG-Unk5 | 1111 | 4 | 1 | | — | — | Steviol |
| Reb D | 1127 | 5 | | | Glcβ(1-2)Glcβ1- | Glcβ(1-2)[Glcβ(1-3)]Glcβ1- | Steviol |
| Reb I | 1127 | 5 | | | Glcβ(1-3)Glcβ1- | Glcβ(1-2)[Glcβ(1-3)]Glcβ1- | Steviol |
| Reb L | 1127 | 5 | | | Glcβ1- | Glcβ(1-6)Glcβ(1-2)[Glcβ(1-3)]Glcβ1- | Steviol |
| Reb I3 | 1127 | 5 | | | [Glcβ(1-2) Glcβ(1-6)]Glcβ 1- | Glcβ(1-2)Glcβ1- | |
| SG-Unk6 | 1127 | 5 | | | — | — | Steviol |
| Reb Q (SG-5) | 1127 | 5 | | | Glcβ1- | Glcβ(1-4)Glcβ(1-2)[Glcβ(1-3)]Glcβ1- | Steviol |
| Reb I2 (SG-6) | 1127 | 5 | | | Glcβ1- | Glcα(1-3)Glcβ1-2[Glcβ1-3)]Glcβ1- | Steviol |
| Reb Q2 | 1127 | 5 | | | Glcα(1-2)Glcα(1-4)Glcβ1- | Glcβ(1-2)Glcβ1- | |
| Reb Q3 | 1127 | 5 | | | Glcβ1- | Glcα(1-4)Glcβ(1-3)[Glcβ(1-2)]Glcβ1- | |
| Reb T1 | 1127 | 5 (1 Gal) | | | Galβ(1-2)Glcβ1- | Glcβ(1-2)[Glcβ(1-3)]Glcβ1- | |
| Related SG#4 | 1127 | — | | | | | |
| Reb V2 | 1259 | 5 | | 1 | Xylβ(1-2)[Glcβ(1-3)]-Glcβ1- | Glcβ(1-2)[Glcβ(1-3)]Glcβ1- | Steviol |
| Reb V | 1259 | 5 | | 1 | Glcβ(1-2)[Glcβ(1-3)]Glcβ1- | Xylβ(1-2)[Glcβ(1-3)]-Glcβ1- | |

TABLE A-continued

| SGs grouped by molecular weight (MW) | | | | | | | |
|---|---|---|---|---|---|---|---|
| SG Name | MW | # added Glc moieties mw = 180 | # added Rha/Deox Hex moieties mw = 164 | # added Xyl/Arab moieties mw = 150 | R1 (C-19) | R2 (C-13) | Backbone |
| Reb Y | 1259 | 5 | | 1 | Glcβ(1-2)[Araβ(1-3)]Glcβ1- | Glcβ(1-2)[Glcβ(1-3)]Glcβ1- | |
| Reb N | 1273 | 5 | 1 | | Rhaα(1-2)[Glcβ(1-3)]Glcβ1- | Glcβ(1-2)[Glcβ(1-3)]Glcβ1- | Steviol |
| Reb M | 1289 | 6 | | | Glcβ(1-2)[Glcβ(1-3)]Glcβ1- | Glcβ(1-2)[Glcβ(1-3)]Glcβ1- | Steviol |
| 15α-OH Reb M | 1305 | 6 | | | Glcβ1-2(Glcβ1-3)Glcβ1- | Glcβ(1-2)[Glcβ1-3]Glcβ1- | 15α-Hydroxy-steviol |
| Reb O | 1435 | 6 | 1 | | Glcβ(1-3)Rhaα(1-2)[Glcβ(1-3)]Glcβ1- | Glcβ(1-2)[Glcβ(1-3)]Glcβ1- | Steviol |
| Reb O2 | 1435 | 6 | 1 | | Glcβ(1-4)Rhaα(1-2)[Glcβ(1-3)]Glcβ1- | Glcβ(1-2)[Glcβ(1-3)]Glcβ1- | |

Legend: SG-1 to 16: SGs without a specific name;
SG-Unk1-6: SGs without detailed structural proof;
Glc: Glucose;
Rha: Rhamnose;
Xyl: Xylose;
Ara: Arabinose.

Table B shows SGs grouped according to the number of specific sugar groups in the C-19 and C-13 positions, whereby "x" in SG-xG refers to the number of glucose groups in the C-19 and C-13 positions, whereby "x" in SG-xR refers to the number of rhamnose and/or deoxyhexose groups in the C-19 and C-13 positions, whereby "x" in SG-xX refers to the number of xylose and/or arabinose groups in the C-19 and C-13 positions, whereby "x" in SG-xFru refers to the number of fructose groups in the C-19 and C-13 positions, and whereby "x" in SG-xGal refers to the number of galactose groups in the C-19 and C-13 positions. In addition, a number between −1 and −8 following the last letter corresponding to a sugar (i.e., G, R, X) refers to the number of glucose molecules added to that last sugar during enzymatic treatment. Thus, for example, "SG-4G-2" represents an SG with 4 glucose molecules to which 2 glucose molecules were added during enzymatic treatment; "SG-3G1R-4" represents an SG with 3 glucose molecules and 1 rhamnose/deoxyhexose molecule to which 4 glucose molecules were added during enzymatic treatment; and "SG-4G1X-3 represents an SG with 4 glucose molecules and 1 xylose/arabinose molecule to which 3 glucose molecules were added during enzymatic treatment.

TABLE B

| SG-group | Name | MW | Added Glc MW = 180 | Added Rham/DeoxyHex MW = 164 | Added Xyl/Arab MW = 150 | R1 (C-19) | R2 (C-13) | Backbone |
|---|---|---|---|---|---|---|---|---|
| SG-1G | Steviol-monoside | 480 | 1 | | | H— | Glcβ1- | Steviol |
| | Steviol-monoside A | 480 | 1 | | | Glcβ1- | H— | Steviol |
| SG-1G1R | Dulcoside A1 | 626 | 1 | 1 | | H— | Rhaα(1-2)Glcβ1- | Steviol |
| | Dulcoside A1 | 626 | 1 | 1 | | | | Steviol |
| SG-1G1X | SG-4 | 612 | 1 | | 1 | H— | Xylβ(1-2)Glcβ1- | Steviol |
| SG-2G | Reb-G1 | 642 | 2 | | | H— | Glcβ(1-3)Glcβ1- | Steviol |
| | Rubusoside | 642 | 2 | | | Glcβ1- | Glcβ1- | Steviol |
| | Steviolbioside | 642 | 2 | | | H— | Glcβ(1-2)Glcβ1- | Steviol |
| SG-2G1R | Dulcoside A | 788 | 2 | 1 | | Glcβ1- | Rhaα(1-2)Glcβ1- | Steviol |
| | Dulcoside B (JECFA C) | 788 | 2 | 1 | | H— | Rhaα(1-2)[Glcβ(1-3)]Glcβ1- | Steviol |
| | SG-3 | 788 | 2 | 1 | | H— | 6-deoxyGlcβ(1-2)[Glcβ(1-3)]Glcβ1- | Steviol |
| | Stevioside D | 788 | 2 | 1 | | Glcβ1- | Glcβ(1-2)6-deoxyGlcβ1- | Steviol |
| SG-2G1X | Reb-F1 | 774 | 2 | | 1 | H— | Xylβ(1-2)[Glcβ(1-3)]Glcβ1- | Steviol |

TABLE B-continued

| SG-group | Name | MW | Added Glc MW = 180 | Added Rham/ DeoxyHex MW = 164 | Added Xyl/ Arab MW = 150 | R1 (C-19) | R2 (C-13) | Backbone |
|---|---|---|---|---|---|---|---|---|
| | Reb-R1 | 774 | 2 | | 1 | H— | Gβ(1-2)[Glcβ(1-3)]Xylβ- | Steviol |
| | Stevioside F (SG-1) | 774 | 2 | | 1 | Glcβ1- | Xylβ(1-2)Glcβ1- | Steviol |
| | SG-Unk1 | 774 | 2 | | 1 | — | — | Steviol |
| SG-3G | Reb B | 804 | 3 | | | H— | Glcβ(1-2)[Glcβ(1-3)]Glcβ1- | Steviol |
| | Reb G | 804 | 3 | | | Glcβ1- | Glcβ(1-3)Glcβ1- | Steviol |
| | Reb-KA | 804 | 3 | | | Glcβ(1-2)Glcβ1- | Glcβ1- | Steviol |
| | Stevioside | 804 | 3 | | | Glcβ1- | Glcβ(1-2)Glcβ1- | Steviol |
| | Stevioside B (SG-15) | 804 | 3 | | | Glcβ(1-3)Glcβ1- | Glcβ1- | Steviol |
| SG-3G1Fru | Reb A3 (SG-8) | 966 | 4 (1 Fru) | | | Glcβ1- | Glcβ(1-2)[Fruβ(1-3)]Glcβ1- | Steviol |
| SG-3G1R | Reb C | 950 | 3 | 1 | | Glcβ1- | Rhaα(1-2)[Glcβ(1-3)]Glcβ1- | Steviol |
| | Reb C2/Reb S | 950 | 3 | 1 | | Rhaα(1-2)Glcβ1- | Glcβ(1-2)Glcβ1- | Steviol |
| | Stevioside E (SG-9) | 950 | 3 | 1 | | Glcβ1- | 6-DeoxyGlcβ(1-2)[Glcβ(1-3)]Glcβ1- | Steviol |
| | Stevioside E2 | 950 | 3 | 1 | | 6-DeoxyGlcβ1- | Glcβ(1-2)[Glcβ(1-3)]Glcβ1- | Steviol |
| | SG-10 | 950 | 3 | 1 | | Glcβ1- | Glcα(1-3)Glcβ(1-2)[Glcβ(1-31)Glcβ1- | Steviol |
| | Reb L1 | 950 | 3 | 1 | | H— | Glcβ(1-3)Rhaα(1-2)[Glcβ(1-3)]Glcβ1- | Steviol |
| | SG-2 | 950 | 3 | 1 | | Glcβ1- | 6-deoxyGlcβ(1-2)[Glcβ(1-3)]Glcβ1- | Steviol |
| SG-3G1X | Reb F | 936 | 3 | | 1 | Glcβ1- | Xylβ(1-2)[Glcβ(1-3)]Glcβ1- | Steviol |
| | Reb R | 936 | 3 | | 1 | Glcβ1- | Glcβ(1-2)[Glcβ(1-3)]Xylβ1- | Steviol |
| | SG-Unk2 | 936 | 3 | | 1 | — | — | Steviol |
| | SG-Unk3 | 936 | 3 | | 1 | — | — | Steviol |
| | Reb F3 (SG-11) | 936 | 3 | | 1 | Xylβ(1-6)Glcβ1- | Glcβ(1-2)Glcβ1- | Steviol |
| | Reb F2 (SG-14) | 936 | 3 | | 1 | Glcβ1- | Glcβ(1-2)[Xylβ(1-3)]Glcβ1- | Steviol |
| SG-4G | Reb A | 966 | 4 | | | Glcβ1- | Glcβ(1-2)[Glcβ(1-3)]Glcβ1- | Steviol |
| | Reb A2 (SG-7) | 966 | 4 | | | Glcβ1- | Glcβ(1-6)[Glcβ(1-2)]Glcβ1- | Steviol |
| | Reb E | 966 | 4 | | | Glcβ(1-2)Glcβ1- | Glcβ(1-2)Glcβ1- | Steviol |
| | Reb H1 | 966 | 4 | | | H— | Glcβ(1-6)Glcβ(1-3)[Glcβ1-3)]Glcβ1- | Steviol |
| SG-4G1Gal | Reb T1 | 1128 | 5 (1 Gal) | | | Galcβ(1-2)Glcβ1- | Glcβ(1-2)[Glcβ(1-3)]Glcβ1- | Steviol |
| SG-4G1R | SG-12 | 1112 | 4 | 1 | | Rhaα(1-2)Glcβ1- | Glcβ(1-2)[Glcβ(1-3)]Glcβ1- | Steviol |
| | Reb H | 1112 | 4 | 1 | | Glcβ1- | Glcβ(1-3)Rhaα(1-2)[Glcβ(1-3)]Glcβ1- | Steviol |
| | Reb J | 1112 | 4 | 1 | | Rhaα(1-2)Glcβ1- | Glcβ(1-2)[Glcβ(1-3)]Glcβ1- | Steviol |
| | Reb K | 1112 | 4 | 1 | | Glcβ(1-2)Glcβ1- | Rhaα(1-2)[Glcβ(1-3)]Glcβ1- | Steviol |
| | Reb K2 | 1112 | 4 | 1 | | Glcβ(1-6)Glcβ1- | Rhaα(1-2)[Glcβ(1-3)]Glcβ1- | Steviol |
| | SG-Unk4 | 1112 | 4 | 1 | | — | — | Steviol |
| | SG-Unk5 | 1112 | 4 | 1 | | — | — | Steviol |
| SG-4G1X | Reb U2 | 1098 | 4 | | 1 | Xylβ(1-2)[Glcβ(1-3)]Glcβ1- | Glcβ(1-2)Glcβ1- | Steviol |
| | Reb T | 1098 | 4 | | 1 | Xylβ(1-2)Glcβ1- | Glcβ(1-2)[Glcβ(1-3)]Glcβ1- | Steviol |
| | Reb W | 1098 | 4 | | 1 | Glcβ(1-2)[Araβ(1-3)]Glcβ1- | Glcβ(1-2)Glcβ1- | Steviol |
| | Reb W2 | 1098 | 4 | | 1 | Araβ(1-2)Glcβ1- | Glcβ(1-2)[Glcβ(1-3)]Glcβ1- | Steviol |
| | Reb W3 | 1098 | 4 | | 1 | Araβ(1-6)Glcβ1- | Glcβ(1-2)[Glcβ(1-3)]Glcβ1- | Steviol |
| | Reb U | 1098 | 4 | | 1 | Araα(1-2)-Glcβ1- | Glcβ(1-2)[Glcβ(1-3)]Glcβ1- | Steviol |
| SG-5G | Reb D | 1128 | 5 | | | Glcβ(1-2)Glcβ1- | Glcβ(1-2)[Glcβ(1-3)]Glcβ1- | Steviol |
| | Reb I | 1128 | 5 | | | Glcβ(1-3)Glcβ1- | Glcβ(1-2)[Glcβ(1-3)]Glcβ1- | Steviol |

TABLE B-continued

| SG-group | Name | MW | Added Glc MW = 180 | Added Rham/ DeoxyHex MW = 164 | Added Xyl/ Arab MW = 150 | R1 (C-19) | R2 (C-13) | Backbone |
|---|---|---|---|---|---|---|---|---|
| | Reb L | 1128 | 5 | | | Glcβ1- | Glcβ(1-6)Glcβ(1-2)[Glcβ(1-3)]Glcβ1- | Steviol |
| | Reb I3 | 1128 | 5 | | | [Glcβ(1-2)Glcβ(1-6)]Glcβ1- | Glcβ(1-2)Glcβ1- | Steviol |
| | SG-Unk6 | 1128 | 5 | | | — | — | Steviol |
| | Reb Q (SG-5) | 1128 | 5 | | | Glcβ1- | Glcα(1-4)Glcβ(1-2)[Glcβ(1-3)]Glcβ1- | Steviol |
| | Reb I2 (SG-6) | 1128 | 5 | | | Glcβ1- | Glcα(1-3)Glcβ1-2[Glcβ1-3)]Glcβ1- | Steviol |
| | Reb Q2 | 1128 | 5 | | | Glcα(1-2)Glcα(1-4)Glcβ1- | Glcβ(1-2)Glcβ1- | Steviol |
| | Reb Q3 | 1128 | 5 | | | Glcβ1- | Glcα(1-4)Glcβ(1-3)[Glcβ(1-2)]Glcβ1- | Steviol |
| SG-5G1R | Reb N | 1274 | 5 | 1 | | Rhaα(1-2)[Glcβ(1-3)]Glcβ1- | Glcβ(1-2)[Glcβ(1-3)]Glcβ1- | Steviol |
| SG-5G1X | Reb V2 | 1260 | 5 | | 1 | Xylβ(1-2)[Glcβ(1-3)]-Glcβ1- | Glcβ(1-2)[Glcβ3(1-3)]Glcβ1- | Steviol |
| | Reb V | 1260 | 5 | | 1 | Glcβ(1-2)[Glcβ(1-3)]Glcβ1- | Xylβ(1-2)[Glcβ(1-3)]-Glcβ1- | Steviol |
| | Reb Y | 1260 | 5 | | 1 | Glcβ(1-2)[Araβ(1-3)]Glcβ1- | Glcβ(1-2)[Glcβ(1-3)]Glcβ1- | Steviol |
| SG-6G | Reb M | 1290 | 6 | | | Glcβ(1-2)[Glcβ(1-3)]Glcβ1- | Glcβ(1-2)[Glcβ(1-3)]Glcβ1- | Steviol |
| SG-6G1R | Reb O | 1436 | 6 | 1 | | Glcβ(1-3)Rhaα(1-2)[Glcβ(1-3)]Glcβ1- | Glcβ(1-2)[Glcβ(1-3)]Glcβ1- | Steviol |
| | Reb O2 | 1436 | 6 | 1 | | Glcβ(1-4)Rhaα(1-2)[Glcβ(1-3)]Glcβ1- | Glcβ(1-2)[Glcβ(1-3)]Glcβ1- | Steviol |
| SG-Rel | Related SG#1 | 458 | — | | | | | Steviol |
| SG-Rel | Related SG#2 | 982 | — | | | | | Steviol |
| SG-Rel | Related SG#3 | 676 | — | | | | | Steviol |
| SG-Rel | Related SG#4 | 1128 | — | | | | | Steviol |
| SG-Rel | Related SG#5 | 982 | — | | | | | Steviol |
| — | Iso-Steviolbioside | 642 | 2 | | | H— | Glcβ(1-2)Glcβ1- | Isosteviol |
| — | Iso-Reb B | 804 | 3 | | | H— | Glcβ(1-2)[Glcβ(1-3)]Glcβ1- | Isosteviol |
| — | Iso-Stevioside | 804 | 3 | | | Glcβ1- | Glcβ(1-2)Glcβ1- | Isosteviol |
| — | Iso-Reb A | 966 | 4 | | | Glcβ1- | Glcβ(1-2)[Glcβ(1-3)]Glcβ1- | Isosteviol |
| — | SG-13 | 804 | 3 | | | Glcβ1- | Glcβ(1-2)Glcβ1- | Isomeric steviol (12α-hydroxy) |
| — | 15α-OH Reb M | 1306 | 6 | | | Glcβ1-2(Glcβ1-3)Glcβ1- | Glcβ1-2(Glcβ1-3)Glcβ1- | 15α-Hydroxy-steviol |

Legend: SG-1 to 16: SGs without a specific name;
SG-Unk1-6: Steviolglycosides without detailed structural proof;
Glc: Glucose;
Rha: Rhamnose;
Xyl: Xylose;
Ara: Arabinose;
Fru: Fructose;
Gal: Galactose In some embodiments, the composition of the present application comprises one or more *Stevia* glycoside(s) selected from Tables A and/or B.

In one embodiment, the SG composition comprises one or more SGs, each in an amount between 0.01-2 wt %, wherein the one or more SGs are selected from the group consisting of Iso-steviolbioside, Reb-E, Reb-F1, Reb-G, Reb-H, Reb-H1, Reb-I, Reb-I2, Reb-J, Reb-KA, Reb-K2, Reb-M, Reb-N, Reb-O, Reb-O2, Reb-Q, Reb-R, Reb-R1, Reb-S, Reb-T, Reb-U2, Reb-V, Reb-V2, Reb-W, Reb-W2/3, Reb-Y, Rel SG#1, Rel SG#2, Rel SG#3, Rel SG#4, Rel SG#5, and combinations thereof.

In another embodiment, a GSG composition comprises one or more GSGs originating from one or more SGs selected from the group consisting of Reb-D, Reb-I, Reb-L, Reb-Q, and Reb-I2, wherein the one or more GSGs are selected from the group consisting of GSG-5G-1, GSG-5G-2, GSG-5G-3, GSG-5G-4, and GSG-5G-5. These GSGs originate from the SG-5G group.

In other embodiments, the composition comprises a plurality of SGs in the form of a *Stevia* leaf extract including, but are not limited to RA20, RA40, RA50, RA60, RA80, RA 90, RA95, RA97, RA98, RA99, RA99.5, RB8, RB10, RB15, RC15, RD6 and combinations thereof.

*Stevia* extracts contain a wide variety of different SGs in different concentrations. For example, an analysis of an RA50 extract using the process described in Example 63 below show the following distribution and concentrations of SGs as shown in Table C. An analysis of a combination extract comprising RA40+RB8 is shown in Table D.

TABLE C

Distribution and concentration of SGs in RA50

| Name | MW | mg/10 ml | % m/m |
|---|---|---|---|
| Related steviol glycoside #1 | 517 or 427 | <0.01 | <0.01 |
| Related steviol glycoside #2 | 981 | 0.23 | 0.130 |
| Related steviol glycoside #3 | 427 or 735 | 0.27 | 0.151 |
| Related steviol glycoside #4 | 675 or 1127 | 0.07 | 0.037 |
| Related steviol glycoside #5 | 981 | 2.23 | 1.242 |
| Reb-V | 1259 | <0.01 | <0.01 |
| Reb-T | 1127 | <0.01 | <0.01 |
| Reb-E | 965 | 0.87 | 0.487 |
| Reb-O | 1435 | 0.02 | 0.009 |
| Reb-D | 1127 | 2.63 | 1.464 |
| Reb-K | 1111 | 0.06 | 0.035 |
| Reb-N | 1273 | 0.03 | 0.014 |
| Reb-M | 1289 | 0.07 | 0.038 |
| Reb-S | 949 | 0.00 | −0.002 |
| Reb-J | 1111 | 0.05 | 0.028 |
| Reb-W | 1097 | 0.13 | 0.074 |
| Reb-U2 | 1097 | <0.01 | <0.01 |
| Reb-W2/3 | 1097 | <0.01 | <0.01 |
| Reb-O2 | 965 | 0.08 | 0.047 |
| Reb-Y | 1259 | 0.09 | 0.050 |
| Reb-I | 1127 | <0.01 | <0.01 |
| Reb-V2 | 1259 | <0.01 | <0.01 |
| Reb-K2 | 1111 | 1.19 | 0.661 |
| Reb-H | 1111 | <0.01 | <0.01 |
| Reb-A | 965 | 91.72 | 51.041 |
| Stevioside | 803 | 55.43 | 30.844 |
| Reb-F | 935 | 0.15 | 0.086 |
| Reb-C | 949 | 7.40 | 4.118 |
| Dulcoside-A | 787 | 0.45 | 0.248 |
| Rubusoside | 641 | 0.47 | 0.260 |
| Reb-B | 803 | 4.02 | 2.239 |
| Dulcoside B | 787 | 0.65 | 0.362 |
| Steviolbioside | 641 | 0.96 | 0.531 |
| Reb-R | 935 | 0.01 | 0.005 |
| Reb-G | 803 | 0.23 | 0.128 |
| Stevioside-B | 787 | 0.94 | 0.526 |
| Reb-G1 | 641 | <0.01 | <0.01 |
| Reb-R1 | 773 | 1.39 | 0.771 |
| Reb-F1 | 773 | <0.01 | <0.01 |
| Iso-Steviolbioside | 641 | 0.23 | 0.130 |
| | Sum | 171.33 | 95.34 |

TABLE D

Distribution and concentration of SGs in RA40/RB8

| | | RA40/RB8 Lot 174-71-01 | | |
|---|---|---|---|---|
| Name | MW | mg/10 ml | % m/m | ±s.d. % (m/m) |
| Related steviol glycoside #1 | 517 or 427 | 0.08 | 0.05 | 0.01 |
| Related steviol glycoside #2 | 981 | <0.01 | <0.01 | <0.01 |
| Related steviol glycoside #3 | 427 or 735 | 1.01 | 0.67 | 0.13 |
| Related steviol glycoside #4 | 675 or 1127 | 0.21 | 0.14 | 0.03 |
| Related steviol glycoside #5 | 981 | 0.10 | 0.06 | 0.01 |
| Reb-V | 1259 | <0.01 | <0.01 | <0.01 |
| Reb-T | 1127 | <0.01 | <0.01 | <0.01 |
| Reb-E | 965 | 0.74 | 0.49 | 0.10 |
| Reb-O | 1435 | 2.53 | 1.69 | 0.25 |
| Reb-D | 1127 | 1.73 | 1.15 | 0.17 |
| Reb-K | 1111 | <0.01 | <0.01 | <0.01 |
| Reb-N | 1273 | 0.42 | 0.28 | 0.06 |
| Reb-M | 1289 | 0.07 | 0.05 | 0.01 |
| Reb-S | 949 | 0.11 | 0.07 | 0.01 |
| Reb-J | 1111 | 0.11 | 0.07 | 0.01 |
| Reb-W | 1097 | 0.05 | 0.03 | 0.01 |
| Reb-U2 | 1097 | <0.01 | <0.01 | <0.01 |
| Reb-W2/3 | 1097 | 0.05 | 0.03 | 0.01 |

TABLE D-continued

Distribution and concentration of SGs in RA40/RB8

| | | RA40/RB8 Lot 174-71-01 | | |
|---|---|---|---|---|
| Name | MW | mg/10 ml | % m/m | ±s.d. % (m/m) |
| Reb-O2 | 965 | <0.01 | <0.01 | <0.01 |
| Reb-Y | 1259 | 0.38 | 0.25 | 0.05 |
| Reb-I | 1127 | 1.12 | 0.75 | 0.15 |
| Reb-V2 | 1259 | <0.01 | <0.01 | <0.01 |
| Reb-K2 | 1111 | <0.01 | <0.01 | <0.01 |
| Reb-H | 1111 | <0.01 | <0.01 | <0.01 |
| Reb-A | 965 | 60.36 | 40.30 | 6.04 |
| Stevioside | 803 | 26.66 | 17.80 | 2.67 |
| Reb-F | 935 | <0.01 | <0.01 | <0.01 |
| Reb-C | 949 | 2.91 | 1.94 | 0.29 |
| Dulcoside-A | 787 | 11.92 | 7.96 | 1.19 |
| Rubusoside | 641 | 2.50 | 1.67 | 0.25 |
| Reb-B | 803 | 12.09 | 8.07 | 1.21 |
| Dulcoside B | 787 | 0.36 | 0.24 | 0.05 |
| Steviolbioside | 641 | 0.37 | 0.25 | 0.05 |
| Reb-R | 935 | 0.72 | 0.48 | 0.10 |
| Reb-G | 803 | 1.49 | 1.00 | 0.20 |
| Stevioside-B | 787 | 1.04 | 0.69 | 0.14 |
| Reb-G1 | 641 | <0.01 | <0.01 | <0.01 |
| Reb-R1 | 773 | <0.01 | <0.01 | <0.01 |
| Reb-F1 | 773 | <0.01 | <0.01 | <0.01 |
| Iso-Steviolbioside | 641 | <0.01 | <0.01 | <0.01 |
| | Sum | 129.11 | 86.19 | |

In one embodiment, an SG-A composition comprises 25-35 wt % Reb-A, 0.4-4 wt % Reb-B, 5-15 wt % Reb-C, 1-10 wt % Reb-D, 2-5 wt % Reb-F, 1-5 wt % Reb-K, and 20-40 wt % Stevioside. In some embodiments, the SG composition further comprises at least 20, at least 21, at least 22, at least 23 or at least 24 members selected from the group consisting of 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG#4, 0.01-0.5 wt % Rel SG#5, 0.01-0.4 wt % Reb-M, 0.01-0.4 wt % Reb-N, 0.01-0.4 wt % Reb-E, 0.01-0.4 wt % Reb-F1, 0.01-0.4 wt % Reb-Y, and combinations thereof.

In another embodiment, an SG-B composition comprises 45-55 wt % Reb-A, 20-40 wt % Stevioside, 2-6 wt % Reb-C, 0.5-3 wt % Reb-B, and 0.5-3 wt % Reb-D. In some embodiments, the SG-B composition further comprises one or more members selected from the group consisting of 0.1-3 wt % Related SG#5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, and combinations thereof. In some embodiments, the SG-B composition further comprises one or more members selected from the group consisting of 0.01-1 wt % Steviolbioside, 0.01-1 wt % Iso-steviolbioside, 0.01-1 wt % Stevioside-B, 0.01-1 wt % Related SG#3, 0.01-1 wt % Related SG#2, 0.01-1 wt % Reb-G, 0.01-1 wt % Reb-F, 0.01-1 wt % Reb-W, and combinations thereof.

B. GSGs and GSG Compositions

GSGs are modified SGs with additional sugar groups added at various positions of the SG molecules. The additional sugar groups may be added in an enzymatically catalyzed glycosylation process. The abbreviation "GX" may be used with reference to the number of sugar groups added to a SG, where "X" is a value from 1 to 20 corresponding to the number of enzymatically added glycosyl groups present in GSG molecule. Thus, glycosylated steviol materials with 1 additional glycosyl group are referred to as G1, materials with 2 additional glucosyls are referred to as G2, and so forth. For example, ST G1 (ST-G1) has one (1) glycosyl group, thus "G1," ST-G2 has two (2) glycosyl groups present, ST-G3 has three (3) glycosyl groups present, ST-G4 has four (4) glycosyl groups present, ST-G5 has five (5) glycosyl groups present, ST-G6 has six (6) glycosyl groups present, ST-G7 has seven (7) groups present, ST-G8 has eight (8) glycosyl groups present, and ST-G9 has nine (9) glycosyl groups present. Without limitation, GSGs containing even more glucosyl groups can be made. The glycosylation of the molecule can be determined by HPLC-MS as described herein and as exemplified by Example 17.

Any of the SGs in Tables A-D, for example steviol, STB, ST, RA, RB, RC, RD, rebaudioside E (RE), rebaudioside F (RF), rebaudioside M (RM), rubusoside and dulcoside A can be enzymatically modified to afford, for example, their corresponding multi-glycosylated glycosides as follows: Steviol-G1, Steviol-G2, Steviol-G3, Steviol-G4, Steviol-G5, Steviol-G6, Steviol-G7, Steviol-G8, Steviol-G9, STB-G1, STB-G2, STB-G3, STB-G4, STB-G5, STB-G6, STB-G7, STB-G8, STB-G9, RB-G1, RB-G2, RB-G3, RB-G4, RB-G5, RB-G6, RB-G7, RB-G8, RB-G9, RC-G1, RC-G2, RC-G3, RC-G4, RC-G5, RC-G6, RC-G7, RC-G8, RC-G9, RD-G1, RD-G2, RD-G3, RD-G4, RD-G5, RD-G6, RD-G7, RD-G8, RD-G9, RE-G1, RE-G2, RE-G3, RE-G4, RE-G5, RE-G6, RE-G7, RE-G8, RE-G9, RF-G1, RF-G2, RF-G3, RF-G4, RF-G5, RF-G6, RF-G7, RF-G8, RF-G9, RM-G1, RM-G2, RM-G3, RM-G4, RM-G5, RM-G6, RM-G7, RM-G8, RM-G9, Rubusoside-G1, Rubusoside-G2, Rubusoside-G3, Rubusoside-G4, Rubusoside-G5, Rubusoside-G6, Rubusoside-G7, Rubusoside-G8, Rubusoside-G9, Dulcoside A-G1, Dulcoside A-G2, Dulcoside A-G3, Dulcoside A-G4, Dulcoside A-G5, Dulcoside A-G6, Dulcoside A-G7, Dulcoside A-G8, and Dulcoside A-G9.

For example, G1 and G2 of steviol, STB, ST, RA, RB, RC, RD, RE, RF, RM, rubusoside and dulcoside A are shown below.

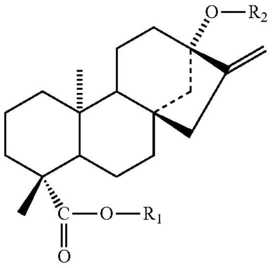

| Name | $R_1$ | $R_2$ |
|---|---|---|
| Steviol | —H | —H |
| Steviol G1 (S-G1) | -glucosyl | —H |
| | —H | -glucosyl |
| Steviol G2 (S-G2) | -glucosyl | -glucosyl |
| | -(glucosyl)$_2$ | —H |
| | —H | -(glucosyl)$_2$ |

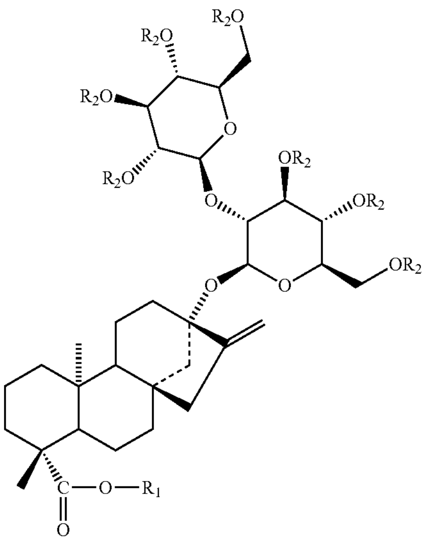

| Name | $R_1$ | $R_2$ |
|---|---|---|
| Steviolbioside | —H | —7H |
| Steviol G1 (S-G1) | -glucosyl | —7H |
| | —H | —6H, -glucosyl |
| Steviol G2 (S-G2) | -glucosyl | —6H, -glucosyl |
| | -(glucosyl)$_2$ | —7H |
| | —H | —5H, −2 × glucosyl |
| | —H | —6H, -(glucosyl)$_2$ |

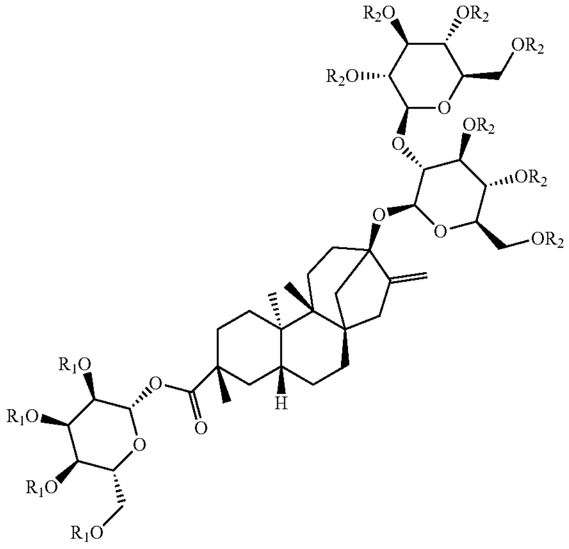

| Name | $R_1$ | $R_2$ |
|---|---|---|
| Stevioside (ST) | —H | —H |
| Stevioside-G1 | -glucosyl | —H |
| (ST-G1) | —H | -glucosyl |
| Stevioside-G2 | -(glucosyl)$_2$ | —H |
| (ST-G2) | -glucosyl | -glycosyl |
| | —H | -(glucosyl)- |

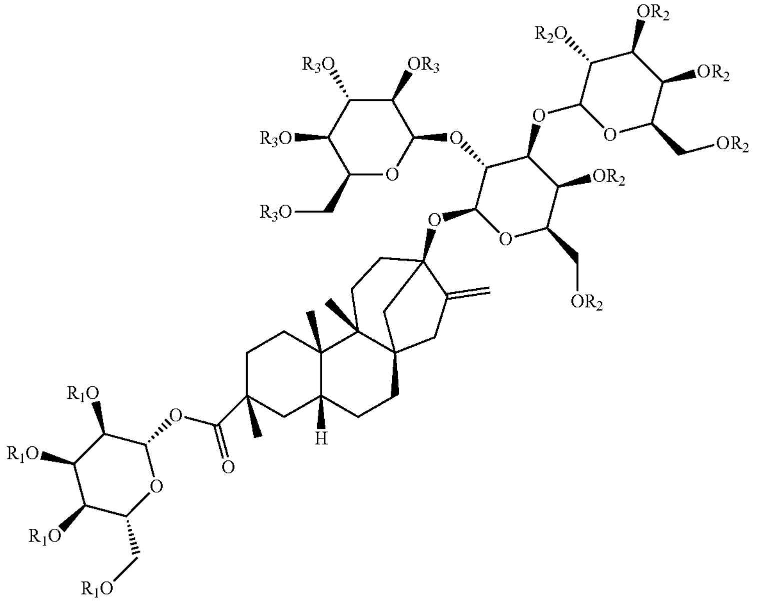

| Name | $R_1$ | $R_2$ | $R_3$ |
|---|---|---|---|
| Rebaudioside A | —H | —H | —H |
| Rebaudioside A | -glycosyl | —H | —H |
| G1 (RA-G1) | —H | -glucosyl | —H |
| | —H | —H | -glycosyl |
| Rebaudioside A | -(glucosyl)- | —H | —H |
| G2 (RA-G2) | —H | -$(glucosyl)_1$ | —H |
| | —H | —H | -$(glucosyl)_2$ |
| | -glucosyl | -glucosyl | —H |
| | —H | -glucosyl | -glucosyl |
| | -glusoyl | —H | -glucosyl |

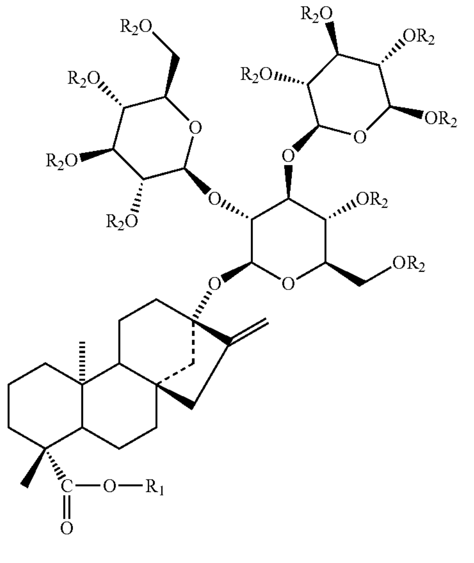

| Name | $R_1$ | $R_2$ |
|---|---|---|
| Rebaudioside B | —H | —10H |
| Rebaudioside B G1 (RB-G1) | -glucosyl | —10H |
| | —H | —9H, -glucosyl |

-continued

| | | |
|---|---|---|
| Rebaudioside B G2 (RB-G2) | -glucosyl, | —9H, -glucosyl |
| | -$(glucosyl)_2$ | —7H |
| | —H | —8H, −2 × glucosyl |
| | —H | —9H, -$(glucosyl)_2$ |

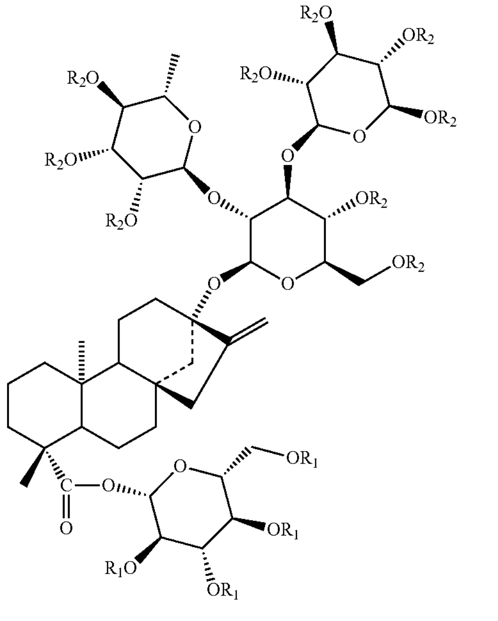

-continued

| Name | $R_1$ | $R_2$ |
|---|---|---|
| Rebaudioside C | —4H | —9H |
| Rebaudioside C G1 (RC-G1) | —3H, -glucosyl | —9H |
| | —4H | —8H, -glucosyl |
| Rebaudioside C G2 (RC-G2) | —3H, -glucosyl | —8H, -glucosyl |
| | —3H, -(glucosyl)$_2$ | —9H |
| | —2H, −2 × glucosyl | —9H |
| | —4H | —7H, −2 × glucosyl |
| | —4H | —8H, -(glucosyl)$_2$ |

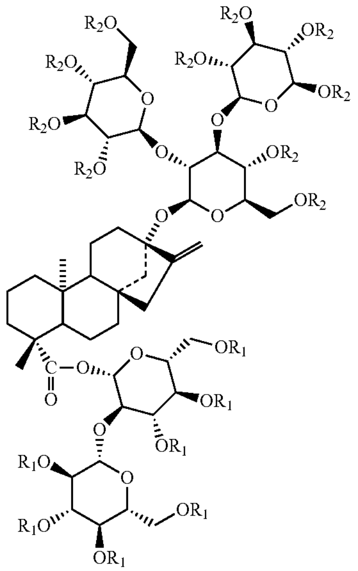

| Name | $R_1$ | $R_2$ |
|---|---|---|
| Rebaudioside D | —7H | —10H |
| Rebaudioside D G1 (RD-G1) | —6H, -glucosyl | —10H |
| | —7H | —9H, -glucosyl |
| Rebaudioside D G2 (RD-G2) | —6H, -glucosyl | —9H, -glucosyl |
| | —6H, -(glucosyl)$_2$ | —10H |
| | —5H, −2 × glucosyl | —10H |
| | —7H | —8H, −2 × glucosyl |
| | —7H | —9H, -(glucosyl)$_2$ |

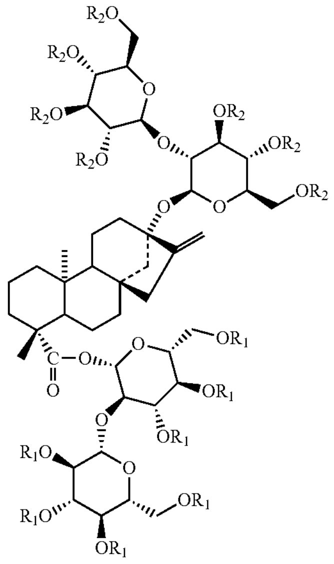

| Name | $R_1$ | $R_2$ |
|---|---|---|
| Rebaudioside E | —7H | —7H |
| Rebaudioside E G1 (RE-G1) | —6H, -glucosyl | —7H |
| | —7H | —6H, -glucosyl |
| Rebaudioside E G2 (RE-G2) | —6H, -glucosyl | —6H, -glucosyl |
| | —6H, -(glucosyl)$_2$ | —7H |
| | —5H, −2 × glucosyl | —7H |
| | —7H | —5H, −2 × glucosyl |
| | —7H | —6H, -(glucosyl)$_2$ |

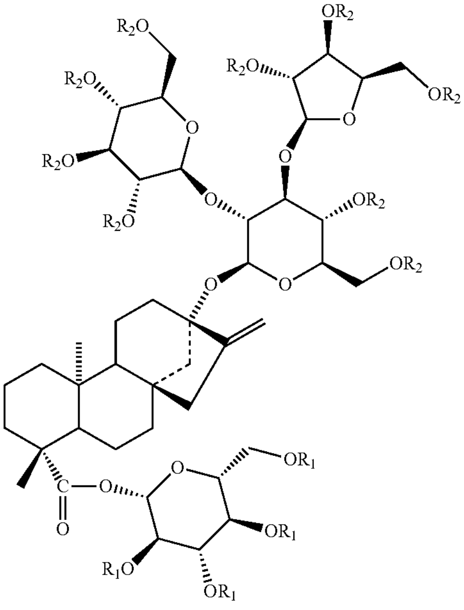

| Name | $R_1$ | $R_2$ |
|---|---|---|
| Rebaudioside F | —4H | —9H |
| Rebaudioside F G1 (RF-G1) | —3H, -glucosyl | —9H |
| | —4H | —8H, -glucosyl |

-continued

| | | |
|---|---|---|
| Rebaudioside F G2 (RF-G2) | —3H, -glucosyl | —8H, -glucosyl |
| | —3H, -(glucosyl)$_2$ | —9H |
| | —2H, −2 × glucosyl | —9H |
| | —4H | —7H, −2 × glucosyl |
| | —4H | —8H, -(glucosyl)$_2$ |

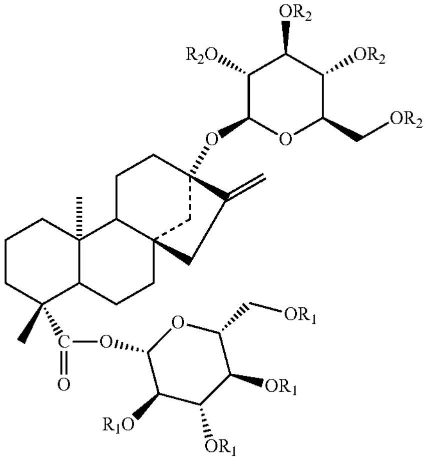

| Name | $R_1$ | $R_2$ |
|---|---|---|
| Rubusoside | —4H | —4H |
| Rubusoside G1 (R-G1) | —3H, -glucosyl | —4H |
| | —4H | —3H, -glucosyl |
| Rubusoside G2 (R-G2) | —3H, -glucosyl | —3H, -glucosyl |
| | —3H, -(glucosyl)$_2$ | —4H |
| | —2H, −2 × glucosyl | —4H |
| | —4H | —2H, −2 × glucosyl |
| | —4H | —3H, -(glucosyl)$_2$ |

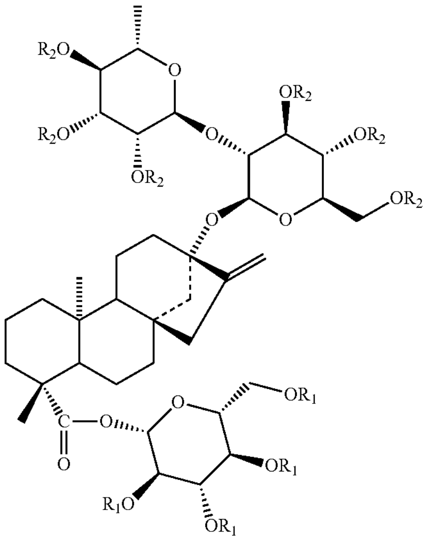

| Name | $R_1$ | $R_2$ |
|---|---|---|
| Dulcoside A | —4H | —6H |
| Dulcoside A G1 (DA-G1) | —3H, -glucosyl | —6H |
| | —4H | —5H, -glucosyl |

-continued

| | | |
|---|---|---|
| Dulcoside A G2 (DA-G2) | —3H, -glucosyl | —5H, -glucosyl |
| | —3H, -(glucosyl)$_2$ | —6H |
| | —2H, −2 × glucosyl | —6H |
| | —4H | —4H, −2 × glucosyl |
| | —4H | —5H, -(glucosyl)$_2$ |

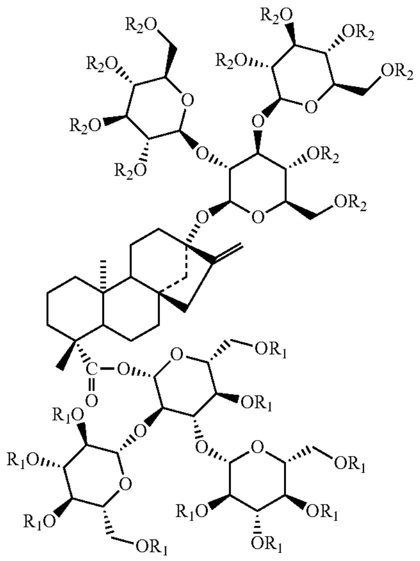

| Name | $R_1$ | $R_2$ |
|---|---|---|
| Rebaudioside M | —10H | —10H |
| Rebaudioside M G1 (RM-G1) | —9H, -glucosyl | —10H |
| | —10H | —9H, -glucosyl |
| Rebaudioside M G2 (RM-G2) | —9H, -glucosyl | —9H, -glucosyl |
| | —9H, -(glucosyl)$_2$ | —10H |
| | —8H, −2 × glucosyl | —10H |
| | —10H | —8H, −2 × glucosyl |
| | —10H | —9H, -(glucosyl)$_2$ |

More extensive non-limiting lists of GSGs are shown in Tables E, F and G.

Table E depicts GSG groups corresponding to parental SGs with glucose ("G"; i.e., 2nd G after hyphen) moieties added thereto.

TABLE E

| Steviol-glycoside | SG-group | MW | Steviol + Glucose Glycosylated Steviolglycoside (GSG)-groups based on SG-group given MW = 480 SG-1G | MW = 642 SG-2G | MW = 804 SG-3G | MW = 966 SG-4G | MW = 1128 SG-5G | MW = 1290 SG-6G |
|---|---|---|---|---|---|---|---|---|
| Steviolmonoside<br>Steviolmonoside A | SG-1G | 480 | | | | | | |
| Iso-Steviolbioside<br>Reb-G1<br>Rubusoside<br>Steviolbioside | SG-2G | 642 | GSG-1G-1 | | | | | |
| Iso-Reb B<br>Iso-Stevioside<br>Reb B<br>Reb G<br>Reb-KA<br>SG-13<br>Stevioside<br>Stevioside B (SG-15) | SG-3G | 804 | GSG-1G-2 | GSG-2G-1 | | | | |
| Reb A3 (SG-8)<br>Iso-Reb A<br>Reb A<br>Reb A2 (SG-7)<br>Reb E<br>Reb H1 | SG-4G | 966 | GSG-1G-3 | GSG-2G-2 | GSG-3G-1 | | | |
| Reb D<br>Reb I<br>Reb L<br>Reb I3<br>SG-Unk6<br>Reb Q (SG-5)<br>Reb I2 (SG-6)<br>Reb Q2<br>Reb Q3<br>Reb T1<br>Related SG#4 | SG-5G | 1128 | GSG-1G-4 | GSG-2G-3 | GSG-3G-2 | GSG-4G-1 | | |
| Reb M | SG-6G | 1290 | GSG-1G-5 | GSG-2G-4 | GSG-3G-3 | GSG-4G-2 | GSG-5G-1 | |
| — | — | 1452 | GSG-1G-6 | GSG-2G-5 | GSG-3G-4 | GSG-4G-3 | GSG-5G-2 | GSG-6G-1 |
| — | — | 1614 | GSG-1G-7 | GSG-2G-6 | GSG-3G-5 | GSG-4G-4 | GSG-5G-3 | GSG-6G-2 |
| — | — | 1776 | GSG-1G-8 | GSG-2G-7 | GSG-3G-6 | GSG-4G-5 | GSG-5G-4 | GSG-6G-3 |
| — | — | 1938 | | GSG-2G-8 | GSG-3G-7 | GSG-4G-6 | GSG-5G-5 | GSG-6G-4 |
| — | — | 2100 | | | GSG-3G-8 | GSG-4G-7 | GSG-5G-6 | GSG-6G-5 |

Table F depicts GSG groups corresponding to parental SGs with glucose ("G"; i.e., 2nd G after hyphen) and one moiety of rhamnose or deoxyhexose ("R") added thereto.

TABLE F

| Steviol-glycoside | SG-group | MW | Steviol + Glucose + 1 Rhamnose/Deoxyhexose Glycosylated Steviolglycoside (GSG)-groups based on SG-group given MW = 626 SG-1G1R | MW = 788 SG-2G1R | MW = 950 SG-3G1R | MW = 1112 SG-4G1R | MW = 1274 SG-5G1R | MW = 1436 SG-6G1R |
|---|---|---|---|---|---|---|---|---|
| Dulcoside A1 | SG-1G1R | 626 | | | | | | |
| Dulcoside A<br>Dulcoside B (JECFAC)<br>SG-3<br>Stevioside D | SG-2G1R | 788 | GSG-1G1R-1 | | | | | |
| Reb C<br>Reb C2/Reb S<br>Stevioside E (SG-9)<br>Stevioside E2<br>SG-10<br>Reb L1<br>SG-2 | SG-3G1R | 950 | GSG-1G1R-2 | GSG-2G1R-1 | | | | |
| SG-12<br>Reb H<br>Reb J<br>Reb K | SG-4G1R | 1112 | GSG-1G1R-3 | GSG-2G1R-2 | GSG-3G1R-1 | | | |

TABLE F-continued

| Steviol-glycoside | SG-group | MW | Steviol + Glucose + 1 Rhamnose/Deoxyhexose Glycosylated Steviolglycoside (GSG)-groups based on SG-group given MW = 626 SG-1G1R | MW = 788 SG-2G1R | MW = 950 SG-3G1R | MW = 1112 SG-4G1R | MW = 1274 SG-5G1R | MW = 1436 SG-6G1R |
|---|---|---|---|---|---|---|---|---|
| Reb K2<br>SG-Unk4<br>SG-Unk5 | | | | | | | | |
| Reb N | SGS-G1R | 1274 | GSG-1G1R-4 | GSG-2G1R-3 | GSG-3G1R-2 | GSG-4G1R-1 | | |
| Reb O<br>Reb O2 | SG-6G1R | 1436 | GSG-1G1R-5 | GSG-2G1R-4 | GSG-3G1R-3 | GSG-4G1R2 | GSG-5G1R1 | |
| — | — | 1598 | GSG-1G1R-6 | GSG-2G1R-5 | GSG-3G1R-4 | GSG-4G1R-3 | GSG-5G1R-2 | GSG-6G1R-1 |
| — | — | 1760 | GSG-1G1R-7 | GSG-2G1R-6 | GSG-3G1R-5 | GSG-4G1R-4 | GSG-5G1R-3 | GSG-6G1R-2 |
| — | — | 1922 | GSG-1G1R-8 | GSG-2G1R-7 | GSG-3G1R-6 | GSG-4G1R-5 | GSG-5G1R-4 | GSG-6G1R-3 |
| — | — | 2084 | | GSG-2G1R-8 | GSG-3G1R-7 | GSG-4G1R-6 | GSG-5G1R-5 | GSG-6G1R-4 |
| — | — | 2246 | | | GSG-3G1R-8 | GSG-4G1R-7 | GSG-5G1R-6 | GSG-6G1R-5 |

Table G depicts GSG groups corresponding to parental SGs with glucose ("G"; i.e., 2nd G after hyphen) and 1 moiety of xylose or deoxyhexose ("X") added thereto.

TABLE G

| Steviol-glycoside (GS) | SG-group | MW | Steviol + Glucose + 1 Xylose/Arabinose Glycosylated Steviolglycoside (GSG)-groups based on SG-group given MW = 612 SG-1G1X | MW = 774 SG-2G1X | MW = 936 SG-3G1X | MW = 1098 SG-4G1X | MW = 1260 SG-5G1X | MW = 1422 SG-6G1X |
|---|---|---|---|---|---|---|---|---|
| SG-4 | SG-1G1X | 612 | | | | | | |
| Reb-F1<br>Reb-R1<br>Stevioside F (SG-1)<br>SG-Unk1 | SG-2G1X | 774 | GSG-1G1X-1 | | | | | |
| Reb F<br>Reb R<br>SG-Unk2<br>SG-Unk3<br>Reb F3 (SG-11)<br>Reb F2 (SG-14) | SG-3G1X | 936 | GSG-1G1X-2 | GSG-2G1X-1 | | | | |
| Reb U2<br>Reb T<br>Reb W<br>Reb W2<br>Reb W3<br>Reb U | SG-4G1X | 1098 | GSG-1G1X-3 | GSG-2G1X-2 | GSG-3G1X-1 | | | |
| Reb V<br>Reb Y | SG-5G1X | 1260 | GSG-1G1X-4 | GSG-2G1X-3 | GSG-3G1X-2 | GSG-4G1X-1 | | |
| — | — | 1422 | GSG-1G1X-5 | GSG-2G1X-4 | GSG-3G1X-3 | GSG-4G1X-2 | GSG-5G1X-1 | |
| — | — | 1584 | GSG-1G1X-6 | GSG-2G1X-5 | GSG-3G1X-4 | GSG-4G1X-3 | GSG-5G1X-2 | GSG-6G1X-1 |
| — | — | 1746 | GSG-1G1X-7 | GSG-2G1X-6 | GSG-3G1X-5 | GSG-4G1X-4 | GSG-5G1X-3 | GSG-6G1X-2 |
| — | — | 1908 | GSG-1G1X-8 | GSG-2G1X-7 | GSG-3G1X-6 | GSG-4G1X-5 | GSG-5G1X-4 | GSG-6G1X-3 |
| — | — | 2070 | | GSG-2G1X-8 | GSG-3G1X-7 | GSG-4G1X-6 | GSG-5G1X-5 | GSG-6G1X-4 |
| — | — | 2232 | | | GSG-3G1X-8 | GSG-4G1X-7 | GSG-5G1X-6 | GSG-6G1X-5 |

A non-limiting list of exemplary GSGs includes *Stevia* extracts including, but not limited to, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8).

In some embodiments, the composition of the present application comprises one or more SGs having a molecular weight of 966 daltons or greater and/or one or more GSGs produced from one or more SGs having a molecular weight of 966 daltons or greater.

In some embodiments, the composition of the present application comprises one or more SGs having a molecular weight of 1259 daltons or greater and/or one or more GSGs produced from one or more SGs having a molecular weight of 1259 daltons or greater.

In some embodiments, each of the one or more GSGs in the composition comprises a GSG originating from an SG in an amount of 0-99%, 0-30 wt %, 0-25 wt %, 0-20 wt %, 0-15 wt %, 0-10 wt %, 0-8 wt %, 0-5 wt %, 0-2 wt %, 0-1 wt %, 0-0.5 wt %, 0.1-30 wt %, 0.1-25 wt %, 0.1-20 wt %, 0.1-15 wt %, 0.1-10 wt %, 0.1-8 wt %, 0.1-5 wt %, 0.1-2 wt %, 0.1-1 wt %, 0.1-0.5 wt %, 0.5-30 wt %, 0.5-25 wt %, 0.5-20 wt %, 0.5-15 wt %, 0.5-10 wt %, 0.5-8 wt %, 0.5-5 wt %, 0.5-2 wt %, 0.5-1 wt %, 1-30 wt %, 1-25 wt %, 1-20 wt %, 1-15 wt %, 1-10 wt %, 1-8 wt %, 1-5 wt %, 1-2 wt %, 1.5-30 wt %, 1.5-25 wt %, 1.5-20 wt %, 1.5-15 wt %, 1.5-10 wt %, 1.5-8 wt %, 1.5-5 wt %, 5-30 wt %, 5-25 wt %, 5-20 wt %, 5-15 wt %, 5-10 wt %, 5-8 wt %, 10-30 wt %, 10-25 wt %, 10-20 wt %, 10-15 wt %, 15-30 wt %, 15-25 wt %, 15-20 wt %, 20-30 wt %, 20-25 wt % or 25-30 wt % and combinations thereof. In other embodiments, the composition does not have GSGs originating from an SG or is substantially devoid of it.

In one embodiment, a GSG composition comprises one or more GSGs originating from one or more SGs selected from the group consisting of Reb-B, Iso-Reb-B, Reb-G, Reb-KA, SG-13, Stevioside, Iso-stevioside, and Stevioside B (SG-15), wherein the one or more GSGs are selected from the group consisting of GSG-3G-2, GSG-3G-3, GSG-3G-4, GSG-3G-7, GSG-3G-8. These GSGs originate from the SG-3G group.

In another embodiment, a GSG composition comprises one or more GSGs originating from one or more SGs selected from the group consisting of Reb-A, Reb-A2 (SG-7), Reb-A3 (SG-8), Iso-Reb-A, Reb-E, and Reb-H1, wherein the one or more GSGs are selected from the group consisting of GSG-4G-1, GSG-4G-2, GSG-4G-3, and GSG-4G-4. These GSGs originate from the SG-4G group.

In another embodiment, a GSG composition comprises one or more GSGs originating from one or more SGs selected from the group consisting of Reb-D, Reb-I, Reb-I2 (SG-6), Reb-I3, Reb-L, Reb-Q (SG-5), Reb-Q2, Reb-Q3, Reb-T1, Related SG#4, and SG-Unk6, wherein the one or more GSGs are selected from the group consisting of GSG-5G-1, GSG-5G-2, GSG-5G-3, GSG-5G-4, and GSG-5G-5. These GSGs originate from the SG-5G group.

In another embodiment, a GSG composition comprises a GSG originating from Reb-M, wherein the GSG is GSG-6G-3. Thus, GSG-6G-3 originates from the SG-6G group.

In another embodiment, a GSG composition comprises a GSG originating from one or more SGs selected from the group consisting of Reb-C, Reb-C2/Reb-S, Stevioside E2, Stevioside E (SG-9), Reb-H, Reb-L1, SG-2, and SG-10, wherein the GSG is GSG-3G1R-3a or GSG-3G1R-3b. These GSGs originate from the SG-3G1R group.

In another embodiment, a GSG composition comprises one or more GSGs originating from one or more SGs selected from the group consisting of Reb-J, Reb-K, Reb-K2, SG-12, SG-Unk4, and SG-Unk5, wherein the one or more GSGs are selected from the group consisting of GSG-4G1R-2, GSG-4G1R-3, GSG-4G1R-4, and GSG-4G1R-6. These GSGs originate from the SG-4G1R group.

In another embodiment, a GSG composition comprises a GSG originating from Reb-N, wherein the GSG is GSG-5G1R-4. Thus, GSG-5G1R-4 originates from the SG-5G1R group.

In another embodiment, a GSG composition comprises one or more GSGs originating from Reb-O or Reb-O2, wherein the one or more GSGs are selected from the group consisting of GSG-6G1R-1a, GSG-6G1R-1b, and GSG-6G1R-2. These GSGs originate from the SG-6G1R group.

In another embodiment, a GSG composition comprises one or more GSGs originating from Reb-F, Reb-F2 (SG-14), Reb-F3 (SG-11), SG-Unk2, and SG-Unk3, wherein the one or more GSGs are selected from the group consisting of GSG-3G1X-4 and GSG-3G1X-5. These GSGs originate from the SG-3G1X group.

In another embodiment, a GSG composition comprises one or more GSGs originating from one or more SGs selected from the group consisting of Reb-U, Reb-U2, Reb-T, Reb-W, Reb-W2, and Reb-W3, wherein the one or more GSGs are selected from the group consisting of GSG-4G1X-1, GSG-4G1X-2, GSG-4G1X-3, and GSG-4G1X-4. These GSGs originate from the SG-4G1X group.

In another embodiment, a GSG composition comprises a GSG originating from Reb-V, wherein the GSG is GSG-5G1X-4. Thus, GSG-5G1R-4 originates from the SG-5G1X group.

In some embodiments, the composition of the present application comprises a GSG composition produced from a SG composition comprising RA, RB and/or RC. In one embodiment, the composition of the present application comprises a GSG composition produced from a SG composition comprising from about 20 to about 97 wt % of RA, from about 0 to about 10 wt % of RB and/or from about 5 to about 20 wt % of RC. In another embodiment, the composition of the present application comprises a GSG composition produced from a SG composition comprising from about 30 to about 60 wt % of RA, from about 0.5 to about 8 wt % of RB and/or from about 5 to about 18 wt % of RC.

Any one of the SGs and/or GSGs, including any of those in Tables A-E, may be present individually or collectively in the composition of the present application in an amount of about 0.1 wt % to about 99.5 wt %, including any range specified by any combination of integers from 1 to 99.

In a given composition, each of the SG(s) and/or GSG(s) may be present in the composition of the present application in the amount of about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, about 99 wt. %, about 100 wt. % or any range specified by any pair of the above integers in this paragraph.

In some embodiments, the total amount of SGs and/or GSGs in a sweetening or flavoring composition is less than about 99.5 wt %, less than about 99 wt %, less than about 98 wt %, less than about 95 wt %, less than about 90 wt %, less than about 85 wt %, less than about 80 wt %, less than about 75 wt %, less than about 70 wt %, less than about 65 wt %, less than about 60 wt %, less than about 55 wt %, less than about 50 wt %, less than about 45 wt %, less than about 40 wt %, less than about 35 wt %, less than about 30 wt %, less than about 25 wt %, less than about 20 wt %, less than about 15 wt %, less than about 10 wt %, less than about 5 wt %, less than about 2 wt %, less than about 1 wt %, less than about 0.5 wt %, less than about 0.2 wt %, less than about 0.1 wt %, less than about 0.05 wt %, or less than about 0.02 wt % of the composition.

In some embodiments, the SGs and/or GSGs may be present individually or collectively in the composition of the present application in an amount of about 1 wt % to about 5 wt %, about 1 wt % to about 10 wt %, about 1 wt % to about 15 wt %, about 1 wt % to about 20 wt %, about 1 wt % to about 25 wt %, about 1 wt % to about 30 wt %, about 1 wt % to about 35 wt %, about 1 wt % to about 40 wt %, about 1 wt % to about 45 wt %, about 1 wt % to about 50 wt %, about 1 wt % to about 55 wt %, about 1 wt % to about 60 wt %, about 1 wt % to about 65 wt %, about 1 wt % to about 70 wt %, about 1 wt % to about 75 wt %, about 1 wt % to about 80 wt %, about 1 wt % to about 85 wt %, about 1 wt % to about 90 wt %, about 1 wt % to about 95 wt %, about 1 wt % to about 97 wt %, about 1 wt % to about 99 wt %, about 1 wt % to about 99.5 wt % of the composition, or any range encompassed by any of the above integers in this paragraph.

In some embodiments, the SGs and/or GSGs may be present individually or collectively in the composition of the present application in an amount of about 10 wt % to about 15 wt %, about 10 wt % to about 20 wt %, about 10 wt % to about 25 wt %, about 10 wt % to about 30 wt %, about 10 wt % to about 35 wt %, about 10 wt % to about 40 wt %, about 10 wt % to about 45 wt %, about 10 wt % to about 50 wt %, about 10 wt % to about 55 wt %, about 10 wt % to about 60 wt %, about 10 wt % to about 65 wt %, about 10 wt % to about 70 wt %, about 10 wt % to about 75 wt %, about 10 wt % to about 80 wt %, about 10 wt % to about 85 wt %, about 10 wt % to about 90 wt %, about 10 wt % to about 95 wt %, about 10 wt % to about 97 wt %, about 10 wt % to about 99 wt %, about 10 wt % to about 99.5 wt % of the composition, or any range encompassed by any of the above integers in this paragraph.

In some embodiments, the SGs and/or GSGs may be present individually or collectively in the composition of the present application in an amount of about 20 wt % to about 25 wt %, about 20 wt % to about 30 wt %, about 20 wt % to about 35 wt %, about 20 wt % to about 40 wt %, about 20 wt % to about 45 wt %, about 20 wt % to about 50 wt %, about 20 wt % to about 55 wt %, about 20 wt % to about 60 wt %, about 20 wt % to about 65 wt %, about 20 wt % to about 70 wt %, about 20 wt % to about 75 wt %, about 20 wt % to about 80 wt %, about 20 wt % to about 85 wt %, about 20 wt % to about 90 wt %, about 20 wt % to about 95 wt %, about 20 wt % to about 97 wt %, about 20 wt % to about 99 wt %, about 20 wt % to about 99.5 wt % of the composition of the present application, or any range encompassed by any of the above integers in this paragraph.

In some embodiments, the SGs and/or GSGs may be present individually or collectively in the composition of the present application in an amount of about 30 wt % to about 35 wt %, 30 wt % to about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 30 wt % to about 70 wt %, 30 wt % to about 75 wt %, about 30 wt % to about 80 wt %, about 30 wt % to about 85 wt %, about 30 wt % to about 90 wt %, about 30 wt % to about 95 wt %, about 30 wt % to about 97 wt %, about 30 wt % to about 99 wt %, about 30 wt % to about 99.5 wt % of the composition, or any range encompassed by any of the above integers in this paragraph.

In some embodiments, the SGs and/or GSGs may be present individually or collectively in the composition of the present application in an amount of about 40 wt % to about 45 wt %, about 40 wt % to about 50 wt %, about 40 wt % to about 55 wt %, about 40 wt % to about 60 wt %, about 40 wt % to about 65 wt %, about 40 wt % to about 70 wt %, about 40 wt % to about 75 wt %, about 40 wt % to about 80 wt %, about 40 wt % to about 85 wt %, about 40 wt % to about 90 wt %, about 40 wt % to about 95 wt %, about 40 wt % to about 97 wt %, about 40 wt % to about 99 wt %, about 40 wt % to about 99.5 wt % of the composition, or any range encompassed by any of the above integers in this paragraph.

In some embodiments, the SGs and/or GSGs may be present individually or collectively in the composition of the present application in an amount of about 45 wt % to about 50 wt %, about 45 wt % to about 55 wt %, about 45 wt % to about 60 wt %, about 45 wt % to about 65 wt %, about 45 wt % to about 70 wt %, about 45 wt % to about 75 wt %, about 45 wt % to about 80 wt %, about 45 wt % to about 85 wt %, about 45 wt % to about 90 wt %, about 45 wt % to about 95 wt %, about 45 wt % to about 97 wt %, about 45 wt % to about 99 wt %, about 45 wt % to about 99.5 wt % of the composition, or any range encompassed by any of the above integers in this paragraph.

In some embodiments, the SGs and/or GSGs may be present individually or collectively in the composition of the present application in an amount of about 50 wt % to about 55 wt %, about 50 wt % to about 60 wt %, about 50 wt % to about 65 wt %, about 50 wt % to about 70 wt %, about 50 wt % to about 75 wt %, about 50 wt % to about 80 wt %, about 50 wt % to about 85 wt %, about 50 wt % to about 90 wt %, about 50 wt % to about 95 wt %, about 50 wt % to about 97 wt %, about 50 wt % to about 99 wt %, about 50 wt % to about 99.5 wt % of the composition, or any range encompassed by any of the above integers in this paragraph.

In some embodiments, the SGs and/or GSGs may be present individually or collectively in the composition of the present application in an amount of about 55 wt % to about 60 wt %, 55 wt % to about 65 wt %, 55 wt % to about 70 wt %, 55 wt % to about 75 wt %, 55 wt % to about 80 wt %, 55 wt % to about 85 wt %, 55 wt % to about 90 wt %, 55 wt % to about 95 wt %, 55 wt % to about 97 wt %, 55 wt % to about 99 wt %, about 55 wt % to about 99.5 wt % of the composition, or any range encompassed by any of the above integers in this paragraph.

In some embodiments, the SGs and/or GSGs may be present individually or collectively in the composition of the present application in an amount of about 60 wt % to about 65 wt %, 60 wt % to about 70 wt %, 60 wt % to about 75 wt %, 60 wt % to about 80 wt %, 60 wt % to about 85 wt %, 60 wt % to about 90 wt %, 60 wt % to about 95 wt %, 60 wt % to about 97 wt %, 60 wt % to about 99 wt %, about 60 wt % to about 99.5 wt % of the composition, or any range encompassed by any of the above integers in this paragraph.

In some embodiments, the SGs and/or GSGs may be present individually or collectively in the composition of the present application in an amount of about 65 wt % to about 70 wt %, 65 wt % to about 75 wt %, 65 wt % to about 80 wt %, 65 wt % to about 85 wt %, 65 wt % to about 90 wt %, 65 wt % to about 95 wt %, 65 wt % to about 97 wt %, 65 wt % to about 99 wt %, about 65 wt % to about 99.5 wt % of the composition, or any range encompassed by any of the above integers in this paragraph.

In some embodiments, the SGs and/or GSGs may be present individually or collectively in the composition of the present application in an amount of about 70 wt % to about 75 wt %, 70 wt % to about 80 wt %, 70 wt % to about 85 wt %, 70 wt % to about 90 wt %, 70 wt % to about 95 wt %, 70 wt % to about 97 wt %, 70 wt % to about 99 wt %, about 70 wt % to about 99.5 wt % of the composition, or any range encompassed by any of the above integers in this paragraph.

In some embodiments, the SGs and/or GSGs may be present individually or collectively in the composition of the present application in an amount of about 75 wt % to about 80 wt %, 75 wt % to about 85 wt %, 75 wt % to about 90 wt %, 75 wt % to about 95 wt %, 75 wt % to about 97 wt %, 75 wt % to about 99 wt %, about 75 wt % to about 99.5 wt % of the composition, or any range encompassed by any of the above integers in this paragraph.

In some embodiments, the SGs and/or GSGs may be present individually or collectively in the composition of the present application in an amount of about 80 wt % to about 85 wt %, 80 wt % to about 90 wt %, 80 wt % to about 95 wt %, 80 wt % to about 97 wt %, 80 wt % to about 99 wt %, about 80 wt % to about 99.5 wt % of the composition, or any range encompassed by any of the above integers in this paragraph.

In some embodiments, the SGs and/or GSGs may be present individually or collectively in the composition of the present application in an amount of about 85 wt % to about 90 wt %, 85 wt % to about 95 wt %, 85 wt % to about 97 wt %, 85 wt % to about 99 wt %, about 85 wt % to about 99.5 wt % of the composition, or any range encompassed by any of the above integers in this paragraph.

In some embodiments, the SGs and/or GSGs may be present individually or collectively in the composition of the present application in an amount of about 90 wt % to about 95 wt %, 90 wt % to about 97 wt %, 90 wt % to about 99 wt %, about 90 wt % to about 99.5 wt % of the composition, or any range encompassed by any of the above integers in this paragraph.

In some embodiments, the GSGs and/or SGs may be present individually or collectively in the composition of the present application in an amount of about 95 wt % to about 97 wt %, and 95 wt % to about 99 wt %, about 95 wt % to about 99.5 wt % of the composition, or any range encompassed by any of the above integers in this paragraph.

In some embodiments, the total glycosides in the composition of the present application is in the range of 1-99.5 wt %, 5-99.5 wt %, 10-99.5 wt %, 15-99.5 wt %, 20-99.5 wt %, 25-99.5 wt %, 30-99.5 wt %, 35-99.5 wt %, 40-99.5 wt %, 45-99.5 wt %, 50-99.5 wt %, 55-99.5 wt %, 60-99.5 wt %, 65-99.5 wt %, 70-99.5 wt %, 75-99.5 wt %, 80-99.5 wt %, 85-99.5 wt %, 90-99.5 wt %, 95-99.5 wt %, 1-95 wt %, 5-95 wt %, 10-95 wt %, 15-95 wt %, 20-95 wt %, 25-95 wt %, 30-95 wt %, 35-95 wt %, 40-95 wt %, 45-95 wt %, 50-95 wt %, 55-95 wt %, 60-95 wt %, 65-95 wt %, 70-95 wt %, 75-95 wt %, 80-95 wt %, 85-95 wt %, 90-95 wt %, 1-90 wt %, 5-90 wt %, 10-90 wt %, 15-90 wt %, 20-90 wt %, 25-90 wt %, 30-90 wt %, 35-90 wt %, 40-90 wt %, 45-90 wt %, 50-90 wt %, 55-90 wt %, 60-90 wt %, 65-90 wt %, 70-90 wt %, 75-90 wt %, 80-90 wt %, 85-90 wt % of the composition.

While not wishing to be bound by theory, it is believed that the combination of SGs and GSGs provide a synergistic effect in terms of sweetness. More specifically, the resultant sweetness value of the SG/GSG composition following glycosylation is greater than the combined theoretical sweetness values corresponding to the SGs only and the GSGs only.

In one embodiment, a GSG composition comprises 10-30 wt % SGs, 50-70 wt % GSGs, and 60-90 wt % total glycosides.

In another embodiment, a GSG-A composition comprises:

(a) one or more SG-3G group members selected from the group consisting of: 1-10 wt % GSG-3G-2, 2-6 wt % GSG-3G-3, 0.5-3 wt % GSG-3G-4, 0.2-5 wt % GSG-3G-7, and 1-6 wt % GSG-3G-8;

(b) one or more SG-4G group members selected from the group consisting of: 5-15 wt % GSG-4G-1, 1-2 wt % GSG-4G-2, 0.5-2.5 wt % GSG-4G-3, and 2-10 wt % GSG-4G-7;

(c) one or more SG-5G group members selected from the group consisting of: 0.1-0.5 wt %/o GSG-5G-1, 0.05-0.5 wt % GSG-5G-2, 0.5-3 wt % GSG-5G-3, 0.05-0.5 wt % GSG-5G-4, and 0.2-4 wt % GSG-5G-5;

(d) 0.1-2 wt % GSG-6G-3;

(e) one or more SG-3G1R group members selected from the group consisting of: 0.5-5.5 wt % GSG-3G1R-3a and 2-6 wt % GSG-3G1R-3b;

(f) one or more SG-4G1R group members selected from the group consisting of: 0.3-1.5 wt % GSG-4G1R-2, 0.05-1 wt % GSG-4G1R-3, 1-5 wt % GSG-4G1R-4, and 0.5-10 wt % GSG-4G1R-6;

(g) 2-6 wt % GSG-5G1R-4;

(h) one or more SG-6G1R group members selected from the group consisting of: 0.2-1.2 wt % GSG-6G1R-1a, 0.2-2 wt % GSG-6G1R-1b, and 0.3-3 wt % GSG-6G1R-2;

(i) one or more SG-3G1X group members selected from the group consisting of: 2-8 wt % GSG-3G1X-4 and 0.5-3 wt % GSG-3G1X-5;

(j) one or more SG-4G1X group members selected from the group consisting of: 0.5-3 wt % GSG-4G1X-1, 0.5-3 wt % GSG-4G1X-2, 1-6 wt % GSG-4G1X-3, and 0.2-2 wt % GSG-4G1X-4; and (k) 1-4 wt % GSG-5G1X-1, wherein the composition comprises one or more GSGs from each of at least 8, 9, 10 or 11 groups set forth in (a)-(k).

In some embodiments, the GSG-A composition further comprises at least 5, 6, 7 or 8 unreacted steviol glycoside members selected from the group consisting of: 1-8 wt % Reb-A, 0.1-1.5 wt % Reb-B, 0.05-3 wt % Reb-C, 0.05-1 wt % Reb-D, 0.05-0.3 wt % Reb-F, 0.05-0.25 wt % Reb-K, 0.05-0.5 wt % Rubusoside, and 0.05-3 wt % Stevioside.

In another embodiment, a GSG-B composition comprises:

(a) one or more SG-3G group members selected from the group consisting of: 2-10 wt % GSG-3G-2, 2-6 wt % GSG-3G-3, 0.5-2 wt % GSG-3G-4, 0.2-3 wt % GSG-3G-7, and 1-4 wt % GSG-3G-8;

(b) one or more SG-4G group members selected from the group consisting of: 5-12 wt % GSG-4G-1, 0.3-1.5 wt % GSG-4G-2, 0.5-1.5 wt % GSG-4G-3, and 2.5-6 wt % GSG-4G-7;

(c) one or more SG-5G group members selected from the group consisting of: 0.2-0.4 wt % GSG-5G-1, 0.05-0.4 wt % GSG-5G-2, 0.75-2 wt % GSG-5G-3, 0.05-0.3 wt % GSG-5G-4, and 0.4-4 wt % GSG-5G-5; (d) 0.1-2 wt % GSG-6G-3; (e) one or more SG-3G1R group members selected from the group consisting of: 0.2-3 wt % GSG-3G1R-3a and 1.5-5 wt % GSG-3G1R-3b; (f) one or more SG-4G1R group members selected from the group consisting of: 0.3-1 wt % GSG-4G1R-2, 0.05-0.75 wt % GSG-4G1R-3, 1-4 wt % GSG-4G1R-4, and 0.5-6.5 wt % GSG-4G1R-6; (g) 2.5-5 wt % GSG-5G1R-4; (h)) one or more SG-6G1R group members selected from the group consisting of: 0.1-1 wt % GSG-6G1R-1a, 0.2-2 wt % GSG-6G1R-1b, and 0.3-3 wt % GSG-6G1R-2; (i) one or more SG-3G1X group members selected from the group consisting of: 2-5 wt % GSG-3G1X-4 and 0.5-2 wt % GSG-3G1X-5; (j) one or more SG-4G1X group members selected from the group consisting of: 0.5-2 wt % GSG-4G1X-1, 0.5-2 wt % GSG-4G1X-2, 1.5-5 wt % GSG-4G1X-3, and 0.2-1.5 wt % GSG-4G1X-4; and (k) 1-2.5 wt % GSG-5G1X-1, wherein the composition comprises one or more GSGs from each of at least 8, 9, 10 or 11 groups set forth in (a)-(k).

In some embodiments, the GSG-B composition further comprises Reb-D, Reb-M or both, wherein the content of Reb-D, Reb-M or both is present in the composition in a range from 1 wt % to 99 wt %.

In some embodiments, the GSG-B composition further comprises at least 4, 5, 6 or 7 unreacted steviol glycosides selected from the group consisting of: 1.5-12.5 wt % Reb-A, 0.2-1.5 wt % Reb-B, 0.5-4 wt % Reb-C, 0.3-1 wt % Reb-D, 0.1-2.5 wt % Reb-F, 0.05-2.5 wt % Rubusoside, and 1.5-6.5 wt % Stevioside.

In another embodiment, a GSG-C composition comprises:

(a) one or more SG-3G group members selected from the group consisting of: 3-6 wt % GSG-3G-2, 1.5-3.5 wt % GSG-3G-3, 1-3 wt % GSG-3G-4, 2-5 wt % GSG-3G-7, and 2-5 wt % GSG-3G-8;

(b) one or more SG-4G group members selected from the group consisting of: 6-10 wt % GSG-4G-1, 0.5-1.5 wt % GSG-4G-2, 1-3 wt % GSG-4G3, and 3-6 wt % GSG-4G-7;

(c) one or more SG-5G group members selected from the group consisting of: 0.2-0.4 wt % GSG-5G-1, 0.05-0.3 wt % GSG-5G-2, 1-2 wt % GSG-5G-3, 0.08-0.2 wt % GSG-5G-4, and 1.5-4.5 wt % GSG-5G-5; (d) 0.5-1.5 wt % GSG-6G-3; (e) one or more SG-3G1R group members selected from the group consisting of: 2-5 wt % GSG-3G1R-3a and 2-4 wt % GSG-3G1R-3b;

(f) one or more SG-4G1R group members selected from the group consisting of: 0.3-1 wt % GSG-4G1R-2, 0.2-0.6 wt % GSG-4G1R-3, 1.5-4 wt % GSG-4G1R-4, and 3-10 wt % GSG-4G1R-6;

(g) 2.5-5 wt % GSG-5G1R-4; (h) one or more SG-6G1R group members selected from the group consisting of: 0.5-1.5 wt % GSG-6G1R-1a, 0.5-1.5 wt % GSG-6G1R-1b, and 0.5-2 wt % GSG-6G1R-2; (i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.3-1.5 wt % GSG-4G1X-1, 1-3.5 wt % GSG-4G1X-2, 1.5-4 wt % GSG-4G1X-3, and 0.5-2 wt % GSG-4G1X-4; and (k) 1.5-3 wt % GSG-5G1X-1, wherein the composition comprises one or more GSGs from each of at least 8, 9, 10 or 11 groups set forth in (a)-(k).

In some embodiments, the GSG-C composition further comprises at least 4, 5, 6 or 7 unreacted steviol glycosides selected from the group consisting of: 0.5-2.5 wt % Reb-A, 0.2-1 wt % Reb-B, 0.2-0.8 wt % Reb-C, 0.2-0.6 wt % Reb-D, 0.05-0.25 wt % Reb-F, 0.05-0.6 wt % Rubusoside, and 0.05-2 wt % Stevioside.

In another embodiment, a GSG-D composition comprises:

(a) one or more SG-3G group members selected from the group consisting of: 5-15 wt % GSG-3G-2, 1-6 wt % GSG-3G-3, 0.5-3.5 wt % GSG-3G-4, 0.5-3.5 wt % GSG-3G-7, and 1.5-6 wt % GSG-3G-8; (b) one or more SG-4G group members selected from the group consisting of: 10-18 wt % GSG-4G-1, 0.5-3.5 wt % GSG-4G-2, 0.5-3.5 wt % GSG-4G-3, and 2-6 wt % GSG-4G-7; (c) one or more SG-5G group members selected from the group consisting of: 0.15-1.5 wt % GSG-5G-1, 0.05-1 wt % GSG-5G-2, 0.5-3.5 wt % GSG-5G-3, 0.05-0.35 wt % GSG-5G-4, and 0.1-1.5 wt % GSG-5G-5; (d) 0.3-2.5 wt % GSG-6G-3; (e) one or more SG-3G1R group members selected from the group consisting of: 0.5-2 wt % GSG-3G1R-3a and 3-5 wt % GSG-3G1R-3b; (f) one or more SG-4G1R group members selected from the group consisting of: 0.25-2.5 wt % GSG-4G1R-2, 0.05-1 wt % GSG-4G1R-3, 1-4 wt % GSG-4G1R-4, and 0.3-3 wt % GSG-4G1R-6; (g) 1.5-7.5 wt % GSG-5G1R-4; (h) one or more SG-6G1R group members selected from the group consisting of: 0.1-2 wt % GSG-6G1R-1a, 0.1-2 wt % GSG-6G1R-1b, and 0.1-2 wt % GSG-6G1R-2; (i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.5-5 wt % GSG-4G1X-1, 0.5-2.5 wt % GSG-4G1X-2, 1.5-6 wt % GSG-4G1X-3, and 0.5-2.5 wt % GSG-4G1X-4; and (k) 0.5-4.5 wt % GSG-5G1X-1, wherein the composition comprises one or more GSGs from each of at least 8, 9, 10 or 11 groups set forth in (a)-(k).

In some embodiments, the GSG-D composition further comprises at least 4, 5, 6 or 7 unreacted steviol glycosides selected from the group consisting of: 1-6 wt % Reb-A, 0.2-2 wt % Reb-B, 0.5-3.5 wt % Reb-C, 0.1-1.5 wt % Reb-D, 0.05-2 wt % Reb-F, 0.05-1 wt % Rubusoside, and 0.05-3.5 wt % Stevioside.

In other embodiments, the GSG-D composition comprises at least 4, 5, 6 or 7 unreacted steviol glycosides selected from the group consisting of: 3-10 wt % Reb-A, 0.05-2 wt % Reb-C, 0.05-2 wt % Reb-D, 0.05-1.5 wt % Reb-G, 0.05-0.5 wt % Reb-O, 0.05-0.5 wt % Rubusoside, and 0.05-4 wt % Stevioside.

In another embodiment, a GSG-E composition comprises:

(a) one or more SG-3G group members selected from the group consisting of: 1-5 wt % GSG-3G-2, 1-5 wt % GSG-3G-3, 0.5-3 wt % GSG-3G-4, 0.5-4 wt % GSG-3G-7, and 2-6 wt % GSG-3G-8;

(b) one or more SG-4G group members selected from the group consisting of: 5-12 wt % GSG-4G-1, 0.2-3 wt % GSG-4G-2, 0.2-3 wt % GSG-4G-3, and 2-6 wt % GSG-4G-7;

(c) one or more SG-5G group members selected from the group consisting of: 0.05-1.5 wt % GSG-5G-1, 0.05-1.5 wt % GSG-5G-2, 0.1-3 wt % GSG-5G-3, 0.01-0.4 wt % GSG-5G-4, and 0.5-4 wt % GSG-5G-5; (d) 0.1-2 wt % GSG-6G-3; (e) one or more SG-3G1R group members selected from the group consisting of: 1-3 wt % GSG-3G1R-3a and 1-3 wt % GSG-3G1R-3b; (f) one or more SG-4G1R group members selected from the group consisting of: 0.1-2 wt % GSG-4G1R-2, 0.05-1 wt % GSG-4G1R-3, 1-3 wt % GSG-4G1R-4, and 5-10 wt % GSG-4G1R-6; (g) 2-6 wt % GSG-5G1R-4;

(h) one or more SG-6G1R group members selected from the group consisting of: 0.1-1 wt % GSG-6G1R-1a, 0.1-1 wt % GSG-6G1R-1b, and 0.2-2 wt % GSG-6G1R-2; (i) one or more SG-3G1X group members selected from the group consisting of: 1-4 wt % GSG-3G1X-4 and 0.5-2 wt % GSG-3G1X-5;

(j) one or more SG-4G1X group members selected from the group consisting of: 0.2-1.5 wt % GSG-4G1X-1, 0.5-2.5 wt % GSG-4G1X-2, 1-3 wt % GSG-4G1X-3, and 0.3-2 wt % GSG-4G1X-4; and (k) 1-4 wt % GSG-5G1X-1, wherein the composition comprises one or more GSGs from each of at least 8, 9, 10 or 11 groups set forth in (a)-(k).

In some embodiments, the GSG-E composition further comprises Reb-D, Reb-M or both, wherein the content of Reb-D, Reb-M or both is present in the composition in a range from 1 wt % to 99 wt %.

In some embodiments, the GSG-E composition further comprises at least 4, 5, 6 or 7 unreacted steviol glycosides selected from the group consisting of: 6-12 wt % Reb-A, 0.1-1.5 wt % Reb-B, 0.5-3.5 wt % Reb-C, 0.1-1.5 wt % Reb-D, 0.8-3 wt % Reb-F, 0.5-2.5 wt % Rubusoside, and 2-6 wt % Stevioside.

In another embodiment, a GSG-F composition comprises:

(a) one or more SG-3G group members selected from the group consisting of: 1-4 wt % GSG-3G-2, 1-4 wt % GSG-3G-3, 0.5-3 wt % GSG-3G-4, 0.5-3 wt % GSG-3G-7, and 0.5-3.5 wt % GSG-3G-8;

(b) one or more GSG-4G group members selected from the group consisting of: 3-8 wt % GSG-4G-1, 0.1-2 wt % GSG-4G-2, 0.1-2 wt % GSG-4G3, and 1-4 wt % GSG-4G-7;

(c) one or more SG-5G group members selected from the group consisting of: 0.05-1 wt % GSG-5G-1, 0.05-1 wt % GSG-5G-2, 0.3-3 wt % GSG-5G-3, 0.01-0.4 wt % GSG-5G-4, and 0.1-2 wt % GSG-5G-5; (d) 0.1-2 wt % GSG-6G-3; (e) one or more SG-3G1R group members selected from the group consisting of: 0.2-2 wt % GSG-3G1R-3a and 1-3 wt % GSG-3G1R-3b; (f) one or more SG-4G1R group members selected from the group consisting of: 0.1-2 wt % GSG-4G1R-2, 0.05-1 wt % GSG-4G1R-3, 1-3 wt % GSG-4G1R-4, and 1-3 wt % GSG-4G1R-6; (g) 2-6 wt % GSG-5G1R-4;

(h) one or more SG-6G1R group members selected from the group consisting of: 0.05-1 wt % GSG-6G1R-1a, 0.05-1 wt % GSG-6G1R-1b, and 0.1-1.2 wt % GSG-6G1R-2;

(i) one or more SG-3G1X group members selected from the group consisting of: 1-4 wt % GSG-3G1X-4 and 0.5-2 wt % GSG-3G1X-5; (j) one or more SG-4G1X group members selected from the group consisting of: 0.2-1.5 wt % GSG-4G1X-1, 0.5-2.5 wt % GSG-4G1X-2, 0.5-2.5 wt % GSG-4G1X-3, and 0.2-2 wt % GSG-4G1X-4; and (k) 1-3 wt % GSG-5G1X-1, wherein the composition comprises one or more GSGs from each of at least 8, 9, 10 or 11 groups set forth in (a)-(k).

In some embodiments, the GSG-F composition further comprises at least 4, 5, 6 or 7 unreacted steviol glycosides selected from the group consisting of: 15-25 wt % Reb-A, 0.05-1 wt % Reb-B, 1-3 wt % Reb-C, 0.1-1.5 wt % Reb-D, 0.8-3 wt % Reb-F, 0.3-2 wt % Rubusoside, and 6-12 wt % Stevioside.

All of the starting components of the composition disclosed herein can be purchased or be made by processes known to those of ordinary skill in the art and combined (e.g., precipitation/co-precipitation, mixing, blending, grounding, mortar and pestal, microemulsion, solvothermal, sonochemical, etc.) or treated as defined by the present application.

Without limitation, the composition as described herein can in an amorphous form, each individually in a polymorphic form, each individually in a hydrate form, or a mixture thereof. In some embodiments, the composition of the present application is an amorphous solid.

In some embodiments, the composition of the present application is provided as a sweetening composition comprising (1) one or more SGs from Table A and/or Table B; and (2) one or more GSGs, each GSG being enzymatically formed in vitro from an SG in Table A and/or Table B. In other embodiments, the sweetening composition comprises (1) a plurality of GSGs formed from a *Stevia* extract resulting in a GSG composition selected from the group consisting of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8), in combination with (2) one or more SGs selected from the group consisting of steviol, ST, STB, RA, RB, RC, RD, RE, RF, RM, rubusoside and dulcoside A.

In some embodiments, the sweetening composition is in solution form and the GSGs are present in solution at a final concentration (wt/wt) of 5%, 10%, 15%, 20%, 25%, 30%, 35%, 40%, 45%, 50%, 55%, 60%, 65%, 70% or any range specified by any pair of the aforementioned integers. Likewise, the SGs may be present in the sweetening solution at a final concentration (wt/wt) of 5%, 10%, 15%, 20%, 25%, 30%, 35%, 40%, 45%, 50%, 55%, 60%, 65%, 70% or any range specified by any pair of the aforementioned integers. Accordingly, the total amount of glycosides (i.e., GSGs+SGs) may be present in the sweetening composition at a final concentration (wt/wt) of 10%, 15%, 20%, 25%, 30%, 35%, 40%, 45%50%, 55%, 60%, 65%, 70%, 75%, 80%, 85%, 90%, 95%, 99%, 100%, or any range specified by any pair of the aforementioned integers.

In some embodiments, the sweetening composition is provided in such an amount, so that the GSGs and/or SGs are collectively present in the final product (e.g., orally consumable product) in a range between 100-50,000 ppm. In some embodiments, the GSGs and/or SGs are collectively present in the final product in a range from about 100 ppm to about 20,000 ppm, from about 100 ppm to about 5,000 ppm, from about 100 ppm to about 2000 ppm, from about 100 ppm to about 500 ppm, from about 100 ppm to about 200 ppm, from about 500 ppm to about 20,000 ppm, from about 500 ppm to about 5,000 ppm, from about 500 ppm to about 2000 ppm, from about 2000 ppm to about 20,000 ppm or from about 2000 ppm to about 5,000 ppm.

In some embodiments, the sweetening composition is provided in such an amount, so that the GSGs and/or SGs are collectively present in the final product (e.g., a beverage) in a range between 100-2,000 ppm, preferably from about 200 ppm to about 1000 ppm, and more preferably from about 300 ppm to about 500 ppm and any value or range there between, specifically 350 ppm, 400 ppm, or 450 ppm.

In some embodiments, the compositions disclosed herein are provided as a flavoring composition comprising (1) a plurality of GSGs presented as a GSG composition selected from the group consisting of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8), in combination with (2) one or more SGs selected from the group consisting of steviol, ST, STB, RA, RB, RC, RD, RE, RF, RM, rubusoside and dulcoside A.

In some embodiments, the flavoring composition is in solution form and the GSGs are present in solution at 0.1 ppm, 1 ppm, 10 ppm, 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm or any or range specified by any pair of the aforementioned integers. Likewise, the SGs may be present in the flavoring composition in solution form at a final concentration of 0.1 ppm, 1 ppm, 10 ppm 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, so the total glycosides in solution ranges from about 1 ppm to about 2000 ppm, preferably from about 200 ppm to about 1000 ppm, and more preferably from about 300 ppm to about 500 ppm and any or range specified by any pair of the aforementioned integers.

In some embodiments, the flavoring composition is provided in such an amount so that the GSGs and/or SGs are collectively present in the final product (e.g., orally consumable product) in a range between 0.1-1000 ppm. In some embodiments, the GSGs and/or SGs are collectively present in the final product in a range from about 1 to about 200 ppm, from about 1 ppm to about 50 ppm, from about 10 ppm to about 50 ppm, from about 20 ppm to about 50 ppm, from about 1 ppm to about 100 ppm, from about 10 ppm to about 100 ppm, from about 20 ppm to about 100 ppm, from about 50 ppm to about 100 ppm, from about 1 ppm to about 150 ppm, from about 10 ppm to about 150 ppm, from about 20 ppm to about 150 ppm, from about 50 ppm to about 150 ppm, from about 100 ppm to about 150 ppm, from about 1 ppm to about 200 ppm, from about 10 ppm to about 200 ppm, from about 20 ppm to about 200 ppm, from about 50 ppm to about 200 ppm, from about 100 ppm to about 200 ppm, or from about 150 ppm to about 200 ppm.

In some embodiments, the composition of the present application has a solubility (g/100 g) in water of 0.1, 0.5, 1, 2, 3, 4, 5, 6, 7, 8, 9, 10, 15, 20 or 25 g/100 g of water, and remains stable in water for greater than 1, 2, 3, 4, 5, 6, 7, 8, 9, 10, 14, 21 or 28 days at room temperature.

Dextrins

In embodiments comprising GSGs, the composition typically comprises one or more dextrins remaining after the glycosylation reaction. Dextrins are hydrolysate products of starch that provide a substrate for glycosylation so as to produce a more cost-effective SG/GSG composition having improved solubility and/or an improved taste profile.

In some embodiments, the dextrins are produced from a starch. The starches used may be the naturally occurring starches, such as potato starch, waxy potato starch, corn starch, rice starch, pea starch, banana starch, horse chestnut starch, wheat starch, amylose, amylomaize, amylopectin, pullulan, lactose, and combinations thereof. However, it is also possible to use modified starches, for example pregelatinized starch, thin-boiling starch, oxidized starch, citrate starch, high-fructose corn syrup, hydrogenated starch hydrosylate, hydroxyethyl starch, hydroxypropyl distarch phosphate, maltitol, acetate starch, acetylated distarch adipate, starch ethers, starch esters, starch phosphates, phosphated distarch phosphate, and pentastarch. There is in principle no restriction in the selection of the starch. The starch may have, for example, low viscosity, moderate viscosity or high viscosity, and be cationic or anionic, and cold water-soluble or hot water-soluble.

Dextrins may be linear or circular. The dextrin may be selected from the group of tapioca dextrin, potato dextrin, corn dextrin, yellow dextrin, white dextrin, borax dextrin, maltodextrin and cyclodextrins (CD), such as alpha, beta, and/or gamma cyclodextrin. In certain preferred embodiments, the dextrin is a CD or tapioca dextrin. CDs are a family of compounds made up of sugar molecules bound together in a ring, cyclic oligosaccharides. They are composed of 5 or more alpha-D-glucopyranoside units linked 1→4, as in amylose. CDs are also referred to as cycloamyloses.

Dextrins can make up 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt % or 99 wt %, and all ranges between 1 and 99 wt %, for example from about 1 wt % to about 99 wt %, from about 1 wt % to about 98 wt %, from about 1 wt % to about 97 wt %, from about 1 wt % to about 95 wt %, from about 1 wt % to about 90 wt %, from about 1 wt % to about 80 wt %, from about 1 wt % to about 70 wt %, from about 1 wt % to about 60 wt %, from about 1 wt % to about 50 wt %, from about 1 wt % to about 40 wt %, from about 1 wt % to about 30 wt %, from about 1 wt % to about 20 wt %, from about 1 wt % to about 10 wt %, from about 1 wt % to about 5 wt %, from about 2 wt % to about 99 wt %, from about 2 wt % to about 98 wt %, from about 2 wt % to about 97 wt %, from about 2 wt % to about 95 wt %, from about 2 wt % to about 90 wt %, from about 2 wt % to about 80 wt %, from about 2 wt % to about 70 wt %, from about 2 wt % to about 60 wt %, from about 2 wt % to about 50 wt %, from about 2 wt % to about 40 wt %, from about 2 wt % to about 30 wt %, from about 2 wt % to about 20 wt %, from about 2 wt % to about 10 wt %, from about 2 wt % to about 5 wt %, from about 3 wt % to about 99 wt %, from about 3 wt % to about 98 wt %, from about 3 wt % to about 97 wt %, from about 3 wt % to about 95 wt %, from about 3 wt % to about 90 wt %, from about 3 wt % to about 80 wt %, from about 3 wt % to about 70 wt %, from about 3 wt % to about 60 wt %, from about 3 wt % to about 50 wt %, from about 3 wt % to about 40 wt %, from about 3 wt % to about 30 wt %, from about 3 wt % to about 20 wt %, from about 3 wt % to about 10 wt %, from about 3 wt % to about 5 wt %, from about 5 wt % to about 99 wt %, from about 5 wt % to about 98 wt %, from about 5 wt % to about 97 wt %, from about 5 wt % to about 95 wt %, from about 5 wt % to about 90 wt %, from about 5 wt % to about 80 wt %, from about 5 wt % to about 70 wt %, from about 5 wt % to about 60 wt %, from about 5 wt % to about 50 wt %, from about 5 wt % to about 40 wt %, from about 5 wt % to about 30 wt %, from about 5 wt % to about 20 wt %, from about 5 wt % to about 10 wt %, from about 10 wt % to about 99 wt %, from about 10 wt % to about 98 wt %, from about 10 wt % to about 97 wt %, from about 10 wt % to about 95 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40% w/wt, from about 10 wt % to about 30 wt %, and from about 10 wt % to about 20 wt %, of the composition.

In some embodiments, the compositions of the present application disclosed herein may be solubilized in an aqueous solution. The aqueous solution can include water and/or an alcohol, such as one or more of methanol, ethanol, propanol, isopropanol, n-butanol, isobutanol, sec-butanol, tert-butanol, n-pentanol, isopentanol, neopentanol, or combinations thereof.

The water alcohol solution can be less than 60% alcohol, less than 50% alcohol, less than 40% alcohol, less than 30% alcohol, less than 20% alcohol, less than 10% alcohol, less than 5% alcohol, less than 2% alcohol, or less than 1% alcohol by volume.

C. Non-Steviol Glycoside Sweeteners (Non-SG Sweeteners)

The compositions of the present application can also comprise one or more non-SG sweeteners. Exemplary non-SG sweeteners include, but are not limited to, natural sweeteners, natural high potency sweeteners, synthetic sweeteners, or a combination thereof.

As used herein, a "natural sweetener" refers to any sweetener found naturally in nature, excluding SGs. The phrase "natural high potency sweetener" refers to any sweetener found naturally in nature that has a sweetness potency greater than sucrose, fructose, or glucose, yet has less calories. The phrase "synthetic sweetener" refers to any composition which is not found naturally in nature that has a sweetness potency greater than sucrose, fructose, or glucose, yet has less calories. As used herein, the terms "natural sweeteners," "natural high potency sweeteners" and "synthetic sweeteners" are to be distinguished from SGs.

In certain embodiments, the non-SG sweetener comprises at least one carbohydrate sweetener. Exemplary carbohydrate sweeteners are selected from, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

Other suitable non-SG sweeteners may be selected from the group consisting of mogroside IV, mogroside V, Luo han guo, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, burned sugar from all sources, polypodoside A, pterocaryoside A, pterocaryoside B, mukurozioside, phlomisoside I, periandrin I, abrusoside A, cyclocarioside I, sugar alcohols, such as erythritol, sucralose, acesulfame acid and salts thereof, such as acesulfame-K and potassium acesulfame; L-α-aspartyl-L-phenylalanine methylester (Aspartame), N—[N-[3-(3-hydroxy-4-methoxyphenyl) propyl]-α-aspartyl]-L-phenylalanine (Advantame), N—[N-[3-(3-hydroxy-4-methoxyphenyl) propyl]-α-aspartyl]-L-phenylalanine 1-methyl ester (ANS9801), alitame, saccharin and salts thereof, neohesperidin dihydrochalcone, cyclamate, cyclamic acid and salts thereof, neotame, trehalose, raffinose, cellobiose, tagatose, DOLCIA PRIMA™, allulose, inulin, and combinations thereof.

In some embodiments, the compositions of the present application comprise thaumatin. In some embodiments, thaumatin may be present in a composition in a range selected from the group consisting of from: about 0.01 wt % and about 10 wt %, about 0.01 wt % and about 5 wt %, about 0.01 wt % and about 2 wt %, about 0.01 wt % and about 1 wt %, about 0.01 wt % and about 0.5 wt %, about 0.01 wt % and about 0.2 wt %, about 0.01 wt % and about 0.1 wt %, about 0.01 wt % and about 0.05 wt %, about 0.01 wt % and about 0.02 wt %, about 0.02 wt % and about 10 wt %, about 0.02 wt % and about 5 wt %, about 0.02 wt % and about 2 wt %, about 0.02 wt % and about 1 wt %, about 0.02 wt % and about 0.5 wt %, about 0.02 wt % and about 0.2 wt %, about 0.02 wt % and about 0.1 wt %, about 0.02 wt % and about 0.05 wt %, about 0.05 wt % and about 10 wt %, about 0.05 wt % and about 5 wt %, about 0.05 wt % and about 2 wt %, about 0.05 wt % and about 1 wt %, about 0.05 wt % and about 0.5 wt %, about 0.05 wt % and about 0.2 wt %, about 0.1 wt % and about 10 wt %, about 0.1 wt % and about 5 wt %, about 0.1 wt % and about 2 wt %, about 0.1 wt % and about 1 wt %, about 0.1 wt % and about 0.5 wt %, about 0.2 wt % and about 10 wt %, about 0.2 wt % and about 5 wt %, about 0.2 wt % and about 2 wt %, about 0.2 wt % and about 1 wt %, about 0.2 wt % and about 0.5 wt %, about 0.5 wt % and about 10 wt %, about 0.5 wt % and about 5 wt %, about 0.5 wt % and about 2 wt %, about 0.5 wt % and about 1 wt %, about 1 wt % and about 10 wt %, about 1 wt % and about 5 wt %, about 1 wt % and about 2 wt %, about 2 wt % and about 10 wt %, about 2 wt % and about 5 wt % and about 5 wt % and about 10 wt %.

In some embodiments, the compositions further comprise a sugar or burned sugar in an amount between about 0.001% and about 25%, between about 0.05% and about 15%, between about 0.01% and about 10%, or between about 0.01% and about 5% (wt/wt).

In some embodiments, the non-SG sweetener is a caloric sweetener or mixture of caloric sweeteners. Exemplary caloric sweeteners include sucrose, fructose, glucose, high fructose corn/starch syrup, a beet sugar, a cane sugar, and combinations thereof.

In some embodiments, the non-SG sweetener is a rare sugar selected from sorbose, lyxose, ribulose, xylose, xylulose, D-allose, L-ribose, D-tagatose, L-glucose, L-fucose, L-arabinose, turanose and combinations thereof. The rare sugars can be present in the sweetener compositions in an amount from about 0.5 wt % to about 3.0 wt %, such as, for example, about 0.5 wt % to about 2.5 wt %, about 0.5 wt % to about 2.0 wt %, about 0.5 wt % to about 1.5 wt %, about 0.5 wt % to about 1.0 wt %, about 1.0 wt % to about 3.0 wt %, about 1.0 wt % to about 2.5 wt %, about 1.0 wt % to about 2.0 wt %, about 1.0 wt % to about 1.5 wt %, about 2.0 wt % to about 3.0 wt % and about 2.0 wt % to about 2.5 wt %.

The one or more non-SG sweetener of the composition of the present application can make up anywhere from about 0.1 wt. % of the SG composition to about 50 wt. % of the composition, specifically about 0.01 wt. %, about 0.02 wt %, about 0.05 wt %, about 0.07 wt %, about 0.1 wt %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, and all ranges there between, including for example from about 0.01 wt % to about 20 wt %, about 0.03 wt % to about 20 wt %, about 0.05 wt % to about 20 wt %, about 0.07 wt % to about 20 wt %, about 0.1 wt % to about 20 wt %, about 0.3 wt % to about 20 wt %, about 0.5 wt % to about 20 wt %, about 0.7 wt % to about 20 wt %, about 1 wt % to about 20 wt %, about 3 wt % to about 20 wt %, about 5 wt % to about 20 wt %, about 7 wt % to about 20 wt %, about 10 wt % to about 20 wt %, about 15 wt % to about 20 wt %, about 0.01 wt % to about 10 wt %, about 0.03 wt % to about 10 wt %, about 0.05 wt % to about 10 wt %, about 0.07 wt % to about 10 wt %, about 0.1 wt % to about 10 wt %, about 0.3 wt % to about 10 wt %, about 0.5 wt % to about 10 wt %, about 0.7 wt % to about 10 wt %, about 1 wt % to about 10 wt %, about 3 wt % to about 10 wt %, about 5 wt % to about 10 wt %, about 7 wt % to about 10 wt %, about 0.01 wt % to about 5 wt %, about 0.03 wt % to about 5 wt %, about 0.05 wt % to about 5 wt %, about 0.07 wt % to about 5 wt %, about 0.1 wt % to about 5 wt %, about 0.3 wt % to about 5 wt %, about 0.5 wt % to about 5 wt %, about 0.7 wt % to about 5 wt %, about 1 wt % to about 5 wt %, about 3 wt % to about 5 wt %, about 0.01 wt % to about 2.5 wt %, about 0.03 wt % to about 2.5 wt %, about 0.05 wt % to about 2.5 wt %, about 0.07 wt % to about 2.5 wt %, about 0.1 wt % to about 2.5 wt %, about 0.3 wt % to about 2.5 wt %, about 0.5 wt % to about 2.5 wt %, about 0.7 wt % to about 2.5 wt %, about 1 wt % to about 2.5 wt %, about 5 wt. % to about 30 wt. %, from about 10 wt. % to about 30 wt. %, from about 20 wt. % to about 40 wt. %, or from about 30 wt. % to about 50 wt. %.

D. Additional Additives

In other embodiments, the composition of the present application further comprises one or more additional additives. Examples of additional additives include, but are not limited to, salts, flavoring agents, minerals, organic acids and inorganic acids, polyols, nucleotides, bitter compounds, astringent compounds, proteins or protein hydrolysates, surfactants, gums and waxes, antioxidants, polymers, fatty acids, vitamins, preservatives, and hydration agents, as further described below.

i. Salts

The composition of the present application can comprise one or more salts. As used herein, the term "salt" refers to salts that retain the desired chemical activity of the compositions of the present application and are safe for human or animal consumption in a generally acceptable range.

The one or more salts may be organic or inorganic salts. Nonlimiting examples of salts include sodium carbonate, sodium bicarbonate, sodium chloride, potassium chloride, magnesium chloride, sodium sulfate, magnesium sulfate, and potassium sulfate, or any edible salt, for example calcium salts, metal alkali halides, metal alkali carbonates, metal alkali bicarbonates, metal alkali phosphates, metal alkali sulfates, biphosphates, pyrophosphates, triphosphates, metaphosphates, and metabisulfates.

In some embodiments, the one or more salts are salts formed with metal cations such as calcium, bismuth, barium, magnesium, aluminum, copper, cobalt, nickel, cadmium, sodium, potassium, and the like, or with a cation formed from ammonia, N,N-dibenzylethylenediamine, D-glucosamine, ethanolamine, diethanolamine, triethanolamine, N-methylglucamine tetraethylammonium, or ethylenediamine.

In some embodiments, the one or more salts are formed with inorganic acids, such as hydrochloric acid, hydrobromic acid, sulfuric acid, nitric acid, phosphoric acid, and the like; or formed with organic acids, such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethane-disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid and muconic acid.

In particular embodiments, non-limiting inorganic salts may be selected from the group consisting of sodium chloride, sodium carbonate, sodium bicarbonate, sodium acetate, sodium sulfide, sodium sulfate, sodium phosphate, potassium chloride, potassium citrate, potassium carbonate, potassium bicarbonate, potassium acetate, europium chloride ($EuCl_3$), gadolinium chloride ($GdCl_3$), terbium chloride ($TbCl_3$), magnesium sulfate, alum, magnesium chloride, mono-, di-, tri-basic sodium or potassium salts of phosphoric acid (e.g., inorganic phosphates), salts of hydrochloric acid (e.g., inorganic chlorides), sodium carbonate, sodium bisulfate, and sodium bicarbonate. Exemplary organic salts may be selected from the group consisting of choline chloride, alginic acid sodium salt (sodium alginate), glucoheptonic acid sodium salt, gluconic acid sodium salt (sodium gluconate), gluconic acid potassium salt (potassium gluconate), guanidine HCl, glucosamine HCl, amiloride HCl, monosodium glutamate (MSG), adenosine monophosphate salt, magnesium gluconate, potassium tartrate (monohydrate), and sodium tartrate (dihydrate).

In certain embodiments, the salt is a metal or metal alkali halide, a metal or metal alkali carbonate or bicarbonate, or a metal or metal alkali phosphate, biphosphate, pyrophosphate, triphosphate, metaphosphate, or metabisulfate thereof. In certain particular embodiments, the salt is an inorganic salt that comprises sodium, potassium, calcium, or magnesium. In some embodiments, the salt is a sodium salt or a potassium salt.

The salt forms can be added to the sweetener compositions in the same amounts as their acid or base forms.

Alternative salts include various chloride or sulfate salts, such as sodium chloride, potassium chloride, magnesium chloride, sodium sulfate, magnesium sulfate, and potassium sulfate, or any edible salt.

In some embodiments, the one or more salts comprise one or more salts of steviol glycosides (SG salts) and/or salts of glycosylated steviol glycosides (GSG-salts). In some further embodiments, the one or more SG salts comprise a salt of RB and/or STB.

In some embodiments, the one or more salts comprise one or more amino acid salts. In some embodiments, the one or more salts comprise one or more poly-amino acid salts.

In some embodiments, the one or more salts comprise one or more sugar acid salts.

The one or more salts can make up anywhere from about 0.01 wt. % to about 30 wt. % of the composition of the present application, specifically about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, and all ranges there between, including for example from about 0.01 wt % to about 10 wt %, about 0.03 wt % to about 10 wt %, about 0.05 wt % to about 10 wt %, about 0.07 wt % to about 10 wt %, about 0.1 wt % to about 10 wt %, about 0.3 wt % to about 10 wt %, about 0.5 wt % to about 10 wt %, about 0.7 wt % to about 10 wt %, about 1 wt % to about 10 wt %, about 3 wt % to about 10 wt %, about 5 wt % to about 10 wt %, about 7 wt % to about 10 wt %, about 0.01 wt % to about 3 wt %, about 0.03 wt % to about 3 wt %, about 0.05 wt % to about 3 wt %, about 0.07 wt % to about 3 wt %, about 0.1 wt % to about 3 wt %, about 0.3 wt % to about 3 wt %, about 0.5 wt % to about 3 wt %, about 0.7 wt % to about 3 wt %, about 1 wt % to about 3 wt %, about 0.01 wt % to about 1 wt %, about 0.03 wt % to about 1 wt %, about 0.05 wt % to about 1 wt %, about 0.07 wt % to about 1 wt %, about 0.1 wt % to about 1 wt %, about 0.3 wt % to about 1 wt %, about 0.5 wt % to about 1 wt %, about 0.7 wt % to about 1 wt %, about 0.01 wt % to about 0.3 wt %, about 0.03 wt % to about 0.3 wt %, about 0.05 wt % to about 0.3 wt %, about 0.07 wt % to about 0.3 wt %, about 0.1 wt % to about 0.3 wt %, about 0.01 wt % to about 0.1 wt %, about 0.03 wt % to about 0.1 wt %, about 0.05 wt % to about 0.1 wt %, about 0.07 wt % to about 0.1 wt %, about 0.01 wt % to about 0.03 wt %, about 0.01 wt % to about 0.05 wt %, about 0.01 wt % to about 0.07 wt %, about 5 wt. % to about 30 wt. %, from about 10 wt. % to about 30 wt. %, or from about 20 wt. % to about 30 wt. % of the composition of the present application.

Regardless of the salt used in the present compositions, the salt content in a composition is calculated based on the weight of sodium chloride. More specifically, the salt content (based on weight of NaCl) may be determined by determining the total ash content of a sample according to the general method for determining total ash content as set forth in FAO JECFA MONOGRAPHS, vol. 4, 2007. The weight of sodium chloride is determined from the weight of sodium oxide multiplied by a factor of 1.89. For example, if the total ash content of 100 g the composition of the present application is 1 g, the composition of the present application has a salt content of 1.89 wt %.

ii. Flavoring Agents

As used herein, a "flavoring agent" or "flavorant" herein refers to a compound or an ingestibly acceptable salt or solvate thereof that induces a flavor or taste in an animal or a human. The flavoring agent can be natural, semi-synthetic, or synthetic. Suitable flavorants and flavoring ingredient additives for use in the compositions of the present application include, but are not limited to, vanillin, vanilla extract, mango extract, cinnamon, citrus, coconut, ginger, viridiflorol, almond, bay, thyme, cedar leaf, nutmeg, allspice, sage, mace, menthol (including menthol without mint), an essential oil, such as an oil produced from a plant or a fruit, such as peppermint oil, spearmint oil, other mint oils, clove oil, cinnamon oil, oil of wintergreen, or an oil of almonds; a plant extract, fruit extract or fruit essence from grape skin extract, grape seed extract, apple, banana, watermelon, pear, peach, grape, strawberry, raspberry, cherry, plum, pineapple, apricot, a flavoring agent comprising a citrus flavor, such as an extract, essence, or oil of lemon, lime, orange, tangerine, grapefruit, citron, kumquat, and combinations thereof.

Non-limiting examples of proprietary flavorants include Dohler™ Natural Flavoring Sweetness Enhancer K14323 (Dohler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, New Jersey, U.S.A.), and Sucramask™ (Creative Research Management, Stockton, California, U.S.A.).

In some embodiments, the flavoring agent is present in the composition of the present application in an amount effective to provide a final amount of from about 0.1 ppm to about 5,000 ppm.

iii. Minerals

Minerals comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts. Bulk minerals generally are required in amounts greater than or equal to about 100 mg per day and trace minerals are those that are required in amounts less than about 100 mg per day.

In some embodiments of the present application, the minerals are chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine.

Although iodine generally is classified as a trace mineral, it is required in larger quantities than other trace minerals and often is categorized as a bulk mineral.

In some embodiments, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. In some embodiments, the minerals are in their ionic form, having either a positive or negative charge. For example, sulfur and phosphorous often are found naturally as sulfates, sulfides, and phosphates. In some embodiment, the minerals are present in their molecular form.

In some embodiments, minerals are present in the composition of the present application in an amount effective to provide an amount of from about 25 ppm to about 25,000 ppm in the final product.

iv. Organic Acids and Inorganic Acids

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In some embodiments, the organic acid additive is present in the composition of the present application in an amount effective to provide an amount of from about 10 ppm to about 5,000 ppm in the final product.

Organic acids also include amino acids such as, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid (α-, β-, and/or δ-isomers), glutamine, hydroxyproline, taurine, norvaline and sarcosine. The amino acid may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids.

As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-a-lysine or poly-L-s-lysine), poly-L-ornithine (e.g., poly-L-a-ornithine or poly-L-s-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-a-lysine with a MW of 1,500, MW of 6,000, MW of 25,200, MW of 63,000, MW of 83,000, or MW of 300,000.

In some embodiments, the amino acid is present in the composition of the present application in an amount effective to provide an amount of from about 10 ppm to about 50,000 ppm in the final product.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

In some embodiments, the in organic acid is present in the composition of the present application in an amount effective to provide an amount of from about 25 ppm to about 25,000 ppm in the final product.

v. Polyols

The term "polyol," as used herein, refers to a molecule that contains more than one hydroxyl group. A polyol may be a diol, triol, or a tetraol which contains 2, 3, and 4 hydroxyl groups respectively. A polyol also may comprise more than 4 hydroxyl groups, such as a pentaol, hexaol, heptaol, or the like, which comprise 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

In some embodiments, polyol is present in the compositions of the present application in an amount effective to provide an amount of from about 100 ppm to about 250,000 ppm in the final product.

vi. Nucleotides

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, and uracil).

In some embodiments, nucleotide is present in the compositions of the present application in an amount effective to provide an amount of from about 5 ppm to about 1,000 ppm in the final product.

vii. Bitter Compounds

Suitable bitter compound additives include, but are not limited to, caffeine, quinine, urea, bitter orange oil, naringin, quassia, and salts thereof.

In some embodiments, bitter compounds are present in the compositions of the present application in an amount effective to provide an amount of from about 25 ppm to about 25,000 ppm in the final product.

viii. Astringent Compounds

Suitable astringent compound additives include, but are not limited to, tannic acid, europium chloride (EuCl3), gadolinium chloride (GdCl3), terbium chloride (TbCl3), alum, tannic acid, and polyphenols (e.g., tea polyphenols).

In some embodiments, astringent compound is present in the compositions of the present application in an amount effective to provide an amount of from about 10 ppm to about 5,000 ppm in the final product.

ix. Proteins or Protein Hydrolysates

Suitable protein or protein hydrolysate additives include, but are not limited to, bovine serum albumin (BSA), whey protein (including fractions or concentrates thereof such as 90% instant whey protein isolate, 34% whey protein, 50%>hydrolyzed whey protein, and 80%>whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

In some embodiments, proteins or protein hydrolysates are present in the compositions of the present application in an amount effective to provide an amount of from about 100 ppm to about 50,000 ppm in the final product.

x. Surfactants

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltnmethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

In some embodiments, surfactants are present in the compositions of the present application in an amount effective to provide an amount of from about 20 ppm to about 20,000 ppm in the final product.

xi. Gums and Waxes

Gums and mucilages represent a broad array of different branched structures. Guar gum is a galactomannan produced from the ground endosperm of the guar seed. Guar gum is commercially available (e.g., Benefiber by Novartis AG). Other gums, such as gum arabic and pectins, have still different structures. Still other gums include xanthan gum, gellan gum, tara gum, psylium seed husk gum, and locust been gum.

Waxes are esters of ethylene glycol and two fatty acids, generally occurring as a hydrophobic liquid that is insoluble in water.

In some embodiments, gums or waxes are present in the compositions of the present application in an amount effective to provide an amount of from about 100 ppm to about 100,000 ppm in the final product.

xii. Antioxidants

As used herein "antioxidant" refers to any substance which inhibits, suppresses, or reduces oxidative damage to cells and biomolecules. Without being bound by theory, it is believed that antioxidants inhibit, suppress, or reduce oxidative damage to cells or biomolecules by stabilizing free radicals before they can cause harmful reactions. As such, antioxidants may prevent or postpone the onset of some degenerative diseases.

Examples of suitable antioxidants for embodiments of this application include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, a-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-a-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), *aronia* extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this application include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. A variety of health benefits may be derived from polyphenols, including prevention of cancer, heart disease, and chronic inflammatory disease and improved mental strength and physical strength, for example. Suitable polyphenols for embodiments of this application include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In some embodiments, the antioxidant is a catechin such as, for example, epigallocatechin gallate (EGCG). Suitable sources of catechins for embodiments of this application include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this application include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this application include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this application include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is reservatrol. Suitable sources of reservatrol for embodiments of this application include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this application include, but are not limited to, soy beans, soy products, legumes, alfalfa sprouts, chickpeas, peanuts, and red clover.

In some embodiments, the antioxidant is curcumin. Suitable sources of curcumin for embodiments of this application include, but are not limited to, turmeric and mustard.

In particular embodiments, the antioxidant is chosen from punicalagin, ellagitannin or combinations thereof. Suitable sources of punicalagin and ellagitannin for embodiments of this application include, but are not limited to, pomegranate, raspberry, strawberry, walnut, and oak-aged red wine.

In some embodiments, the antioxidant is a citrus flavonoid, such as hesperidin or naringin. Suitable sources of citrus flavonoids, such as hesperidin or naringin, for embodiments of this application include, but are not limited to, oranges, grapefruits, and citrus juices.

In particular embodiments, the antioxidant is chlorogenic acid. Suitable sources of chlorogenic acid for embodiments of this application include, but are not limited to, green coffee, yerba mate, red wine, grape seed, red grape skin, purple grape skin, red grape juice, purple grape juice, apple juice, cranberry, pomegranate, blueberry, strawberry, sunflower, *Echinacea*, pycnogenol, and apple peel.

In some embodiments, antioxidants are present in the compositions of the present application in an amount effective to provide an amount of from about 100 ppm to about 250,000 ppm in the final product.

xiii. Polymers

Suitable polymer additives include, but are not limited to, chitosan, pectin, pectic, pectinic, polyuronic, polygalacturonic acid, starch, food hydrocolloid or crude extracts thereof (e.g., gum acacia Senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

In some embodiments, polymer are present in the compositions of the present application in an amount effective to provide an amount of from about 10 ppm to about 10,000 ppm in the final product.

xiv. Fatty Acids

As used herein, "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, an "omega-6 fatty acid" is any polyunsaturated fatty acid having a first double bond as the sixth carbon-carbon bond from the terminal methyl end of its carbon chain.

Suitable omega-3 fatty acids for use in embodiments of the present application can be produced from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be produced from commercially available omega-3 fatty acid oils, such as Microalgae DHA oil (from Martek, Columbia, MD), OmegaPure (from Omega Protein, Houston, TX), Marinol C-38 (from Lipid Nutrition, Channahon, IL), Bonito oil and MEG-3 (from Ocean Nutrition, Dartmouth, NS), Evogel (from Symrise, Holzminden, Germany), Marine Oil, from tuna or salmon (from Arista Wilton, CT), OmegaSource 2000, Marine Oil, from menhaden and Marine Oil, from cod (from OmegaSource, RTP, NC).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof.

Suitable esterified fatty acids for embodiments of the present application may include, but are not limited to, monoacylgycerols containing omega-3 and/or omega-6 fatty acids, diacylgycerols containing omega-3 and/or omega-6 fatty acids, or triacylgycerols containing omega-3 and/or omega-6 fatty acids and combinations thereof.

In some embodiments, fatty acids are present in the compositions of the present application in an amount effective to provide an amount of from about 100 ppm to about 100,000 ppm in the final product.

xv. Vitamins

Vitamins are organic compounds that the human body needs in small quantities for normal functioning. The body uses vitamins without breaking them down, unlike other nutrients such as carbohydrates and proteins. To date, thirteen vitamins have been recognized, and one or more can be used in the compositions herein. Suitable vitamins and their alternative chemical names are provided in the accompanying parentheses which follow include, vitamin A (retinol, retinaldehyde), vitamin D (calciferol, cholecalciferol, lumisterol, ergocalciferol, dihydrotachysterol, 7-dehydrocholesterol), vitamin E (tocopherol, tocotrienol), vitamin K (phylloquinone, naphthoquinone), vitamin B1 (thiamin), vitamin B2 (riboflavin, vitamin G), vitamin B3 (niacin, nicotinic acid, vitamin PP), vitamin B5 (pantothenic acid), vitamin B6 (pyridoxine, pyridoxal, pyridoxamine), vitamin B7 (biotin, vitamin H), vitamin B9 (folic acid, folate, folacin, vitamin M, pteroyl-L-glutamic acid), vitamin B12 (cobalamin, cyanocobalamin), and vitamin C (ascorbic acid).

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

In some embodiments, the vitamin is a fat-soluble vitamin chosen from vitamin A, D, E, K and combinations thereof. In other embodiments, the vitamin is a water-soluble vitamin chosen from vitamin B1, vitamin B2, vitamin B3, vitamin B6, vitamin B12, folic acid, biotin, pantothenic acid, vitamin C and combinations thereof.

In some embodiments, vitamins are present in the compositions of the present application in an amount effective to provide an amount of from about 10 ppm to about 10,000 ppm in the final product.

xvi. Preservatives

In some embodiments of this application, the preservative is chosen from antimicrobials, antienzymatics or combinations thereof.

Non-limiting examples of antimicrobials include sulfites, propionates, benzoates, sorbates, nitrates, nitrites, bacteriocins such as nisin, salts, sugars, acetic acid, dimethyl dicarbonate (DMDC), ethanol, and ozone.

Sulfites include, but are not limited to, sulfur dioxide, sodium bisulfite, and potassium hydrogen sulfite. Propionates include, but are not limited to, propionic acid, calcium propionate, and sodium propionate. Benzoates include, but are not limited to, sodium benzoate and benzoic acid. Sorbates include, but are not limited to, potassium sorbate, sodium sorbate, calcium sorbate, and sorbic acid. Nitrates and nitrites include, but are not limited to, sodium nitrate and sodium nitrite.

Non-limiting examples of antienzymatics suitable for use as preservatives in particular embodiments of the application include ascorbic acid, citric acid, and metal chelating agents such as ethylenediaminetetraacetic acid (EDTA).

In some embodiments, preserves are present in the compositions of the present application in an amount effective to provide an amount of from about 100 ppm to about 5000 ppm in the final product.

xvii. Hydration Agents

Hydration products help the body to replace fluids that are lost through excretion. For example, fluid is lost as sweat in order to regulate body temperature, as urine in order to excrete waste substances, and as water vapor in order to exchange gases in the lungs. Fluid loss can also occur due to a wide range of external causes, non-limiting examples of which include physical activity, exposure to dry air, diarrhea, vomiting, hyperthermia, shock, blood loss, and hypotension. Diseases causing fluid loss include diabetes, cholera, gastroenteritis, shigellosis, and yellow fever. Forms of malnutrition that cause fluid loss include excessive consumption of alcohol, electrolyte imbalance, fasting, and rapid weight loss.

In some embodiments, the hydration product in a composition helps the body replace fluids that are lost during exercise. Accordingly, in some embodiments, the hydration product is an electrolyte, non-limiting examples of which include sodium, potassium, calcium, magnesium, chloride, phosphate, bicarbonate, and combinations thereof. Suitable electrolytes for use in some embodiments of this application are also described in U.S. Pat. No. 5,681,569, the disclosure of which is expressly incorporated herein by reference. In some embodiments, the electrolytes are obtained from their corresponding water-soluble salts. Non-limiting examples of salts for use in some embodiments include chlorides, carbonates, sulfates, acetates, bicarbonates, citrates, phosphates, hydrogen phosphates, tartrates, sorbates, citrates, benzoates, or combinations thereof. In other embodiments, the electrolytes are provided by juice, fruit extracts, vegetable extracts, tea, or teas extracts.

In some embodiments, the hydration agent is a flavanol that provides cellular rehydration. Flavanols are a class of natural substances present in plants, and generally comprise a 2-phenylbenzopyrone molecular skeleton attached to one or more chemical moieties. Non-limiting examples of flavanols suitable for use herein include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In some embodiments, the hydration agent is a glycerol solution to enhance exercise endurance. The ingestion of a glycerol containing solution has been shown to provide beneficial physiological effects, such as expanded blood volume, lower heart rate, and lower rectal temperature.

In some embodiments, hydration agents are present in the compositions of the present application in an amount effective to provide an amount of from about 100 ppm to about 250,000 ppm in the final product.

2. Orally Consumable Compositions Comprising an SG/GSG Composition

Another aspect of the present application relates to an orally consumable composition comprising a composition of the present application. The composition of the present application can be added to the consumable composition to provide a sweetened consumable composition or a flavored consumable composition.

"Orally consumable compositions," as used herein, refer to substances which are contacted with the mouth of man or animal, including substances which are taken into and subsequently ejected from the mouth and substances which are drunk, eaten, swallowed or otherwise ingested, and are safe for human or animal consumption when used in a generally acceptable range.

Exemplary orally consumable compositions include, but are not limited to, confections, condiments, chewing compositions, cereal composition, baked goods, tabletop sweeteners, beverages and beverage products, medicinal compositions, smoking compositions, and oral hygiene compositions. Consumables can be sweetened or unsweetened.

Orally consumable compositions consumable can optionally include additives, sweeteners, functional ingredients and combinations thereof, as described herein. Any of the additive, sweeteners and other ingredients described above can be present in the orally consumable compositions.

Consumables employing the compositions of the present application are also suitable for use in processed agricultural products, livestock products or seafood; processed meat products such as sausage and the like; retort food products, pickles, preserves boiled in soy sauce, delicacies, side dishes; soups; snacks, such as potato chips, cookies, or the like; as shredded filler, leaf, stem, stalk, homogenized leaf cured and animal feed.

A. Confections

In some embodiments, the orally consumable composition comprising the composition of the present application is a confection. As referred to herein, "confection" can mean a sweet, a lollie, a confectionery, or similar term. The confection generally contains a base composition component and a sweetener component. A "base composition" refers to any composition which can be a food item and provides a matrix for carrying the sweetener component. The composition of the present application comprising the same can serve as the sweetener component. The confection may be in the form of any food that is typically perceived to be rich in sugar or is typically sweet.

In some embodiments of the present application, the confections may be bakery products such as pastries; desserts such as yogurt, jellies, drinkable jellies, puddings, Bavarian cream, blancmange, cakes, brownies, mousse and the like, sweetened food products eaten at tea time or following meals; frozen foods; cold confections, e.g., types of ice cream such as ice cream, ice milk, lacto-ice and the like (food products in which sweeteners and various other types of raw materials are added to milk products, and the resulting mixture is agitated and frozen), and ice confections such as sherbets, dessert ices and the like (food products in which various other types of raw materials are added to a sugary liquid, and the resulting mixture is agitated and frozen); general confections, e.g., baked confections or steamed confections such as crackers, biscuits, buns with bean-jam filling, halvah, alfajor, and the like; rice cakes and snacks; table top products; general sugar confections such as chewing gum (e.g. including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; cremes including butter cremes, flour pastes, whipped cream and the like; jams including strawberry jam, marmalade and the like; and breads including sweet breads and the like or other starch products, and combinations thereof.

Suitable base compositions for embodiments of this application may include flour, yeast, water, salt, butter, eggs, milk, milk powder, liquor, gelatin, nuts, chocolate, citric acid, tartaric acid, fumaric acid, natural flavors, artificial flavors, colorings, polyols, sorbitol, isomalt, maltitol, lactitol, malic acid, magnesium stearate, lecithin, hydrogenated glucose syrup, glycerine, natural or synthetic gum, starch, and the like, and combinations thereof. Such components generally are recognized as safe (GRAS) and/or are U.S. Food and Drug Administration (FDA)-approved. In some embodiments of the application, the base composition is present in the confection in an amount ranging from about 0.1 to about 99 weight percent of the confection.

The base composition of the confection may optionally include other artificial or natural sweeteners, bulk sweeteners, or combinations thereof. Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof. Generally, the amount of bulk sweetener present in the confection ranges widely depending on the particular embodiment of the confection and the desired degree of sweetness. Those of ordinary skill in the art will readily ascertain the appropriate amount of bulk sweetener.

B. Condiments

In some embodiments, the consumable comprising a composition of the present application or a sweetener composition comprising the same is a condiment. Condiments, as used herein, are compositions used to enhance or improve the flavor of a food or beverage. Non-limiting examples of condiments include ketchup (catsup); mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings (e.g., oil and vinegar, Caesar, French, ranch, bleu cheese, Russian, Thousand Island, Italian, and balsamic vinaigrette), salsa; sauerkraut; soy sauce; steak sauce; syrups; tartar sauce; and Worcestershire sauce.

Condiment bases generally comprise a mixture of different ingredients, non-limiting examples of which include vehicles (e.g., water and vinegar); spices or seasonings (e.g., salt, pepper, garlic, mustard seed, onion, paprika, turmeric, and combinations thereof); fruits, vegetables, or their products (e.g., tomatoes or tomato-based products (paste, puree), fruit juices, fruit juice peels, and combinations thereof); oils or oil emulsions, particularly vegetable oils; thickeners (e.g., xanthan gum, food starch, other hydrocolloids, and combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, and combinations thereof). Recipes for condiment bases and methods of making condiment bases are well known to those of ordinary skill in the art.

Generally, condiments also comprise caloric sweeteners, such as sucrose, high fructose corn syrup, molasses, honey, or brown sugar. In exemplary embodiments of the condiments provided herein, the composition of the present application or a sweetener composition comprising the same is used instead of traditional caloric sweeteners. Accordingly, a condiment composition desirably comprises a composition of the present application or a sweetener composition comprising the same and a condiment base.

The condiment composition optionally may include other natural and/or synthetic high-potency sweeteners, bulk sweeteners, pH modifying agents (e.g., lactic acid, citric acid, phosphoric acid, hydrochloric acid, acetic acid, and combinations thereof), fillers, functional agents (e.g., pharmaceutical agents, nutrients, or components of a food or plant), flavorings, colorings, or combinations thereof.

C. Chewing Compositions

In some embodiments, the consumable comprising the steviol composition of the present application is a chewing composition. The term "chewing compositions" include chewing gum compositions, chewing tobacco, smokeless tobacco, snuff, chewing gum and other compositions which are masticated and subsequently expectorated.

Chewing gum compositions generally comprise a water-soluble portion and a water-insoluble chewable gum base portion. The water soluble portion, which typically includes a Composition of the present application or a sweetener composition comprising the same, dissipates with a portion of the flavoring agent over a period of time during chewing while the insoluble gum base portion is retained in the mouth. The insoluble gum base generally determines whether a gum is considered chewing gum, bubble gum, or a functional gum.

The insoluble gum base, which is generally present in the chewing gum composition in an amount in the range of about 15 to about 35 weight percent of the chewing gum composition, generally comprises combinations of elastomers, softeners (plasticizers), emulsifiers, resins, and fillers. Such components generally are considered food grade, recognized as safe (GRA), and/or are U.S. Food and Drug Administration (FDA)-approved.

Elastomers, the primary component of the gum base, provide the rubbery, cohesive nature to gums and can include one or more natural rubbers (e.g., smoked latex, liquid latex, or guayule); natural gums (e.g., jelutong, perillo, sorva, massaranduba balata, massaranduba chocolate, nispero, rosindinha, chicle, and gutta hang kang); or synthetic elastomers (e.g., butadiene-styrene copolymers, isobutylene-isoprene copolymers, polybutadiene, polyisobutylene, and vinyl polymeric elastomers). In a particular embodiment, the elastomer is present in the gum base in an amount in the range of about 3 to about 50 weight percent of the gum base.

Resins are used to vary the firmness of the gum base and aid in softening the elastomer component of the gum base. Non-limiting examples of suitable resins include a rosin ester, a terpene resin (e.g., a terpene resin from α-pinene, β-pinene and/or D-limonene), polyvinyl acetate, polyvinyl alcohol, ethylene vinyl acetate, and vinyl acetate-vinyl laurate copolymers. Non-limiting examples of rosin esters include glycerol esters of partially hydrogenated rosins, glycerol esters of polymerized rosins, glycerol esters of partially dimerized rosins, glycerol esters of rosins, pentaerythritol esters of partially hydrogenated rosins, methyl esters of rosins, and methyl esters of partially hydrogenated rosins. In some embodiment, the resin is present in the gum base in an amount in the range of about 5 to about 75 weight percent of the gum base.

Softeners, which also are known as plasticizers, are used to modify the ease of chewing and/or mouthfeel of the chewing gum composition. Generally, softeners comprise oils, fats, waxes, and emulsifiers. Non-limiting examples of oils and fats include tallow, hydrogenated tallow, large, hydrogenated or partially hydrogenated vegetable oils (e.g., soybean, canola, cottonseed, sunflower, palm, coconut, corn, safflower, or palm kernel oils), cocoa butter, glycerol monostearate, glycerol triacetate, glycerol abietate, lecithin, monoglycerides, diglycerides, triglycerides acetylated monoglycerides, and free fatty acids. Non-limiting examples of waxes include polypropylene/polyethylene/Fisher-Tropsch waxes, paraffin, and microcrystalline and natural waxes (e.g., candelilla, beeswax and carnauba). Microcrystalline waxes, especially those with a high degree of crystallinity and a high melting point, also may be considered as bodying agents or textural modifiers. In some embodiments, the softeners are present in the gum base in an amount in the range of about 0.5 to about 25 weight percent of the gum base.

Emulsifiers are used to form a uniform dispersion of the insoluble and soluble phases of the chewing gum composition and also have plasticizing properties. Suitable emulsifiers include glycerol monostearate (GMS), lecithin (phosphatidyl choline), polyglycerol polyricinoleic acid (PPGR), mono and diglycerides of fatty acids, glycerol distearate, tracetin, acetylated monoglyceride, glycerol triacetate, and magnesium stearate. In some embodiments, the emulsifiers are present in the gum base in an amount in the range of about 2 to about 30 weight percent of the gum base.

The chewing gum composition also may comprise adjuvants or fillers in either the gum base and/or the soluble portion of the chewing gum composition. Suitable adjuvants and fillers include lecithin, inulin, polydextrin, calcium carbonate, magnesium carbonate, magnesium silicate, ground limestone, aluminum hydroxide, aluminum silicate, talc, clay, alumina, titanium dioxide, and calcium phosphate. In some embodiments, lecithin can be used as an inert filler to decrease the stickiness of the chewing gum composition. In other some embodiments, lactic acid copolymers, proteins (e.g., gluten and/or zein) and/or guar can be used to create a gum that is more readily biodegradable. The adjuvants or fillers are generally present in the gum base in an amount up to about 20 weight percent of the gum base. Other optional ingredients include coloring agents, whiteners, preservatives, and flavors.

In some embodiments of the chewing gum composition, the gum base comprises about 5 to about 95 weight percent of the chewing gum composition, more desirably about 15 to about 50 weight percent of the chewing gum composition, and even more desirably from about 20 to about 30 weight percent of the chewing gum composition.

The soluble portion of the chewing gum composition may optionally include other artificial or natural sweeteners, bulk sweeteners, softeners, emulsifiers, flavoring agents, coloring agents, adjuvants, fillers, functional agents (e.g., pharmaceutical agents or nutrients), or combinations thereof. Suitable examples of softeners and emulsifiers are described above.

Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof. In some embodiments, the bulk sweetener is present in the chewing gum composition in an amount in the range of about 1 to about 75 weight percent of the chewing gum composition.

Flavoring agents may be used in either the insoluble gum base or soluble portion of the chewing gum composition. Such flavoring agents may be natural or artificial flavors. In some embodiments, the flavoring agent comprises an essential oil, such as an oil produced from a plant or a fruit, peppermint oil, spearmint oil, other mint oils, clove oil, cinnamon oil, oil of wintergreen, bay, thyme, cedar leaf, nutmeg, allspice, sage, mace, and almonds. In another some embodiment, the flavoring agent comprises a plant extract or a fruit essence such as apple, banana, watermelon, pear, peach, grape, strawberry, raspberry, cherry, plum, pineapple, apricot, and mixtures thereof. In still another some embodiment, the flavoring agent comprises a citrus flavor, such as an extract, essence, or oil of lemon, lime, orange, tangerine, grapefruit, citron, or kumquat.

In some embodiments, a chewing gum composition comprises a composition of the present application or a sweetener composition comprising the same and a gum base.

D. Cereal Compositions

In some embodiments, the consumable comprising the steviol composition of the present application is a cereal composition. Cereal compositions typically are eaten either as staple foods or as snacks. Non-limiting examples of cereal compositions for use in some embodiments include ready-to-eat cereals as well as hot cereals. Ready-to-eat cereals are cereals which may be eaten without further processing (i.e., cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in some embodiments include maize, wheat, rice, barley, bran, bran endosperm, bulgur, sorghums, millets, oats, rye, triticale, buckwheat, fonio, *quinoa*, bean, soybean, amaranth, teff, spelt, and kaniwa.

In some embodiment, the cereal composition comprises a composition of the present application or a sweetener composition comprising the same and at least one cereal ingredient. The Composition of the present application or sweetener composition comprising the same may be added to the cereal composition in a variety of ways, such as, for example, as a coating, as a frosting, as a glaze, or as a matrix blend (i.e., added as an ingredient to the cereal formulation prior to the preparation of the final cereal product).

Accordingly, in some embodiment, the composition of the present application or sweetener composition comprising the same is added to the cereal composition as a matrix blend. In one embodiment, the composition of the present application or sweetener composition comprising the same is blended with a hot cereal prior to cooking to provide a sweetened hot cereal product. In another embodiment, the composition of the present application or sweetener composition comprising the same is blended with the cereal matrix before the cereal is extruded.

In some embodiments, the composition of the present application or sweetener composition comprising the same is added to the cereal composition as a coating, such as, for example, by combining with a food grade oil and applying the mixture onto the cereal. In a different embodiment, the composition of the present application or sweetener composition comprising the same and the food grade oil may be applied to the cereal separately, by applying either the oil or the sweetener first. Non-limiting examples of food grade oils for use some embodiments include vegetable oils such as corn oil, soybean oil, cottonseed oil, peanut oil, coconut oil, canola oil, olive oil, sesame seed oil, palm oil, palm kernel oil, and mixtures thereof. In yet another embodiment, food grade fats may be used in place of the oils, provided that the fat is melted prior to applying the fat onto the cereal.

In another embodiment, the composition of the present application or sweetener composition comprising the same is added to the cereal composition as a glaze. Non-limiting examples of glazing agents for use in some embodiments include corn syrup, honey syrups and honey syrup solids, maple syrups and maple syrup solids, sucrose, isomalt, polydextrose, polyols, hydrogenated starch hydrolysate, aqueous solutions thereof, and mixtures thereof. In another such embodiment, the composition of the present application or sweetener composition comprising the same is added as a glaze by combining with a glazing agent and a food grade oil or fat and applying the mixture to the cereal. In yet another embodiment, a gum system, such as, for example, gum acacia, carboxymethyl cellulose, or algin, may be added to the glaze to provide structural support. In addition, the glaze also may include a coloring agent, and also may include a flavor.

In another embodiment, the composition of the present application or sweetener composition comprising the same is added to the cereal composition as a frosting. In one such embodiment, the composition of the present application or sweetener composition comprising the same is combined with water and a frosting agent and then applied to the cereal. Non-limiting examples of frosting agents for use in some embodiments include maltodextrin, sucrose, starch, polyols, and mixtures thereof. The frosting also may include a food grade oil, a food grade fat, a coloring agent, and/or a flavor.

Generally, the amount of the composition of the present application or sweetener composition comprising the same in a cereal composition varies widely depending on the particular type of cereal composition and its desired sweetness. Those of ordinary skill in the art can readily discern the appropriate amount of sweetener to put in the cereal composition.

E. Baked Goods

In some embodiments, the consumable comprising the steviol composition of the present application is bakes goods. Baked goods, as used herein, include ready to eat and all ready to bake products, flours, and mixes requiring preparation before serving. Non-limiting examples of baked goods include cakes, crackers, cookies, brownies, muffins, rolls, bagels, donuts, strudels, pastries, croissants, biscuits, bread, bread products, and buns.

Preferred baked goods in accordance with embodiments of this application can be classified into three groups: bread-type doughs (e.g., white breads, variety breads, soft buns, hard rolls, bagels, pizza dough, and flour tortillas), sweet doughs (e.g., danishes, croissants, crackers, puff pastry, pie crust, biscuits, and cookies), and batters (e.g., cakes such as sponge, pound, devil's food, cheesecake, and layer cake, donuts or other yeast raised cakes, brownies, and muffins). Doughs are generally characterized as being flour-based, whereas batters are more water-based.

Baked goods in accordance with particular embodiments of this application generally comprise a combination of sweetener, water, and fat. Baked goods made in accordance with many embodiments of this application also contain flour in order to make a dough or a batter. The term "dough" as used herein is a mixture of flour and other ingredients stiff enough to knead or roll. The term "batter" as used herein consists of flour, liquids such as milk or water, and other ingredients, and is thin enough to pour or drop from a spoon. Desirably, in accordance with particular embodiments of the application, the flour is present in the baked goods in an amount in the range of about 15 to about 60% on a dry weight basis, more desirably from about 23 to about 48% on a dry weight basis.

The type of flour may be selected based on the desired product. Generally, the flour comprises an edible non-toxic flour that is conventionally utilized in baked goods. According to particular embodiments, the flour may be a bleached bake flour, general purpose flour, or unbleached flour. In other particular embodiments, flours also may be used that have been treated in other manners. For example, in particular embodiments flour may be enriched with additional vitamins, minerals, or proteins. Non-limiting examples of flours suitable for use in particular embodiments of the application include wheat, corn meal, whole grain, fractions of whole grains (wheat, bran, and oatmeal), and combinations thereof. Starches or farinaceous material also may be used as the flour in particular embodiments. Common food starches generally are derived from potato, corn, wheat, barley, oat, tapioca, arrow root, and sago. Modified starches and pregelatinized starches also may be used in particular embodiments of the application.

The type of fat or oil used in particular embodiments of the application may comprise any edible fat, oil, or combination thereof that is suitable for baking. Non-limiting examples of fats suitable for use in particular embodiments of the application include vegetable oils, tallow, lard, marine oils, and combinations thereof. According to particular embodiments, the fats may be fractionated, partially hydrogenated, and/or intensified. In another particular embodiment, the fat desirably comprises reduced, low calorie, or non-digestible fats, fat substitutes, or synthetic fats. In yet another particular embodiment, shortenings, fats, or mixtures of hard and soft fats also may be used. In particular embodiments, shortenings may be derived principally from triglycerides derived from vegetable sources (e.g., cotton seed oil, soybean oil, peanut oil, linseed oil, sesame oil, palm oil, palm kernel oil, rapeseed oil, safflower oil, coconut oil, corn oil, sunflower seed oil, and mixtures thereof). Synthetic or natural triglycerides of fatty acids having chain lengths from 8 to 24 carbon atoms also may be used in particular embodiments. Desirably, in accordance with particular embodiments of this application, the fat is present in the baked good in an amount in the range of about 2 to about 35% by weight on a dry basis, more desirably from about 3 to about 29% by weight on a dry basis.

Baked goods in accordance with particular embodiments of this application also comprise water in amounts sufficient to provide the desired consistency, enabling proper forming, machining and cutting of the baked good prior or subsequent to cooking. The total moisture content of the baked good includes any water added directly to the baked good as well as water present in separately added ingredients (e.g., flour, which generally includes about 12 to about 14% by weight moisture). Desirably, in accordance with particular embodiments of this application, the water is present in the baked good in an amount up to about 25% by weight of the baked good.

Baked goods in accordance with particular embodiments of this application also may comprise a number of additional conventional ingredients such as leavening agents, flavors, colors, milk, milk by-products, egg, egg by-products, cocoa, vanilla or other flavoring, as well as inclusions such as nuts, raisins, cherries, apples, apricots, peaches, other fruits, citrus peel, preservative, coconuts, flavored chips such a chocolate chips, butterscotch chips, and caramel chips, and combinations thereof. In particular embodiments, the baked goods may also comprise emulsifiers, such as lecithin and monoglycerides.

According to particular embodiments of this application, leavening agents may comprise chemical leavening agents or yeast leavening agents. Non-limiting examples of chemical leavening agents suitable for use in particular embodiments of this application include baking soda (e.g., sodium, potassium, or aluminum bicarbonate), baking acid (e.g., sodium aluminum phosphate, monocalcium phosphate, or dicalcium phosphate), and combinations thereof.

In accordance with another particular embodiment of this application, cocoa may comprise natural or "Dutched" chocolate from which a substantial portion of the fat or cocoa butter has been expressed or removed by solvent extraction, pressing, or other means. In a particular embodiment, it may be necessary to reduce the amount of fat in a baked good comprising chocolate because of the additional fat present in cocoa butter. In particular embodiments, it may be necessary to add larger amounts of chocolate as compared to cocoa in order to provide an equivalent amount of flavoring and coloring.

Baked goods generally also comprise caloric sweeteners, such as sucrose, high fructose corn syrup, erythritol, molasses, honey, or brown sugar. In exemplary embodiments of the baked goods provided herein, the caloric sweetener is replaced partially or totally with a SG composition of the present application or a sweetener composition comprising the same. Accordingly, in one embodiment a baked good comprises a SG composition of the present application or a sweetener composition comprising the same in combination with a fat, water, and optionally flour. In a particular embodiment, the baked good optionally may include other natural and/or synthetic high-potency sweeteners and/or bulk sweeteners.

F. Tabletop Sweetener Compositions

In some embodiments, the orally consumable composition comprising the composition of the present application is a tabletop sweetener composition. In some embodiments, the tabletop sweetener composition may further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other embodiments of the application, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refer to any composition which assists in content uniformity and uniform dissolution. In some embodiments, non-limiting examples of anti-caking agents include cream of tartar, calcium silicate, silicon dioxide, microcrystalline cellulose (Avicel, FMC BioPolymer, Philadelphia, Pennsylvania), and tricalcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (~8 g). The amount of the Composition of the present application or a sweetener composition comprising the same in a dry-blend tabletop sweetener formulation can vary. In some embodiments, a dry-blend tabletop sweetener formulation may comprise a Composition of the present application in an amount from about 1% (w/w) to about 10% (w/w) of the tabletop sweetener composition.

Solid tabletop sweetener embodiments include cubes and tablets. A non-limiting example of conventional cubes is equivalent in size to a standard cube of granulated sugar, which is approximately 2.2×2.2×2.2 cm3 and weighs approximately 8 g. In one embodiment, a solid tabletop sweetener is in the form of a tablet or any other form known to those skilled in the art.

A tabletop sweetener composition also may be embodied in the form of a liquid, wherein a composition of the present application or a sweetener composition comprising the same is combined with a liquid carrier. Suitable non-limiting examples of carrier agents for liquid tabletop sweeteners include water, alcohol, polyol, glycerin base or citric acid base dissolved in water, and mixtures thereof. The sweetness equivalent of a tabletop sweetener composition for any of the forms described herein or known in the art may be varied to obtain a desired sweetness profile. For example, a tabletop sweetener composition may have a level of sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

G. Beverages and Beverage Products

In some embodiments, a beverage or beverage product comprises a composition of the present application or a sweetener composition comprising the same. The beverage may be sweetened or unsweetened. The composition of the present application, or sweetener composition comprising the same, may be added to a beverage to sweeten the beverage or enhance its existing sweetness or flavor profile.

"Beverage product," as used herein, is a ready-to-drink beverage, a beverage concentrate, a beverage syrup, or a powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverages comprising milk components (e.g. milk beverages, coffee comprising milk components, cafe au lait, milk tea, fruit milk beverages), and beverages comprising cereal extracts and smoothies.

Beverage concentrates and beverage syrups are prepared with an initial volume of liquid matrix (e.g., water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e., the basic ingredient in which the ingredients—including the compositions of the present application—are dissolved. In one embodiment, a beverage comprises water of beverage quality as the matrix, such as, for example deionized water, distilled water, reverse osmosis water, carbon-treated water, purified water, demineralized water and combinations thereof, can be used. Additional suitable matrices include, but are not limited to phosphoric acid, phosphate buffer, citric acid, citrate buffer and carbon-treated water.

In some embodiments, a beverage comprises a composition of the present application. In some embodiments, a beverage product comprises a sweetener composition of the present application.

The beverage concentrations below can be provided by the composition of the present application or sweetener composition of the present application.

In some embodiments, the total concentration of SGs in the beverage is from about 50 ppm to about 900 ppm, such as, for example, from about 50 ppm to about 600 ppm, from about 50 ppm to about 500 ppm, from about 50 ppm to about 400 ppm, from about 50 ppm to about 300 ppm, from about 50 ppm to about 200 ppm, from about 100 ppm to about 600 ppm, from about 100 ppm to about 500 ppm, from about 100 ppm to about 400 ppm, from about 100 ppm to about 300 ppm, from about 100 ppm to about 200 ppm, from about 200 ppm to about 600 ppm, from about 200 ppm to about 500 ppm, from about 200 ppm to about 400 ppm, from about 200 ppm to about 300 ppm, from about 300 ppm to about 600 ppm, from about 300 ppm to about 500 ppm, from about 300 ppm to about 400 ppm, from about 400 ppm to about 600 ppm, from about 400 ppm to about 500 ppm and from about 500 ppm to about 600 ppm.

H. Medical Compositions

The term "medicinal composition" includes solids, gases and liquids which are ingestible materials having medicinal value, such as cough syrups, cough drops, medicinal sprays, vitamins, and chewable medicinal tablets.

I. Oral Hygiene Compositions

The term "oral hygiene compositions" includes mouthwashes, mouth rinses, toothpastes, tooth polishes, dentifrices, mouth sprays, and mouth refreshers.

J. Smoking Compositions

The term "smoking composition," as used herein, includes cigarette, pipe and cigar tobacco, and all forms of tobacco such as shredded filler, leaf, stem, stalk, homogenized leaf cured, reconstituted binders, and reconstituted tobacco from tobacco dust, fines, or other sources in sheet, pellet or other forms. "Smoking compositions" also include tobacco substitutes formulated from non-tobacco materials, such as representative tobacco substitutes described in U.S. Pat. Nos. 3,529,602, 3,703,177 and 4,079,742 and references cited therein.

3. Method of Making the SG/GSG Compositions

Another aspect of the present application is directed to methods of making an SG/GSG composition of the present application.

In some embodiments, the composition of the present application is prepared by subjecting a starting material to glycosylation to produce a GSG product by an enzymatic process.

In certain embodiments, the GSGs used in the present application are prepared as follows: i) dissolving a glucose-donor material in water to form a liquefied glucose-donor material; ii) adding a starting SG composition to liquefied glucose-donor material to obtain a mixture; iii) adding an effective amount of an enzyme to the mixture to form a reaction mixture, wherein the enzyme catalyzes the transfer of glucose moieties from the glucose-donor material to SGs in the starting SG composition, and incubating the reaction mixture at a desired temperature for a desired length of reaction time to glycosylate SGs with glucose moieties present in the glucose-donor molecule. In some further embodiments, after achieving a desired ratio of GSG- and residual SG contents, the reaction mixture can be heated to a sufficient temperature for a sufficient amount of time to inactivate the enzyme. In some embodiments, the enzyme is removed by filtration in lieu of inactivation. In other embodiments, the enzyme is removed by filtration following inactivation. In some embodiments the resulting solution comprising GSG, residual SGs and dextrin is decolorized. In certain embodiments the resulting solution of GSG, residual SGs and dextrin is dried. In some embodiments, the drying is by spray drying. In some embodiments, step (i) comprises the substeps of (a) mixing a glucose-donor material with a desired amount of water to form a suspension, (b) adding a desired amount of glycosylating enzyme to the suspension and (c) incubate the suspension at a reaction temperature and reaction time sufficient to form liquefied glucose-donor material. The enzymatic reaction may be carried out at a temperature between 20° C. and 100° C., between 40° C.-80° C., between 50° C.-70° C., between 55° C.-65° C. or about 60° C. The reaction time may range from about 0.5 to about 24 hours, typically from about 12 to about 24 hours.

In some embodiments, the glucose-donor molecule is dextrin. In more preferred embodiments, the dextrin is a cyclodextrin, maltodextrin or tapioca dextrin. In certain preferred embodiments, the starting SG composition is a *Stevia* extract.

Enzymes for hydrolyzing starches and/or glycosylation include, but are not limited to cyclodextrin glycosyl transferase (CGTase), alpha-amylase, amylopullulanase, beta-amylase, glucoamylase, isoamylase, maltogenic amylase, and pullulanase. In some embodiments, the water is reverse osmosis (RO)-purified water.

In some embodiments, the starting SG composition has an SG content in a range from about of 10-99 wt %. In some embodiments, the liquefied glucose-donor molecule is liquefied dextrin and the starting SG composition is added at a SG composition-to-dextrin weight ratio of 1:99 to 99:1.

In some embodiments, the incubation time is in the range of 0.1 to 24 h, 0.1 to 12 h, 0.1 to 6 h, 0.1 to 4 h, 0.1 to 3 h, 0.1 to 2, 0.1 to 1 h, 0.1 to 0.5 h, 0.5 to 24 h, 0.5 to 12 h, 0.5 to 6 h, 0.5 to 4h, 0.5 to 3 h, 0.5 to 2, 0.5 to 1 h, 1 to 24 h, 1 to 12h, 1 to 6h, 1 to 4h, 1 to 3 h, 1 to 2h, 2 to 24 h, 2 to 12 h, 2 to 6 h, 2 to 4 h, 2 to 3 h, 3 to 24 h, 3 to 12 h, 3 to 6 h, 3 to 4 h, 4 to 24 h, 4 to 12 h, 4 to 6 h, 6 to 24 h, 6 to 12 h or 12 to 24 h. The incubation temperature is in the range of 4-80° C., 10-80° C., 15-80° C., 20-80° C., 30-80° C., 40-80° C., 50-80° C., 60-80° C., 70-80° C., 4-80° C., 10-80° C., 15-80° C., 20-80° C., 30-80° C., 40-80° C., 50-80° C., 60-80° C., 70-80° C., 50-70° C. or 55-65° C.

In an exemplary embodiment, the GSGs used in the present application are prepared as follows: i) dissolving dextrin in water; ii) adding the *Stevia* extract with total SGs content between 60% and 99% or between 70% and 99% to liquefied dextrin to obtain a mixture, wherein the weight ratio of dextrin to *Stevia* extract was optimized between 20:80 and 80:20 or between 40:60 and 60:40; iii) adding CGTase enzyme to the mixture and incubating at 60° C. for a desired length of reaction time to glycosylate SGs with glucose molecules derived from the dextrin; iv) after achieving a desired ratio of GSG and residual SG contents, heating the reaction mixture to 90-100° C. for 30 min to inactivate the CGTase, which is then removed by filtration; and v) decoloring and spray drying the resulting solution of GSG, residual SGs and dextrin. In more preferred embodiments, the dextrin is tapioca dextrin and the water is reverse osmosis (RO)-purified water.

In other exemplary embodiments, a method for forming compositions of the present application containing a hydrolysis product comprises the steps of: (1) mixing a GSG and an SG with water; (2) heating the mixture while stirring, until the mixture was completely dissolved to obtain a clear solution; (3) further stirring the solution at the temperature, and then cooling to ambient temperature. Step (4) can include subjecting the solution to crystallization or spray drying and the mixture can be heated to 40-100° C., 50-90° C., or even 60-70° C. in step (2)

The perceived sweetness of the compositions of the present application containing the hydrolysis product can be modified by the addition of any of the above-described additives. For instance, β-1,4-galactosyl can be substituted on the GSG using a β-1,4-galactosyl transferase enzyme in reactions known in the art.

4. Methods of Using the SG/GSG Compositions

Another aspect of the present application is directed to a method of using the SG/GSG composition of the present application as a sweetener, co-sweetener or flavoring agent.

In some embodiments, the method is a method for improving the sweetness of an orally consumable composition. The method comprises the step of adding an effective amount of the composition of the present application to an orally consumable composition. In some embodiments, the method further comprises the step of admixing composition of the present application with a liquid carrier to form a solution. Preferred carriers include water, ethanol, other alkanols used in food processing, or mixtures thereof. The solution so formed is contacted with an orally consumable composition, and the carrier is removed from the orally consumable composition by evaporation, or otherwise, and the composition of the present application is deposited with the orally consumable composition. This process is particularly useful for adding composition of the present application to tea leaves, herbal plant leaves, and other sweeteners, particularly granular sucrose (table sugar).

In accordance with still another embodiment, a liquid filter material, suitable for use with a consumable composition, is prepared with composition of the present application. The term "liquid filter," as used herein, refers to a porous or semi-porous filter material used for preparation of an orally consumable composition such as a tea bag, a coffee filter or a filter disk. The term "filter disk" refers to a porous or semi-porous inactive article added to an orally consumable composition for the purposes of acting as a vehicle for the addition of a flavoring or sweetening composition to the orally consumable composition. A process for preparing a liquid filter comprising a filter material and composition of the present application is typically by admixing composition of the present application with a carrier to form a composition of the present application carrier mixture; contacting the composition of the present application-carrier mixture with the filter material; and removing the carrier from the filter material thereby depositing a composition of the present application residue on the filter material.

The composition of the present application can be used as a sweetener, a co-sweetener, or as a flavoring agent, in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g., spreads), preserved (e.g., meals-ready-to-eat rations), and synthesized (e.g., gels) products. Such candies, confections, desserts, and snacks can be in ready-to-eat, ready-to-cook, ready-to-mix, raw, or ingredient form.

The composition of the present application can be used, as a sweetener, a co-sweetener, or as a flavoring agent, in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g., toothpaste, mouthwash, rinses, floss, toothbrushes, other implements), personal care products (e.g., soaps, shampoos, rinses, lotions, balms, salves, ointments, paper goods, perfumes, lipstick, other cosmetics), professional dentistry products in which taste or smell is a factor (e.g., liquids, chewables, inhalables, injectables, salves, resins, rinses, pads, floss, implements), medical, veterinarian, and surgical products in which taste or smell is a factor (e.g., liquids, chewables, inhalables, injectables, salves, resins, rinses, pads, floss, implements), and pharmaceutical compounding fillers, syrups, capsules, gels, and coating products.

The composition of the present application can be used, as a flavoring agent, in consumer goods packaging materials and containers selected from the group comprising plastic film, thermoset and thermoplastic resin, gum, foil, paper, bottle, box, ink, paint, adhesive, and packaging coating products.

The composition of the present application can be used as a flavoring agent in goods selected from the group comprising sweeteners, co-sweeteners, coated sweetener sticks, frozen confection sticks, medicine spoons (human and veterinary uses), dental instruments, pre-sweetened disposable tableware and utensils, sachets, edible sachets, pot pourris, edible pot pourris, hotch potches, edible hotch potches, artificial flowers, edible artificial flowers, clothing, edible clothing, massage oils, and edible massage oils.

In some embodiments, the composition of the present application is used in an effective amount as a sweetener with improved solubility and/or sensory profiles.

In some embodiments, the composition of the present application is used an effective amount as a co-sweetener with improved solubility and/or sensory profiles.

In other embodiments, the composition of the present application is used an effective amount as a flavoring agent.

The term "iso-sweet" as used herein is intended to mean that the subject composition has a level of sweetness equal to that of sugar.

For use as a co-sweetener, the composition of the present application can be used in ways known in the art of sweeteners (e.g., steam, ethanol, or alkanol aerosolized Product vapor-deposited on a co-sweetener) to coat or permeate other solid sweeteners, such granular and powdered sugar and artificial sweeteners, to be mixed as a separate powder with such solid sweeteners, to be co-crystallized with other solid sweeteners, or to be suspended or dissolved in liquid sweeteners, such as corn syrup and honey. Commercially available spray dryers used in the ethanol purge and drying stage of the industrial embodiment can typically be configured to produce a particulate size of Product appropriate for an intended use.

In some embodiments, the composition of the present application is used as a flavoring agent that enhances or modifies the flavor of a consumable. In some embodiments, the composition of the present application, when used in an effective amount, modifies or enhances flavor characteristics that are sweet, fruity, floral, herbaceous, spicy, aromatic, pungent, "nut-like" (e.g., almond, pecan), "spicy" (e.g., cinnamon, clove, nutmeg, anise and wintergreen), "non-citrus fruit" flavor (e.g., strawberry, cherry, apple, grape, currant, tomato, gooseberry and blackberry), "citrus fruit" flavor (e.g., orange, lemon, lime and grapefruit), and other useful flavors, including coffee, cocoa, peppermint, spearmint, vanilla and maple.

In some embodiments, the composition of the present application is used in an amount effective to sweeten or to modify or enhance the taste, odor and/or texture of an orally consumable composition.

The terminology "amount effective" or "effective amount" means an amount that produces a sensory perception. The use of an excessive amount of a composition of the present application will produce sweetness that may not be desired for flavor modification or enhancement, just as too much sugar can be added to a foodstuff or beverage. The amount of composition of the present application employed can vary over a relatively wide range, depending upon the desired sensory effect to be achieved with the orally consumable composition and the nature of the initial composition.

The composition of the present application can be added to an orally consumable composition by admixing the composition of the present application with the consumable composition or admixing the composition of the present application with a component of the consumable composition.

5. Specific Embodiments

The following paragraphs enumerated consecutively from 1 through 94 provide for various aspects of the present application. In one embodiment, in a first paragraph (1), the present application provides:

1. A composition comprising one or more glycosylated steviol glycosides (GSGs) and/or one or more steviol glycosides (SGs).

2. The composition of Paragraph 1, comprising one or more SGs, each in a total amount of between 0.1-99.5 wt % of the composition.

3. The composition of Paragraph 1, wherein the one or more SGs are selected from Table A or Table B.

4. The composition of Paragraph 1, wherein the one or more SGs comprise 25-35 wt % Reb-A, 0.4-4 wt % Reb-B, 5-15 wt % Reb-C, 1-10 wt % Reb-D, 2-5 wt % Reb-F, 1-5 wt % Reb-K, and 20-40 wt % Stevioside.

5. The composition of Paragraph 3 or 4, wherein the one or more SGs comprise one or more members selected from the group consisting of 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG#4, 0.01-0.5 wt % Rel SG#5, 0.01-0.4 wt % Reb-M, 0.01-0.4 wt % Reb-N, 0.01-0.4 wt % Reb-E, 0.01-0.4 wt % Reb-F1, 0.01-0.4 wt % Reb-Y, and combinations thereof.

6. The composition of any one of Paragraphs 3-5, wherein the one or more SGs comprise at least 20, at least 21, at least 22, at least 23 or at least 24 members selected from the group consisting of 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG#4, 0.01-0.5 wt % Rel SG#5, 0.01-0.4 wt % Reb-M, 0.01-0.4 wt % Reb-N, 0.01-0.4 wt % Reb-E, 0.01-0.4 wt % Reb-F1, and 0.01-0.4 wt % Reb-Y.

7. The composition of Paragraph 1, wherein the one or more SGs comprise 45-55 wt % Reb-A, 20-40 wt % Stevioside, 2-6 wt % Reb-C, 0.5-3 wt % Reb-B, and 0.5-3 wt % Reb-D.

8. The composition of Paragraph 7, wherein the one or more SGs further comprise one or more members selected from the group consisting of: 0.1-3 wt % Related SG#5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG#3, 0.01-1 wt % Related SG#2, 0.01-1 wt % Reb-G, 0.01-1 wt % Reb-F, and 0.01-1 wt % Reb-W.

9. The composition of Paragraph 7, wherein the one or more SGs further comprise at least 12, at least 13, at least 14 or at least 15 members selected from the group consisting of: 0.1-3 wt % Related SG#5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG#3, 0.01-1 wt % Related SG#2, 0.01-1 wt % Reb-G, 0.01-1 wt % Reb-F, and 0.01-1 wt % Reb-W.

10. The composition of Paragraph 1, wherein the one or more SGs comprise 35-45 wt % Reb-A, 10-25 wt % Stevioside, 4-12 wt % Reb-B, 4-12 wt % Dulcoside A, 0.5-4 wt % Reb-C, and 0.1-4 wt % Reb-O.

11. The composition of Paragraph 8, wherein the one or more SGs further comprise one or more members selected from the group consisting of: 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG#3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, 0.01-1 wt % Dulcoside B, and combinations thereof.

12. The composition of Paragraph 8, wherein the one or more SGs further comprise at least 10, at least 11, at least 12 or at least 13 members selected from the group consisting of: 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG#3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, and 0.01-1 wt % Dulcoside B.

13. The composition of Paragraph 1, comprising one or more GSGs in a total amount of 0.1-99.5 wt % of the composition.

14. The composition of Paragraph 13, wherein the one or more GSGs are selected from Table B.

15. The composition of any one of Paragraphs 13 or 14, comprising a plurality of GSGs and a plurality of SGs, wherein the plurality of GSGs are present in a total amount of 10-80 wt % of the composition and wherein the plurality of SGs are present in a total amount of 1-40 wt % of the composition.

16. The composition of Paragraph 15, comprising 10-30 wt % SGs, 50-70 wt % GSGs, and 60-90 wt % total glycosides.

17. The composition of any one of Paragraphs 13-15, further comprising:

(a) one or more SG-3G group members selected from the group consisting of: 1-10 wt % GSG-3G-2, 2-6 wt % GSG-3G-3, 0.5-3 wt % GSG-3G-4, 0.2-5 wt % GSG-3G-7, and 1-6 wt % GSG-3G-8;

(b) one or more SG-4G group members selected from the group consisting of: 5-15 wt % GSG-4G-1, 1-2 wt % GSG-4G-2, 0.5-2.5 wt % GSG-4G-3, and 2-10 wt % GSG-4G-7;

(c) one or more SG-5G group members selected from the group consisting of: 0.1-0.5 wt % GSG-5G-1, 0.05-0.5 wt % GSG-5G-2, 0.5-3 wt % GSG-5G-3, 0.05-0.5 wt % GSG-5G-4, and 0.2-4 wt % GSG-5G-5;

(d) 0.1-2 wt % GSG-6G-3;

(e) one or more SG-3G1R group members selected from the group consisting of: 0.5-5.5 wt % GSG-3G1R-3a and 2-6 wt % GSG-3G1R-3b;

(f) one or more SG-4G1R group members selected from the group consisting of: 0.3-1.5 wt % GSG-4G1R-2, 0.05-1 wt % GSG-4G1R-3, 1-5 wt % GSG-4G1R-4, and 0.5-10 wt % GSG-4G1R-6;

(g) 2-6 wt % GSG-5G1R-4;

(h) one or more SG-6G1R group members selected from the group consisting of: 0.1-1 wt % GSG-6G1R-1a, 0.2-2 wt % GSG-6G1R-1b, and 0.3-2.5 wt % GSG-6G1R-2;

(i) one or more SG-3G1X group members selected from the group consisting of: 2-8 wt % GSG-3G1X-4 and 0.5-3 wt % GSG-3G1X-5;

(j) one or more SG-4G1X group members selected from the group consisting of: 0.5-3 wt % GSG-4G1X-1, 0.5-3 wt % GSG-4G1X-2, 1-6 wt % GSG-4G1X-3, and 0.2-2 wt % GSG-4G1X-4; and (k) 1-4 wt % GSG-5G1X-1, wherein the composition comprises one or more GSGs from each of at least 8, 9, 10 or 11 groups set forth in (a)-(k).

18. The composition of Paragraph 17, further comprising at least 5, 6, 7 or 8 unreacted steviol glycoside members selected from the group consisting of: 1-8 wt % Reb-A, 0.1-1.5 wt % Reb-B, 0.05-3 wt % Reb-C, 0.05-1 wt % Reb-D, 0.05-0.3 wt % Reb-F, 0.05-0.25 wt % Reb-K, 0.05-0.5 wt % Rubusoside, and 0.05-3 wt % Stevioside.

19. The composition of any one of Paragraphs 13-15, comprising:

(a) one or more SG-3G group members selected from the group consisting of: 2-10 wt % GSG-3G-2, 2-6 wt % GSG-3G-3, 0.5-2 wt % GSG-3G-4, 0.2-3 wt % GSG-3G-7, and 1-4 wt % GSG-3G-8;

(b) one or more SG-4G group members selected from the group consisting of: 5-12 wt % GSG-4G-1, 0.3-1.5 wt % GSG-4G-2, 0.5-1.5 wt % GSG-4G-3, and 2.5-6 wt % GSG-4G-7;

(c) one or more SG-5G group members selected from the group consisting of: 0.2-0.4 wt % GSG-5G-1, 0.05-0.4 wt % GSG-5G-2, 0.75-2 wt % GSG-5G-3, 0.05-0.3 wt % GSG-5G-4, and 0.4-4 wt % GSG-5G-5; (d) 0.1-2 wt % GSG-6G-3; (e) one or more SG-3G1R group members selected from the group consisting of: 0.2-3 wt % GSG-3G1R-3a and 1.5-5 wt % GSG-3G1R-3b; (f) one or more SG-4G1R group members selected from the group consisting of: 0.3-1 wt % GSG-4G1R-2, 0.05-0.75 wt % GSG-4G1R-3, 1-4 wt % GSG-4G1R-4, and 0.5-6.5 wt % GSG-4G1R-6; (g) 2.5-5 wt % GSG-5G1R-4; (h) one or more SG-6G1R group members selected from the group consisting of: 0.1-1 wt % GSG-6G1R-1a, 0.2-2 wt % GSG-6G1R-1b, and 0.3-2.5 wt % GSG-6G1R-2; (i) one or more SG-3G1X group members selected from the group consisting of: 2-5 wt % GSG-3G1X-4 and 0.5-2 wt % GSG-3G1X-5; (j) one or more SG-4G1X group members selected from the group consisting of: 0.5-2 wt % GSG-4G1X-1, 0.5-2 wt % GSG-4G1X-2, 1.5-5 wt % GSG-4G1X-3, and 0.2-1.5 wt % GSG-4G1X-4; and (k) 1-2.5 wt % GSG-5G1X-1, wherein the composition comprises one or more GSGs from each of at least 8, 9, 10 or 11 groups set forth in (a)-(k).

20. The composition of Paragraph 19, further comprising at least 4, 5, 6 or 7 unreacted steviol glycoside members selected from the group consisting of: 1.5-12.5 wt % Reb-A, 0.2-1.5 wt % Reb-B, 0.5-4 wt % Reb-C, 0.3-1 wt % Reb-D, 0.1-2.5 wt % Reb-F, 0.05-2.5 wt % Rubusoside, and 1.5-6.5 wt % Stevioside.

21. The composition of any one of Paragraphs 13-15, comprising:

(a) one or more SG-3G group members selected from the group consisting of: 3-6 wt % GSG-3G-2, 1.5-3.5 wt % GSG-3G-3, 1-3 wt % GSG-3G-4, 2-5 wt % GSG-3G-7, and 2-5 wt % GSG-3G-8;

(b) one or more SG-4G group members selected from the group consisting of: 6-10 wt % GSG-4G-1, 0.5-1.5 wt % GSG-4G-2, 1-3 wt % GSG-4G3, and 3-6 wt % GSG-4G-7;

(c) one or more SG-5G group members selected from the group consisting of: 0.2-0.4 wt % GSG-5G-1, 0.05-0.3 wt % GSG-5G-2, 1-2 wt % GSG-5G-3, 0.08-0.2 wt % GSG-5G-4, and 1.5-4.5 wt % GSG-5G-5; (d) 0.5-1.5 wt % GSG-6G-3; (e) one or more SG-3G1R group members selected from the group consisting of: 2-5 wt % GSG-3G1R-3a and 2-4 wt % GSG-3G1R-3b; (f) one or more SG-4G1R group members selected from the group consisting of: 0.3-1 wt % GSG-4G1R-2, 0.2-0.6 wt % GSG-4G1R-3, 1.5-4 wt % GSG-4G1R-4, and 3-10 wt % GSG-4G1R-6; (g) 2.5-5 wt % GSG-5G1R-4; (h) one or more SG-6G1R group members selected from the group consisting of: 0.5-1.5 wt % GSG-6G1R-1a, 0.5-1.5 wt % GSG-6G1R-1b, and 0.5-2 wt % GSG-6G1R-2; (i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.3-1.5 wt % GSG-4G1X-1, 1-3.5 wt % GSG-4G1X-2, 1.5-4 wt % GSG-4G1X-3, and 0.5-2 wt % GSG-4G1X-4; and (k) 1.5-3 wt % GSG-5G1X-1, wherein the composition comprises one or more GSGs from each of at least 8, 9, 10 or 11 groups set forth in (a)-(k).

22. The composition of Paragraph 21, further comprising at least at least 4, 5, 6 or 7 unreacted steviol glycosides selected from the group consisting of: 0.5-2.5 wt % Reb-A, 0.2-1 wt % Reb-B, 0.2-0.8 wt % Reb-C, 0.2-0.6 wt % Reb-D, 0.05-0.25 wt % Reb-F, 0.05-0.6 wt % Rubusoside, and 0.05-2 wt % Stevioside.

23. The composition of any one of Paragraphs 13-15, comprising:

(a) one or more SG-3G group members selected from the group consisting of: 5-15 wt % GSG-3G-2, 1-6 wt % GSG-3G-3, 0.5-3.5 wt % GSG-3G-4, 0.5-3.5 wt % GSG-3G-7, and 1.5-6 wt % GSG-3G-8; (b) one or more SG-4G group members selected from the group consisting of: 10-18 wt % GSG-4G-1, 0.5-3.5 wt % GSG-4G-2, 0.5-3.5 wt % GSG-4G-3, and 2-6 wt % GSG-4G-7;

(c) one or more SG-5G group members selected from the group consisting of: 0.15-1.5 wt % GSG-5G-1, 0.05-1 wt % GSG-5G-2, 0.5-3.5 wt % GSG-5G-3, 0.05-0.35 wt % GSG-5G-4, and 0.1-1.5 wt % GSG-5G-5; (d) 0.3-2.5 wt % GSG-6G-3; (e) one or more SG-3G1R group members selected from the group consisting of: 0.5-2 wt % GSG-3G1R-3a and 3-5 wt % GSG-3G1R-3b;

(f) one or more SG-4G1R group members selected from the group consisting of: 0.25-2.5 wt % GSG-4G1R-2, 0.05-1 wt % GSG-4G1R-3, 1-4 wt % GSG-4G1R-4, and 0.3-3 wt % GSG-4G1R-6;

(g) 1.5-7.5 wt % GSG-5G1R-4; (h) one or more SG-6G1R group members selected from the group consisting of: 0.1-2 wt % GSG-6G1R-1a, 0.1-2 wt % GSG-6G1R-1b, and 0.1-2 wt % GSG-6G1R-2;

(i) one or more SG-3G1X group members selected from the group consisting of: 2-5 wt % GSG-3G1X-4 and 1-3 wt % GSG-3G1X-5; (j) one or more SG-4G1X group members selected from the group consisting of: 0.5-5 wt % GSG-4G1X-1, 0.5-2.5 wt % GSG-4G1X-2, 1.5-6 wt % GSG-4G1X-3, and 0.5-2.5 wt % GSG-4G1X-4; and (k) 0.5-4.5 wt % GSG-5G1X-1, wherein the composition comprises one or more GSGs from each of at least 8, 9, 10 or 11 groups set forth in (a)-(k).

24. The composition of Paragraph 23, further comprising at least 4, 5, 6 or 7 unreacted steviol glycoside members selected from the group consisting of: 1-6 wt % Reb-A, 0.2-2 wt % Reb-B, 0.5-3.5 wt % Reb-C, 0.1-1.5 wt % Reb-D, 0.05-2 wt % Reb-F, 0.05-1 wt % Rubusoside, and 0.05-3.5 wt % Stevioside.

25. The composition of Paragraph 23, further comprising at least 4, 5, 6 or 7 unreacted steviol glycoside members selected from the group consisting of: 3-10 wt % Reb-A, 0.05-2 wt % Reb-C, 0.05-2 wt % Reb-D, 0.05-1.5 wt % Reb-G, 0.05-0.5 wt % Reb-O, 0.05-0.5 wt % Rubusoside, and 0.05-4 wt % Stevioside.

26. The composition of any one of Paragraphs 13-15, comprising:

(a) one or more SG-3G group members selected from the group consisting of: 1-5 wt % GSG-3G-2, 1-5 wt % GSG-3G-3, 0.5-3 wt % GSG-3G-4, 0.5-4 wt % GSG-3G-7, and 2-6 wt % GSG-3G-8;

(b) one or more SG-4G group members selected from the group consisting of: 5-12 wt % GSG-4G-1, 0.2-3 wt % GSG-4G-2, 0.2-3 wt % GSG-4G3, and 2-6 wt % GSG-4G-7;

(c) one or more SG-5G group members selected from the group consisting of: 0.05-1.5 wt % GSG-5G-1, 0.05-1.5 wt % GSG-5G-2, 0.1-3 wt % GSG-5G-3, 0.01-0.4 wt % GSG-5G-4, and 0.5-4 wt % GSG-5G-5; (d) 0.1-2 wt % GSG-6G-3; (e) one or more SG-3G1R group members selected from the group consisting of: 1-3 wt % GSG-3G1R-3a and 1-3 wt % GSG-3G1R-3b; (f) one or more SG-4G1R group members selected from the group consisting of: 0.1-2 wt % GSG-4G1R-2, 0.05-1 wt % GSG-4G1R-3, 1-3 wt % GSG-4G1R-4, and 5-10 wt % GSG-4G1R-6; (g) 2-6 wt % GSG-5G1R-4;

(h) one or more SG-6G1R group members selected from the group consisting of: 0.1-1 wt % GSG-6G1R-1a, 0.1-1 wt % GSG-6G1R-1b, and 0.2-2 wt % GSG-6G1R-2; (i) one or more SG-3G1X group members selected from the group consisting of: 1-4 wt % GSG-3G1X-4 and 0.5-2 wt % GSG-3G1X-5; (j) one or more SG-4G1X group members selected from the group consisting of: 0.2-1.5 wt % GSG-4G1X-1, 0.5-2.5 wt % GSG-4G1X-2, 1-3 wt % GSG-4G1X-3, and 0.3-2 wt % GSG-4G1X-4; and (k) 1-4 wt % GSG-5G1X-1, wherein the composition comprises one or more GSGs from each of at least 8, 9, 10 or 11 groups set forth in (a)-(k).

27. The composition of Paragraph 26, further comprising at least 4, 5, 6 or 7 unreacted steviol glycoside members selected from the group consisting of: 6-12 wt % Reb-A, 0.1-1.5 wt % Reb-B, 0.5-3.5 wt % Reb-C, 0.1-1.5 wt % Reb-D, 0.8-3 wt % Reb-F, 0.5-2.5 wt % Rubusoside, and 2-6 wt % Stevioside.

28. The composition of any one of Paragraphs 13-15, comprising:

(a) one or more SG-3G group members selected from the group consisting of: 1-4 wt % GSG-3G-2, 1-4 wt % GSG-3G-3, 0.5-3 wt % GSG-3G-4, 0.5-3 wt % GSG-3G-7, and 0.5-3.5 wt % GSG-3G-8;

(b) one or more SG-4G group members selected from the group consisting of: 3-8 wt % GSG-4G-1, 0.1-2 wt % GSG-4G-2, 0.1-2 wt % GSG-4G3, and 1-4 wt % GSG-4G-7;

(c) one or more SG-5G group members selected from the group consisting of: 0.05-1 wt % GSG-5G-1, 0.05-1 wt % GSG-5G-2, 0.3-3 wt % GSG-5G-3, 0.01-0.4 wt % GSG-5G-4, and 0.1-2 wt % GSG-5G-5; (d) 0.1-2 wt % GSG-6G-3; (e) one or more SG-3G1R group members selected from the group consisting of: 0.2-2 wt % GSG-3G1R-3a and 1-3 wt % GSG-3G1R-3b; (f) one or more SG-4G1R group members selected from the group consisting of: 0.1-2 wt % GSG-4G1R-2, 0.05-1 wt % GSG-4G1R-3, 1-3 wt % GSG-4G1R-4, and 1-3 wt % GSG-4G1R-6; (g) 2-6 wt % GSG-5G1R-4;

(h) one or more SG-6G1R group members selected from the group consisting of: 0.05-1 wt % GSG-6G1R-1a, 0.05-1 wt % GSG-6G1R-1b, and 0.1-1.2 wt % GSG-6G1R-2; (i) one or more SG-3G1X group members selected from the group consisting of: 1-4 wt % GSG-3G1X-4 and 0.5-2 wt % GSG-3G1X-5; (j) one or more SG-4G1X group members selected from the group consisting of: 0.2-1.5 wt % GSG-4G1X-1, 0.5-2.5 wt % GSG-4G1X-2, 0.5-2.5 wt % GSG-4G1X-3, and 0.2-2 wt % GSG-4G1X-4; and (k) 1-3 wt % GSG-5G1X-1, wherein the composition comprises one or more GSGs from each of at least 8, 9, 10 or 11 groups set forth in (a)-(k).

29. The composition of Paragraph 28, further comprising at least 4, 5, 6 or 7 unreacted steviol glycosides selected from the group consisting of: 15-25 wt % Reb-A, 0.05-1 wt % Reb-B, 1-3 wt % Reb-C, 0.1-1.5 wt % Reb-D, 0.8-3 wt % Reb-F, 0.3-2 wt % Rubusoside, and 6-12 wt % Stevioside.

30. The composition of any one of Paragraphs 1-29, further comprising thaumatin.

31. The composition of any one of Paragraphs 1-29, further comprising a dextrin.

32. The composition of Paragraph 30, wherein the dextrin is a cyclodextrin.

33. The composition of any one of Paragraphs 1-29, further comprising a salt.

Non-SG Sweeteners

34. The composition of any one of Paragraphs 1-33, further comprising one or more non-SG sweeteners.

35. The composition of Paragraph 34, wherein the one or more non-SG sweeteners comprise a non-steviol sugar or non-steviol burned sugar.

36. The composition of Paragraph 34 or 35, wherein the one or more non-SG sweeteners comprise one or more sweeteners selected from the group consisting of cyclamates and salts thereof, sucralose, aspartame, saccharin and salts thereof, xylitol, acesulfame-K, neotame, N—[N-[3-(3-hydroxy-4-methoxyphenyl) propyl]-alpha-aspartyl]-L-phenylalanine 1-methyl ester (hereinafter abbreviated as "ANS9801"), glycyrrhizin, thaumatin, monellin, and combinations thereof.

37. The composition of Paragraph 34 or 35, wherein the non-SG sweeteners comprise one or more carbohydrate sweeteners are selected from the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

38. The composition of Paragraph 34, wherein the non-SG sweeteners comprise one or more carbohydrate sweeteners and one or more non-carbohydrate sweeteners.

39. The composition of Paragraph 34, wherein the non-SG sweeteners comprise one or more proteinaceous sweeteners.

40. The composition of Paragraph 39, wherein the one or more proteinaceous sweeteners comprise thaumatin.

Salts

41. The composition of any one of Paragraphs 1-40, further comprising one or more salts.

42. The composition of Paragraph 41, wherein the one or more salts comprise NaCl and/or KCl.

43. The composition of Paragraph 41, wherein the one or more salts comprise one or more SG salts.

44. The composition of Paragraph 43, wherein the one or more SG salts comprise a salt of STB.

45. The composition Paragraph 43, wherein the one or more SG salts comprise a sodium salt of RB.

Consumables

46. An orally consumable composition comprising the SG composition of any one of Paragraphs 1-45.

47. The orally consumable composition of Paragraph 46, wherein the orally consumable composition is a sweetener.

48. The orally consumable composition of Paragraph 46, wherein the orally consumable composition is a flavoring agent.

Method of Making

49. A method for the preparation of a GSG composition, comprising the steps of: i) dissolving a glucose-donor material in water to form a liquefied glucose-donor material; ii) adding a SG composition to liquefied glucose-donor material to obtain a reaction mixture; iii) adding an effective amount of an enzyme to the reaction mixture, wherein the enzyme catalyzes the transfer of glucose moieties from the glucose-donor molecule to SGs in the SG composition, to the mixture and incubating at a desired temperature for a desired length of reaction time to glycosylate SGs of the SG composition with glucose moieties present in the glucose-donor material; iv) inactivating the enzyme; v) removing the enzyme from the reaction mixture; and vi) drying the resulting solution of GSGs, residual SGs and dextrins.

50. The method of Paragraph 49, wherein the glucose-donor material is dextrin.

51. The method of Paragraph 50, wherein the dextrin is tapioca dextrin.

52. The method of Paragraph 50, wherein the dextrin is a cyclodextrin.

53. The method of Paragraph 50, wherein the dextrin is maltodextrin.

54. The method of any one of Paragraphs 49-53, wherein the water is reverse osmosis purified water.

55. The method of any one of Paragraphs 49-54, wherein the SG composition is a *Stevia* extract.

56. The method of any one of Paragraphs 49-56, wherein the total SG content of the SG composition is between 1% and 99%, between 10% and 90%, or between 15%-60%.

57. The method of any one of Paragraphs 49-56, wherein the % wt ratio of glucose-donor molecule to SG composition is between 10:90 and 90:10, between 20:80 and 80:20, between 30:70 and 70:30, or between 40:60 and 60:40.

58. The method of any one of Paragraphs 49-57, wherein the enzyme is CGTase.

59. The method of any one of Paragraphs 49-58, wherein the enzyme comprises is inactivated by heating the reaction mixture to 90° C. or above for 10 minutes or longer.

60. The method of any one of Paragraphs 49-59, further comprising decoloring the reaction mixture following step v).

61. The method of any one of Paragraphs 49-60, wherein the drying is by spray drying.

Method of Using

62. A method for increasing the sweetness of an orally consumable composition, comprising the step of: adding an effective amount of one or more SGs and/or one or more GSGs in any one of Paragraphs 1-48 to the orally consumable composition.

63. A method for increasing a taste or flavor of an orally consumable composition, comprising the step of: adding an effective amount of one or more SGs and/or one or more GSGs in any one of Paragraphs 1-48 to the orally consumable composition.

64. The composition of any of the above numbered paragraphs, wherein the one or more SGs comprise at least one SG selected from the group consisting of Related SG#1, SG-4, iso-steviolbioside, Related SG#3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, SG-Unk4, SG-Unk5, rebaudioside I3, SG-Unk6, rebaudioside Q, rebaudioside Q2, rebaudioside Q3, rebaudioside I2, rebaudioside T1, Related SG#4, rebaudioside V, rebaudioside V2, rebaudioside Y, 15?-OH-rebaudioside M, rebaudioside O2, and combinations thereof.

65. The composition of any of the above numbered paragraphs, wherein the one or more SGs are present in a composition selected from the group consisting of: RA20, RA40, RA50, RA60, RA80, RA 90, RA95, RA97, RA98, RA99, RA99.5, RB8, RB10, RB15, RC15, RD6 and combinations thereof.

66. The composition of any of the above numbered paragraphs, wherein the one or more SGs conform to at least one SG-group selected from the group consisting of SG-1G, SG-2G, SG-3G, SG-4G, SG-5G, SG-6G, SG-1G1R, SG-2G1R, SG-3G1R, SG-4G1R, SG-5G1R, SG-6G1R, SG-1G1X, SG-2G1X, SG-3G1X, SG-4G1X, SG-5G1X, and combinations thereof.

67. The composition of any of the above numbered paragraphs, wherein the one or more SGs comprise at least one SG having a molecular weight less than equal to or less than 965 daltons, or the one or more SGs comprise at least one SG having a molecular weight less than equal to or less than 804 daltons, or the one or more SGs comprise at least one SG having a molecular weight greater than 804 daltons, or the one or more SGs comprise at least one SG having a molecular weight greater than 965 daltons, or the one or more SGs comprise at least one SG having a molecular weight equal to or greater than 1127 daltons, or the one or more SGs comprise at least one SG having a molecular weight equal to or greater than 1259 daltons.

68. The composition of any of the above numbered paragraphs, wherein the one or more GSGs are further glycosylation products from one or more SGs in Table A.

69. The composition of Paragraph 68, wherein the one or more GSGs are further glycosylation products from one or more SGs selected from the group consisting of: Related SG#1, SG-4, iso-steviolbioside, Related SG#3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, SG-Unk4, SG-Unk5, rebaudioside I3, SG-Unk6, rebaudioside Q, rebaudioside Q2, rebaudioside Q3, rebaudioside I2, rebaudioside T1, Related SG#4, rebaudioside V, rebaudioside V2, rebaudioside Y, 15?-OH-rebaudioside M, rebaudioside O2, and combinations thereof.

70. The composition of Paragraph 68, wherein the one or more GSGs comprise at least one GSG selected from the group consisting of: GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-4G-1, GSG-4G-2, GSG-5G-1, and combinations thereof.

71. The composition of Paragraph 68, wherein the one or more GSGs comprise at least one GSG selected from the group consisting of: GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, and combinations thereof.

72. The composition of Paragraphs 68-69, wherein the one or more GSGs comprise one or more rhamnose moieties, one or more deoxyhexose moieties, or combination thereof.

73. The composition of Paragraph 72, wherein the one or more GSGs are selected from the group consisting of: GSG-1G1R-1, GSG-1G1R-2, GSG-2G1R-1, GSG-1G1R-3, GSG-2G1R-2, GSG-3G1R-1, GSG-1G1R-4, GSG-2G1R-3, GSG-3G1R-2, GSG-4G1R-1, GSG-5G1R-1, GSG-2G1R-4, GSG-3G1R-3a, GSG-3G1R-3b, GSG-4G1R-2, GSG-5G1R-1, and combinations thereof.

74. The composition of Paragraph 72, wherein the one or more GSGs are selected from the group consisting of: GSG-3G1R-3a, GSG-3G1R-3b, GSG-4G1R-2, GSG-4G1R-3, GSG-4G1R-4, GSG-4G1R-6, GSG-5G1R-4, GSG-6G1R-1a, GSG-6G1R-1b, GSG-6G1R-2, and combinations thereof.

75. The composition of Paragraphs 68-69, wherein the one or more GSGs comprise one or more xylose moieties, arabinose moieties, or combination thereof.

76. The composition of Paragraph 75, wherein the one or more GSGs are selected from the group consisting of: GSG-1G1X-1, GSG-1G1X-2, GSG-1G1X-3, GSG-1G1X-4, GSG-2G1X-1, GSG-2G1X-2, GSG-2G1X-3, GSG-3G1X-1, GSG-3G1X-2, GSG-4G1X-1, and combinations thereof.

77. The composition of Paragraph 75, wherein the one or more GSGs are selected from the group consisting of: GSG-3G1X-4, GSG-3G1X-5, GSG-4G1X-1, GSG-4G1X-2, GSG-4G1X-3, GSG-4G1X-4, and combinations thereof.

78. The composition of any one of Paragraphs 68-77, wherein at least one of the one or more GSGs has a molecular weight less than equal to or less than 1128 daltons, or at least one of the one or more GSGs has a molecular weight less than equal to or less than 966 daltons, or at least one of the one or more GSGs has a molecular weight less than equal to or less than 804 daltons, or at least one of the one or more GSGs has a molecular weight greater than 1128 daltons, or at least one of the one or more GSGs has a molecular weight equal to or greater than 1260 daltons, or at least one of the one or more GSGs has a molecular weight equal to or greater than 1422 daltons, or at least one of the one or more GSGs has a molecular weight equal to or greater than 1746 daltons, or at least one of the one or more GSGs has a molecular weight equal to or greater than 1922 daltons.

79. The composition of any one of the above numbered paragraphs, wherein the one or more GSGs comprise are 50-70% of the composition by weight, or wherein the one or more GSGs comprise 55-65% of the composition by weight, or the one or more SGs comprise less than 25% of the composition by weight.

80. An orally consumable composition comprising the GSG composition of any one of the above numbered paragraphs.

81. An orally consumable composition comprising the SG composition of any one of the above numbered paragraphs and the GSG composition of any one of the above numbered paragraphs.

82. The method for preparation of a GSG composition as recited in any of the above numbered paragraphs, wherein the % wt ratio of glucose-donor molecule to the SGs is between 10:90 and 90:10, between 20:80 and 80:20, between 30:70 and 70:30, or between 40:60 and 60:40.

83. The orally consumable composition comprising the SG composition of any of the above numbered paragraphs, wherein, the concentration of SG composition in the orally consumable composition is from about 50 ppm to about 900 ppm.

84. The composition of any of the above numbered paragraphs, wherein the non-steviol sugar or non-steviol burned sugar comprises 0.001% to about 25% of the composition by weight.

85. The composition of any of the above numbered paragraphs, wherein, the thaumatin comprises 0.01-10% of the composition by weight.

86. The composition of any of the above numbered paragraphs, wherein, the SG is RA20.

87. The composition of any of the above numbered paragraphs, wherein the GSG is GSG-RA20.

88. The composition of any of the above numbered paragraphs, further comprising 0.1-2 wt % stev-bios, 0.05-1 wt % Reb-G, 0.5-2 wt % Reb-E, 0.2-2 wt % Reb-M, 0.1-2 wt % Dulcoside A, 0.3-2 wt % Dulcoside B, 0.2-1 wt % Reb-S, 0.05-0.5 wt % Reb-O, and 0.2-1.5 wt % Reb-R.

89. The composition of any of the above numbered paragraphs, further comprising unreacted steviol glycosides selected from the group consisting of: 0.2-0.5 wt % Stev-Bios, 0.05-0.5 wt % Reb-G, 0.5-1.5 wt % Reb-E, 0.2-1 wt % Reb-M, 0.2-1 wt % Dulcoside A, 0.5-1.5 wt % Dulcoside B, 0.2-1 wt % Reb-S, 0.05-0.1 wt % Reb-O and 0.2-1 wt % Reb-R.

90. The composition of any of the above numbered paragraphs, further comprising unreacted steviol glycoside members selected from the group consisting of: 0.1-2 wt %

Stev-Bios, 0.2-1 wt % Reb-G, 0.5-2 wt % Reb-E, 0.1-0.5 wt % Reb-M, 0.1-0.5 wt % Dulcoside A, 1-2 wt % Dulcoside B, 0.5-3 wt % Reb-S, 0.1-0.5 wt % Reb-O and 0.1-1 wt % Reb-R.

91. The composition of any of the above numbered paragraphs, wherein the GSG-6G1R-1 comprises 0.2-0.8 wt % GSG-6G1R-1a and 0.3-1.7 wt % GSG-6G1R-1b.

92. The composition of any of the above numbered paragraphs, further comprising unreacted steviol glycoside members selected from the group consisting of: 0.1-05 wt % Stev-Bios, 0.2-1 wt % Reb-G, 0.5-2 wt % Reb-E, 0.05-0.5 wt % Reb-M, 0.1-2 wt % Dulcoside A, 0.5-2 wt % Dulcoside B, 0.1-1 wt % Reb-S, 0.1-0.5 wt % Reb-O and 0.2-1.5 wt % Reb-R.

93. The composition of any of the above numbered paragraphs, comprising: (a) one or more SG-3G group members selected from the group consisting of: 1-10 wt % GSG-3G-2, 1-6 wt % GSG-3G-3, 0.5-3.5 wt % GSG-3G-4, 0.2-5 wt % GSG-3G-7, and 0.5-6 wt % GSG-3G-8; (b) one or more SG-4G group members selected from the group consisting of: 3-15 wt % GSG-4G-1, 0.1-3.5 wt % GSG-4G-2, 0.1-3.5 wt % GSG-4G-3, and 1-10 wt % GSG-4G-7; (c) one or more SG-5G group members selected from the group consisting of: 0.05-1.5 wt % GSG-5G-1, 0.05-1.5 wt % GSG-5G-2, 0.1-3.5 wt % GSG-5G-3, 0.01-0.5 wt % GSG-5G-4, and 0.1-4 wt % GSG-5G-5; (d) 0.1-2.5 wt % GSG-6G-3; (e) one or more SG-3G-1R group members selected from the group consisting of: 0.2-5.5 wt % GSG-3G1R-3a and 1-6 wt % GSG-3G1R-3b; (f) one or more SG-4G1R group members selected from the group consisting of: 0.1-2.5 wt % GSG-4G1R-2, 0.05-1 wt % GSG-4G1R-3, 1-5 wt % GSG-4G1R-4, and 0.3-10 wt % GSG-4G1R-6; (g) 1.5-7.5 wt % GSG-5G1R-4; (h) one or more SG-6G1R group members selected from the group consisting of: 0.05-2.5 wt % GSG-6G1R-1a, 0.0-2 wt % GSG-6G1R-1b, and 0.1-3 wt % GSG-6G1R-2; (i) one or more SG-3G1X group members selected from the group consisting of: 1-8 wt % GSG-3G1X-4 and 0.5-3 wt % GSG-3G1X-5; (j) one or more SG-4G1X group members selected from the group consisting of: 0.2-5 wt % GSG-4G1X-1, 0.5-3 wt % GSG-4G1X-2, 0.5-6 wt % GSG-4G1X-3, and 0.2-2.5 wt % GSG-4G1X-4; and (k) 0.5-4.5 wt % GSG-5G1X-1, wherein the composition comprises one or more GSGs from each of at least 8, 9, 10 or 11 groups set forth in (a)-(k).

94. The composition of any of the above numbered paragraphs, further comprising at least 5, 6, 7 or 8 unreacted steviol glycoside members selected from the group consisting of: 1-15 wt % Reb-A, 0.05-3 wt % Reb-B, 0.05-4 wt % Reb-C, 0.05-1.5 wt % Reb-D, 0.05-3 wt % Reb-F, 0.05-2.5 wt % Rubusoside, and 0.05-12 wt % Stevioside.

While multiple embodiments are disclosed, still other embodiments of the present application will become apparent to those skilled in the art from the following detailed description. As will be apparent, the application is capable of modifications in various obvious aspects, all without departing from the spirit and scope of the present application. Accordingly, the detailed descriptions are to be regarded as illustrative in nature and not restrictive. The aspects and embodiments of the present application will be further described with reference to the following non-limiting Examples. It will be apparent to those skilled in the art that many changes can be made in the embodiments described without departing from the scope of the present application. Thus the scope of the present application should not be limited to the embodiments described in this application, but only by embodiments described by the language of the claims and the equivalents of those embodiments. Unless otherwise indicated, all percentages are by weight.

EXAMPLES

Analysis of compositions comprising SGs and/or GSGs

TABLE 1

| Raw materials | RA | RD | RB | RC | STV | Total GSGs |
|---|---|---|---|---|---|---|
| RA97 | 98% | | | | | |
| RA/RD | 93.96% | 4.54% | | | | |
| RA50 | 57.10% | | | | 30.30% | |
| RA95 | 95.10% | | | | | |
| RA98 | 98.40% | | | | 0.40% | |
| RA99.5 | 99.60% | | | | | |
| RA75/RB15 | 77.46% | | 16.45% | | 0.45% | |
| RA80/RB10/RD6 | 77.00% | 6.00% | 11.00% | | | |
| GSG-RA50 | 2.39% | | | | 1.39% | 89.35% |
| GSG-RA95 | 6.00% | | | | | 90.60% |
| GSG-RA60 | 3.22% | | | | 1.07% | 89.64% |
| GSG-RA70 | 3.98% | | | | 0.78% | 89.90% |
| GSG-RA80 | 4.23% | | | | 0.43% | 89.00% |
| GSG-RA90 | 5.42% | | | | 0.14% | 90.07% |
| GSG-RA20 | 3.70% | | | | 2.86% | 74.25% |
| GSG(RA50 + RC5) | | | | | | 77.30% |
| RA50/RC5 | 55.01% | | 0.50% | 5.65% | | |
| GSG(RA30 + RC15) | | | | | | 75.90% |
| RA30/RC15 | 29.80% | | 4.60% | 17.62% | | |
| GSG(RA40 + RB8) | | | | | | 80.20% |
| RA40/RB8 | 41.57% | | 7.65% | 6.49% | | |

GSG-RA20, GSG-RA30, GSG-RA40, GSG-RA50, GSG-RA60, GSG-RA70, GSG-RA80, GSG-RA90, GSG-RA95, GSG-(RA50+RC5), GSG-(RA30+RC15), GSG-(RA40+RB8) were used in the follow examples. GSG-RA20, GSG-RA30, GSG-RA40, GSG-RA50, GSG-RA60, GSG-RA70, GSG-RA80, GSG-RA90, and GSG-RA95 uses RA with ST as starting material. Therefore, it is assumed that GSG-RA20, GSG-RA30, GSG-RA40, GSG-RA50 GSG-RA60, GSG-RA70, GSG-RA80, GSG-RA90, and GSG-RA95 contains ST, ST-G1, ST-G2, ST-G3, ST-G4, ST-G5, RA, RA-G1, RA-G2, RA-G3, RA-G4, and RA-G5 as the main components.

GSG-RA50 used in the following examples can be prepared as follows: 120 g Tapioca dextrin was dissolved in 2 L water; 100 g *Stevia* extract (RA 53.1%, total SGs 80.6%) was added to liquefied dextrin to obtain a mixture; the dextrin to *Stevia* extract ratio was 55:45; 5 ml CGTase enzyme was added to the mixture and incubated at 60° C. for 48 hours to glycosylate SGs with glucose moieties in Tapioca dextrin, after a desired ratio of GSG- and residual SG contents has been achieved, the reaction mixture being heated to 95° C. for 30 min to inactivate the CGTase, which was then removed by filtration.

The resulting solution of GSG, residual SGs and dextrin is decolored and spray dried, thereby resulting in 230 g white powder GSG-RA50.

GSG-RA95, GSG-RA60, GSG-RA70, GSG-RA80, GSG-RA90, GSG-RA20, GSG-(RA50+RC5), GSG-(RA30+RC15), GSG-(RA40+RB8) can be prepared respectively by the method as the same as that of GSG-RA50.

Evaluation of Taste Profile:

1. The components where mixed and then dissolved in aqueous citric acid (pH 3.8) with ultrasound at room temperature and left to sit for 30 min.
2. Panel: 6 persons
3. Method: For the sweetness evaluation of each sample, the sample was tested in pairwise with several sucrose solutions of given sweetness. The sweetness of each sample was compared with those of the sucrose solutions, and the sweetness was evaluated and recorded according to the judgment that the sweetness of the sample was similar to a specific sugar solution or between specific sugar solutions. The results were recorded as the mean value of the results provided by the panel.

For evaluation of taste profile, the samples were tested and were scored 0-5 according to the increasing sugar like, bitterness, aftertaste and lingering taste profiles. The results were recorded as the mean value of the results provided by the panel.

Example 1. Evaluating the Taste Profiles of GSG-RA50 and RA97 Compositions in Order to Find Optimized Ratios with Preferred Synergistic Taste Effects'

Conditions: The samples were tested in aqueous solution of citric acid at pH 3.8. The control sample was RA97 at 350 ppm, corresponding to 8% SE.

TABLE 2

| Samples | | | |
|---|---|---|---|
| Sample No. | RA97 | GSG-RA50 | total GSG |
| 1 | 350 ppm | — | |
| 2-1 | 300 ppm | 50 ppm | 12.76% |
| 2-2 | 300 ppm | 100 ppm | 22.34% |
| 2-3 | 300 ppm | 150 ppm | 29.78% |
| 3-1 | 250 ppm | 100 ppm | 25.53% |
| 3-2 | 250 ppm | 150 ppm | 33.51% |
| 3-3 | 250 ppm | 200 ppm | 39.71% |
| 4-1 | 200 ppm | 150 ppm | 38.29% |
| 4-2 | 200 ppm | 200 ppm | 44.68% |
| 4-3 | 200 ppm | 250 ppm | 49.64% |
| 5-1 | 150 ppm | 200 ppm | 51.06% |
| 5-2 | 150 ppm | 250 ppm | 55.84% |
| 5-3 | 150 ppm | 300 ppm | 59.57% |
| 6-1 | 100 ppm | 250 ppm | 63.82% |
| 6-2 | 100 ppm | 300 ppm | 67.01% |
| 6-3 | 100 ppm | 350 ppm | 69.49% |

TABLE 3

| Results | | | | | | | | |
|---|---|---|---|---|---|---|---|---|
| Sample No. | RA97 | GSG-RA50 | Total solid content | SE | Sugar like | Bitterness | After-taste | Lingering |
| 1 | 350 ppm | — | 350 ppm | 8%* | 3 | 2 | 3 | 4 |
| 2-1 | 300 ppm | 50 ppm | 350 ppm | 7% | 3.5 | 0.5 | 2.5 | 3 |
| 2-2 | 300 ppm | 100 ppm | 400 ppm | 8% | 3.5 | 0 | 2 | 2 |
| 2-3 | 300 ppm | 150 ppm | 450 ppm | 8.5% | 3.5 | 0 | 2 | 2 |
| 3-1 | 250 ppm | 100 ppm | 350 ppm | 8% | 4 | 0 | 0.5 | 3 |
| 3-2 | 250 ppm | 150 ppm | 400 ppm | 8.2% | 4 | 0 | 0.5 | 2 |
| 3-3 | 250 ppm | 200 ppm | 450 ppm | 8.5% | 4.5 | 0 | 0 | 2 |
| 4-1 | 200 ppm | 150 ppm | 350 ppm | 7.8% | 4.5 | 0 | 0 | 2 |
| 4-2 | 200 ppm | 200 ppm | 400 ppm | 8% | 4 | 0 | 0.5 | 2 |
| 4-3 | 200 ppm | 250 ppm | 450 ppm | 8.5% | 4.5 | 0 | 0 | 2 |
| 5-1 | 150 ppm | 200 ppm | 350 ppm | 7% | 4.5 | 0 | 0 | 2 |
| 5-2 | 150 ppm | 250 ppm | 400 ppm | 7.5% | 4 | 0 | 0.5 | 2 |
| 5-3 | 150 ppm | 300 ppm | 450 ppm | 7.5% | 4 | 0 | 1 | 2 |
| 6-1 | 100 ppm | 250 ppm | 350 ppm | 7% | 4.8 | 0 | 0 | 2 |
| 6-2 | 100 ppm | 300 ppm | 400 ppm | 7.5% | 4.8 | 0 | 0 | 2 |
| 6-3 | 100 ppm | 350 ppm | 450 ppm | 7.5% | 4.8 | 0 | 0 | 2 |

*The concentration of the solutions depends on the desired sweetness. In the working examples, the sweetness is set to 8%, but it can be lower or higher, depending on desired applications. Therefore, the concentration can also be lower or higher, depending on desired applications.

Conclusion: GSG-RA50 improved the taste profile of RA97. Increasing the concentration of GSG-RA50 in the composition increases sugar like (i.e., feels and tastes like sugar). However, the sweetness of the composition decreases at higher ratio of GSG-RA50.

The samples with a solid content of 350 ppm (1, 2-1, 3-1, 4-1, 5-1, 6-1) were selected and examined further as depicted in FIGS. 1-4. As evident from the FIGS. 1-4 the best synergistic effect at 350 ppm total solid content was achieved at a GSG-RA50/RA97 ratio of between 100/250 and 150/200 having a sweetness equal to 350 ppm RA, while achieving the best taste profile.

The samples with about 8% SE (1, 2-2, 3-3, 4-1, 5-2, 6-3) were selected and examined further. In these samples at high and low RA97 concentration, increased GSG-RA50 was needed to achieve desired sweetness. At lower RA97 concentration, the same sweetness of 100% RA97 could not be obtained even with a large amount of GSG-RA50. Thus in order to maintain 8% SE with a decrease in RA97 concentration using GSG-RA50, the concentration of total solid content was increased until the concentration of RA97 reached 200 ppm, demonstrating that there was synergistic effect at this concentration. At low RA97 concentration, the addition of GSG-RA50 cannot compensate for the sweetness of the reduction of same amount RA97, i.e., additional amount of GSG-RA50 should be added. The tendency was reversed until RA97 reached 200 ppm.

Example 2. Evaluating the Taste Profiles of GSG-RA95 and RA97 Compositions to Identify Optimized Ratios with Preferred Synergistic Tastes Effects Conditions: The samples were tested in aqueous solution of citric acid at pH 3.8. The control sample was RA97 at 350 ppm, corresponding to 8% SE.

TABLE 4

| Samples | | | |
|---|---|---|---|
| Sample No. | RA97 | GSG-RA95 | total GSG |
| 1 | 350 ppm | — | |
| 2-1 | 300 ppm | 50 ppm | 12.94% |
| 2-2 | 300 ppm | 100 ppm | 22.65% |
| 2-3 | 300 ppm | 150 ppm | 30.20% |
| 3-1 | 250 ppm | 100 ppm | 25.89% |
| 3-2 | 250 ppm | 150 ppm | 33.98% |
| 3-3 | 250 ppm | 200 ppm | 40.27% |
| 4-1 | 200 ppm | 150 ppm | 38.83% |
| 4-2 | 200 ppm | 200 ppm | 45.30% |
| 4-3 | 200 ppm | 250 ppm | 50.33% |
| 5-1 | 150 ppm | 200 ppm | 51.77% |
| 5-2 | 150 ppm | 250 ppm | 56.63% |
| 5-3 | 150 ppm | 300 ppm | 60.40% |
| 6-1 | 100 ppm | 250 ppm | 64.71% |
| 6-2 | 100 ppm | 300 ppm | 67.95% |
| 6-3 | 100 ppm | 350 ppm | 70.47% |

TABLE 5

| Results | | | | | | | | |
|---|---|---|---|---|---|---|---|---|
| Sample No. | RA97 | GSG-RA95 | Total Solid contents | SE | Sugar like | Bitterness | After-taste | Lingering |
| 1 | 350 ppm | — | 350 ppm | 8% | 3 | 2 | 3 | 4 |
| 2-1 | 300 ppm | 50 ppm | 350 ppm | 7.80% | 3.5 | 0 | 1.5 | 3 |
| 2-2 | 300 ppm | 100 ppm | 400 ppm | 8% | 4 | 0 | 0.5 | 2 |
| 2-3 | 300 ppm | 150 ppm | 450 ppm | 8.50% | 4 | 0 | 0.5 | 2 |
| 3-1 | 250 ppm | 100 ppm | 350 ppm | 8% | 4 | 0 | 0.5 | 2 |
| 3-2 | 250 ppm | 150 ppm | 400 ppm | 8.30% | 4 | 0 | 0.5 | 2 |
| 3-3 | 250 ppm | 200 ppm | 450 ppm | 8.50% | 4.5 | 0 | 0.5 | 2 |
| 4-1 | 200 ppm | 150 ppm | 350 ppm | 8% | 4 | 0 | 0 | 2 |
| 4-2 | 200 ppm | 200 ppm | 400 ppm | 8.30% | 4 | 0 | 0 | 2 |
| 4-3 | 200 ppm | 250 ppm | 450 ppm | 8.50% | 4.5 | 0 | 0 | 2 |
| 5-1 | 150 ppm | 200 ppm | 350 ppm | 7.50% | 4.5 | 0 | 0 | 2 |
| 5-2 | 150 ppm | 250 ppm | 400 ppm | 7.80% | 4.5 | 0 | 0 | 2 |
| 5-3 | 150 ppm | 300 ppm | 450 ppm | 7.80% | 4.5 | 0 | 0 | 2 |
| 6-1 | 100 ppm | 250 ppm | 350 ppm | 6.80% | 4.5 | 0 | 0 | 2 |
| 6-2 | 100 ppm | 300 ppm | 400 ppm | 7.20% | 4.5 | 0 | 0 | 2 |
| 6-3 | 100 ppm | 350 ppm | 450 ppm | 7.50% | 4.8 | 0 | 0 | 2 |

Conclusion: GSG-RA95 improved the taste profile of RA97. With the increase of the ratio of GSG-RA95, the overall taste profile of the composition became more sugar like (i.e., like sugar). However, the sweetness of the composition decreased at a high ratio of GSG-RA95.

The samples with a solid content of 350 ppm (1, 2-1, 3-1, 4-1, 5-1, 6-1) were selected and examined further in FIGS. 5-8. As evident from the FIGS. 5-8 the best synergistic effect at 350 ppm total solid content was achieved at a GSG-RA95/RA97 ratio of between 100/250 and 150/200 having a sweetness equal to 350 ppm RA, while achieving the best taste profile.

The samples with about 8% SE (1, 2-2, 3-3, 4-1, 5-2, 6-3) were selected and examined further. In these samples at high and low RA97 concentration, increased GSG-RA95 was needed to achieve desired sweetness. At lower RA97 concentration, the same sweetness of 100% RA97 could not be obtained even with a large amount of GSG-RA95. Thus in order to maintain 8% SE with a decrease in RA97 concentration using GSG-RA95, the concentration of total solid content was increased until the concentration of RA97 reached 250 ppm and the effect was maintained until the concentration of RA97 reached 200 ppm, demonstrating that there was synergistic effect at these concentrations.

Example 3. Evaluating the Taste Profiles of GSG-RA50, GSG-RA95 and RA97 Compositions in Order to Find Optimized Ratios with Preferred Synergistic Taste Effects Conditions: The samples were tested in aqueous solution of citric acid at pH 3.8. The control sample was RA97 at 350 ppm, corresponding to 8% SE.

TABLE 6

| Samples | | | | |
|---|---|---|---|---|
| Sample No. | RA97 | GSG-RA50 | GSG-RA95 | total GSG |
| 1 | 350 | — | — | |
| 2 | 200 | 25 | 175 | 45.22% |
| 3 | 200 | 50 | 150 | 45.14% |
| 4 | 200 | 75 | 125 | 45.07% |
| 5 | 200 | 100 | 100 | 44.99% |
| 6 | 200 | 125 | 75 | 44.91% |
| 7 | 200 | 150 | 50 | 44.83% |
| 8 | 200 | 175 | 25 | 44.75% |

TABLE 7

| Results | | | | | | | |
|---|---|---|---|---|---|---|---|
| Sample No. | RA97 (ppm) | GSG-RA50 (ppm) | GSG-RA95 (ppm) | Sugar like | Bitterness | After-taste | Lingering |
| 1 | 350 | — | — | 3 | 2 | 3 | 4 |
| 2 | 200 | 25 | 175 | 4.5 | 0 | 1 | 2 |
| 3 | 200 | 50 | 150 | 5 | 0 | 1 | 2 |
| 4 | 200 | 75 | 125 | 5 | 0 | 0 | 1 |
| 5 | 200 | 100 | 100 | 4.5 | 0 | 0 | 2 |
| 6 | 200 | 125 | 75 | 4.5 | 0 | 0.5 | 2 |
| 7 | 200 | 150 | 50 | 4.5 | 0 | 0.5 | 2 |
| 8 | 200 | 175 | 25 | 4.5 | 0 | 0.5 | 2 |

Conclusion: The mixture of GSG-RA50 and GSG-RA95 improved the taste profile of RA97 at all ratios. The improvement was more significant at a GSG-RA50/GSG-RA95 ratio of 50/150 and 75/125 where the taste profile was more sugar like.

Example 4. Evaluating the Taste Profiles of GSG-RA95 and Steviol Glycoside Comprising RD (RA/RD) Compositions in Order to Find Optimized Ratio with Preferred Synergistic Taste Effects Raw material: RA/RD (RA 93.96%, RD 4.54%).

TABLE 8

| Samples | | | |
|---|---|---|---|
| Sample No. | RA/RD | GSG-RA95 | total GSG |
| 1 | 350 ppm | — | |
| 2-1 | 200 ppm | 150 ppm | 38.83% |
| 2-2 | 200 ppm | 200 ppm | 45.30% |
| 2-3 | 200 ppm | 250 ppm | 50.33% |
| 3-1 | 150 ppm | 200 ppm | 51.77% |
| 3-2 | 150 ppm | 250 ppm | 56.63% |
| 3-3 | 150 ppm | 300 ppm | 60.40% |

TABLE 9

| Results | | | | | | | | |
|---|---|---|---|---|---|---|---|---|
| Sample No. | RA/RD (ppm) | GSG-RA95 (ppm) | Total solid content (ppm) | SE | Sugar like | Bitterness | After-taste | Lingering |
| 1 | 350 | — | 350 | 8.5% | 3.5 | 1 | 2 | 2.5 |
| 2-1 | 200 | 150 | 350 | 8.5% | 4 | 0 | 0.5 | 2 |
| 2-2 | 200 | 200 | 400 | 8.5% | 4 | 0 | 0 | 2 |
| 2-3 | 200 | 250 | 450 | 8.8% | 4 | 0 | 0.5 | 2 |
| 3-1 | 150 | 200 | 350 | 8.2% | 4.5 | 0 | 0 | 2 |
| 3-2 | 150 | 250 | 400 | 8.7% | 4.5 | 0 | 0.5 | 2 |
| 3-3 | 150 | 300 | 450 | 8.8% | 4.5 | 0 | 0.5 | 2 |

Conclusion: GSG-RA95 improved both the bitterness and the aftertaste of RA/RD having a wide effective range. In comparison to RA97, RA/RD had wider synergistic range with GSG-RA95.

Example 5. Evaluating the Taste Profiles of GSG-RA50 and Steviol Glycoside Comprising RD (RA/RD) Compositions in Order to Find Optimized Ratios with Preferred Synergistic Taste Effects Raw material: RA/RD, (RA 93.96%, RD 4.54%).

TABLE 10

| Samples | | | |
|---|---|---|---|
| Sample No. | (RA/RD) | GSG-RA50 | total GSG |
| 1 | 350 ppm | — | |
| 2-1 | 200 ppm | 150 ppm | 38.29% |
| 2-2 | 200 ppm | 200 ppm | 44.68% |
| 2-3 | 200 ppm | 250 ppm | 49.64% |
| 3-1 | 150 ppm | 200 ppm | 51.06% |
| 3-2 | 150 ppm | 250 ppm | 55.84% |
| 3-3 | 150 ppm | 300 ppm | 59.57% |

TABLE 11

| Results | | | | | | | | |
|---|---|---|---|---|---|---|---|---|
| Sample No. | RA/RD (ppm) | GSG-RA50 (ppm) | Total solid content (ppm) | SE | Sugar like | Bitter-ness | After-taste | Linger-ing |
| 1 | 350 | — | 350 | 8.5% | 3.5 | 1 | 2 | 2.5 |
| 2-1 | 200 | 150 | 350 | 8.0% | 4 | 0 | 0 | 2 |
| 2-2 | 200 | 200 | 400 | 8.5% | 4 | 0 | 0 | 2 |
| 2-3 | 200 | 250 | 450 | 8.8% | 4 | 0 | 0 | 2 |
| 3-1 | 150 | 200 | 350 | 7.7% | 4 | 0 | 0 | 2 |
| 3-2 | 150 | 250 | 400 | 8% | 4.5 | 0 | 0 | 2 |
| 3-3 | 150 | 300 | 450 | 8% | 4 | 0 | 0.5 | 2 |

GSG-RA50 improved both the bitterness and the aftertaste of RA/RD. As for the synergistic effects in sweetness, GSG-RA50 was not as good as GSG-RA95 due to a narrow synergistic range.

Example 6. Effects of GSG-RA50 on the Taste Profile of Steviol Glycosides

GSG-RA50 was mixed with various SGs at a ratio of 1:1, and the taste profiles of the mixtures in water (500 ppm) were determined.

TABLE 12

| RA50 | | | | | | |
|---|---|---|---|---|---|---|
| Sample | GSG-RA50 | RA50 | SE | Bitter taste | Aftertaste (bitter, metallic, licorice) | Lingering |
| 1-1 | 250 ppm | 250 ppm | 6.8% | 0.5 | 1.5 | 3.5 |
| 1-2 | — | 500 ppm | 6.5% | 2 | 5 | 5 |

As shown in Table 13, GSG-RA50 improved the taste profile of RA50.

TABLE 13

| RA95 | | | | | | | |
|---|---|---|---|---|---|---|---|
| Sam-ple | GSG-RA50 | RA95 | SE | Bitter taste | Aftertaste (bitter, metallic, licorice) | Linger-ing | total GSG |
| 1-1 | 250 ppm | 250 ppm | 7.4% | 0 | 1 | 3 | 44.68% |
| 1-2 | — | 500 ppm | 7.5% | 0.5 | 3 | 3 | |

GSG-RA50 improved the bitter and metallic aftertaste of RA95, but did not alter the sweetness significantly.

TABLE 14

| RA97 | | | | | | | |
|---|---|---|---|---|---|---|---|
| Sam-ple | GSG-RA50 | RA97 | SE | Bitter taste | Aftertaste (bitter, metallic, licorice) | Linger-ing | total GSG |
| 1-1 | 250 ppm | 250 ppm | 7.4% | 0 | 2 | 2.5 | 44.68% |
| 1-2 | — | 500 ppm | 7.5% | 0.5 | 3.5 | 3 | |

GSG-RA50 improved the bitter and metallic aftertaste of RA97, but did not alter the sweetness significantly.

TABLE 15

| RA98 | | | | | | | |
|---|---|---|---|---|---|---|---|
| Sam-ple | GSG-RA50 | RA98 | SE | Bitter taste | Aftertaste (bitter, metallic, licorice) | Linger-ing | total GSG |
| 1-1 | 250 ppm | 250 ppm | 7.5% | 0.5 | 0.5 | 2.5 | 44.68% |
| 1-2 | — | 500 ppm | 7.5% | 0.5 | 2 | 3 | |

GSG-RA50 improved the bitter and metallic aftertaste of RA98, but did not alter the sweetness significantly.

TABLE 16

| RA99.5 | | | | | | | |
|---|---|---|---|---|---|---|---|
| Sam-ple | GSG-RA50 | RA99.5 | SE | Bitter taste | Aftertaste (bitter, metallic, licorice) | Linger-ing | total GSG |
| 1-1 | 250 ppm | 250 ppm | 7.8% | 0 | 1 | 2 | 44.68% |
| 1-2 | — | 500 ppm | 8.0% | 0 | 2 | 2 | |

GSG-RA50 improved the bitter aftertaste of RA99.5, but did not alter the sweetness significantly.

TABLE 17

| RA/RD | | | | | | | |
|---|---|---|---|---|---|---|---|
| Sam-ple | GSG-RA50 | RA/RD | SE | Bitter taste | Aftertaste (bitter, metallic, licorice) | Linger-ing | total GSG |
| 1-1 | 250 ppm | 250 ppm | 7.7% | 0 | 1 | 2 | 44.68% |
| 1-2 | — | 500 ppm | 7.8% | 0 | 1 | 2 | |

GSG-RA50 did not affect the taste profile of RA/RD, however GSG-RA50 is cheaper than RD and thus will reduce cost.

TABLE 18

| Control sample. | | | | | |
|---|---|---|---|---|---|
| Sample | GSG-RA50 | SE | Bitter taste | Aftertaste (bitter, metallic, licorice) | Lingering |
| | 500 ppm | 6.5% | 0.5 | 2 | 4 |

Example 7. Sweetness of GSG-RA50 and RA97 Compositions

Figure 9:
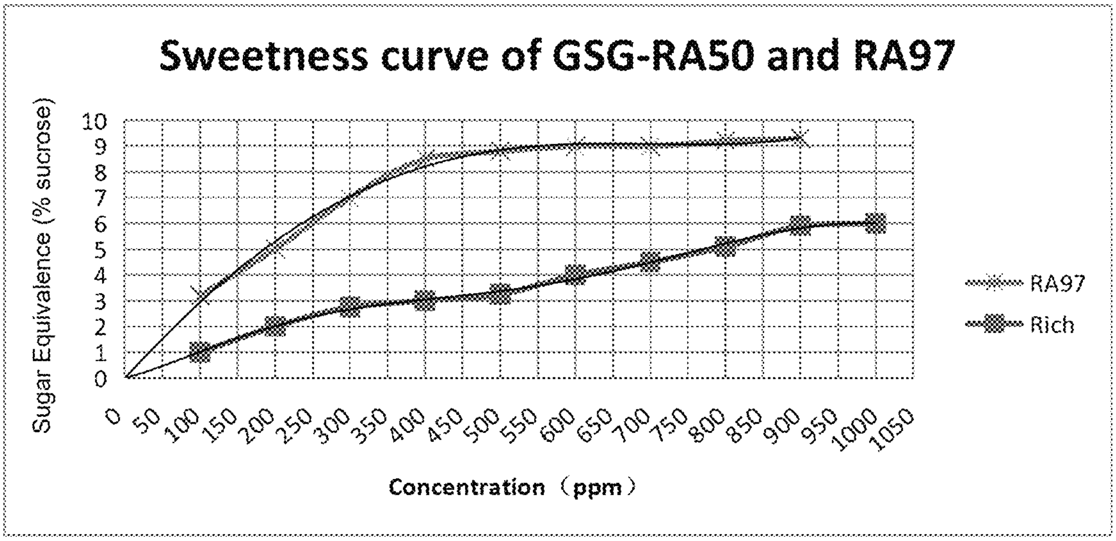
FIG. 9 is a graphical illustration showing the sweetness curve of GSG-RA50 and RA97.

The sweetness of GSG-RA50 and RA97 compositions at varying concentrations was measured according to the sweetness curve (FIG. 9), and the combined sweetness of each composition of GSG-RA50 and RA97 was calculated and compared with the measured value in Table 19.

TABLE 19

| RA97 concen-tration | Calcu-lated SE of RA97 | GSG-RA50 concen-tration | Calcu-lated SE of GSG-RA50 | Calculated SE of the compo-sition | Measured SE of the compo-sition |
|---|---|---|---|---|---|
| 350 ppm | — | — | — | — | 8%* |
| 300 ppm | 6.9% | 50 ppm | 0.5% | 7.4% | 7% |
| 300 ppm | 6.9% | 100 ppm | 1% | 7.9% | 8% |
| 300 ppm | 6.9% | 150 ppm | 1.5% | 8.4% | 8.5% |
| 250 ppm | 6% | 100 ppm | 1% | 7% | 8% |
| 250 ppm | 6% | 150 ppm | 1.5% | 7.5% | 8.2% |
| 250 ppm | 6% | 200 ppm | 2% | 8% | 8.5% |
| 200 ppm | 5% | 150 ppm | 1.5% | 6.5% | 7.8% |
| 200 ppm | 5% | 200 ppm | 2% | 7% | 8% |
| 200 ppm | 5% | 250 ppm | 2.4% | 7.4% | 8.5% |
| 150 ppm | 4.2% | 200 ppm | 2% | 6.2% | 7% |
| 150 ppm | 4.2% | 250 ppm | 2.4% | 6.6% | 7.5% |
| 150 ppm | 4.2% | 300 ppm | 2.75% | 6.95% | 7.5% |
| 100 ppm | 3% | 250 ppm | 2.4% | 5.4% | 7% |
| 100 ppm | 3% | 300 ppm | 2.75% | 5.75% | 7.5% |
| 100 ppm | 3% | 350 ppm | 3% | 6% | 7.5% |

*Control sample. 8% SE is equal to the sweetness of 8 g of sucrose dissolved in 100 g Conclusion: The sweetness of GSG-RA50 and RA97 compositions benefit from a synergistic effect that first appears when the concentration of GSG-RA50 reaches 100 ppm.

Example 8. Sweetness of 350 ppm GSG-RA50 and RA97 Compositions are Shown in Table 20

TABLE 20

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 350 ppm | — | — | — | — | 8% | 0 | 0 |
| 300 ppm | 6.9% | 50 ppm | 0.5% | 7.4% | 7% | 100 | 20 |
| 250 ppm | 6% | 100 ppm | 1% | 7% | 8% | 100 | 200 |
| 200 ppm | 5% | 150 ppm | 1.5% | 6.5% | 7.8% | 100 | 186 |
| 150 ppm | 4.2% | 200 ppm | 2% | 6.2% | 7% | 100 | 140 |
| 100 ppm | 3% | 250 ppm | 2.4% | 5.4% | 7% | 96 | 160 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE-Calculated SE of RA97)/concentration of GSG-RA50.

Figure 10:
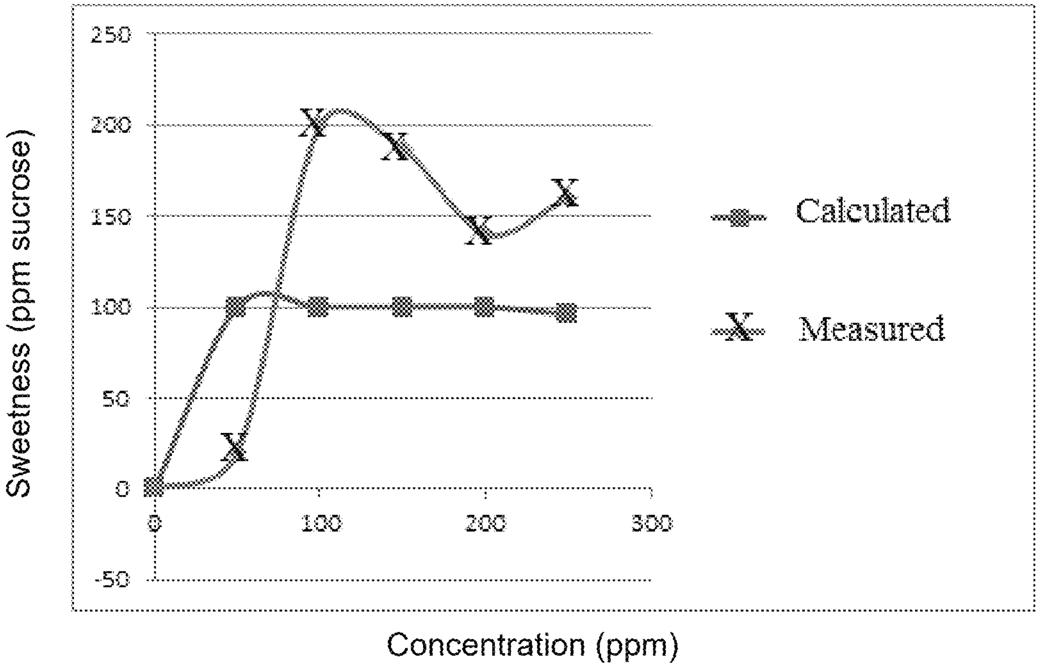
FIG. 10 is a graphical illustration showing the calculated and measured sweetness of GSG-RA50 per ppm in 350 ppm GSG-RA50 and RA97 compositions.

Conclusion: At 350 ppm total solid content, increasing the amount of GSG-RA50 results in a measured contribution to sweetness that was higher than the calculated value (FIG. 10). A positive synergistic sweetness effect was found when GSG-RA50>100 ppm, although the optimized range was 100-150 ppm.

Example 9. Sweetness of 400 ppm GSG-RA50 and RA97 Compositions are Shown in Table 21

TABLE 21

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 300 ppm | 6.9% | 100 ppm | 1% | 7.9% | 8% | 100 | 110 |
| 250 ppm | 6% | 150 ppm | 1.5% | 7.5% | 8.2% | 100 | 146.67 |
| 200 ppm | 5% | 200 ppm | 2% | 7% | 8% | 100 | 150 |
| 150 ppm | 4.2% | 250 ppm | 2.4% | 6.6% | 7.5% | 96 | 132 |
| 100 ppm | 3% | 300 ppm | 2.75% | 5.75% | 7.5% | 91.7 | 150 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE-Calculated SE of RA97)/concentration of GSG-RA50.

Figure 11:
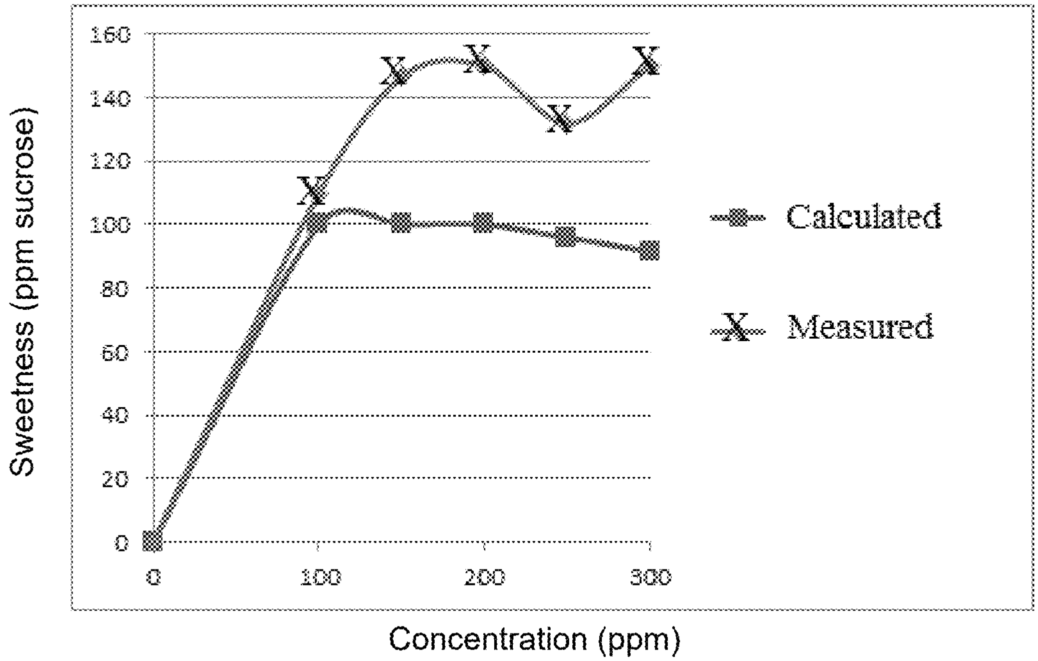
FIG. 11 is a graphical illustration showing the calculated and measured sweetness of GSG-RA50 per ppm in 400 ppm GSG-RA50 and RA97 compositions.

Conclusion: At 400 ppm total solid content, increasing the amount of GSG-RA50 results in a measured contribution to sweetness that was higher than the calculated value (FIG. 11). A positive synergistic sweetness effect was found when GSG-RA50>100 ppm.

Example 10. Sweetness of 450 ppm GSG-RA50 and RA97 Compositions are Shown in Table 22

TABLE 22

| RA97 | Calc. SE of RA97 | GSG-RA50 | Calc. SE of GSG-RA50 | Calc. SE of the composition | Measured SE of the composition | Calc. sweetness (ppm sugar) of GSG-RA50 per ppm | Measured sweetness (ppm sugar) of GSG-RA50 per ppm |
|---|---|---|---|---|---|---|---|
| 300 ppm | 6.9% | 150 ppm | 1.5% | 8.4% | 8.5% | 100 | 106.67 |
| 250 ppm | 6% | 200 ppm | 2% | 8% | 8.5% | 100 | 125 |
| 200 ppm | 5% | 250 ppm | 2.4% | 7.4% | 8.5% | 96 | 140 |
| 150 ppm | 4.2% | 300 ppm | 2.75% | 6.95% | 7.5% | 91.7 | 110 |
| 100 ppm | 3% | 350 ppm | 3% | 6% | 7.5% | 85.7 | 128.57 |

Calculated SE (ppm sucrose) of GSG-RA50 per ppm=calculated SE of GSG-RA50/concentration of GSG-RA50. Measured sweetness (ppm sucrose) of GSG-RA50 per ppm=(Measured SE-Calculated SE of RA97)/concentration of GSG-RA50.

Figure 12:
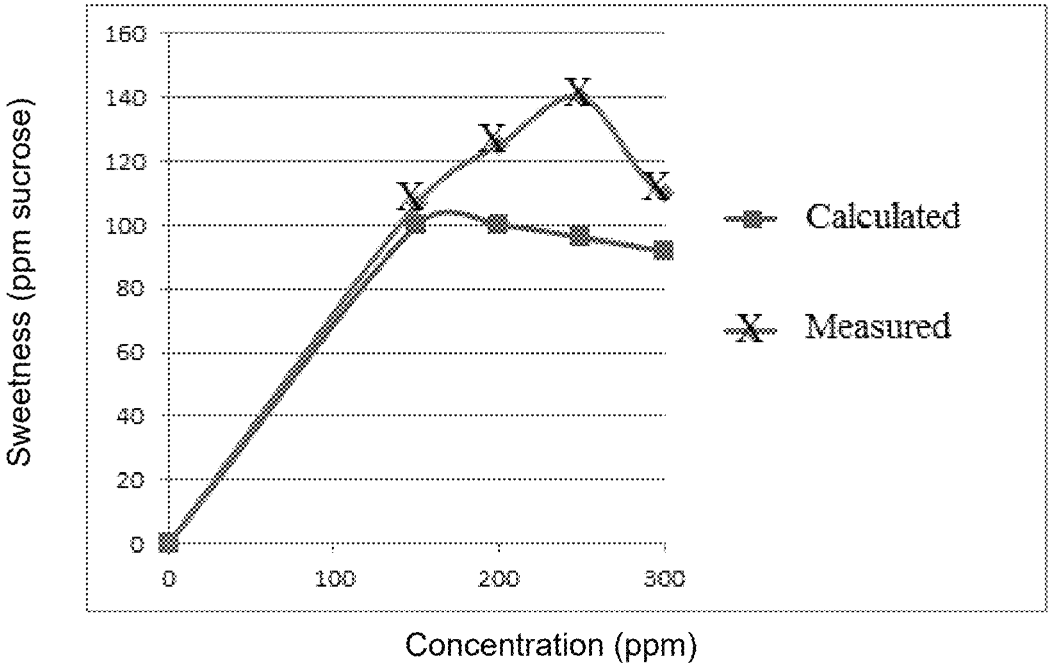
FIG. 12 is a graphical illustration showing the calculated and measured sweetness of GSG-RA50 per ppm in 450 ppm GSG-RA50 and RA97 compositions.

Conclusion: At 450 ppm total solid content, increasing the amount of GSG-RA50 results in a measured contribution to sweetness that was higher than the calculated value (FIG. 12). A positive synergistic sweetness effect was found when GSG-RA50>150 ppm, although the optimized range was 200-250 ppm.

Example 11. Sweetness of GSG-RA95 and RA97 Compositions

Figure 13:
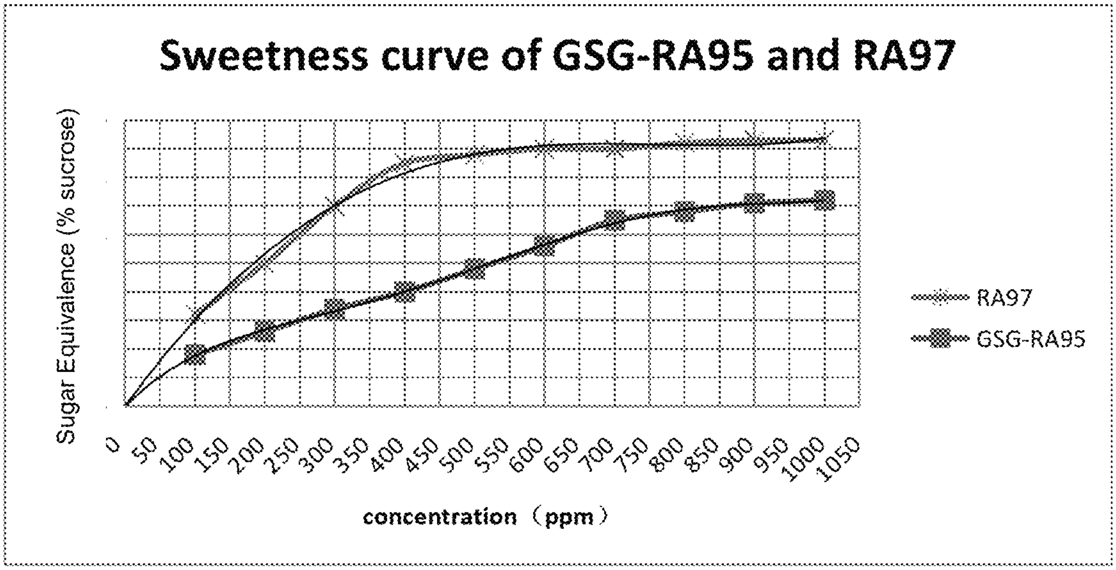
FIG. 13 is a graphical illustration showing the sweetness curve of GSG-RA95 and RA97.

The sweetness of GSG-RA95 and RA, 97% purity (RA) RA97 compositions at varying concentrations was measured according to the sweetness curve (FIG. 13), and the combined sweetness of each composition of GSG-RA95 and RA97 was calculated and compared with the measured value in Table 23.

TABLE 23

| RA97 concentration | Calculated SE of RA97 | GSG-RA95 concentration | Calculated SE of GSG-RA95 | Calculated SE of the composition | Measured SE of the composition |
|---|---|---|---|---|---|
| 350 ppm | — | — | — | — | 8% |
| 300 ppm | 6.9% | 50 ppm | 0.7% | 7.6% | 7.8% |
| 300 ppm | 6.9% | 100 ppm | 1.4% | 8.3% | 8% |
| 300 ppm | 6.9% | 150 ppm | 1.9% | 8.8% | 8.5% |
| 250 ppm | 6% | 100 ppm | 1.4% | 7.4% | 8% |
| 250 ppm | 6% | 150 ppm | 1.9% | 7.9% | 8.3% |
| 250 ppm | 6% | 200 ppm | 2.2% | 8.2% | 8.5% |
| 200 ppm | 5% | 150 ppm | 1.9% | 6.9% | 8% |
| 200 ppm | 5% | 200 ppm | 2.2% | 7.2% | 8.3% |
| 200 ppm | 5% | 250 ppm | 2.5% | 7.5% | 8.5% |
| 150 ppm | 4.2% | 200 ppm | 2.2% | 6.4% | 7.5% |
| 150 ppm | 4.2% | 250 ppm | 2.5% | 6.7% | 7.8% |
| 150 ppm | 4.2% | 300 ppm | 2.9% | 7.1% | 7.8% |
| 100 ppm | 3% | 250 ppm | 2.5% | 5.5% | 6.8% |
| 100 ppm | 3% | 300 ppm | 2.9% | 5.9% | 7.2% |
| 100 ppm | 3% | 350 ppm | 3.1% | 6.1% | 7.5% |

Conclusion: The sweetness of GSG-RA95 and RA97 compositions benefit from a synergistic effect that first appears when the concentration of GSG-RA95 reaches 100 ppm.

Example 12. Sweetness of 350 ppm GSG-RA95 and RA97 Compositions are Shown in Table 24

TABLE 24

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 350 | — | — | — | — | 8% | 0 | 0 |
| 300 | 6.9% | 50 | 0.7% | 7.6% | 7.8% | 140 | 180 |
| 250 | 6% | 100 | 1.4% | 7.4% | 8% | 140 | 200 |

TABLE 24-continued

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 200 | 5% | 150 | 1.9% | 6.9% | 8% | 126.7 | 200 |
| 150 | 4.2% | 200 | 2.2% | 6.4% | 7.5% | 110 | 165 |
| 100 | 3% | 250 | 2.5% | 5.5% | 6.8% | 100 | 152 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE-Calculated SE of RA97)/concentration of GSG-RA95.

Figure 14:
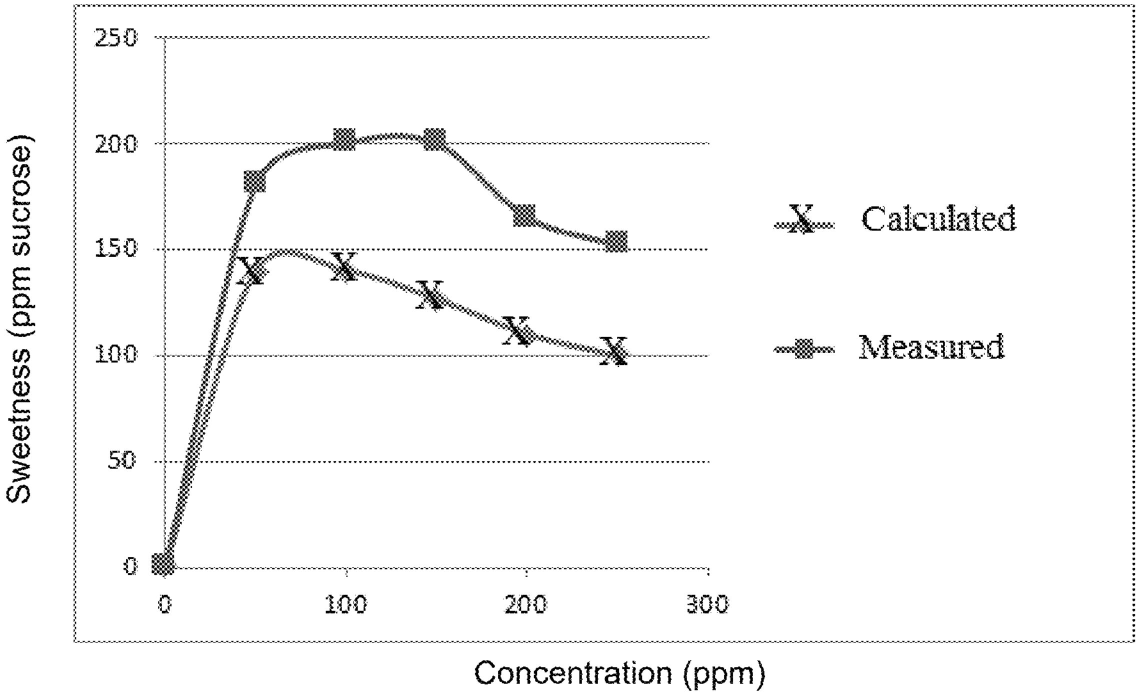
FIG. 14 is a graphical illustration showing the calculated and measured sweetness of GSG-RA95 per ppm in 350 ppm GSG-RA95 and RA97 compositions.

Conclusion: At 350 ppm total solid content, increasing the amount of GSG-RA95 results in a measured contribution to sweetness that was higher than the calculated value (FIG. 14). A positive synergistic sweetness effect was found when GSG-RA95>100 ppm with an optimized range of 100-150 ppm.

Example 13. Sweetness of 400 ppm GSG-RA95 and RA97 Compositions are Shown in Table 25

TABLE 25

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 100 | 1.4% | 8.3% | 8% | 140 | 110 |
| 250 | 6% | 150 | 1.9% | 7.9% | 8.3% | 126.7 | 153.33 |
| 200 | 5% | 200 | 2.2% | 7.2% | 8.3% | 110 | 165 |
| 150 | 4.2% | 250 | 2.5% | 6.7% | 7.8% | 100 | 144 |
| 100 | 3% | 300 | 2.9% | 5.9% | 7.2% | 96.7 | 140 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE-Calculated SE of RA97)/concentration of GSG-RA95.

Figure 15:
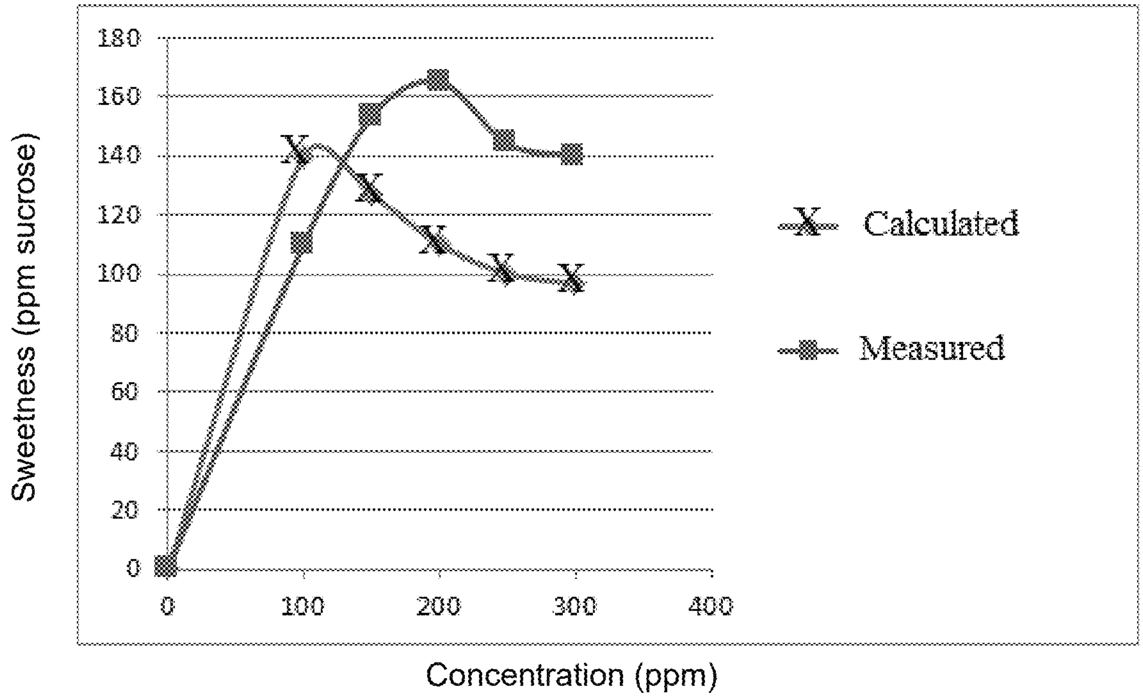
FIG. 15 is a graphical illustration showing the calculated and measured sweetness of GSG-RA95 per ppm in 400 ppm GSG-RA95 and RA97 compositions.

Conclusion: At 400 ppm total solid content, increasing the amount of GSG-RA95 results in a measured contribution to sweetness that was higher than the calculated value (FIG. 15). A positive synergistic sweetness effect was found when GSG-RA95>150 ppm with an optimized range of 150-200 ppm.

Example 14. Sweetness of 450 ppm GSG-RA95 and RA97 Compositions are Shown in Table 26

TABLE 26

| RA97 | Calc. SE of RA97 | GSG-RA95 | Calc. SE of GSG-RA95 | Calc. SE of the composition | Measured SE of the composition | Calc. SE (ppm sucrose) of GSG-RA95 per ppm | Measured SE (ppm sucrose) of GSG-RA95 per ppm |
|---|---|---|---|---|---|---|---|
| 300 ppm | 6.9% | 150 ppm | 1.5% | 8.4% | 8.5% | 100 | 106.67 |
| 250 ppm | 6% | 200 ppm | 2% | 8% | 8.5% | 100 | 125 |
| 200 ppm | 5% | 250 ppm | 2.4% | 7.4% | 8.5% | 96 | 140 |
| 150 ppm | 4.2% | 300 ppm | 2.75% | 6.95% | 7.5% | 91.7 | 110 |
| 100 ppm | 3% | 350 ppm | 3% | 6% | 7.5% | 85.7 | 128.57 |

Calculated SE (ppm sucrose) of GSG-RA95 per ppm=calculated SE of GSG-RA95/concentration of GSG-RA95. Measured sweetness (ppm sucrose) of GSG-RA95 per ppm=(Measured SE-Calculated SE of RA97)/concentration of GSG-RA95.

Figure 16:
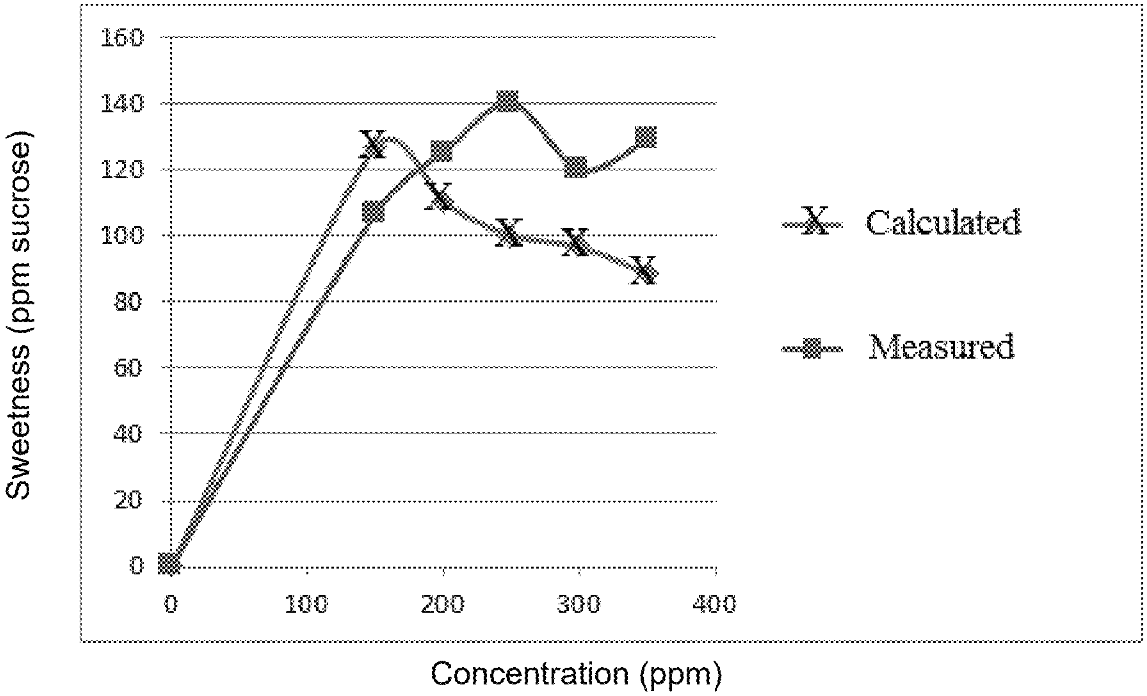
FIG. 16 is a graphical illustration showing the calculated and measured sweetness of GSG-RA95 per ppm in 450 ppm GSG-RA95 and RA97 compositions.

Conclusion: At 450 ppm total solid content, increasing the amount of GSG-RA95 results in a measured contribution to sweetness that was higher than the calculated value (FIG. 16). A positive synergistic sweetness effect was found when GSG-RA95>200 ppm with an optimized range of 200-250 ppm.

Example 15. Compositions of Steviol Glycosides and GSG-RA50

TABLE 27

| Steviol glycoside | GSG-RA50 | Water | Untreated (room temperature) | Treated (room temperature) | Stability |
|---|---|---|---|---|---|
| RA, 0.85 g | 0.15 g | 10 g | Soluble | Soluble | >10 days |
| RA, 0.9 g | 0.1 g | 10 g | Soluble | Soluble | >10 days |
| RB, 0.5 g | 0.5 g | 10 g | Insoluble | Insoluble | — |
| RC, 0.5 g | 0.5 g | 10 g | Insoluble | Insoluble | — |
| RD, 0.5 g | 0.5 g | 10 g | Insoluble | Insoluble | — |
| RB, 0.1 g | 0.9 g | 10 g | Insoluble | Insoluble | — |
| RC, 0.1 g | 0.9 g | 10 g | Insoluble | Soluble | >10 days |
| RD, 0.1 g | 0.9 g | 10 g | Insoluble | Soluble | >10 days |
| RB, 0.05 g | 0.95 g | 10 g | Insoluble | Soluble | >10 days |

For compositions of RA and GSG-RA50, the solubility can be improved by the treatment of according to the present application. For composition of RA, RC, or RD and GSG-RA50, the solubility is improved by the treatment according to the present application, only at higher GSG-RA50 to SG ratio.

Example 16. HPLC-MS Experiments

HPLC-system: Agilent 1100 (quart. Pump, Autosampler, Column oven, UV/VIS-detector coupled to Agilent ESI MS (G1956 A) operated at 350° C., 12 L/min N.sup.2, Fragmentor: 150, pos. Scan mode.

Mobile Phase: Acetonitrile/0.01% acetic acid=95/5 at 0 min to 80/20 at 20 min (linear gradient) hold for another 20 minutes, return to source conditions.

Column: Supelcosil-LC-NH2, 250×4.6 mm, 5 m

Flow rate: 1 mL/min

Temperature: 35° C.

Injection vol: 0.015 mL

Figure 17:
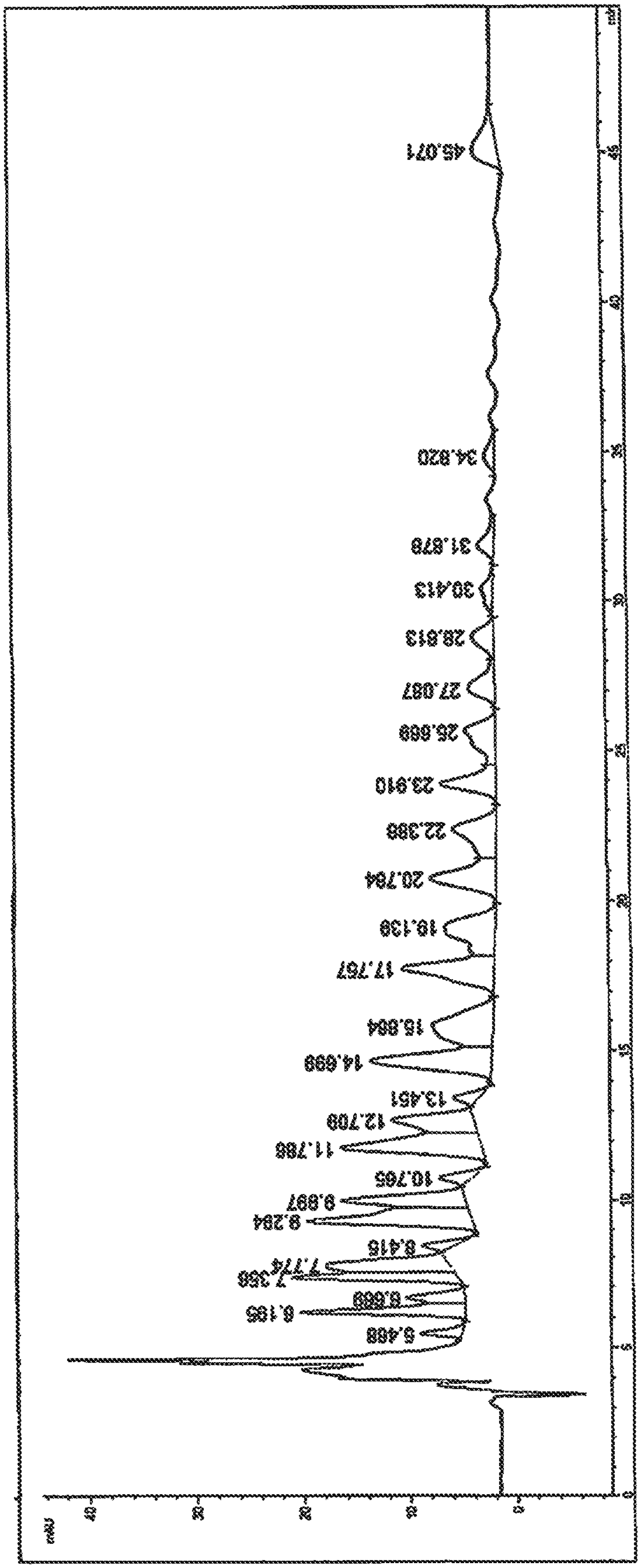
FIG. 17 is an optimized HPLC spectrum of GSG-RA50.

GSG-RA50 was characterized by HPLC-MS (FIG. 17) and the ratios of GSGs are shown in Table 28.

TABLE 28

| Compound | Area | mg RA/100 ml | mol mass | mg/100 ml | % of total sample |
|---|---|---|---|---|---|
| — | 52.9 | 2.42 | | 2.42 | 1.79 |
| ST-G1 | 250 | 3.82 | 967 | 3.82 | 2.83 |
| ST-G1 | 114 | 2.85 | 967 | 2.85 | 2.11 |
| RA-G1 | 288 | 4.09 | 1129 | 4.77 | 3.54 |
| RA-G1 | 393 | 4.84 | 1129 | 5.65 | 4.18 |
| ST-G2 | 110 | 2.82 | 1129 | 3.30 | 2.44 |
| RA-G2 | 479 | 5.44 | 1291 | 7.27 | 5.38 |
| RA-G2 | 341 | 4.46 | 1291 | 5.96 | 4.41 |
| ST-G3 | 105 | 2.78 | 1291 | 3.72 | 2.75 |
| RA-G3 | 470 | 5.39 | 1453 | 8.09 | 5.99 |
| RA-G3 | 319 | 4.31 | 1453 | 6.47 | 4.80 |

TABLE 28-continued

| Compound | Area | mg RA/100 ml | mol mass | mg/100 ml | % of total sample |
|---|---|---|---|---|---|
| ST-G4 | 87.6 | 2.66 | 1453 | 4.00 | 2.97 |
| RA-G4 | 408 | 4.94 | 1615 | 8.25 | 6.11 |
| ST-G5 | 346 | 4.50 | 1615 | 7.51 | 5.57 |
| RA-G5 | 329 | 4.38 | 1777 | 8.05 | 5.96 |
| ST-G6 | 286 | 4.07 | 1777 | 7.48 | 5.54 |
| RA-G6 | 311 | 4.25 | 1939 | 8.53 | 6.32 |
| ST-G7 | 173 | 3.27 | 1939 | 6.56 | 4.86 |
| RA-G7 | 184 | 3.35 | 2101 | 7.28 | 5.39 |
| >RA/ST-G7 | 232 | 3.69 | 2263 | 8.64 | 6.40 |
| Sum: | | 78.35 | | 120.63 | 89.35 |

Figure 18:
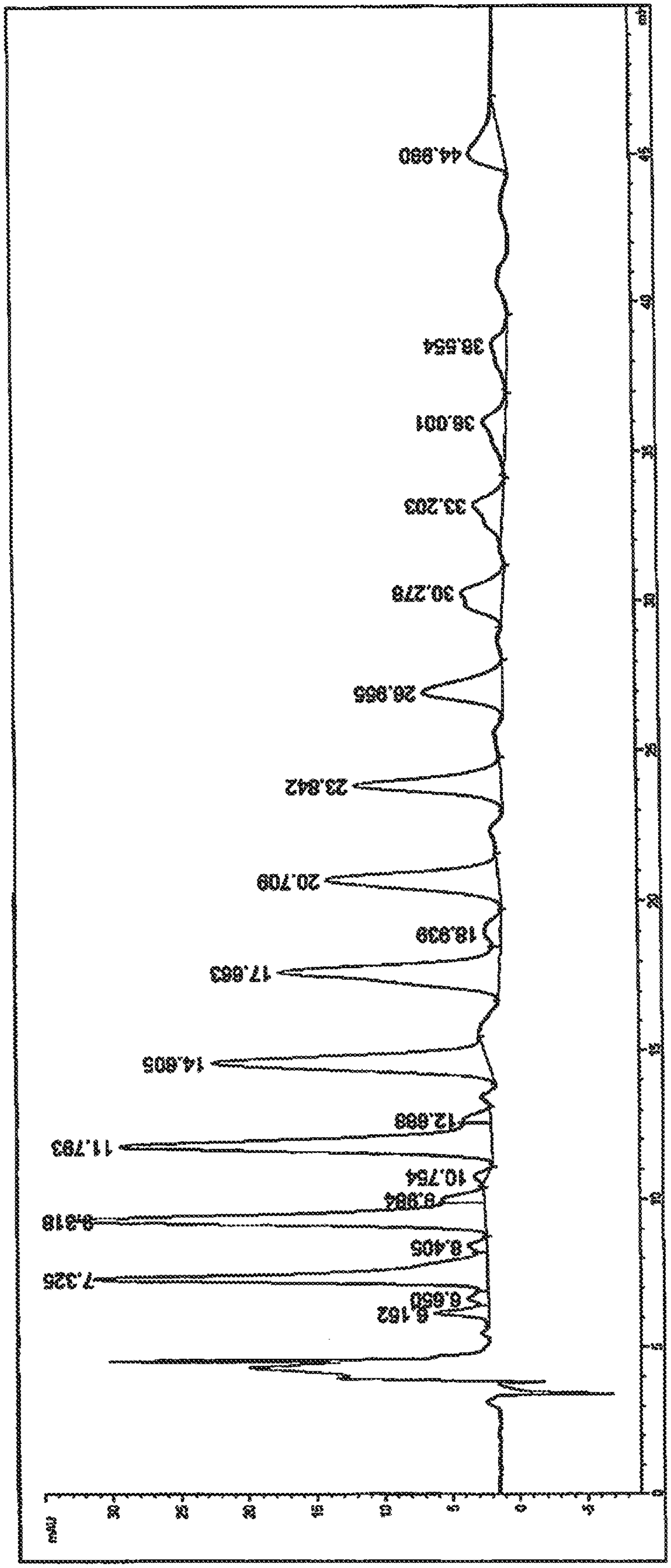
FIG. 18 is an optimized HPLC spectrum of GSG-RA80.

GSG-RA95 was characterized by HPLC-MS (FIG. 18) and the ratios of GSGs are shown in Table 29.

TABLE 29

| Compound | Area | mg RA/100 ml | mol mass | mg/100 ml | % of total sample |
|---|---|---|---|---|---|
| — | 65.4 | 2.51 | | 2.5 | 2.04 |
| — | 33.4 | 2.28 | | 2.3 | 1.85 |
| RA-G1 | 687 | 6.93 | 1129 | 8.10 | 6.59 |
| — | 38.5 | 2.32 | | 2.32 | 1.88 |
| RA-G2 | 886 | 8.34 | 1291 | 11.2 | 9.07 |
| — | 36.9 | 2.30 | | 2.30 | 1.87 |
| RA-G3 | 873 | 8.24 | 1453 | 12.4 | 10.09 |
| RA-G4 | 811 | 7.81 | 1615 | 13.1 | 10.63 |
| RA-G5 | 681 | 6.88 | 1777 | 12.7 | 10.31 |
| RA-G6 | 548 | 5.94 | 1939 | 11.9 | 9.70 |
| RA-G7 | 411 | 4.96 | 2101 | 10.8 | 8.79 |
| >RA-G7 | 920 | 8.58 | 2263 | 20.1 | 16.36 |
| Sum: | | 67.1 | | 110 | 89 |

Figure 19:
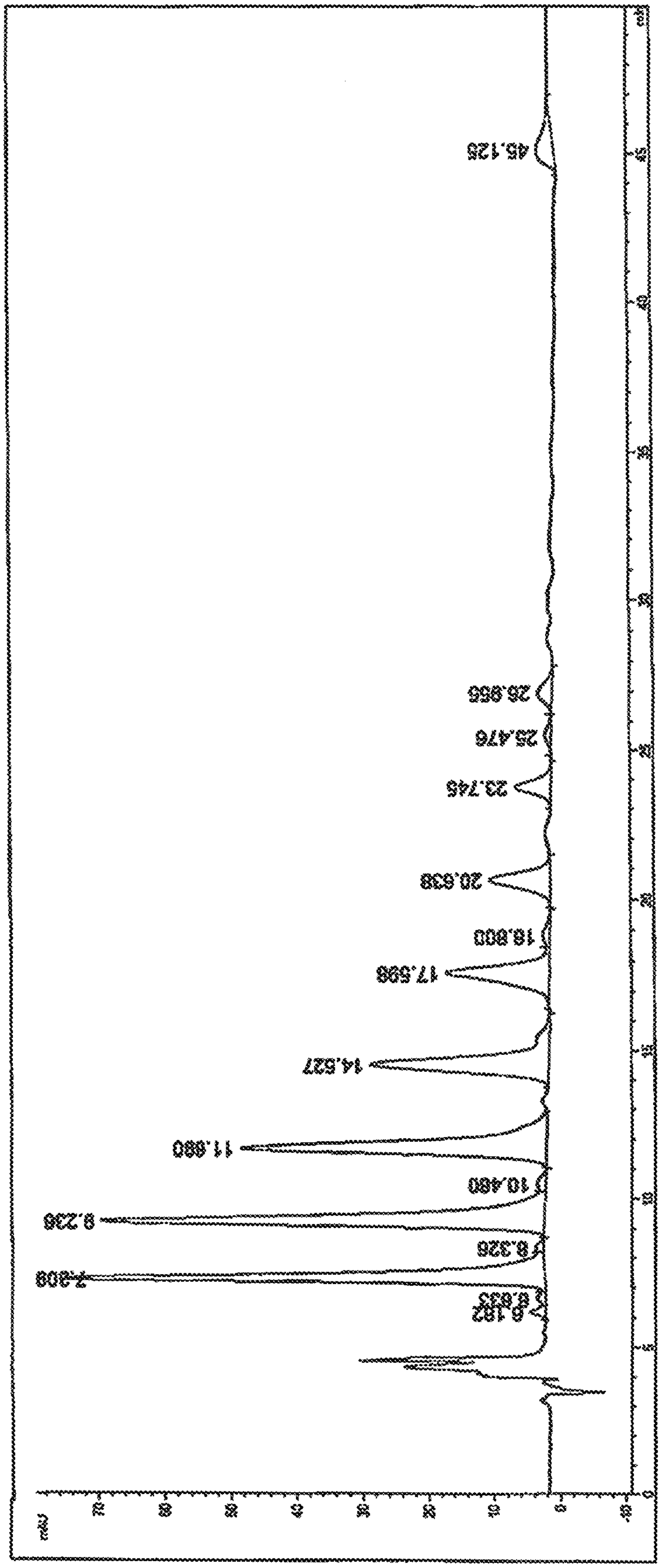
FIG. 19 is an optimized HPLC spectrum of GSG-RA95.

GSG-RA95 was characterized by HPLC-MS (FIG. 19) and the ratios of GSGs are shown in Table 30.

TABLE 30

| Compound | Area | mg RA/100 ml | mol mass | mg/100 ml | % of total sample |
|---|---|---|---|---|---|
| RA-G1 | 1545 | 13.0 | 1129 | 15.2 | 12.7 |
| RA-G2 | 1848 | 15.2 | 1291 | 20.3 | 16.9 |
| RA-G3 | 1458 | 12.4 | 1453 | 18.7 | 15.6 |
| RA-G4 | 1001 | 9.15 | 1615 | 15.3 | 12.8 |
| RA-G5 | 631 | 6.53 | 1777 | 12.0 | 10.0 |
| RA-G6 | 383 | 4.77 | 1939 | 9.58 | 8.0 |
| RA-G7 | 179 | 3.32 | 2101 | 7.22 | 6.0 |
| >RA-G7 | 332 | 4.40 | 2263 | 10.3 | 8.6 |
| Sum: | | 68.8 | | 109 | 90.6 |

Example 17. HPLC-MS Experiments

HPLC-system: Agilent 1100/1200.

| Mobile Phase: | | | | |
|---|---|---|---|---|
| Time | Solv. A* | Solv. B** | Flow | Pressure |
| 0.00 | 72.2 | 27.8 | 1.000 | 300 |
| 8.00 | 55.6 | 44.4 | 1.000 | 300 |
| 12.00 | 55.6 | 44.4 | 1.000 | 300 |

-continued

| Mobile Phase: | | | | |
|---|---|---|---|---|
| Time | Solv. A* | Solv. B** | Flow | Pressure |
| 18.00 | 62.2 | 37.8 | 1.000 | 300 |
| 20.00 | 72.2 | 27.8 | 1.000 | 300 |

Figure 20:
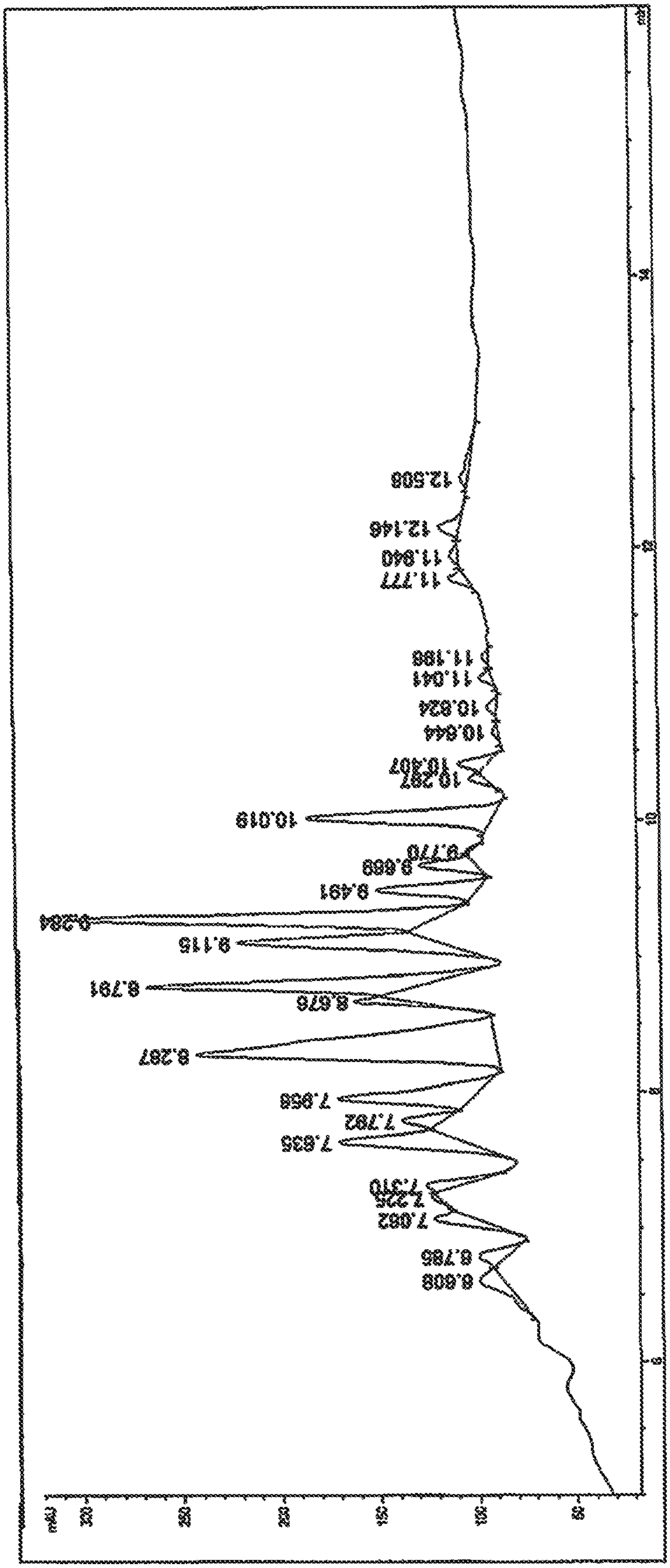
FIG. 20 is an optimized HPLC spectrum of GSG-RA20.

*Solv. A: 0.01M NH4-Acetate with 0.1% Acetic Acid and 0.01% trimethylamine, saturated with dichloromethane
**Solv. B: 90% Acetonitrile/10% water with 0.1% Acetic Acid and 0.01% trimethylamine and 0.1% dichloromethane Injector volume: 30.00 μl
Detector: Diode Array Detector and UV
Wavelength: 210 nm
Temperature settings: 45° C. Flow rate: 1 mL/min
MS: Agilent G 1956 A
Ionization Mode: API-ES
Scan Parameters
Gas Temp: 3000 *C. maximum* 350° C.
Drying Gas: 11.0 l/min maximum 13.0 l/min
Neb Pres: 29 psig maximum 60 psig
Quad Temp: 0° *C. maximum* 0° C.
VCap (Positive): 3000 V
VCap (Negative): 4000 V GSG-RA20 was characterized by HPLC-MS (FIG. 20) and the ratios of GSGs are shown in Table 31.

TABLE 31

| Basic struchture | Specification | Actual Test Result (% m/m) | Mass fragment $[M-2H^+]^{-2}$ | Mass fragment $[M-H^+]^{-1}$ | R-A derived (% m/m)* | Stv derived (% m/m)* | Reb C derived (% m/m)** |
|---|---|---|---|---|---|---|---|
| ST-G1 | | 11.52 | 563 | 1128 | 4.98 | 3.63 | 2.91 |
| ST-G2 | | 8.48 | 644 | 1290 | 3.57 | 2.90 | 2.00 |
| ST-G3 | | 10.21 | 725 | 1452 | 4.30 | 3.21 | 2.70 |
| ST-G4 | | 12.02 | 806 | 1614 | 5.37 | 3.84 | 2.80 |
| ST-G5 | | 8.02 | 887 | 1776 | 3.45 | 2.71 | 1.86 |
| ST-G8 | | 5.85 | 968 | 1938 | 2.58 | 1.94 | 1.33 |
| ST-G7 | | 2.24 | 1049 | 2100 | 1.00 | 0.77 | 0.46 |
| ST-G8 | | 5.83 | 1130 | 2262 | 2.65 | 1.89 | 1.29 |
| ST-G9 | | 4.69 | 1211 | 2424 | 1.97 | 1.55 | 1.16 |
| ST-G10 | | 3.74 | 1292 | 2586 | 1.58 | 1.28 | 0.88 |
| ST-G11 | | 1.65 | 1373 | 2748 | 0.75 | 0.57 | 0.33 |
| Total GSG | 75 | 74.25 | 1454 | 2910 | 34.30 | 24.65 | 15.30 |
| Stevioside | 6 | 6.56 | | | | | |
| SGs | 4 | | | | | | |
| Dextrin | 20 | <=20 | | | | | |

Figure 21:
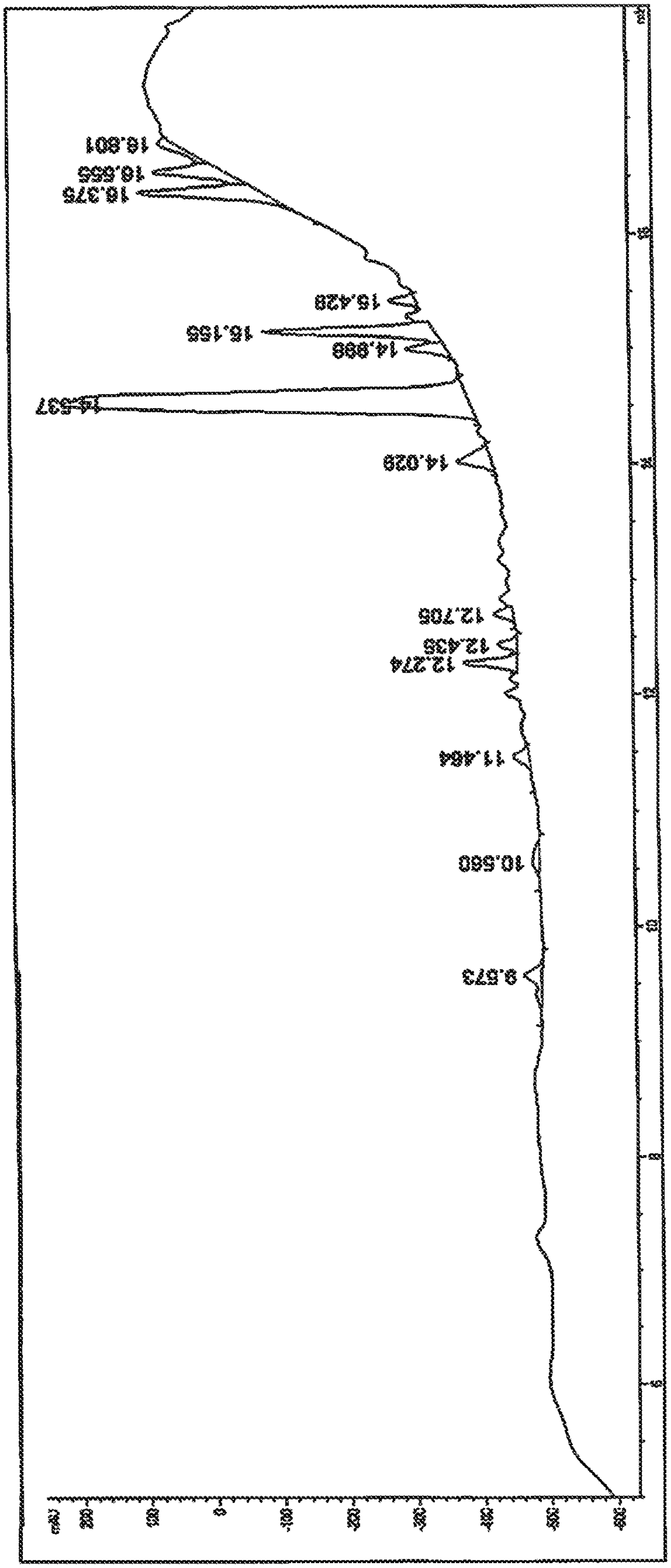
FIG. 21 is an optimized HPLC spectrum of GSG-RA40.

*estimated from chromatogram comparison of Reb-A GSGs to STV GSGs
estimated from unique mass of Reb-C fragment GSG-RA40 was characterized by HPLC-MS (FIG. 21**) and the ratios of GSGs are shown in Table 32.

TABLE 32

| Basic structure | GSG (% m/m) | Mass fragment $[M-2H^+]^{-2}$ | Mass fragment $[M-H^+]^{-1}$ | R-A derived (% m/m) | Stev derived (% m/m) |
|---|---|---|---|---|---|
| ST-G1 | 0.02 | 563 | 1128 | 0.01 | 0.00 |
| ST-G2 | 5.89 | 644 | 1290 | 4.71 | 1.18 |
| ST-G3 | 1.14 | 725 | 1452 | 0.91 | 0.23 |
| ST-G4 | 0.09 | 806 | 1614 | 0.07 | 0.02 |
| ST-G5 | 0.82 | 887 | 1776 | 0.65 | 0.16 |
| ST-G6 | 1.60 | 968 | 1938 | 1.28 | 0.32 |
| ST-G7 | 0.85 | 1049 | 2100 | 0.68 | 0.17 |
| ST-G8 | 2.71 | 1130 | 2262 | 2.17 | 0.54 |
| ST-G9 | 0.72 | 1211 | 2424 | 0.58 | 0.14 |

TABLE 32-continued

| Basic structure | GSG (% m/m) | Mass fragment $[M-2H^+]^{-2}$ | Mass fragment $[M-H^+]^{-1}$ | R-A derived (% m/m) | Stev derived (% m/m) |
|---|---|---|---|---|---|
| ST-G10 | 0.38 | 1292 | 2586 | 0.31 | 0.08 |
| ST-G11 | 1.15 | 1373 | 2748 | 0.92 | 0.23 |
| unidentified | 7.0 | | | | |
| Total GSG | 22.4 | | | | |
| Reb-A/Stev | 53.6 | | | | |

Figure 22:
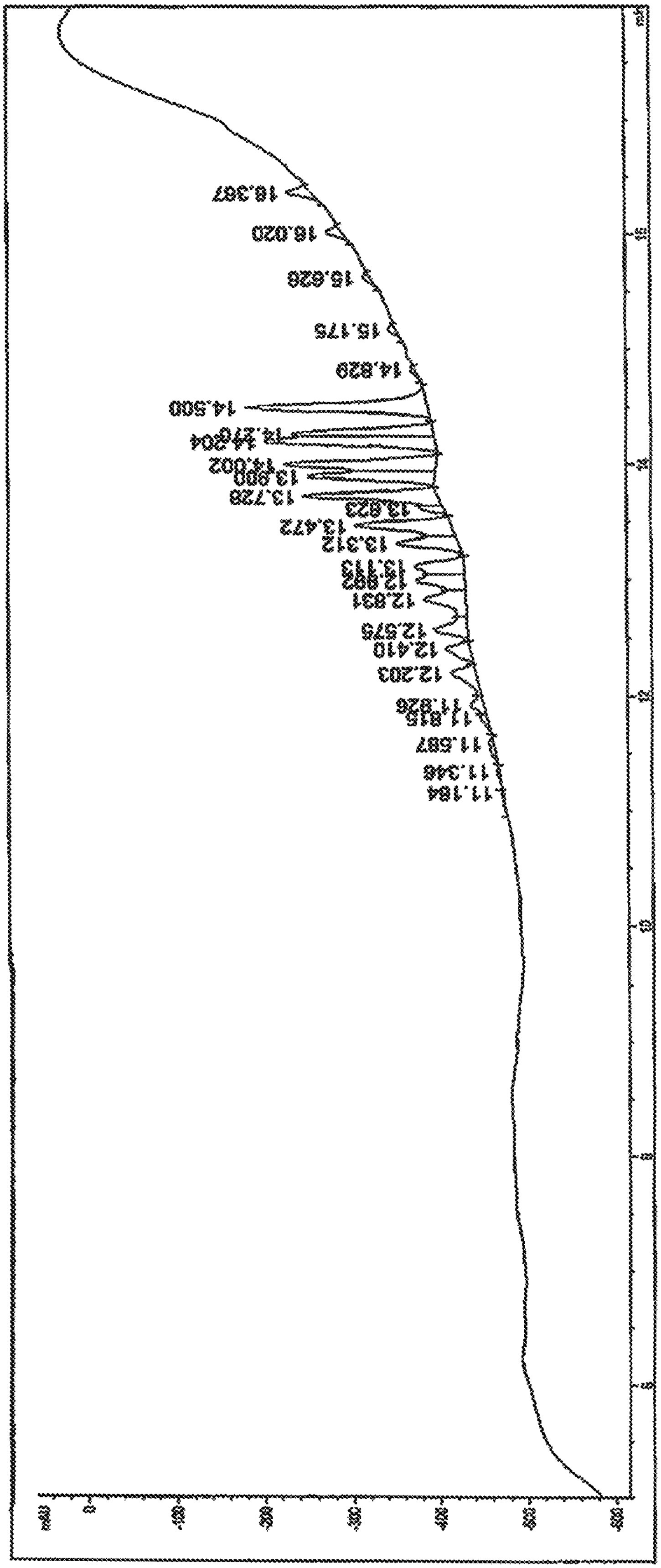
FIG. 22 is an optimized HPLC spectrum of GSG-RA85.

GSG-RA85 was characterized by HPLC-MS (FIG. 22) and the ratios of GSGs are shown in Table 33A.

TABLE 33A

| Basic structure | R-A derived (% m/m) | Mass fragment $[M-2H^+]^{-2}$ | Mass fragment $[M-H^+]^{-1}$ |
|---|---|---|---|
| ST-G1 | 1.36 | 563 | 1128 |
| ST-G2 | 13.77 | 644 | 1290 |
| ST-G3 | 20.87 | 725 | 1452 |
| ST-G4 | 20.70 | 806 | 1614 |
| ST-G5 | 4.14 | 887 | 1776 |
| ST-G6 | 4.29 | 968 | 1938 |
| ST-G7 | 1.82 | 1049 | 2100 |
| ST-G8 | 1.87 | 1130 | 2262 |
| ST-G9 | 0.67 | 1211 | 2424 |
| ST-G10 | 0.45 | 1292 | 2586 |
| ST-G11 | 0.60 | 1373 | 2748 |
| Total GSG | 70.5 | 1454 | 2910 |
| Reb-A | 1.8 | 482 | 965 |

Figure 23:
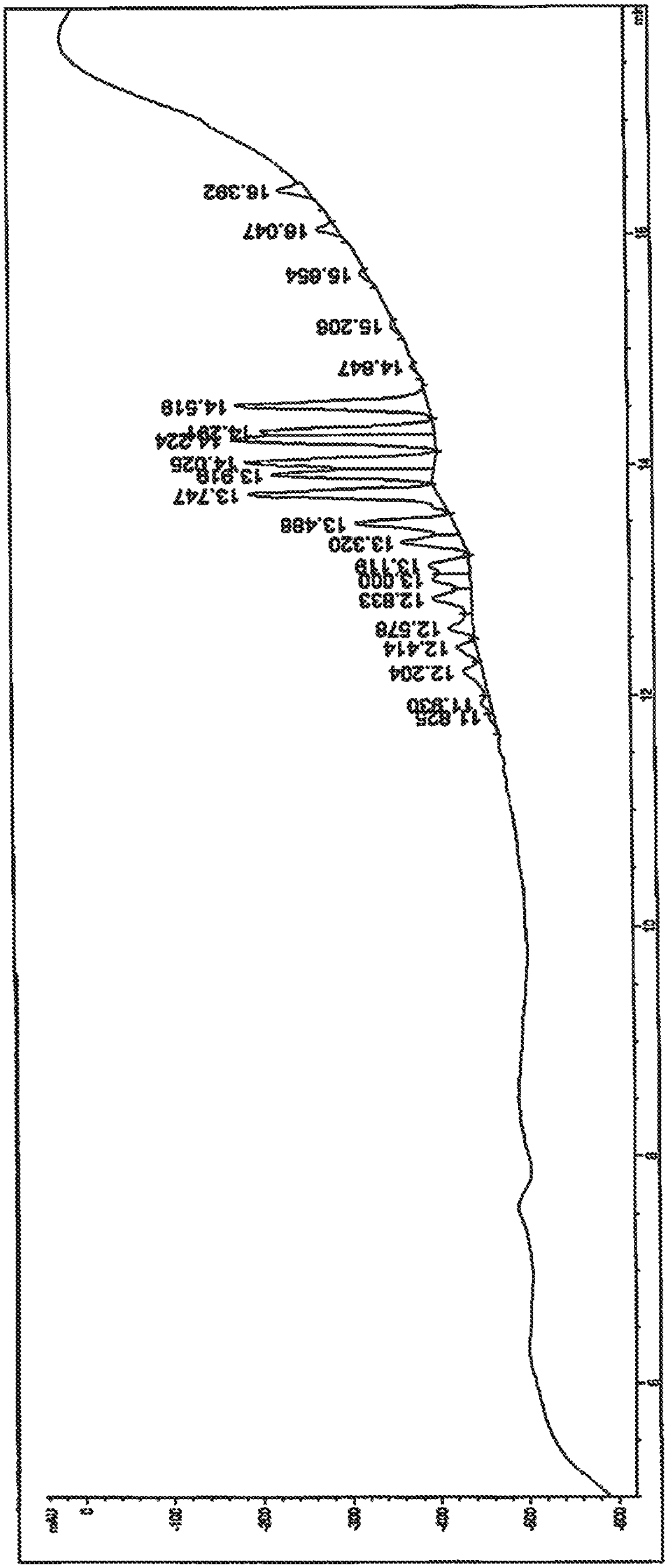
FIG. 23 is an optimized HPLC spectrum of GSG-RA90.

GSG-RA90 was characterized by HPLC-MS (FIG. 23) and the ratios of GSGs are shown in Table 33B.

TABLE 33B

| Basic structure | R-A derived (% m/m) | Mass fragment $[M-2H^+]^{-2}$ | Mass fragment $[M-H+]^{-1}$ |
|---|---|---|---|
| ST-G1 | 1.28 | 563 | 1128 |
| ST-G2 | 17.76 | 644 | 1290 |
| ST-G3 | 24.22 | 725 | 1452 |
| ST-G4 | 16.26 | 806 | 1614 |
| ST-G5 | 7.04 | 887 | 1776 |
| ST-G6 | 3.46 | 968 | 1938 |
| ST-G7 | 1.39 | 1049 | 2100 |
| ST-G8 | 1.51 | 1130 | 2262 |
| ST-G9 | 0.42 | 1211 | 2424 |
| ST-G10 | 0.31 | 1292 | 2586 |
| ST-G11 | 0.28 | 1373 | 2748 |
| Total GSG | 73.9 | 1454 | 2910 |
| Reb-A | 1.7 | 482 | 965 |

Example 18. Synergistic Effects of GSG-RA50 with RA97

Figure 24:
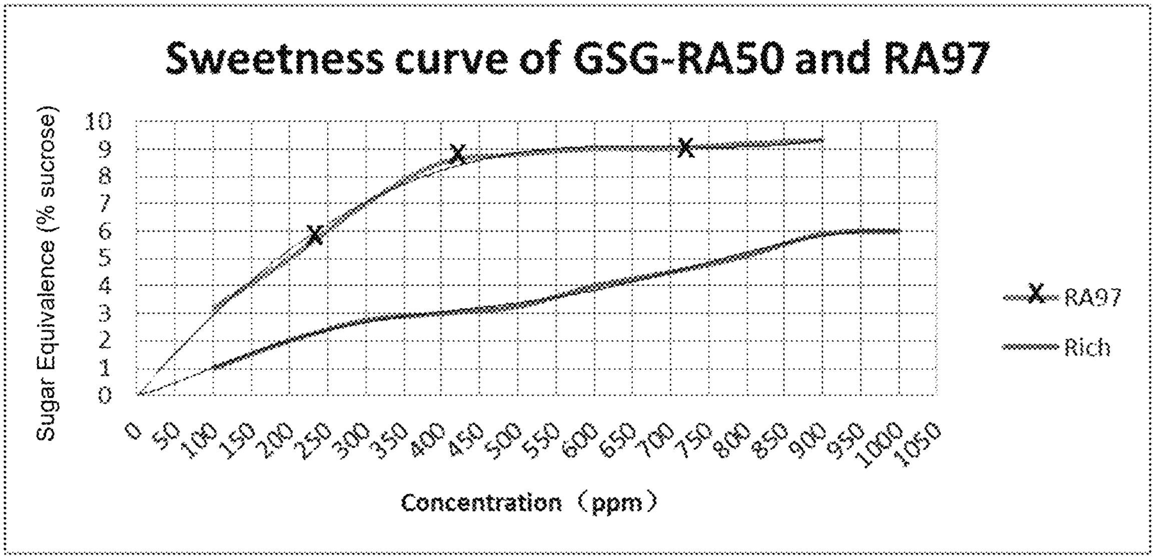
FIG. 24 is a graphical illustration showing the sweetness curve of GSG-RA50 and RA97.

A sweetness curve was prepared for GSG-RA50 and RA97 compositions (FIG. 24), and the taste profiles of 200 ppm total solid content samples were taken as shown in Table 34.

TABLE 34

| RA97 (ppm) | Calc. SE of RA97 | GSG-RA50 (ppm) | Calc. SE of GSG-RA50 | Calc. SE of the composition | Measured SE of the composition | Calc. sweetness (ppm sugar) of GSG-RA50 per ppm | Measured sweetness (ppm sugar)of GSG-RA50 per ppm | total GSG |
|---|---|---|---|---|---|---|---|---|
| 150 | 4.2% | 50 | 0.5% | 4.70% | 5.00% | 100 | 160.00 | 22.34% |
| 100 | 3.0% | 100 | 1.0% | 4.00% | 5.00% | 100 | 200.00 | 44.68% |
| 50 | 1.5% | 150 | 1.5% | 3.00% | 4.50% | 100 | 200.00 | 67.01 |

Calculated sweetness (ppm sugar) of GSG-RA50 per ppm=calculated SE of GSG-RA50/concentration of GSG-RA50. Measured sweetness (ppm sugar) of GSG-RA50 per ppm=(Measured SE-calculated SE of RA97)/concentration of GSG-RA50.

Figure 25:
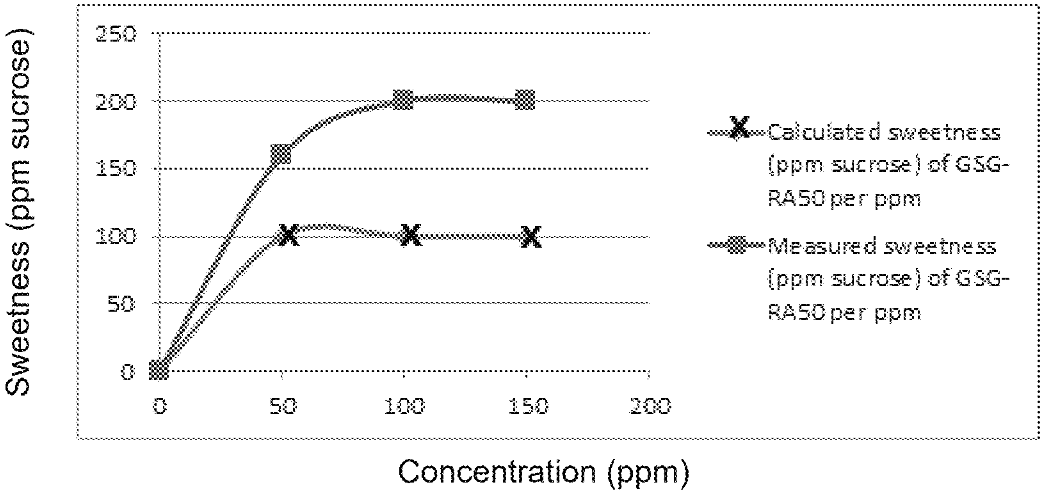
FIG. 25 is a graphical illustration showing the calculated and measured sweetness of GSG-RA50 per ppm in 200 ppm GSG-RA50 and RA97 compositions.

Conclusion: At 200 ppm total solid content, increasing the amount of GSG-RA50 results in a measured contribution to sweetness that was higher than the calculated value as shown in FIG. 25. A positive synergistic sweetness effect was found when GSG-RA50>50 ppm.

The samples with total solid content of 350 ppm are shown in Table 35. For samples 2-1 and 2-2, the concentrations of both glucose and salt were higher than for samples 1-1 and 1-2, and the difference between the samples was significant. For samples 3-1 and 3-2, the concentration of RB in the product was high, lowering the overall sweetness. The difference between the samples was not significant.

TABLE 35

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 350 | — | — | — | — | 8% | 0 | 0 |
| 300 | 6.9% | 50 | 0.5% | 7.4% | 7% | 100 | 20.00 |
| 250 | 6% | 100 | 1% | 7% | 8% | 100 | 200.00 |

TABLE 35-continued

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 200 | 5% | 150 | 1.5% | 6.5% | 7.8% | 100 | 186.67 |
| 150 | 4.2% | 200 | 2% | 6.2% | 7% | 100 | 140.00 |
| 100 | 3% | 250 | 2.4% | 5.4% | 7% | 96 | 160.00 |

Figure 26:
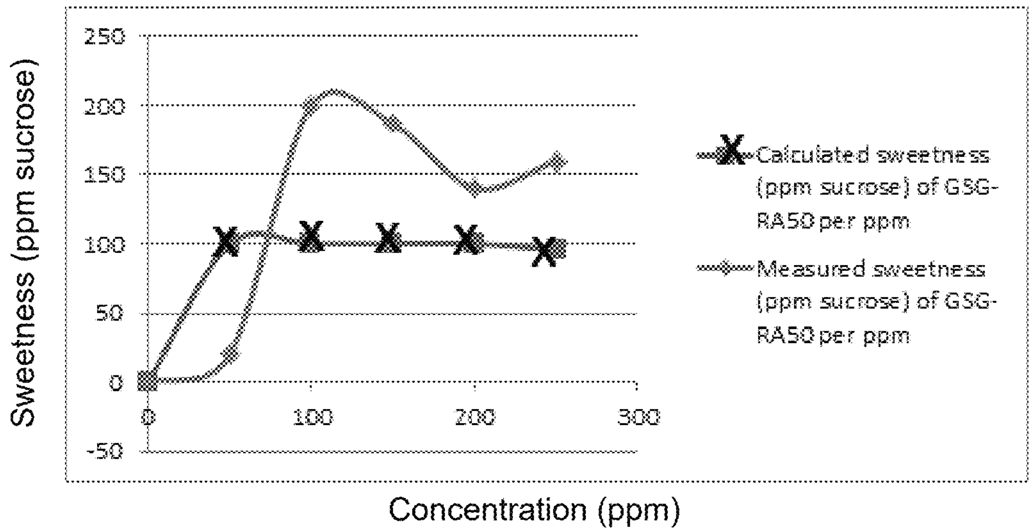
FIG. 26 is a graphical illustration showing the calculated and measured sweetness of GSG-RA50 per ppm in 350 ppm GSG-RA50 and RA97 compositions.

Conclusion: At 350 ppm total solid content, increasing the amount of GSG-RA50 results in a measured contribution of sweetness that was higher than the calculated value as shown in FIG. 26. A positive synergistic sweetness effect was found when GSG-RA50.gtoreq. 100 ppm, with an optimal range of 100-150 ppm.

The samples with total solid content of 400 ppm are shown in Table 36.

TABLE 36

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 300 | 6.9% | 100 | 1% | 7.9% | 8% | 100 | 110.00 |
| 250 | 6% | 150 | 1.5% | 7.5% | 8.2% | 100 | 146.67 |
| 200 | 5% | 200 | 2% | 7% | 8% | 100 | 150.00 |
| 150 | 4.2% | 250 | 2.4% | 6.6% | 7.5% | 96 | 132.00 |
| 100 | 3% | 300 | 2.75% | 5.75% | 7.5% | 91.7 | 150.00 |

Figure 27:
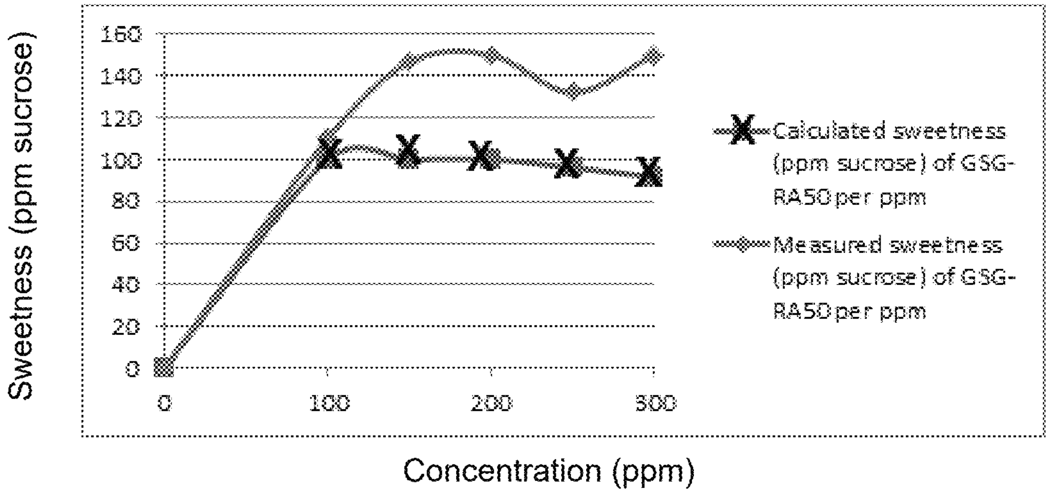
FIG. 27 is a graphical illustration showing the calculated and measured sweetness of GSG-RA50 per ppm in 400 ppm GSG-RA50 and RA97 compositions.

Conclusion: At 400 ppm total solid content, increasing the amount of GSG-RA50 results in a measured contribution of sweetness that was higher than the calculated value as shown in FIG. 27. A positive synergistic sweetness effect was found when GSG-RA50>100 ppm.

The samples with total solid content of 450 ppm are shown in Table 37.

TABLE 37

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 300 | 6.9% | 150 | 1.5% | 8.4% | 8.5% | 100 | 106.67 |
| 250 | 6% | 200 | 2% | 8% | 8.5% | 100 | 125.00 |
| 200 | 5% | 250 | 2.4% | 7.4% | 8.5% | 96 | 140.00 |
| 150 | 4.2% | 300 | 2.75% | 6.95% | 7.5% | 91.7 | 110.00 |
| 100 | 3% | 350 | 3% | 6% | 7.5% | 85.7 | 128.57 |

Figure 28:
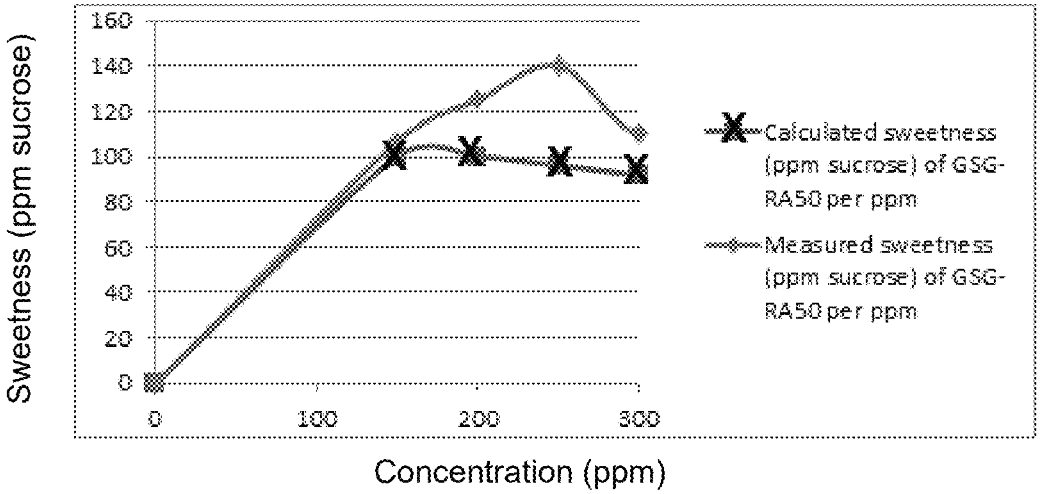
FIG. 28 is a graphical illustration showing the calculated and measured sweetness of GSG-RA50 per ppm in 450 ppm GSG-RA50 and RA97 compositions.

Conclusion: At 450 ppm total solid content, increasing the amount of GSG-RA50 results in a measured contribution of sweetness that was higher than the calculated value as shown in FIG. 28. A positive synergistic sweetness effect was found when GSG-RA50>150 ppm.

The samples with total solid content of 500 ppm are shown in Table 38.

TABLE 38

| RA97 (ppm) | Calc. SE of RA97 | GSG-RA50 (ppm) | Calc. SE of GSG-RA50 | Calc. SE of the composition | Measured SE of the composition | Calc. sweetness (ppm sucrose) of GSG-RA50 per ppm | Measured sweetness (ppm sucrose) of GSG-RA50 per ppm |
|---|---|---|---|---|---|---|---|
| 400 | 8.25% | 100 | 1% | 9.25% | 9% | 100 | 75.00 |
| 300 | 7% | 200 | 2% | 8.9% | 9% | 100 | 105.00 |
| 200 | 5% | 300 | 2.75% | 7.75% | 8% | 91.66667 | 100.00 |
| 100 | 3% | 400 | 3% | 6% | 7.5% | 75 | 112.50 |

Figure 29:
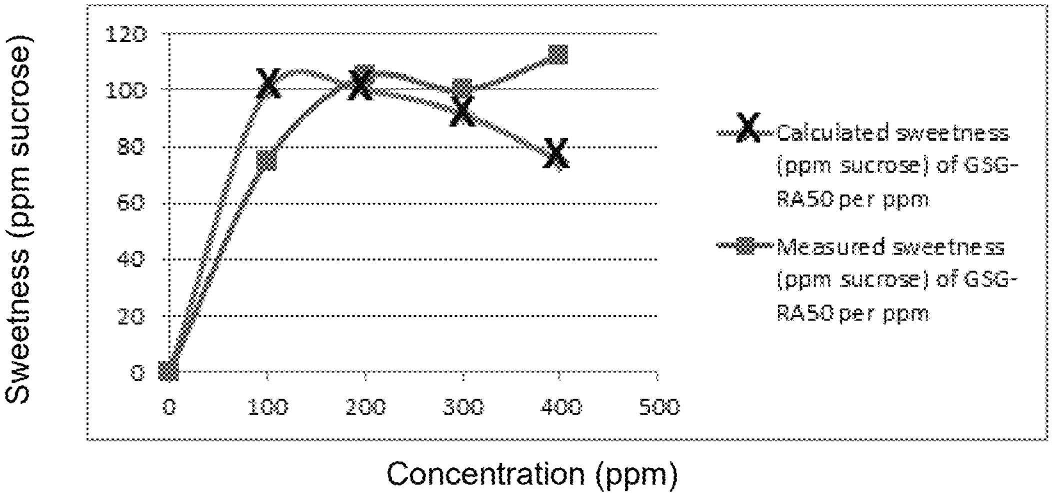
FIG. 29 is a graphical illustration showing the calculated and measured sweetness curves of 500 ppm GSG-RA50 and RA97 compositions.

Conclusion: At 500 ppm total solid content, increasing the amount of GSG-RA50 results in a measured contribution of sweetness that was higher than the calculated value as shown in FIG. 29. A positive synergistic sweetness effect was found when GSG-RA50>200 ppm.

Example 19. Synergistic Effects of GSG-RA60 with RA97

Figure 30:
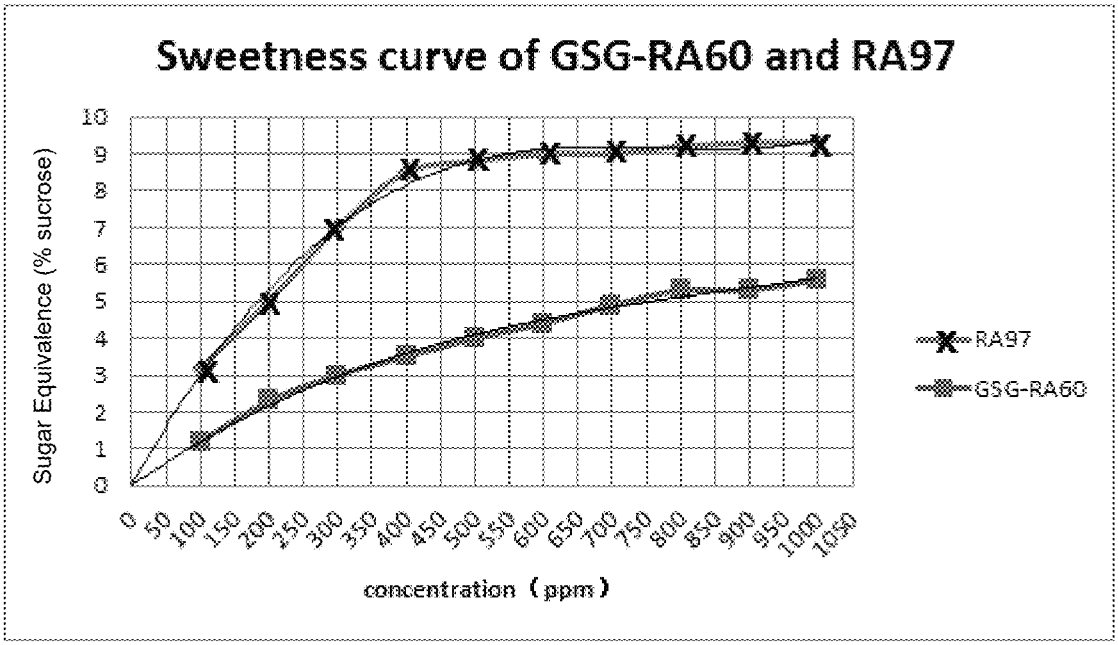
FIG. 30 is a graphical illustration showing the sweetness curve of GSG-RA60 and RA97.

A sweetness curve was prepared for GSG-RA60 and RA97 compositions (FIG. 30), and the taste profiles of 350 ppm total solid content samples were taken as shown in Table 39.

TABLE 39

| RA97 (ppm) | Calc. SE of RA97 | GSG-RA50 (ppm) | Calc. SE of GSG-RA60 | Calc. SE of the composition | Measured SE of the composition | Calc. sweetness (ppm sugar) of GSG-RA60 per ppm | Measured sweetness (ppm sugar) of GSG-RA60 per ppm | total GSG |
|---|---|---|---|---|---|---|---|---|
| 300 | 6.9% | 50 | 0.6% | 7.5% | 7.2% | 120 | 60.00 | 12.81% |
| 250 | 6% | 100 | 1.2% | 7.2% | 6.8% | 120 | 80.00 | 25.61% |
| 200 | 5% | 150 | 1.8% | 6.8% | 7.2% | 120 | 146.67 | 38.42% |
| 150 | 4% | 200 | 2.3% | 6.3% | 7.5% | 115 | 175.00 | 51.22% |
| 100 | 3.2% | 250 | 2.7% | 5.9% | 7.5% | 108 | 172.00 | 64.03% |
| 50 | 1.5% | 300 | 3% | 4.5% | 6% | 100 | 150.00 | 76.83% |

Calculated sweetness (ppm sugar) of GSG-RA60 per ppm=calculated SE of GSG-RA60/concentration of GSG-RA60. Measured sweetness (ppm sugar) of GSG-RA60 per ppm=(Measured SE-calculated SE of RA97)/concentration of GSG-RA60.

Figure 31:
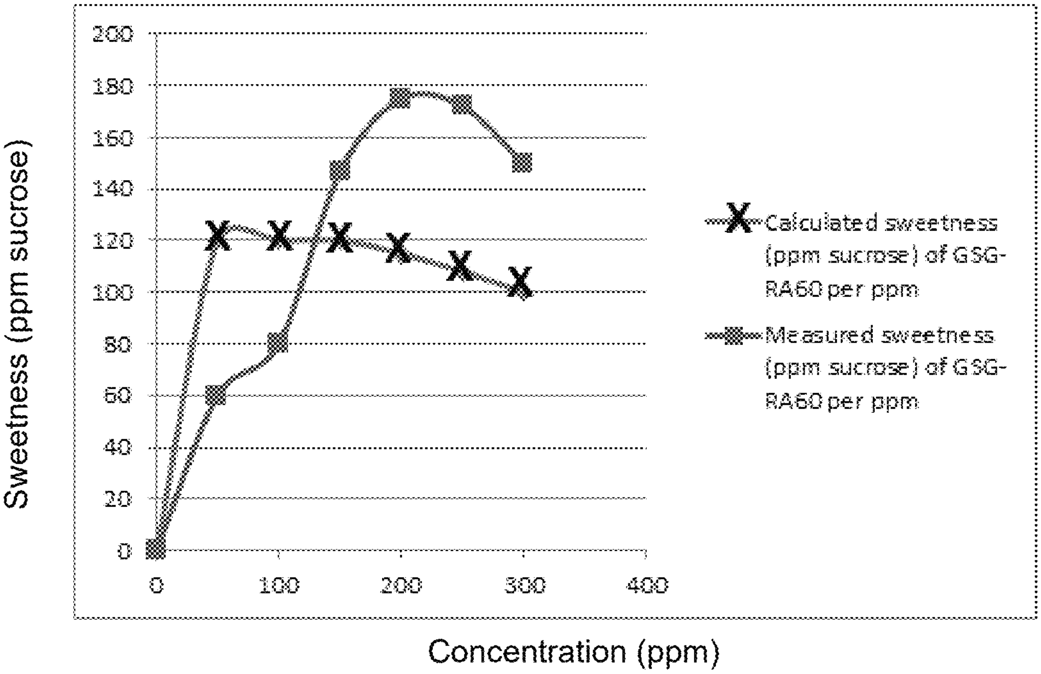
FIG. 31 is a graphical illustration showing the calculated and measured sweetness of GSG-RA60 per ppm in 350 ppm GSG-RA60 and RA97 compositions.

Conclusion: At 350 ppm total solid content, increasing the amount of GSG-RA60 results in a measured contribution of sweetness that rises continuously as shown in FIG. 31. When the concentration of GSG-RA60 is more than 150 ppm, the measured contribution of sweetness is higher than calculated. A positive synergistic sweetness effect was found when the concentration of GSG-RA60 was 150-300 ppm.

Example 20. Synergistic Effects of GSG-RA70 with RA97

Figure 32:
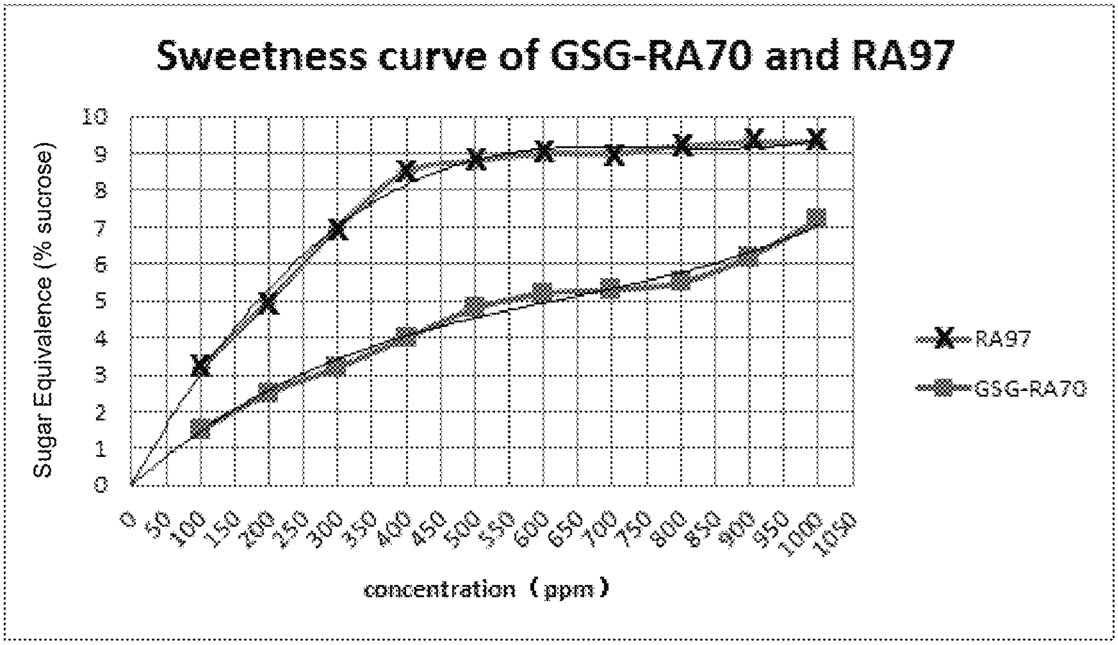
FIG. 32 is a graphical illustration showing the sweetness curve of GSG-RA70 and RA97.

A sweetness curve was prepared for GSG-RA70 and RA97 compositions (FIG. 32), and the taste profiles of 350 ppm total solid content samples were taken as shown in Table 40.

TABLE 40

| RA97 (ppm) | Calc. SE of RA97 | GSG-RA70 (ppm) | Calc. SE of GSG-RA70 | Calc. SE of the composition | Measured SE of the composition | Calc. sweetness (ppm sugar) of GSG-RA70 per ppm | Measured sweetness (ppm sugar) of GSG-RA70 per ppm | total GSG |
|---|---|---|---|---|---|---|---|---|
| 300 | 6.9% | 50 | 0.8% | 7.7% | 7.2% | 160 | 60.00 | 12.84% |
| 250 | 6% | 100 | 1.5% | 7.5% | 7% | 150 | 100.00 | 25.69% |
| 200 | 5% | 150 | 2% | 7% | 7.5% | 133 | 166.67 | 38.53% |
| 150 | 4% | 200 | 2.5% | 6.5% | 7.5% | 125 | 175.00 | 51.37% |
| 100 | 3.2% | 250 | 3% | 6.2% | 7% | 120 | 152.00 | 64.21% |
| 50 | 1.5% | 300 | 3% | 5.1% | 6% | 120 | 150.00 | 77.06% |

Calculated sweetness (ppm sugar) of GSG-RA70 per ppm=calculated SE of GSG-RA70/concentration of GSG-RA70. Measured sweetness (ppm sugar) of GSG-RA70 per ppm=(Measured SE-calculated SE of RA97)/concentration of GSG-RA70.

Figure 33:
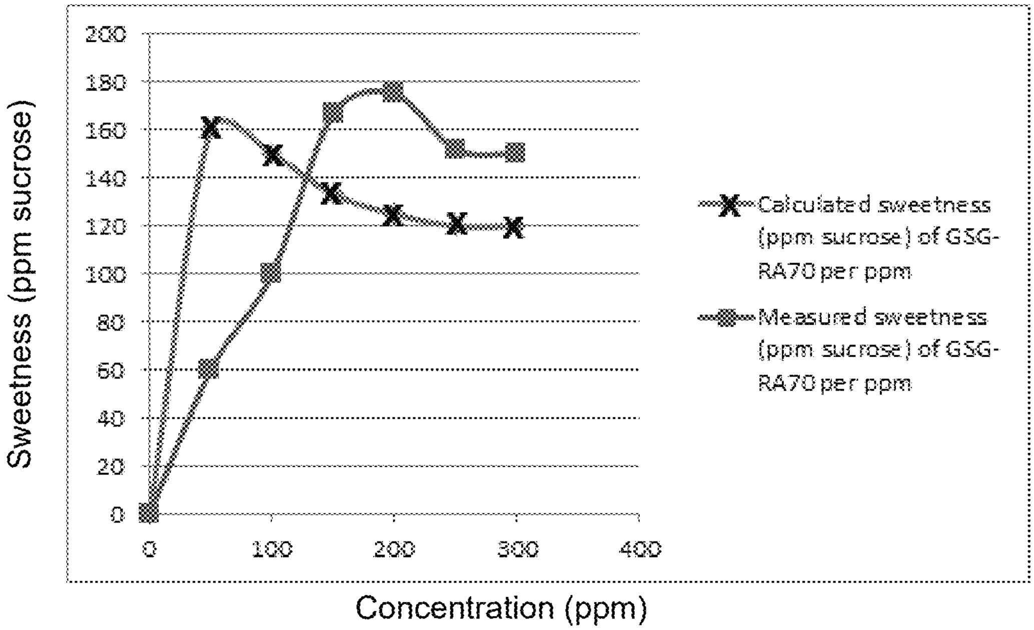
FIG. 33 is a graphical illustration showing the calculated and measured sweetness of GSG-RA70 per ppm in 350 ppm GSG-RA70 and RA97 compositions.

Conclusion: At 350 ppm total solid content, increasing the amount of GSG-RA70 results in a measured contribution of sweetness that rises continuously as shown in FIG. 33. When the concentration of GSG-RA70 is more than 150 ppm, the measured contribution of sweetness is higher than calculated. A positive synergistic sweetness effect was found when the concentration of GSG-RA70 was 150-200 ppm.

Sample 2 was prepared and formulated into 300 ppm solution, with RA, RB, NaCl, and glucose.

Example 21. Synergistic Effects of GSG-RA80 with RA97

Figure 34:
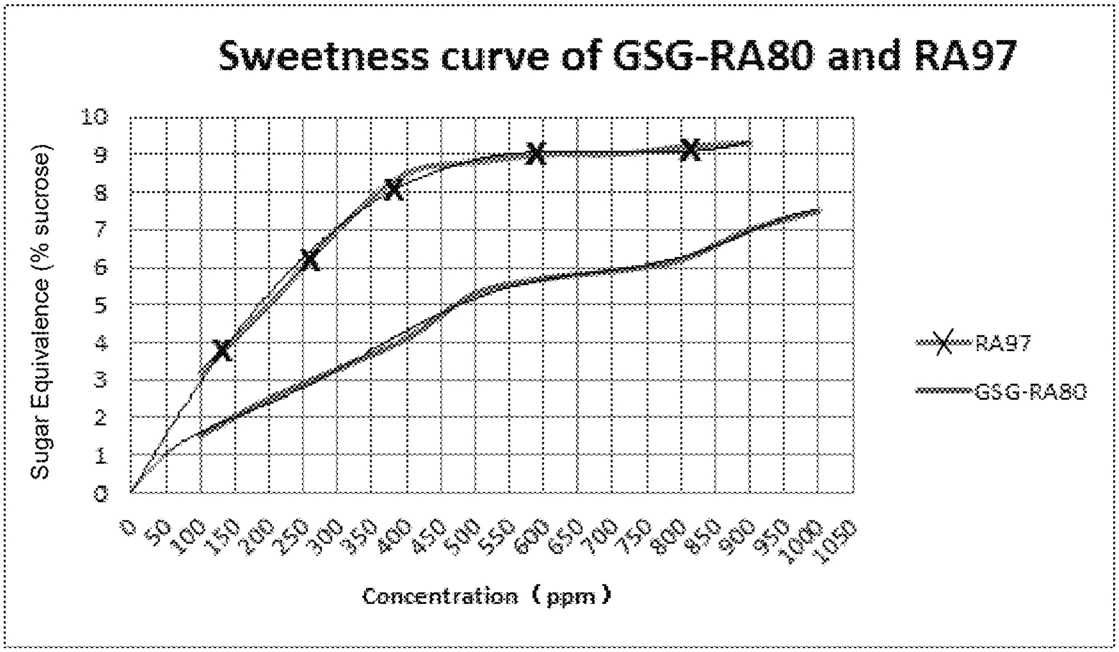
FIG. 34 is a graphical illustration showing the sweetness curve of GSG-RA80 and RA97.

A sweetness curve was prepared for GSG-RA80 and RA97 compositions (FIG. 34), and the taste profiles of 350 ppm total solid content samples were taken as shown in Table 41.

TABLE 41

| RA97 (ppm) | GSG-RA80 (ppm) | Total solid content (ppm) | SE | Sugar like | Bitterness | After-taste | Lingering | total GSG |
|---|---|---|---|---|---|---|---|---|
| 350 | — | 350 | 8% | 3 | 2 | 3 | 4 | |
| 300 | 50 | 350 | 7.5% | 4 | 0 | 1 | 2 | 12.71% |
| 250 | 100 | 350 | 8% | 4 | 0 | 0.5 | 2 | 25.43% |
| 200 | 150 | 350 | 7.8% | 4.5 | 0 | 0 | 2 | 38.14% |
| 150 | 200 | 350 | 7.2% | 4 | 0 | 0 | 2 | 50.86% |
| 100 | 250 | 350 | 7% | 4 | 0 | 0 | 2 | 63.57% |

At 350 ppm total solid content, a synergistic effect was found at a range of 200-250 ppm RA97 and 100-150 ppm GSG-RA80.

The sweetness of GSG-RA80 or RA97 at each concentration was read according to the sweetness curve, and the combined sweetness of each composition of GSG-RA80 and RA97 was calculated and compared with measured value in Table 42.

TABLE 42

| RA97 (ppm) | Calc. SE of RA97 | GSG-RA80 | Calc. SE of GSG-RA80 | Calc. SE of the composition | Measured SE of the composition | Calc. sweetness (ppm sugar) of GSG-RA80 per ppm | Measured sweetness (ppm sugar) of GSG-RA80 per ppm |
|---|---|---|---|---|---|---|---|
| 350 | — | — | — | — | 8% | 0 | 0 |
| 300 | 6.9% | 50 | 1% | 7.9% | 7.5% | 200 | 120 |
| 250 | 6% | 100 | 1.5% | 7.5% | 8% | 150 | 200 |
| 200 | 5% | 150 | 2% | 7% | 7.8% | 133.33 | 186.67 |
| 150 | 4.2% | 200 | 2.5% | 6.7% | 7.2% | 125 | 150 |
| 100 | 3% | 250 | 3% | 6% | 7% | 120 | 160 |

Calculated sweetness (ppm sucrose) of GSG-RA80 per ppm=calculated SE of GSG-RA80/concentration of GSG-RA80. Measured sweetness (ppm sucrose) of GSG-RA80 per ppm=(Measured SE-calculated SE of RA97)/concentration of GSG-RA80.

Figure 35:
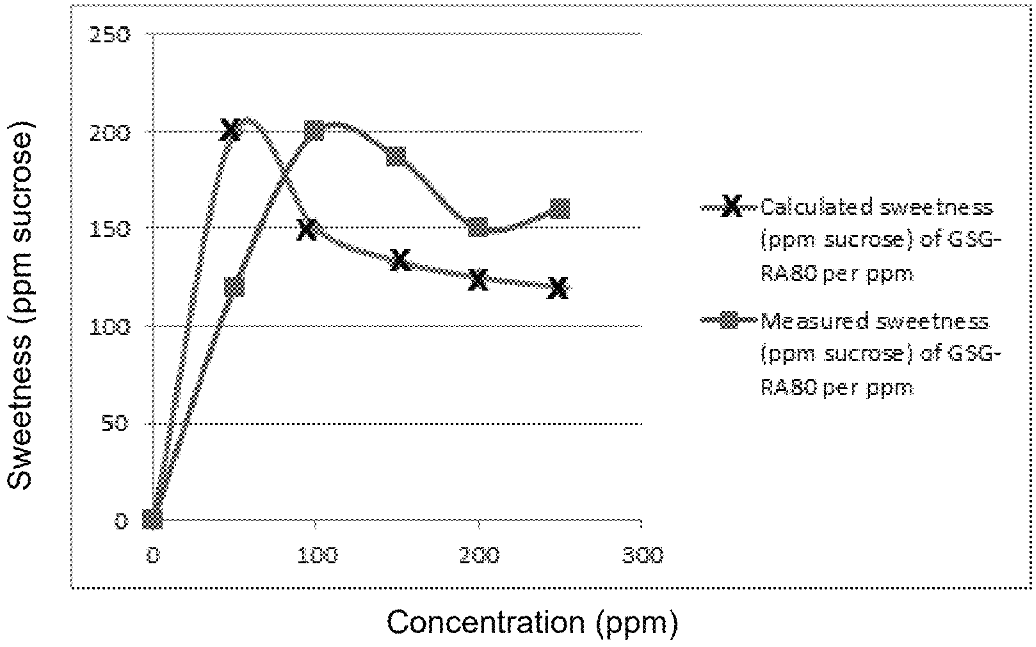
FIG. 35 is a graphical illustration showing the calculated and measured sweetness of GSG-RA80 per ppm in 350 ppm GSG-RA80 and RA97 compositions.

Conclusion: At 350 ppm total solid content, increasing the amount of GSG-RA80 results in a measured contribution of sweetness that rises continuously as shown in FIG. 35. When the concentration of GSG-RA80 is more than 100 ppm, the measured contribution of sweetness is higher than calculated. A positive synergistic sweetness effect was found when the concentration of GSG-RA80 was more than 100 ppm.

Example 22. Synergistic Effects of GSG-RA90 with RA97

Figure 36:
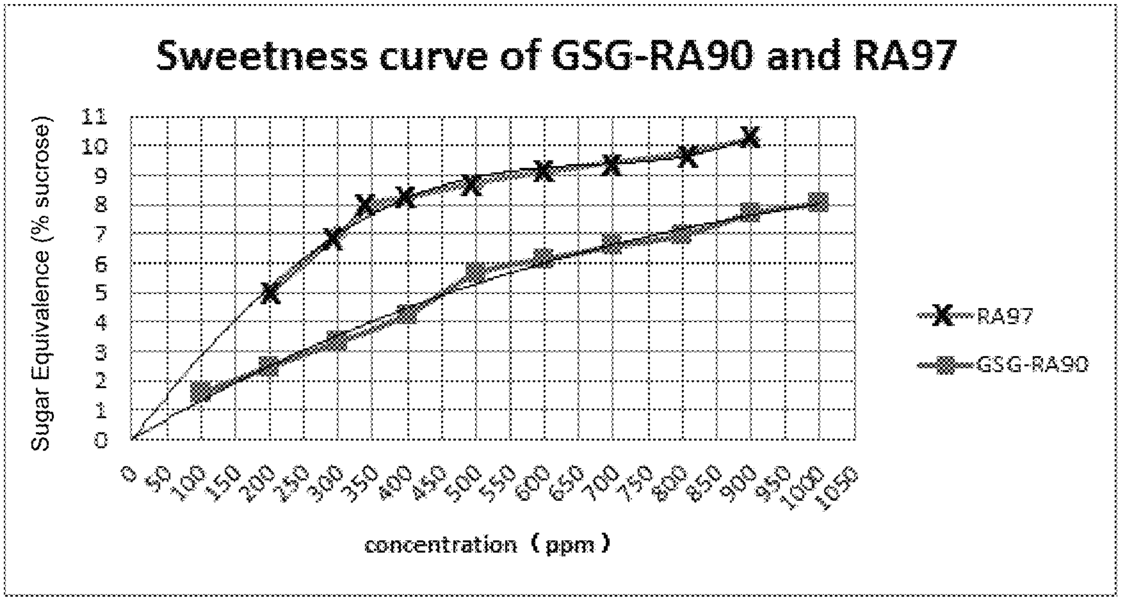
FIG. 36 is a graphical illustration showing the sweetness curve of GSG-RA90 and RA97.

A sweetness curve was prepared for GSG-RA90 and RA97 compositions (FIG. 36), and the taste profiles of 350 ppm total solid content samples were taken as shown in Table 43.

TABLE 43

| RA97 (ppm) | Calc. SE of RA97 | GSG-RA90 (ppm) | Calc. SE of GSG-RA90 | Calc. SE of the composition | Measured SE of the composition | Calc. sweetness (ppm sugar) of GSG-RA90 per ppm | Measured sweetness (ppm sugar)of GSG-RA90 per ppm | total GSG |
|---|---|---|---|---|---|---|---|---|
| 300 | 6.9% | 50 | 0.7% | 7.6% | 7.2% | 140 | 60.00 | 12.87% |
| 250 | 6% | 100 | 1.6% | 7.6% | 7% | 160 | 100.00 | 25.73% |
| 200 | 5% | 150 | 2% | 7% | 7.5% | 133 | 166.67 | 38.60% |
| 150 | 4% | 200 | 2.5% | 6.5% | 7.5% | 125 | 175.00 | 51.47% |
| 100 | 3.2% | 250 | 3% | 6.2% | 7% | 120 | 152.00 | 64.34% |
| 50 | 1.5% | 300 | 3.2% | 4.7% | 6% | 107 | 150.00 | 77.20% |

Calculated sweetness (ppm sugar) of GSG-RA90 per ppm=calculated SE of GSG-RA90/concentration of GSG-RA90. Measured sweetness (ppm sugar) of GSG-RA90 per ppm=(Measured SE-calculated SE of RA97)/concentration of GSG-RA90.

Figure 37:
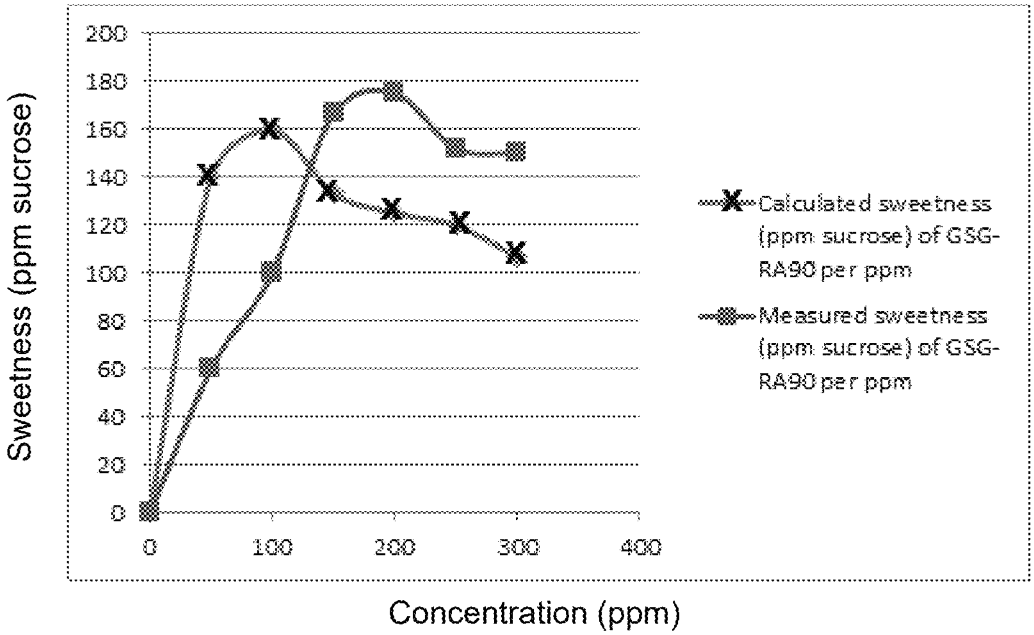
FIG. 37 is a graphical illustration showing the calculated and measured sweetness of GSG-RA90 per ppm in 350 ppm GSG-RA90 and RA97 compositions.

Conclusion: At 350 ppm total solid content, increasing the amount of GSG-RA90 results in a measured contribution of sweetness that rises continuously as shown in FIG. 37. When the concentration of GSG-RA90 is more than 150 ppm, the measured contribution of sweetness is higher than calculated. A positive synergistic sweetness effect was found when the concentration of GSG-RA90 was 150-200 ppm.

Example 23. Synergistic Effects of GSG-RA95 with RA97

Figure 38:
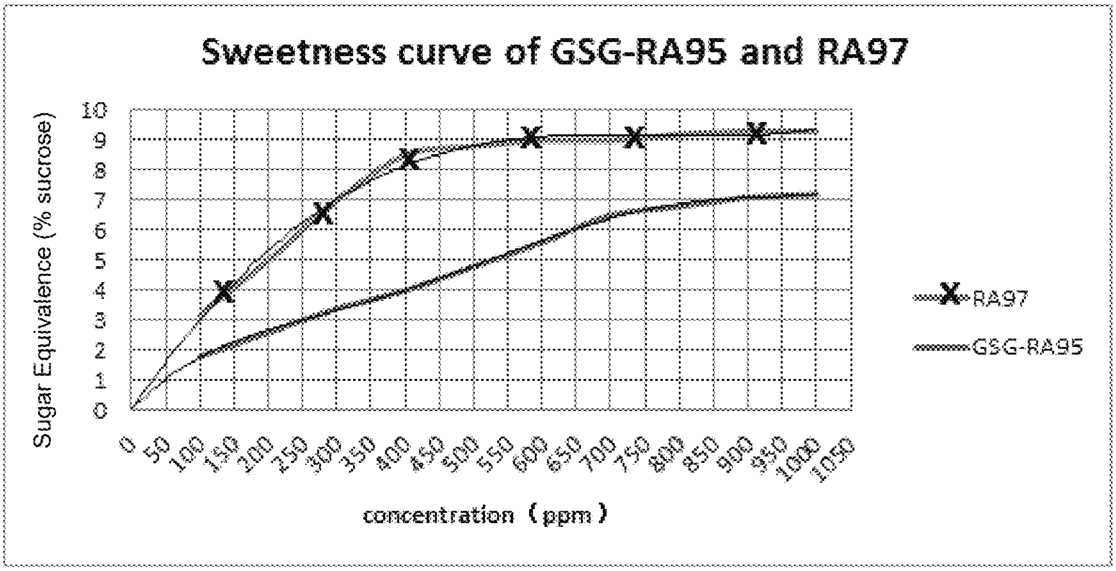
FIG. 38 is a graphical illustration showing the sweetness curve of GSG-RA95 and RA97.

A sweetness curve was prepared for GSG-RA95 and RA97 compositions (FIG. 38), and the taste profiles of 200 ppm total solid content samples were taken as shown in Table 44.

TABLE 44

| RA97 (ppm) | Calc. SE of RA97 | GSG-RA95 (ppm) | Calc. SE of GSG-RA95 | Calc. SE of the composition | Measured SE of the composition | Calc. sweetness (ppm sugar) of GSG-RA95 per ppm | Measured sweetness (ppm sugar)of GSG-RA95 per ppm | total GSG |
|---|---|---|---|---|---|---|---|---|
| 150 | 4.2% | 50 | 1% | 5.2% | 5% | 200 | 160.00 | 22.65% |
| 100 | 3% | 100 | 1.8% | 4.8% | 4.5% | 180 | 150.00 | 45.30% |
| 50 | 1.5% | 150 | 2.2% | 3.7% | 4% | 146.67 | 166.67 | 67.95% |

Calculated sweetness (ppm sugar) of GSG-RA95 per ppm=calculated SE of GSG-RA95/concentration of GSG-RA95. Measured sweetness (ppm sugar) of GSG-RA95 per ppm=(Measured SE-calculated SE of RA97)/concentration of GSG-RA95.

Figure 39:
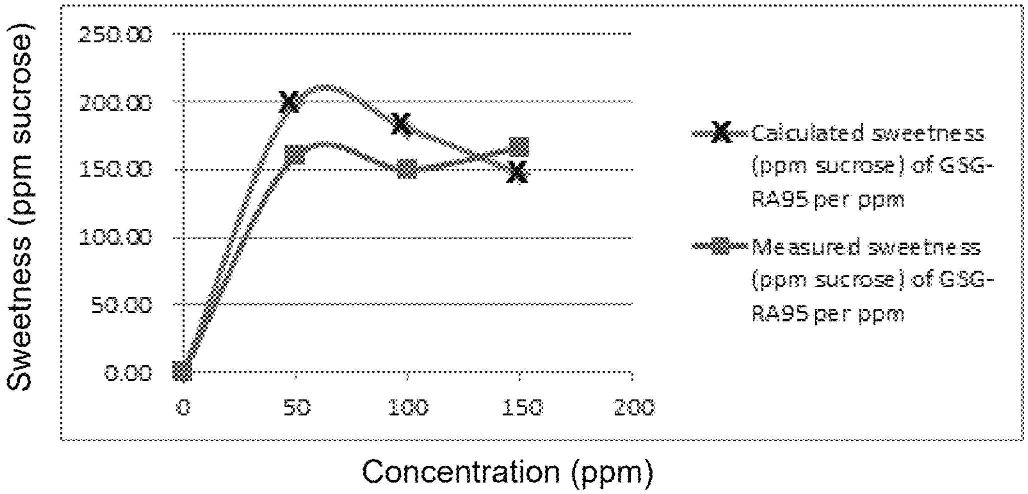
FIG. 39 is a graphical illustration showing the calculated and measured sweetness of GSG-RA95 per ppm in 200 ppm GSG-RA95 and RA97 compositions.

Conclusion: At 200 ppm total solid content, increasing the amount of GSG-RA95 results in a measured contribution to sweetness that was higher than the calculated value as shown in FIG. 39. A positive synergistic sweetness effect was found when GSG-RA95>100 ppm.

The samples with total solid content of 350 ppm are shown in Table 45.

TABLE 45

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 50 | 1% | 7.9% | 7% | 200 | 20.00 |
| 250 | 6% | 100 | 1.8% | 7.8% | 7.4% | 180 | 140.00 |
| 200 | 5% | 150 | 2.2% | 7.2% | 7.3% | 146.67 | 153.33 |
| 150 | 4% | 200 | 2.6% | 6.6% | 7.6% | 130 | 180.00 |
| 100 | 3.2% | 250 | 3% | 6.2% | 7.8% | 120 | 184.00 |
| 50 | 1.5% | 300 | 3.4% | 4.9% | 7.5% | 113.33 | 200.00 |

Figure 40:
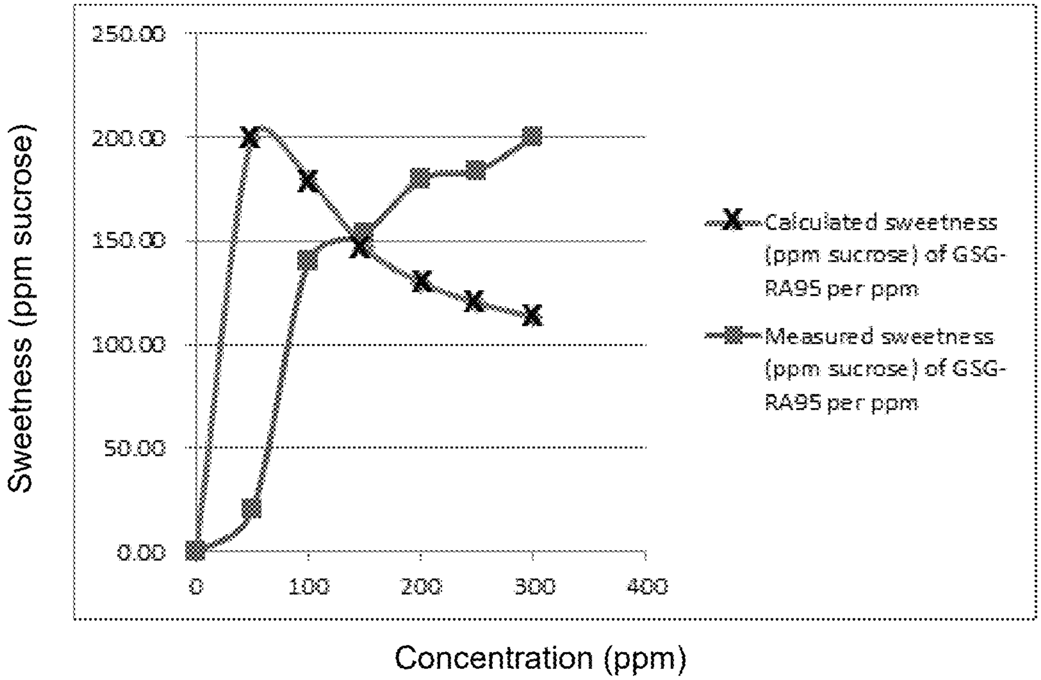
FIG. 40 is a graphical illustration showing the calculated and measured sweetness of GSG-RA95 per ppm in 350 ppm GSG-RA95 and RA97 compositions.

Conclusion: At 350 ppm total solid content, increasing the amount of GSG-RA95 results in a measured contribution of sweetness that was higher than the calculated value as shown in FIG. 40. A positive synergistic sweetness effect was found when GSG-RA95>150 ppm, specifically >200 ppm.

The samples with total solid content of 400 ppm are shown in Table 46.

TABLE 46

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 100 | 1.8% | 8.7% | 8% | 180 | 110.00 |
| 250 | 6% | 150 | 2.2% | 8.2% | 8.3% | 146.67 | 153.33 |
| 200 | 5% | 200 | 2.6% | 7.6% | 8.3% | 130 | 165.00 |
| 150 | 4.2% | 250 | 3% | 7.2% | 7.8% | 120 | 144.00 |
| 100 | 3% | 300 | 3.4% | 6.4% | 7.2% | 113.33 | 140.00 |

Figure 41:
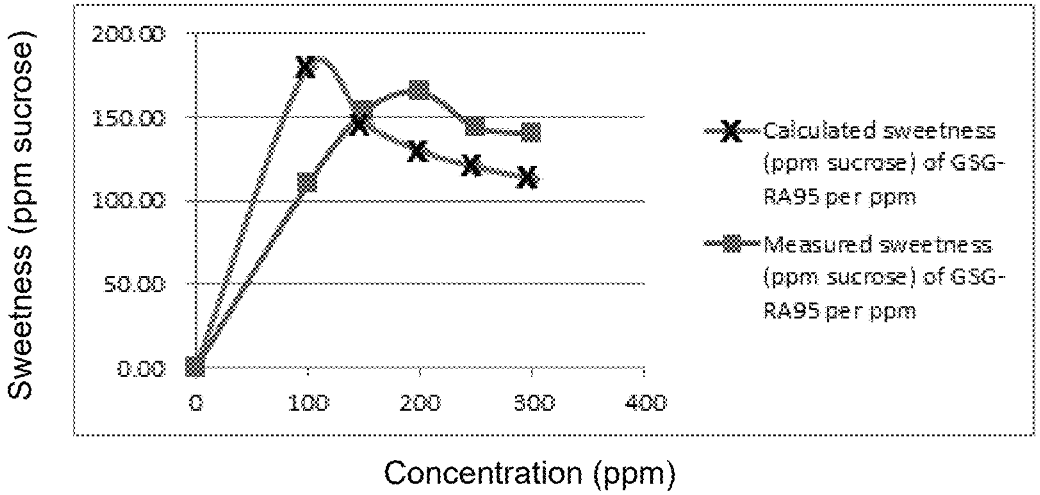
FIG. 41 is a graphical illustration showing the calculated and measured sweetness of GSG-RA95 per ppm in 400 ppm GSG-RA95 and RA97 compositions.

Conclusion: At 400 ppm total solid content, increasing the amount of GSG-RA50 results in a measured contribution of sweetness that was higher than the calculated value as shown in FIG. 41. A positive synergistic sweetness effect was found when GSG-RA95>150 ppm, with an optimal range of 150-200 ppm.

The samples with total solid content of 450 ppm are shown in Table 47.

TABLE 47

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 300 | 6.9% | 150 | 2.2% | 9.1% | 8.5% | 146.67 | 106.67 |
| 250 | 6% | 200 | 2.6% | 8.6% | 8.5% | 130.00 | 125.00 |
| 200 | 5% | 250 | 3% | 8% | 8.5% | 120.00 | 140.00 |
| 150 | 4.2% | 300 | 3.4% | 7.6% | 8% | 113.33 | 126.67 |
| 100 | 3% | 350 | 3.8% | 6.8% | 7.5% | 108.57 | 128.57 |

Figure 42:
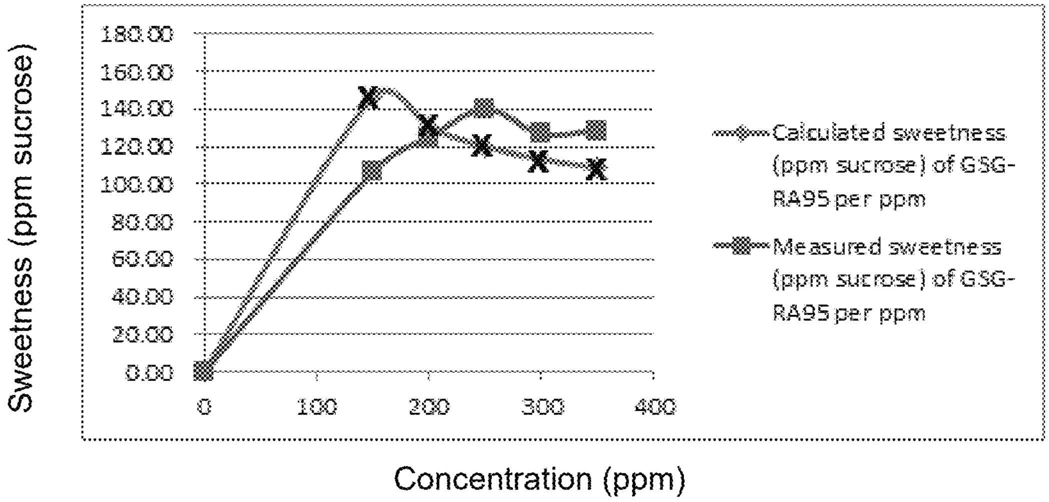
FIG. 42 is a graphical illustration showing the calculated and measured sweetness of GSG-RA95 per ppm in 450 ppm GSG-RA95 and RA97 compositions.

Conclusion: At 450 ppm total solid content, increasing the amount of GSG-RA50 results in a measured contribution of sweetness that was higher than the calculated value as shown in FIG. 42. A positive synergistic sweetness effect was found when GSG-RA50>200 ppm, with an optimal range about 250 ppm.

The samples with total solid content of 500 ppm are shown in Table 48.

TABLE 48

| RA97 (ppm) | Calc. SE of RA97 | GSG-RA95 (ppm) | Calc. SE of GSG-RA95 | Calc. SE of the composition | Measured SE of the composition | Calc. sweetness (ppm sucrose) of GSG-RA95 per ppm | Measured sweetness (ppm sucrose) of GSG-RA95 per ppm |
|---|---|---|---|---|---|---|---|
| 400 | 8.25% | 100 | 1.8% | 10.05% | 9% | 180 | 75.00 |
| 300 | 7% | 200 | 2.6% | 9.5% | 9.8% | 130 | 145.00 |
| 200 | 5% | 300 | 3.4% | 8.4% | 9.2% | 113 | 140.00 |
| 100 | 3% | 400 | 4% | 7% | 8.2% | 100 | 130.00 |

Figure 43:
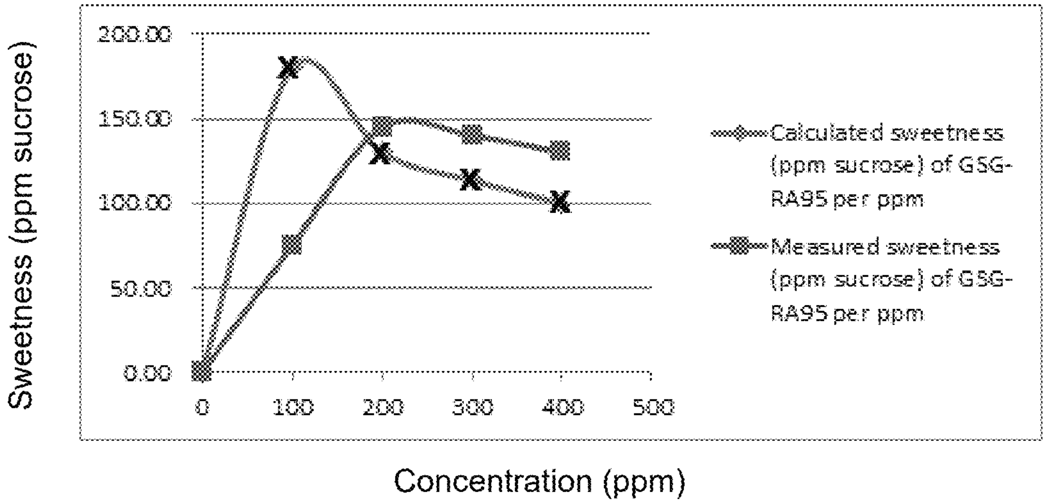
FIG. 43 is a graphical illustration showing the calculated and measured sweetness curves of GSG-RA95 per ppm in 500 ppm GSG-RA95 and RA97 compositions.

Conclusion: At 500 ppm total solid content, increasing the amount of GSG-RA95 results in a measured contribution of sweetness that was higher than the calculated value as shown in FIG. 43. A positive synergistic sweetness effect was found when GSG-RA95>200 ppm.

Example 24. Evaluating the Taste Profile of RA50/RC5 and GSG-RC5 to Find Out the Taste Improvement Effect to RA50/RC5 by Glycosylation Conditions: The samples were tested in aqueous solution of citric acid at pH 3.8.

The samples were as follows

TABLE 49

| RA50/RC5 | GSG-(RA50 + RC5) |
|---|---|
| 500 ppm | — |
| — | 1000 ppm |

The concentration of GSG-(RA50+RC5) is twice as high as RA50/RC5 in order to make the sweetness of them similar.

TABLE 50

| Results | | | | | |
|---|---|---|---|---|---|
| RA50/RC5 | GSG-(RA50 + RC5) | Sugar like | Bitterness | Aftertaste | Lingering |
| 500 ppm | — | 1 | 5 | 5 | 4 |
| — | 1000 ppm | 3 | 0.5 | 3 | 2 |

Glycosylating can improve the taste profile of RA50/RC5 significantly.

Example 25. Evaluating the Taste Profiles of RA30/RC15 and GSG-(RA50+RC5) to Find Out the Taste Improvement Effect to RA30/RC15 by Glycosylation The samples were tested in aqueous solution of citric acid at pH 3.8.

The samples were as follows:

TABLE 51

| RA30/RC15 | GSG-(RA30 + RC15) |
|---|---|
| 1500 ppm | — |
| — | 1000 ppm |

The concentration of GSG-(RA30+RC15) is twice as high as RA30/RC15 in order to make the sweetness of them similar.

TABLE 52

| Results | | | | | |
|---|---|---|---|---|---|
| RA30/RC15 | GSG-(RA30 + RC15) | Sugar like | Bitterness | Aftertaste | Lingering |
| 500 ppm | — | 0.5 | 5 | 5 | 4 |
| — | 1000 ppm | 3.5 | 0.5 | 2.5 | 2 |

Glycosylation can improve the taste profile of RA30/RC15 significantly.

Example 26. Evaluating the Taste Profile of RA40/RB8 and GSG-(RA40+RB8) to Find Out the Taste Improvement Effect to RA40/RB8 by Glycosylation The samples were tested in aqueous solution of citric acid at pH 3.8.

The samples were as follows:

TABLE 53

| RA40/RB8 | GSG-(RA40 + RB8) |
|---|---|
| 500 ppm | — |
| — | 1000 ppm |

The concentration of GSG-(RA40+RB8) is twice as high as RA40/RB8 in order to make the sweetness of them similar.

TABLE 54

| Results | | | | | |
|---|---|---|---|---|---|
| RA40/RB8 | GSG-(RA40 + RB8) | Sugar like | Bitterness | Aftertaste | Lingering |
| 500 ppm | — | 2 | 2 | 3 | 4 |
| — | 1000 ppm | 4 | 0 | 1 | 2 |

Glycosylation can improve the taste profile of RA40/RB8 significantly.

Example 27. Evaluating the Taste Profile of Compositions of GSG-(RA50+RC5) and RA97 to Find Out the Optimized Ratio with the Best Synergistic Taste Effects The samples were tested in aqueous solution of citric acid at pH 3.8.

The control sample was RA97 at 400 ppm, corresponding to 8.3% SE.

The samples were as follows:

TABLE 55

| RA97 | GSG-(RA50 + RC5) |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 44:
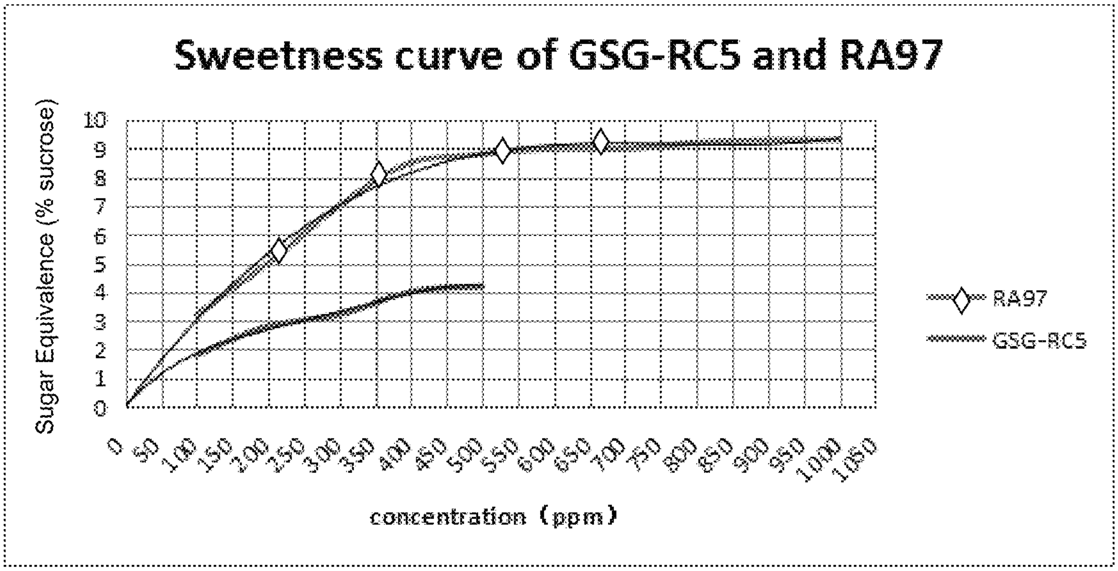
FIG. 44 is a graphical illustration showing the sweetness curve of GSG-(RA50+RC5) and RA97.

Sweetness curves of GSG-(RA50+RC5) and RA97 are shown as FIG. 44.

The taste profile of the RA97/GSG-(RA50+RC5) composition is shown in Table 56:

TABLE 56

| RA97 | GSG-(RA50 + RC5) | SE | Sugar like | Bitter-ness | Aftertaste | Lingering |
|---|---|---|---|---|---|---|
| 400 ppm | — | 8.30% | 3 | 2 | 3 | 4 |
| 300 ppm | 100 ppm | 8.30% | 3.5 | 0.5 | 2 | 3 |
| 250 ppm | 150 ppm | 8.50% | 4 | 0.5 | 1.5 | 3 |
| 200 ppm | 200 ppm | 8.50% | 3.5 | 0.5 | 2 | 2 |

TABLE 56-continued

| RA97 | GSG-(RA50 + RC5) | SE | Sugar like | Bitter-ness | Aftertaste | Lingering |
|---|---|---|---|---|---|---|
| 150 ppm | 250 ppm | 8.00% | 3.5 | 0.5 | 3 | 3 |
| 100 ppm | 300 ppm | 7.00% | 3.5 | 0.5 | 3 | 2 |

The taste of RA97 was improved by GSG-(RA50+RC5), especially at the ratio of 3:1 to 1:1.

TABLE 57

| RA97 concentration | Calculated SE of RA97 | GSG-(RA50 + RC5) concentration | Calculated SE of GSG-(RA50 + RC5) | Calculated SE of the composition | Measured SE of the composition | Calculated sweetness (ppm sucrose) of GSG-(RA50 + RC5) per ppm | Measured sweetness (ppm sucrose) of GSG-(RA50 + RC5) per ppm |
|---|---|---|---|---|---|---|---|
| 400 ppm | | 0 | | | | 0.00 | 0 |
| 300 ppm | 6.90% | 100 | 1.80% | 8.70% | 8.30% | 180.00 | 140.00 |
| 250 ppm | 6% | 150 | 2.30% | 8.30% | 8.50% | 153.33 | 166.67 |
| 200 ppm | 5% | 200 | 2.80% | 7.80% | 8.50% | 140.00 | 175.00 |
| 150 ppm | 4.20% | 250 | 3.00% | 7.20% | 8.00% | 120.00 | 152.00 |
| 100 ppm | 3% | 300 | 3.20% | 6.20% | 7.00% | 106.67 | 133.33 |

Calculated sweetness (ppm sugar) of GSG-(RA50+RC5) per ppm=calculated SE of GSG-(RA50+RC5)/concentration of GSG-RC5.

Measured sweetness (ppm sugar) of GSG-(RA50+RC5) per ppm=(Measured SE-calculated SE of RA97)/concentration of GSG-(RA50+RC5).

Figure 45:
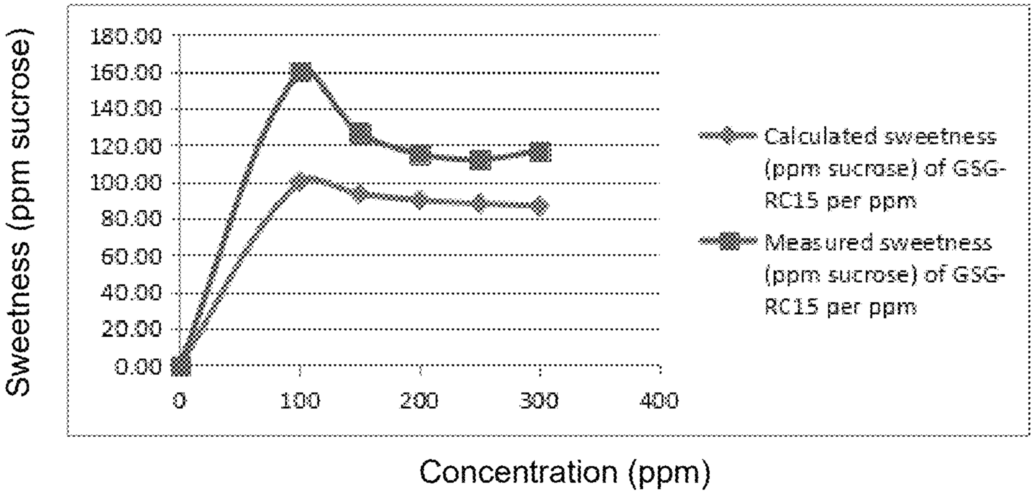
FIG. 45 is a graphical illustration showing the calculated and measured sweetness of GSG-RA80 per ppm in 400 ppm GSG-(RA50+RC5) and RA97 compositions.

The data are shown in FIG. 45.

It is found that at 400 ppm total solid content, with the increase of the amount of GSG-(RA50+RC5), its measured contribution of sweetness was higher than calculated value. Significant synergistic effect was found when GSG-(RA50+RC5)>150 ppm, although the optimized range was 150-200 ppm.

Example 28. Evaluating the Taste Profile of Compositions of GSG-(RA30+RC15) and RA97 to Find Out the Optimized Ratio with the Best Synergistic Taste Effects The samples were tested in aqueous solution of citric acid at pH 3.8.

The control sample was RA97 at 400 ppm, corresponding to 8.3% SE.

The samples were as follows:

TABLE 58

| RA97 | GSG-(RA30 + RC15) |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 46:
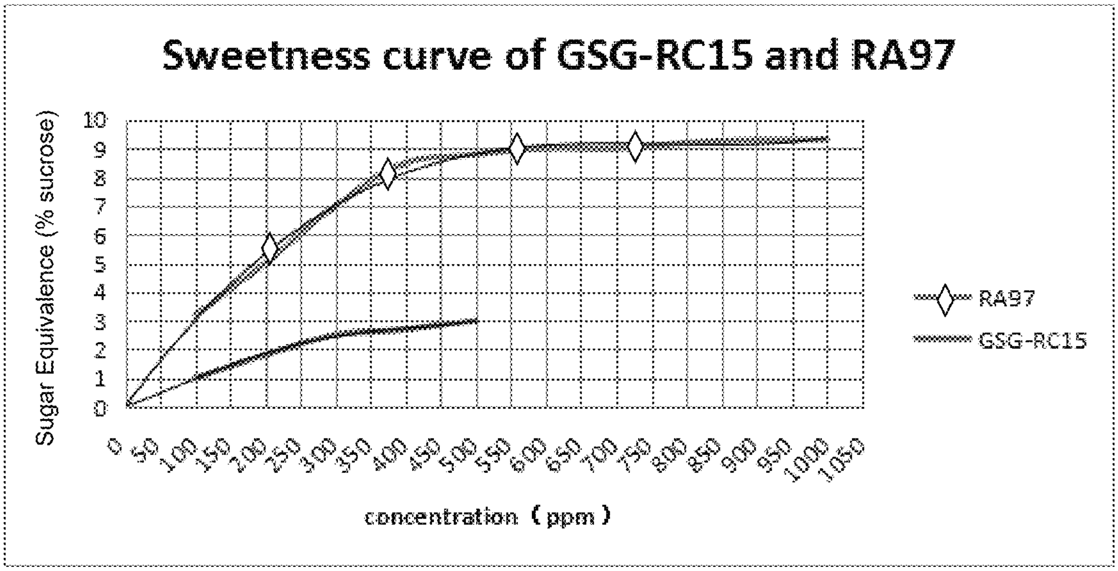
FIG. 46 is a graphical illustration showing the sweetness curve of GSG-(RA30+RC15) and RA97.

Sweetness curves of GSG-(RA30+RC15) and RA97 are shown in FIG. 46.

The taste profile of the RA97/GSG-(RA30+RC15) composition is shown in Table 59:

TABLE 59

| RA97 | GSG-(RA30 + RC15) | SE | Sugar like | Bitter-ness | Aftertaste | Lingering |
|---|---|---|---|---|---|---|
| 400 ppm | — | 8.30% | 3 | 2 | 3 | 4 |
| 300 ppm | 100 ppm | 8.50% | 3.5 | 0.5 | 1.5 | 2.5 |
| 250 ppm | 150 ppm | 7.90% | 3.5 | 0.5 | 1.5 | 2 |
| 200 ppm | 200 ppm | 7.30% | 3.5 | 0.5 | 1 | 2 |
| 150 ppm | 250 ppm | 7.00% | 3.5 | 0.5 | 1 | 2 |
| 100 ppm | 300 ppm | 6.50% | 3.5 | 0.5 | 1.5 | 2 |

The taste of RA97 was improved by GSG-(RA30+RC15).

As for the synergistic effect, it can be found in Table 60.

TABLE 60

| RA97 concentration | Calculated SE of RA97 | GSG-(RA30 + RC15) concentration | Calculated SE of GSG-(RA30 + RC15) | Calculated SE of the composition | Measured SE of the composition | Calculated sweetness (ppm sucrose) of GSG-(RA30 + RC15) per ppm | Measured sweetness (ppm sucrose) of GSG-(RA30 + RC15) per ppm |
|---|---|---|---|---|---|---|---|
| 400 ppm | | 0 | | | | 0.00 | 0 |
| 300 ppm | 6.90% | 100 | 1.00% | 7.90% | 8.50% | 100.00 | 160.00 |

TABLE 60-continued

| RA97 concentration | Calculated SE of RA97 | GSG-(RA30 + RC15) concentration | Calculated SE of GSG-(RA30 + RC15) | Calculated SE of the composition | Measured SE of the composition | Calculated sweetness (ppm sucrose) of GSG-(RA30 + RC15) per ppm | Measured sweetness (ppm sucrose) of GSG-(RA30 + RC15) per ppm |
|---|---|---|---|---|---|---|---|
| 250 ppm | 6% | 150 | 1.40% | 7.40% | 7.90% | 93.33 | 126.67 |
| 200 ppm | 5% | 200 | 1.80% | 6.80% | 7.30% | 90.00 | 115.00 |
| 150 ppm | 4.20% | 250 | 2.20% | 6.40% | 7.00% | 88.00 | 112.00 |
| 100 ppm | 3% | 300 | 2.60% | 5.60% | 6.50% | 86.67 | 116.67 |

Calculated sweetness (ppm sugar) of GSG-(RA30+RC15) per ppm=calculated SE of GSG-(RA30+RC15)/concentration of GSG-(RA30+RC15)

Measured sweetness (ppm sugar) of GSG-(RA30+RC15) per ppm=(Measured SE-calculated SE of RA97)/concentration of GSG-(RA30+RC15).

Figure 47:
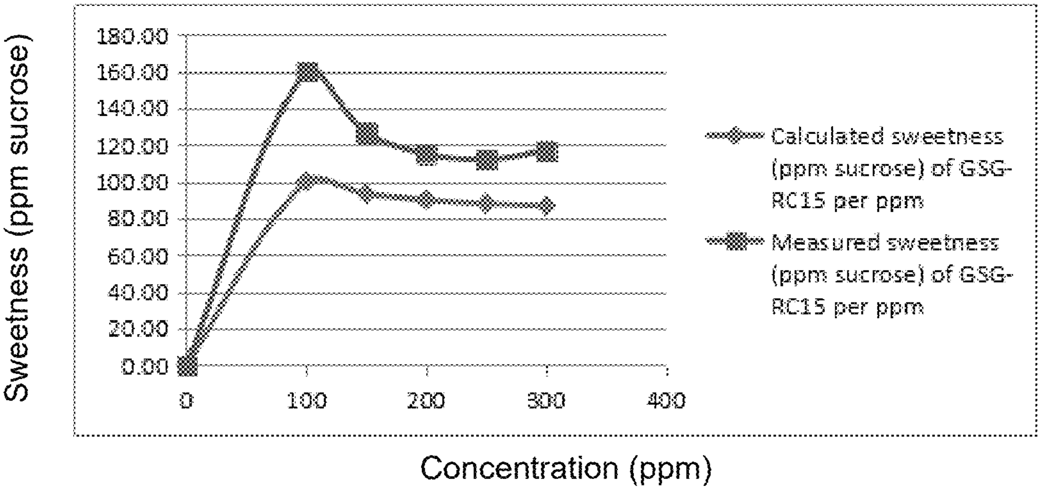
FIG. 47 is a graphical illustration showing the calculated and measured sweetness of GSG-(RA50+RC5) per ppm in 400 ppm GSG-(RA50+RC5) and RA97 compositions.

The data are shown in FIG. 47.

It is found that at 400 ppm total solid content, with the increase of the amount of GSG-(RA30+RC15), its measured contribution of sweetness was higher than calculated value. Significant synergistic effect was found when GSG-(RA30+RC15)>100 ppm, although the optimized range was 100-150 ppm.

Example 29. Evaluating the Taste Profile of Compositions of GSG-(RA40+RB8) and RA97 to Find Out the Optimized Ratio with the Best Synergistic Taste Effects The samples were tested in aqueous solution of citric acid at pH 3.8.

The control sample was RA97 at 400 ppm, corresponding to 8.3% SE.

The samples were as follows:

TABLE 61

| RA97 | GSG-(RA40 + RB8) |
|---|---|
| 400 ppm | — |
| 300 ppm | 100 ppm |

TABLE 61-continued

| RA97 | GSG-(RA40 + RB8) |
|---|---|
| 250 ppm | 150 ppm |
| 200 ppm | 200 ppm |
| 150 ppm | 250 ppm |
| 100 ppm | 300 ppm |

Figure 48:
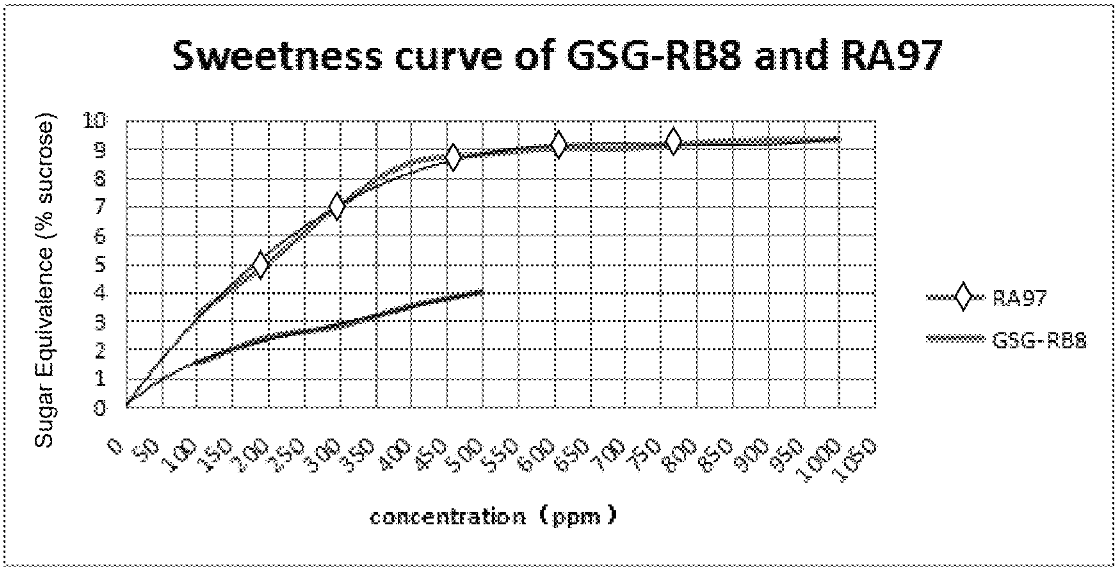
FIG. 48 is a graphical illustration showing the sweetness curve of GSG-(RA40+RB8) and RA97.

Sweetness curves of GSG-(RA40+RB8) and RA97 are shown in FIG. 48.

The taste profile of the RA97/GSG-(RA40+RB8) composition is shown in Table 62.

TABLE 62

| RA97 | GSG-(RA40 + RB8) | SE | Sugar like | Bitterness | Aftertaste | Lingering |
|---|---|---|---|---|---|---|
| 400 ppm | — | 8.30% | 3 | 2 | 3 | 4 |
| 300 ppm | 100 ppm | 8.30% | 3 | 1 | 2 | 2.5 |
| 250 ppm | 150 ppm | 8.00% | 4.5 | 0 | 0.5 | 1 |
| 200 ppm | 200 ppm | 7.80% | 4 | 0 | 1 | 1 |
| 150 ppm | 250 ppm | 7.50% | 3.5 | 0 | 2 | 2 |
| 100 ppm | 300 ppm | 7.00% | 3.5 | 0 | 1.5 | 2 |

The taste of RA97 was improved by GSG-(RA40+RB8).

As for the synergistic effect, it can be found in Table 63.

TABLE 63

| RA97 concentration | Calculated SE of RA97 | GSG-(RA40 + RB8) concentration | Calculated SE of GSG-(RA40 + RB8) | Calculated SE of the composition | Measured SE of the compostion | Calculated sweetness (ppm sucrose) of GSG-(RA40 + RB8) per ppm | Measured sweetness (ppm sucrose) of GSG-(RA40 + RB8) per ppm |
|---|---|---|---|---|---|---|---|
| 400 ppm | | 0 | | | | 0.00 | 0 |
| 300 ppm | 6.90% | 100 | 1.50% | 8.40% | 8.30% | 150.00 | 140.00 |
| 250 ppm | 6% | 150 | 2.00% | 8.00% | 8.00% | 133.33 | 133.33 |
| 200 ppm | 5% | 200 | 2.40% | 7.40% | 7.80% | 120.00 | 140.00 |
| 150 ppm | 4.20% | 250 | 2.70% | 6.90% | 7.50% | 108.00 | 132.00 |
| 100 ppm | 3% | 300 | 2.80% | 5.80% | 7.00% | 93.33 | 133.33 |

Calculated sweetness (ppm sugar) of GSG-(RA40+RB8) per ppm=calculated SE of GSG-(RA40+RB8)/concentration of GSG-(RA40+RB8).

Measured sweetness (ppm sugar) of GSG-(RA40+RB8) per ppm=(Measured SE-calculated SE of RA97)/concentration of GSG-(RA40+RB8).

Figure 49:
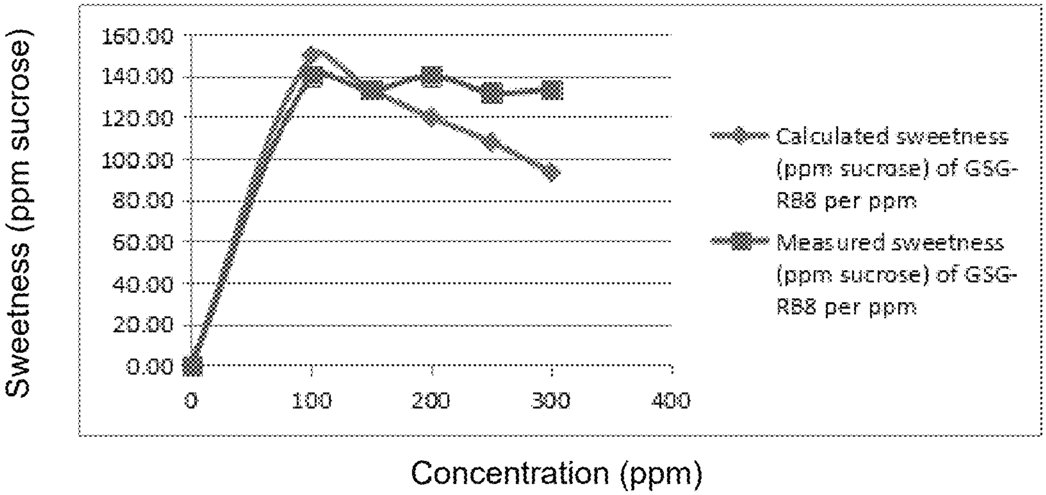
FIG. 49 is a graphical illustration showing the calculated and measured sweetness of GSG-(RA40+RB8) per ppm in 400 ppm GSG-(RA40+RB8) and RA97 compositions.

The data are shown in FIG. 49.

It is found that at 400 ppm total solid content, with the increase of the amount of GSG-(RA40+RB8), its measured contribution of sweetness was higher than calculated value. Significant synergistic effect was found when GSG-(RA40+RB8)>150 ppm, although the optimized range was 200-300 ppm.

Example 30. Evaluating the Taste Profile of Compositions of GSG-RA20 and RA/RB/RD Composition to Find Out the Optimized Ratio with the Best Synergistic Taste Effects The samples were tested in aqueous solution of citric acid at pH 3.8.

The control sample was RA/RB/RD at 400 ppm, corresponding to 8.3% SE.

The samples were as follows:

TABLE 64

| RA/RB/RD composition | GSG-RA20 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 50:
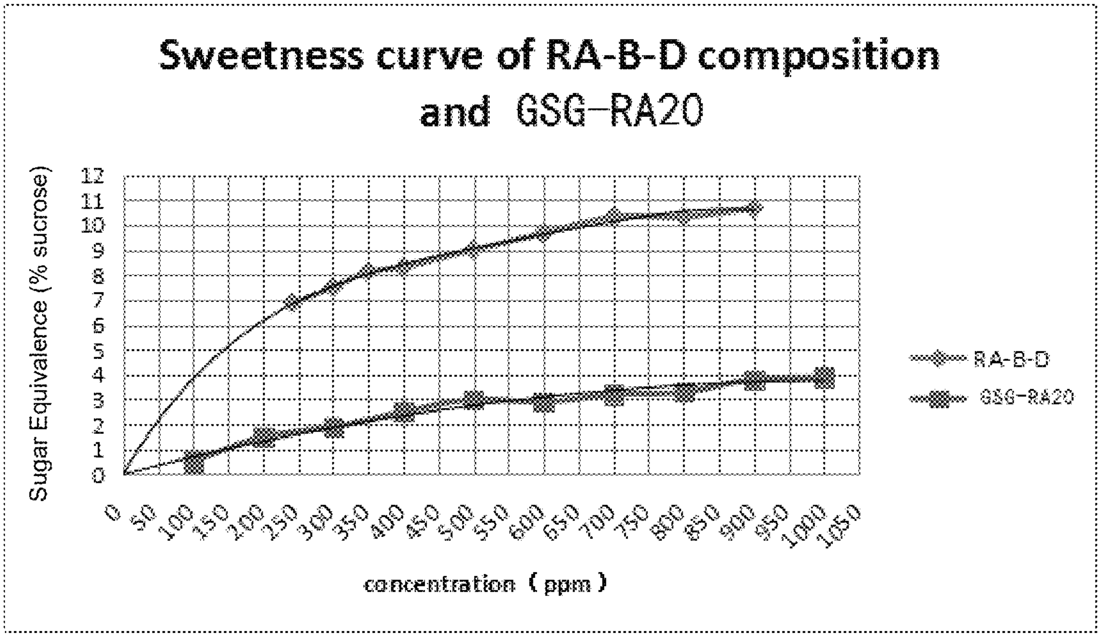
FIG. 50 is a graphical illustration showing the sweetness curve of GSG-RA20 and RA/RB/RD.

Sweetness curves of the GSG-RA20 and RA/RB/RD compositions are shown in FIG. 50.

A taste profile of the RA/RB/RD/GSG-RA20 composition is shown in Table 65.

TABLE 65

| RA/RB/RD composition | GSG-RA20 | SE |
|---|---|---|
| 400 ppm | — | 8.30% |
| 300 ppm | 100 ppm | 8.70% |
| 250 ppm | 150 ppm | 9.00% |
| 200 ppm | 200 ppm | 8.80% |
| 150 ppm | 250 ppm | 8.50% |
| 100 ppm | 300 ppm | 8.00% |

As for the synergistic effect, it can be found in Table 66.

TABLE 66

| RA-B-D concentration | Calculated SE of RA-B-D | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | | | 0.00 | 0 |
| 300 ppm | 7.20% | 100 | 1.50% | 8.70% | 8.70% | 150.00 | 150.00 |
| 250 ppm | 6.00% | 150 | 2.00% | 8.00% | 9.00% | 133.33 | 200.00 |
| 200 ppm | 5.40% | 200 | 2.40% | 7.80% | 8.80% | 120.00 | 170.00 |
| 150 ppm | 4.20% | 250 | 2.70% | 6.90% | 8.50% | 108.00 | 172.00 |
| 100 ppm | 3.00% | 300 | 2.80% | 5.80% | 8.00% | 93.33 | 166.67 |

Calculated sweetness (ppm sugar) of GSG-RA20 per ppm=calculated SE of GSG-RA20/concentration of GSG-RA20

Measured sweetness (ppm sugar) of GSG-RA20 per ppm=(Measured SE-calculated SE of RA-B-D composition)/concentration of GSG-RA20

Figure 51:
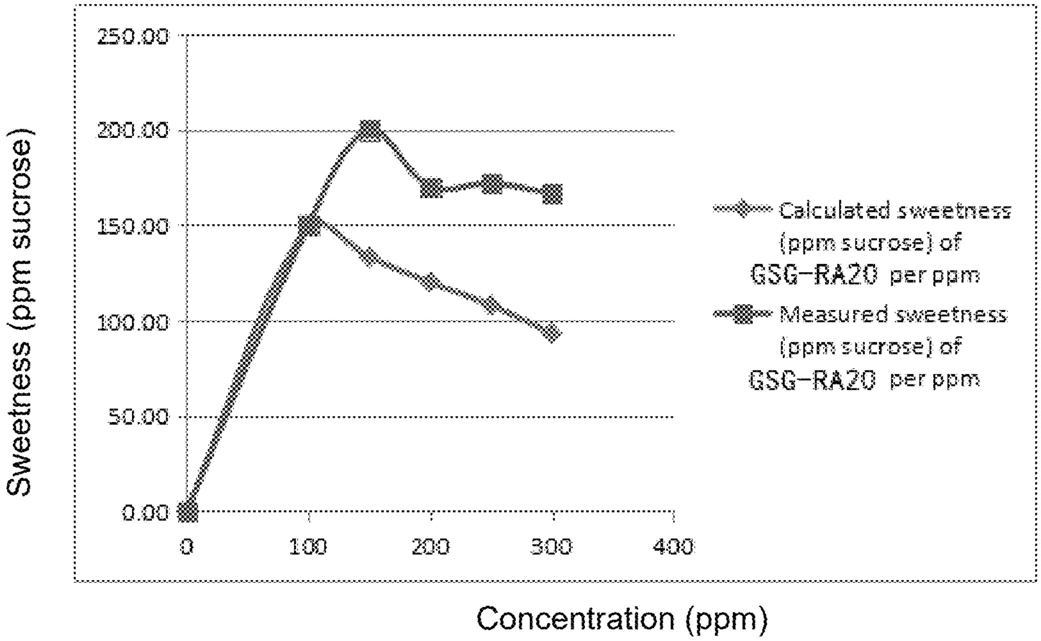
FIG. 51 is a graphical illustration showing the calculated and measured sweetness of GSG-RA20 per ppm in 400 ppm GSG-RA20 and RA/RB/RD compositions.

The data are shown in FIG. 51.

It is found that at 400 ppm total solid content, with the increase of the amount of GSG-RA20, its measured contribution of sweetness was higher than calculated value. Significant synergistic effect was found when GSG-RA20>100 ppm, although the optimized range was 150-200 ppm.

Example 31. Evaluating the Taste Profile of Compositions of GSG-RA95 and RA75/RB15 to Find Out the Optimized Ratio with the Best Synergistic Taste Effects The samples were tested in aqueous solution of citric acid at pH 3.8.

The control sample was RA75/RB15 at 400 ppm, corresponding to 7.0% SE.

The samples were as follows:

TABLE 67

| RA75/RB15 | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 52:
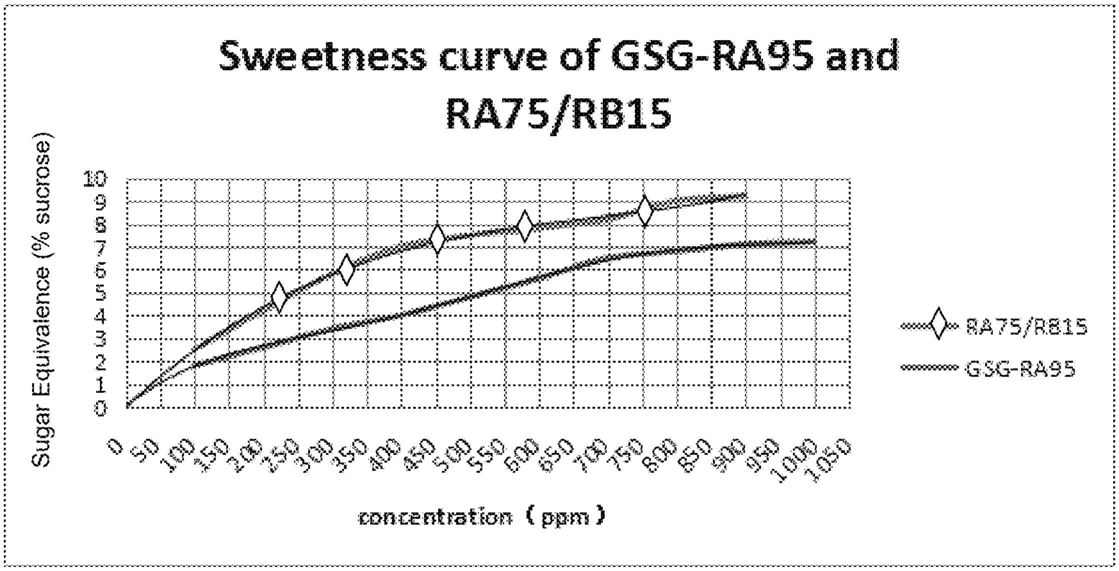
FIG. 52 is a graphical illustration showing the sweetness curve of GSG-RA95 and RA75/RB15.

Sweetness curves of GSG-RA95 and RA75/RB15 are shown in FIG. 52.

A taste profile of the RA75/RB15/GSG-RA95 composition is shown in Table 68.

TABLE 68

| RA75/RB15 | GSG-RA95 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.0% | 4.5 | 0 | 1 | 1.5 |
| 250 ppm | 150 ppm | 7.8% | 4 | 0 | 2 | 2 |
| 200 ppm | 200 ppm | 7.5% | 4 | 0 | 2 | 2 |
| 150 ppm | 250 ppm | 6.5% | 4.5 | 0 | 0.5 | 1 |
| 100 ppm | 300 ppm | 6.0% | 4.5 | 0 | 0.5 | 1.5 |

The taste of RA75/RB15 was improved by GSG-RA95 although the taste of itself is good enough.

As for the synergistic effect, it can be found in Table 69.

TABLE 69

| RA75/ RB15 concentration | Calculated SE of RA75/ RB15 | GSG- RA95 concentration | Calculated SE of GSG- RA95 | Calculated SE of the composition | Measured SE of the composition | Calculated sweetness (ppm sucrose) of GSG-RA95 per ppm | Measured sweetness (ppm sucrose) of GSG- RA95 per ppm |
|---|---|---|---|---|---|---|---|
| 400 ppm | | 0 | | | | 0.00 | 0 |
| 300 ppm | 5.80% | 100 | 1.80% | 7.60% | 7.40% | 180.00 | 160.00 |
| 250 ppm | 5% | 150 | 2.20% | 7.20% | 7.90% | 146.67 | 193.33 |
| 200 ppm | 4% | 200 | 2.60% | 6.80% | 7.70% | 130.00 | 175.00 |
| 150 ppm | 3.40% | 250 | 3.00% | 6.40% | 6.80% | 120.00 | 136.00 |
| 100 ppm | 3% | 300 | 3.40% | 5.90% | 6.50% | 113.33 | 133.33 |

Calculated sweetness (ppm sugar) of GSG-RA95 per ppm=calculated SE of GSG-RA95/concentration of GSG-RA95.

Measured sweetness (ppm sugar) of GSG-RA95 per ppm=(Measured SE-calculated SE of RA75/RB15)/concentration of GSG-RA95.

Figure 53:
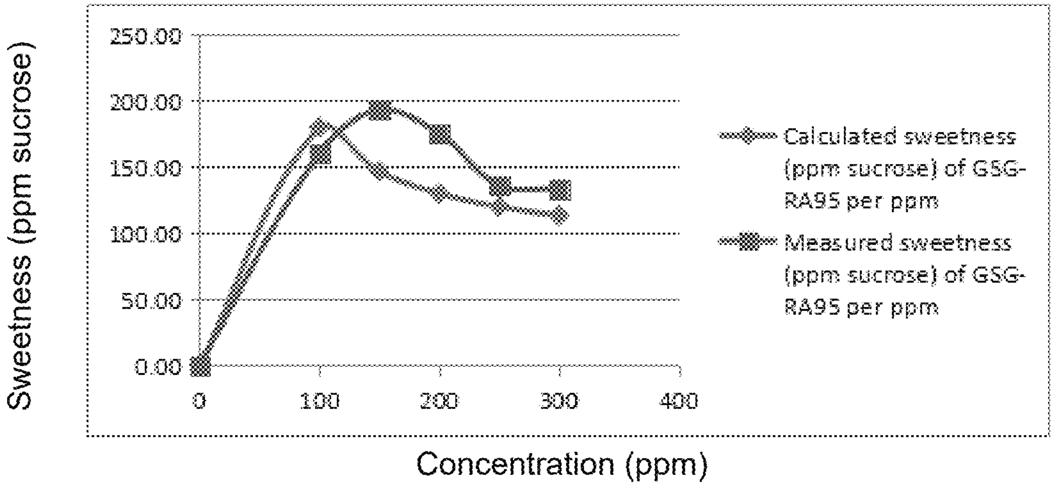
FIG. 53 is a graphical illustration showing the calculated and measured sweetness of GSG-RA95 per ppm in 400 ppm GSG-RA95 and RA75/RB15 compositions.

The data are shown in FIG. 53.

It is found that at 400 ppm total solid content, with the increase of the amount of GSG-RA95, its measured contribution of sweetness was higher than calculated value. Significant synergistic effect was found when GSG-RA95>150 ppm, although the optimized range was 150-200 ppm.

Example 32. Evaluating the Taste Profile of Compositions of GSG-RA95 and RA/RD to Find Out the Optimized Ratio with the Best Synergistic Taste Effects The samples were tested in aqueous solution of citric acid at pH 3.8.

The control sample was RA/RD at 400 ppm, corresponding to 6.5% SE.

The samples were as follows:

TABLE 70

| RA/RD | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 54:
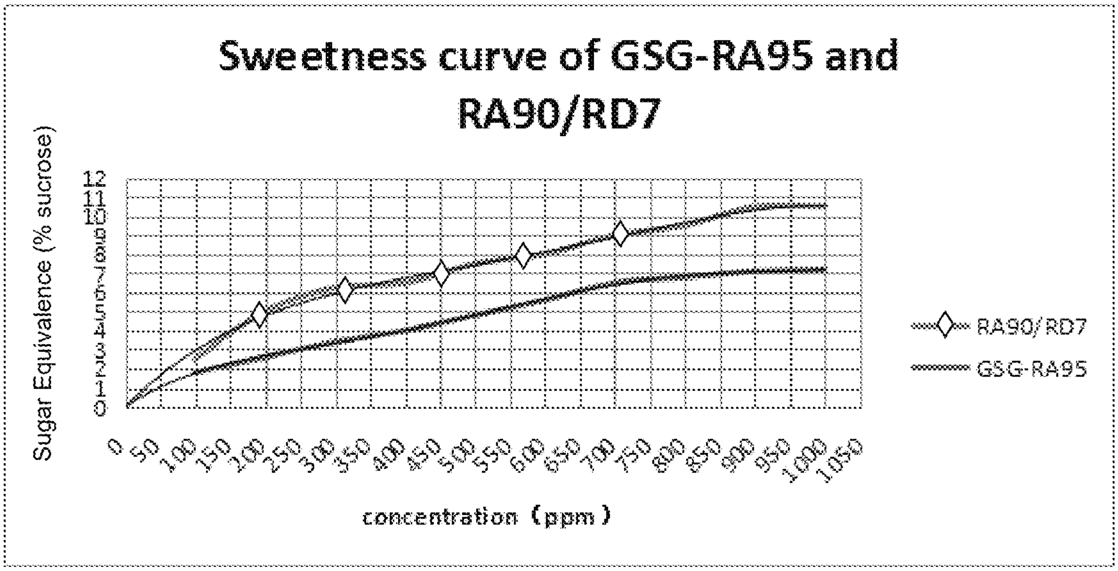
FIG. 54 is a graphical illustration showing the sweetness curve of GSG-RA95 and RA/RD.

Sweetness curves of GSG-RA95 and RA/RD are shown as FIG. 54.

A taste profile of the RA/RD/GSG-RA95 composition is shown in Table 71.

TABLE 71

| RA/RD | GSG- RA95 | SE | Sugar like | Bitter- ness | Aftertaste | Lingering |
|---|---|---|---|---|---|---|
| 400 ppm | — | 6.5% | 3.5 | 1 | 1 | 1.5 |
| 300 ppm | 100 ppm | 8% | 4.5 | 0 | 0.5 | 0.5 |
| 250 ppm | 150 ppm | 8.30% | 4 | 0 | 1 | 0.5 |
| 200 ppm | 200 ppm | 7.80% | 4.5 | 0 | 0.5 | 0.5 |
| 150 ppm | 250 ppm | 7.50% | 4.5 | 0 | 0.5 | 0.5 |
| 100 ppm | 300 ppm | 6.80% | 4.5 | 0 | 0 | 0.5 |

The taste of RA/RD was improved by GSG-RA95 by reducing the bitterness and lingering.

As for the synergistic effect, it can be found in Table 72.

TABLE 72

| RA/RD concentration | Calculated SE of RA/RD | GSG- RA95 concentration | Calculated SE of GSG- RA95 | Calculated SE of the composition | Measured SE of the composition | Calculated sweetness (ppm sucrose) of GSG-RA95 per ppm | Measured sweetness (ppm sucrose) of GSG- RA95 per ppm |
|---|---|---|---|---|---|---|---|
| 400 ppm | | 0 | | | | 0.00 | 0 |
| 300 ppm | 6.00% | 100 | 1.80% | 7.80% | 8% | 180.00 | 200.00 |
| 250 ppm | 5.50% | 150 | 2.20% | 7.70% | 8.30% | 146.67 | 186.67 |
| 200 ppm | 4.80% | 200 | 2.60% | 7.40% | 7.80% | 130.00 | 150.00 |
| 150 ppm | 4.00% | 250 | 3.00% | 7.00 | 7.50 | 120.00 | 140.00 |
| 100 ppm | 3.00% | 300 | 3.40% | 6.40% | 6.80% | 113.33 | 126.67 |

Calculated sweetness (ppm sugar) of GSG-RA95 per ppm=calculated SE of GSG-RA95/concentration of GSG-RA95

Measured sweetness (ppm sugar) of GSG-RA95 per ppm=(Measured SE-calculated SE of RA/RD)/concentration of GSG-RA95

Figure 55:
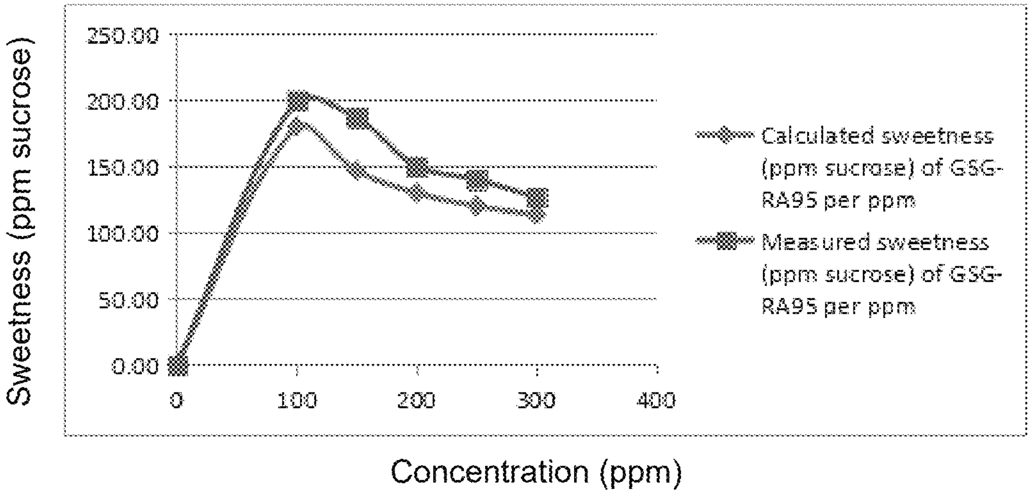
FIG. 55 is a graphical illustration showing the calculated and measured sweetness of GSG-RA95 per ppm in 400 ppm GSG-RA95 and RA/RD compositions.

The data are shown in FIG. 55.

It is found that at 400 ppm total solid content, with the increase of the amount of GSG-RA95, its measured contribution of sweetness was higher than calculated value. Significant synergistic effect was found when GSG-RA95>100 ppm, although the optimized range was 100-250 ppm.

Example 33. Evaluating the Taste Profile of Compositions of GSG-RA95 and RA80/RB10/RD6 to Find Out the Optimized Ratio with the Best Synergistic Taste Effects The samples were tested in aqueous solution of citric acid at pH 3.8.

The control sample was RA80/RB10/RD6 at 400 ppm, corresponding to 8.3% SE.

The samples were as follows:

TABLE 73

| RA80/RB10/RD6 | GSG-RA95 | total GSG |
|---|---|---|
| 400 ppm | — | |
| 300 ppm | 100 ppm | 22.65% |
| 250 ppm | 150 ppm | 33.98% |
| 200 ppm | 200 ppm | 45.30% |
| 150 ppm | 250 ppm | 56.63% |
| 100 ppm | 300 ppm | 67.95% |

Figure 56:
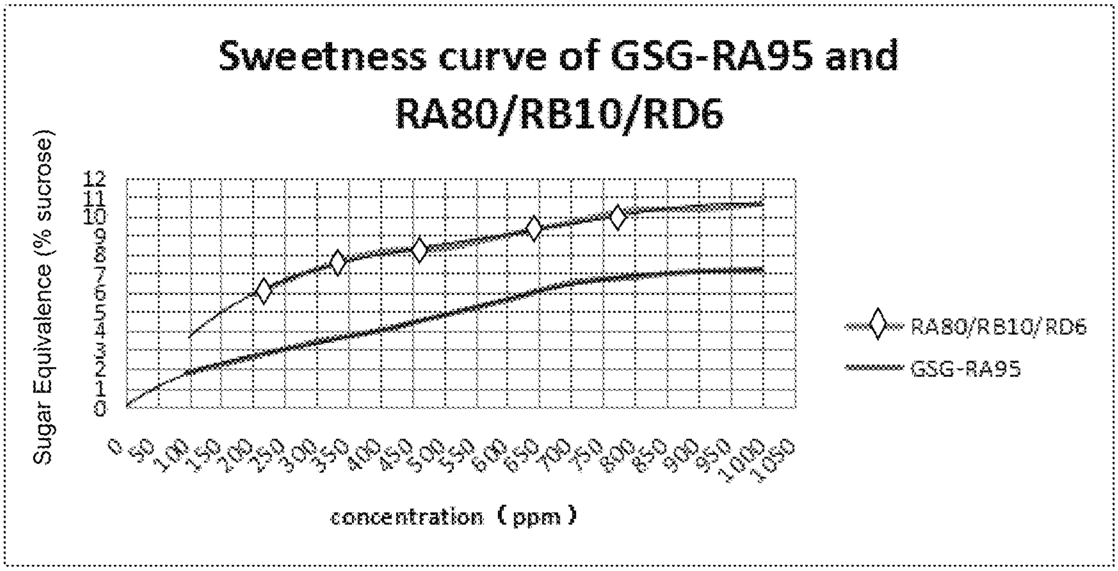
FIG. 56 is a graphical illustration showing the sweetness curve of GSG-RA95 and RA80/RB10/RD6.

Sweetness curves of GSG-RA95 and RA80/RB10/RD6 are shown in FIG. 56.

A taste profile of the RA80/RB10/RD6/GSG-RA95 composition is shown in Table 74.

TABLE 74

| RA80/ RB10/ RD6 | GSG-RA95 | SE | Sugar like | Bitter-ness | Aftertaste | Lingering |
|---|---|---|---|---|---|---|
| 400 ppm | — | 8.3% | 4.5 | 0 | 0 | 0.5 |
| 300 ppm | 100 ppm | 7.70% | 4.5 | 0 | 0.5 | 0.5 |
| 250 ppm | 150 ppm | 8.30% | 4.5 | 0 | 0 | 0.5 |
| 200 ppm | 200 ppm | 8.30% | 4 | 0 | 0.5 | 0.5 |
| 150 ppm | 250 ppm | 8.20% | 4.5 | 0 | 0 | 0.5 |
| 100 ppm | 300 ppm | 7.20% | 3.5 | 0 | 1 | 1 |

As for the synergistic effect, it can be found in Table 75.

TABLE 75

| RA80/ RB10/ RD6 concentration | Calculated SE of RA80/ RB10/ RD6 | GSG-RA95 concentration | Calculated SE of GSG-RA95 | Calculated SE of the composition | Measured SE of the composition | Calculated sweetness (ppm sucrose) of GSG-RA95 per ppm | Measured sweetness (ppm sucrose) of GSG-RA95 per ppm |
|---|---|---|---|---|---|---|---|
| 400 ppm | | 0 | | | | 0.00 | 0 |
| 300 ppm | 7.20% | 100 | 1.80% | 9.00% | 7.70% | 180.00 | 50.00 |
| 250 ppm | 6.00% | 150 | 2.20% | 8.20% | 8.30% | 146.67 | 153.33 |
| 200 ppm | 5.40% | 200 | 2.60% | 8.00% | 8.30% | 130.00 | 145.00 |
| 150 ppm | 4.20% | 250 | 3.00% | 7.20% | 8.20% | 120.00 | 160.00 |
| 100 ppm | 3.00% | 300 | 3.40% | 6.40% | 7.20% | 113.33 | 140.00 |

Calculated sweetness (ppm sugar) of GSG-RA95 per ppm=calculated SE of GSG-RA95/concentration of GSG-RA95

Measured sweetness (ppm sugar) of GSG-RA95 per ppm=(Measured SE-calculated SE of RA80/RB10/RD6)/concentration of GSG-RA95

Figure 57:
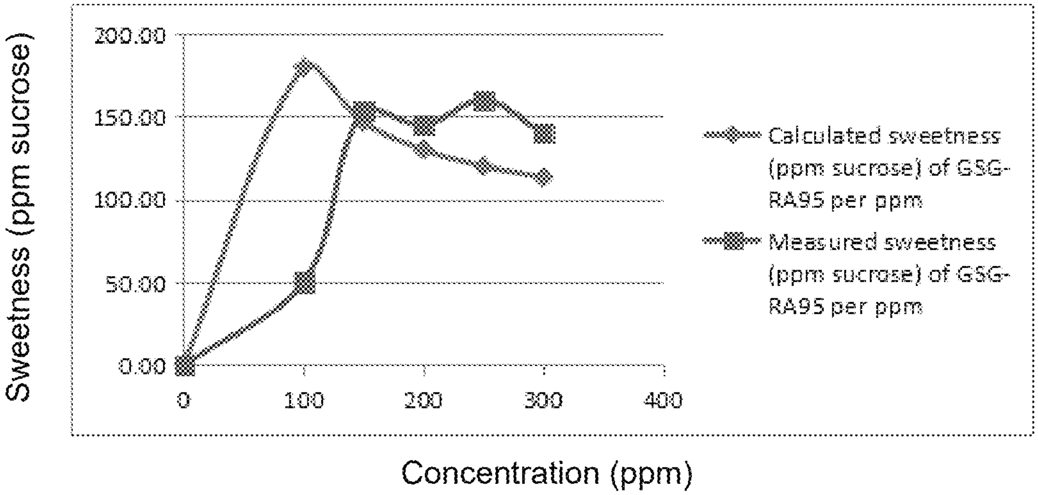
FIG. 57 is a graphical illustration showing the calculated and measured sweetness of GSG-RA95 per ppm in 400 ppm GSG-RA95 and RA80/RB10/RD6 compositions.

The data are shown in FIG. 57.

It is found that at 400 ppm total solid content, with the increase of the amount of GSG-RA95, its measured contribution of sweetness was higher than calculated value. Significant synergistic effect was found when GSG-RA95>150 ppm, although the optimized range was 200-250 ppm.

Example 34. Evaluating the Taste Profile of Compositions of GSG-RA80 and RA75/RB15 to Find Out the Optimized Ratio with the Best Synergistic Taste Effects The samples were tested in aqueous solution of citric acid at pH 3.8.

The control sample was RA75/RB15 at 400 ppm, corresponding to 7.0% SE.

The samples were as follows:

TABLE 76

| RA75/RB15 | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 58:
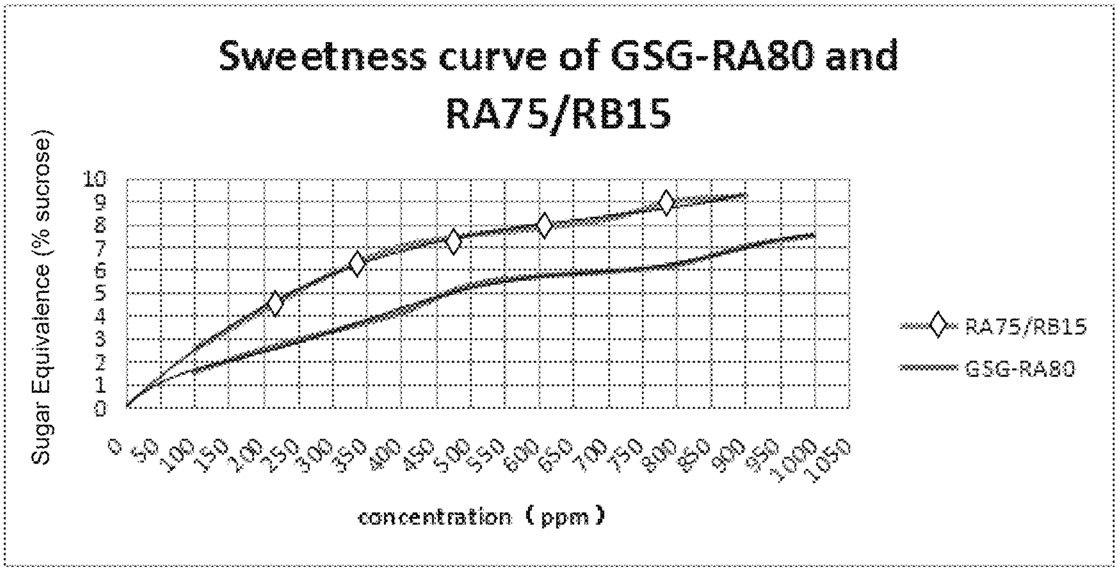
FIG. 58 is a graphical illustration showing the sweetness curve of GSG-RA80 and RA75/RB15.

Sweetness curves of GSG-RA80 and RA75/RB15 are shown in FIG. 58.

A taste profile of the RA75/RB15/GSG-RA80 composition is shown in Table 77.

TABLE 77

| RA75/ RB15 | GSG- RA80 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.2% | 4 | 0 | 0.5 | 1 |
| 250 ppm | 150 ppm | 7.7% | 4 | 0 | 0.5 | 1 |
| 200 ppm | 200 ppm | 7.5% | 4 | 0 | 0.5 | 1 |
| 150 ppm | 250 ppm | 6.8% | 4.5 | 0 | 0 | 0.5 |
| 100 ppm | 300 ppm | 6.3% | 4 | 0 | 1 | 0.5 |

As for the synergistic effect, it can be found in Table 78.

TABLE 78

| RA75/ RB15 concentration | Calculated SE of RA75/ RB15 | GSG-RA80 concentration | Calculated SE of GSG- RA80 | Calculated SE of the composition | Measured SE of the composition | Calculated sweetness (ppm sucrose) of GSG-RA80 per ppm | Measured sweetness (ppm sucrose) of GSG- RA80 per ppm |
|---|---|---|---|---|---|---|---|
| 400 ppm | | 0 | | | | 0.00 | 0 |
| 300 ppm | 5.80% | 100 | 1.50% | 7.30% | 7.20% | 150.00 | 140.00 |
| 250 ppm | 5% | 150 | 2.00% | 7.00% | 7.70% | 133.33 | 180.00 |
| 200 ppm | 4% | 200 | 2.50% | 6.70% | 7.50% | 125.00 | 165.00 |
| 150 ppm | 3.40% | 250 | 2.90% | 6.30% | 6.80% | 116.00 | 136.00 |
| 100 ppm | 3% | 300 | 3.30% | 5.80% | 6.30% | 110.00 | 126.67 |

Calculated sweetness (ppm sugar) of GSG-RA80 per ppm=calculated SE of GSG-RA80/concentration of GSG-RA80

Measured sweetness (ppm sugar) of GSG-RA80 per ppm=(Measured SE-calculated SE of RA75/RB15)/concentration of GSG-RA80

Figure 59:
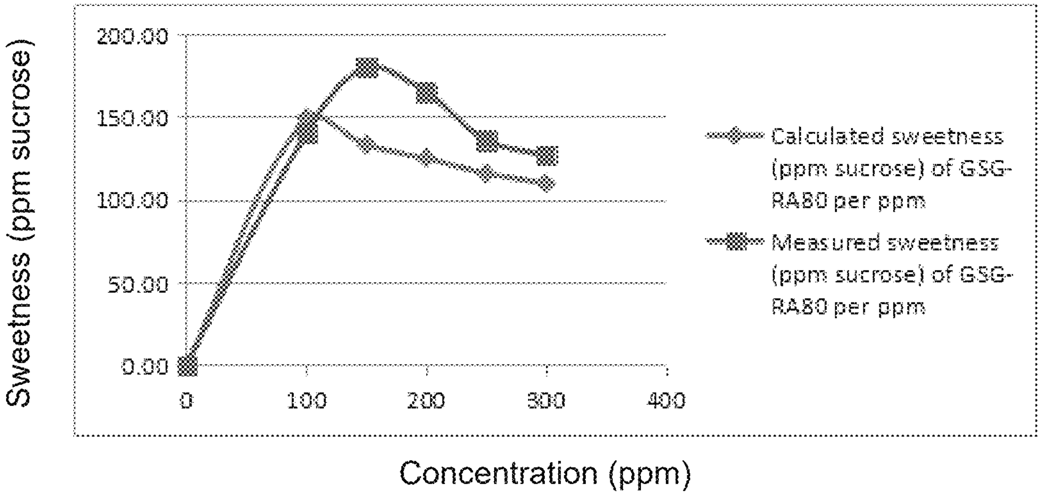
FIG. 59 is a graphical illustration showing the calculated and measured sweetness of GSG-RA80 per ppm in 400 ppm GSG-RA80 and RA75/RB15 compositions.

The data are shown in FIG. 59.

It is found that at 400 ppm total solid content, with the increase of the amount of GSG-RA80, its measured contribution of sweetness was higher than calculated value. Significant synergistic effect was found when GSG-RA80>150 ppm, although the optimized range was 150-250 ppm.

Example 35. Evaluating the taste profile of compositions of GSG-RA80 and RA/RD to find out the optimized ratio with the best synergistic taste effects The samples were tested in aqueous solution of citric acid at pH 3.8.

The control sample was RA/RD at 400 ppm, corresponding to 6.5% SE.

The samples were as follows:

TABLE 79

| RA/RD | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 60:
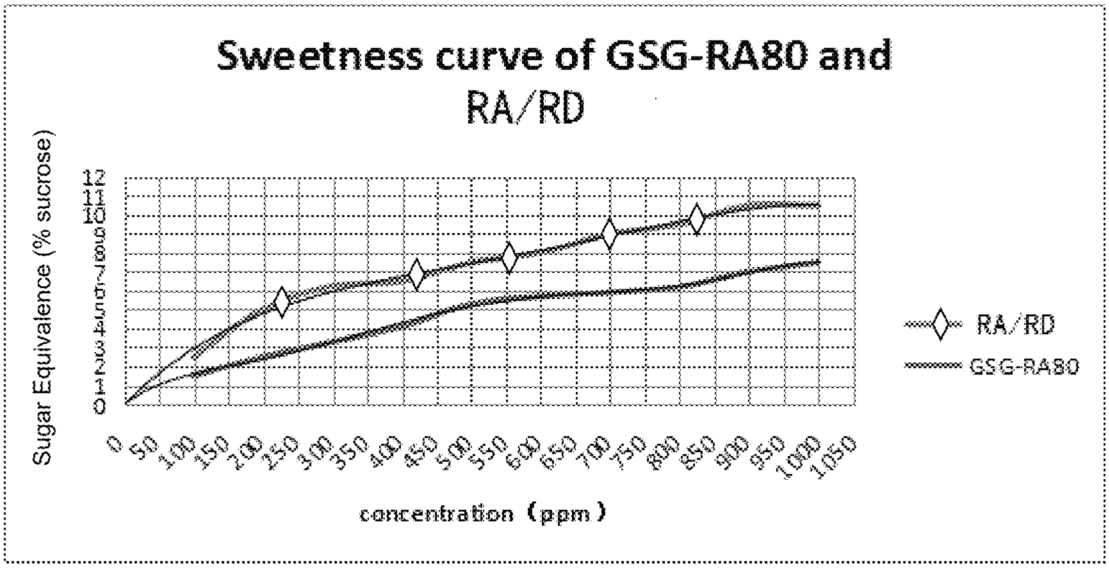
FIG. 60 is a graphical illustration showing the sweetness curve of GSG-RA80 and RA/RD.

Sweetness curves of GSG-RA80 and RA/RD are shown as FIG. 60.

A taste profile of the RA/RD/GSG-RA80 composition is shown in Table 80.

TABLE 80

| RA/RD | GSG-RA80 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 8.2% | 3.5 | 2 | 2 | 2 |
| 250 ppm | 150 ppm | 7.9% | 4 | 0.5 | 0.5 | 1 |
| 200 ppm | 200 ppm | 7.2% | 4 | 0 | 1 | 1 |
| 150 ppm | 250 ppm | 6.5% | 4.5 | 0 | 0.5 | 1 |
| 100 ppm | 300 ppm | 6.0% | 4 | 0 | 0.5 | 1 |

The taste of RA/RD was improved by GSG-RA80 by reducing the bitterness and lingering.

As for the synergistic effect, it can be found in Table 81.

TABLE 81

| RA/RD concentration | Calculated SE of RA/RD | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 6.00% | 100 | 1.50% | 7.50% | 8.20% | 150.00 | 220.00 |
| 250 ppm | 5.50% | 150 | 2.00% | 7.50% | 7.90% | 133.33 | 160.00 |
| 200 ppm | 4.80% | 200 | 2.50% | 7.30% | 7.20% | 125.00 | 120.00 |
| 150 ppm | 4.00% | 250 | 2.90% | 6.90% | 6.50% | 116.00 | 100.00 |
| 100 ppm | 3.00% | 300 | 3.30% | 6.30% | 6.00% | 110.00 | 100.00 |

Calculated sweetness (ppm sugar) of GSG-RA80 per ppm=calculated SE of GSG-RA80/concentration of GSG-RA80.

Measured sweetness (ppm sugar) of GSG-RA80 per ppm=(Measured SE-calculated SE of RA/RD)/concentration of GSG-RA80.

Figure 61:
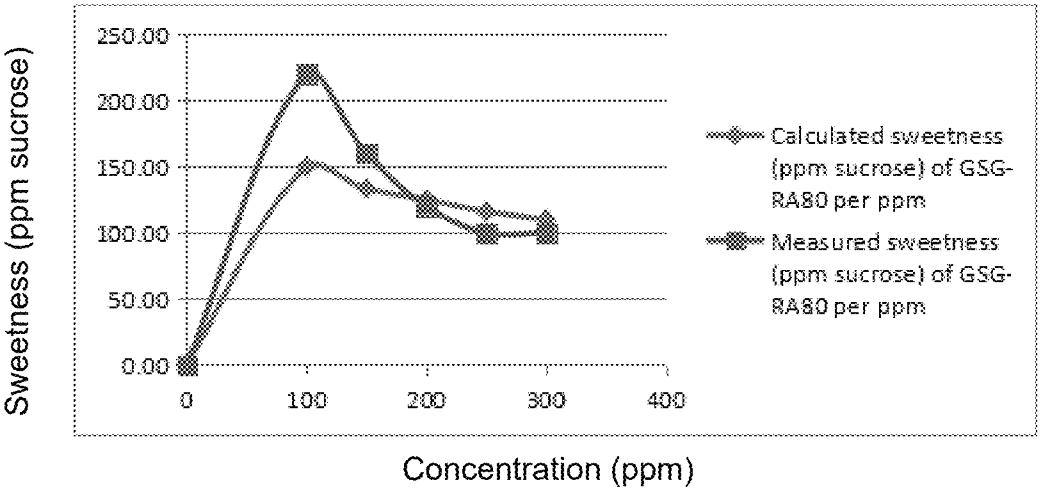
FIG. 61 is a graphical illustration showing the calculated and measured sweetness of GSG-RA80 per ppm in 400 ppm GSG-RA80 and RA/RD compositions.

The data are showed in FIG. 61.

It is found that at 400 ppm total solid content, with the increase of the amount of GSG-RA80, its measured contribution of sweetness was higher than calculated value. Significant synergistic effect was found when GSG-RA80 was 100-200 ppm, although the optimized range was 100-150 ppm.

Example 36. Evaluating the Taste Profile of Compositions of GSG-RA80 and RA80/RB10/RD6 to Find Out the Optimized Ratio with the Best Synergistic Taste Effects The samples were tested in aqueous solution of citric acid at pH 3.8.

The control sample was RA80/RB10/RD6 at 400 ppm, corresponding to 8.3% SE.

The samples were as follows:

TABLE 82

| RA80/RB10/RD6 | GSG-RA80 | total GSG |
|---|---|---|
| 400 ppm | — | |
| 300 ppm | 100 ppm | 22.25% |
| 250 ppm | 150 ppm | 33.38% |
| 200 ppm | 200 ppm | 44.50% |
| 150 ppm | 250 ppm | 55.63% |
| 100 ppm | 300 ppm | 66.75% |

Figure 62:
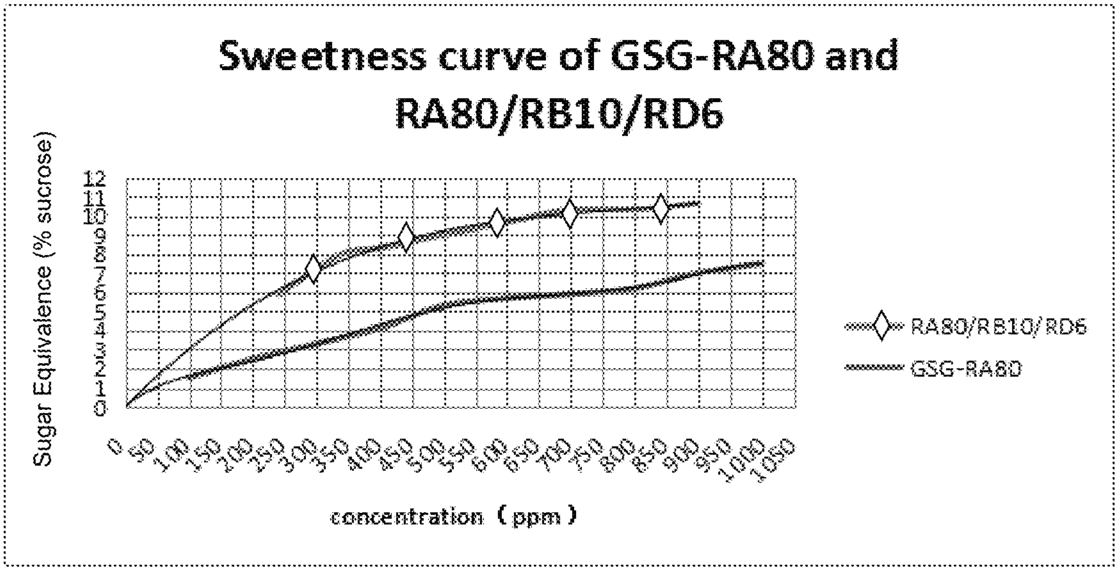
FIG. 62 is a graphical illustration showing the sweetness curve of GSG-RA80 and RA80/RB10/RD6.

Sweetness curves of GSG-RA80 and RA80/RB10/RD6 are shown in FIG. 62.

A taste profile of the RA80/RB10/RD6/GSG-RA80 composition is shown in Table 83.

TABLE 83

| RA80/RB10/RD6 | GSG-RA80 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 7.5% | 4 | 0 | 1 | 0.5 |
| 250 ppm | 150 ppm | 8.3% | 3.5 | 0.5 | 2 | 2 |
| 200 ppm | 200 ppm | 8.1% | 4.5 | 0 | 0.5 | 0.5 |
| 150 ppm | 250 ppm | 7.8% | 4.5 | 0 | 0.5 | 0.5 |
| 100 ppm | 300 ppm | 7.0% | 4 | 0 | 1 | 1 |

As for the synergistic effect, it can be found in Table 84.

TABLE 84

| RA80/RB10/RD6 concentration | Calculated SE of RA80/RB10/RD6 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 7.20% | 100 | 1.50% | 8.70% | 7.50% | 150.00 | 30.00 |
| 250 ppm | 6.00% | 150 | 2.00% | 8.00% | 8.30% | 133.33 | 153.33 |
| 200 ppm | 5.40% | 200 | 2.50% | 7.90% | 8.10% | 125.00 | 135.00 |
| 150 ppm | 4.20% | 250 | 2.90% | 7.10% | 7.80% | 116.00 | 144.00 |
| 100 ppm | 3.00% | 300 | 3.30% | 6.30% | 7.00% | 110.00 | 133.33 |

Calculated sweetness (ppm sugar) of GSG-RA80 per ppm=calculated SE of GSG-RA80/concentration of GSG-RA80.

Measured sweetness (ppm sugar) of GSG-RA80 per ppm=(Measured SE-calculated SE of RA80/RB10/RD6)/concentration of GSG-RA80.

Figure 63:
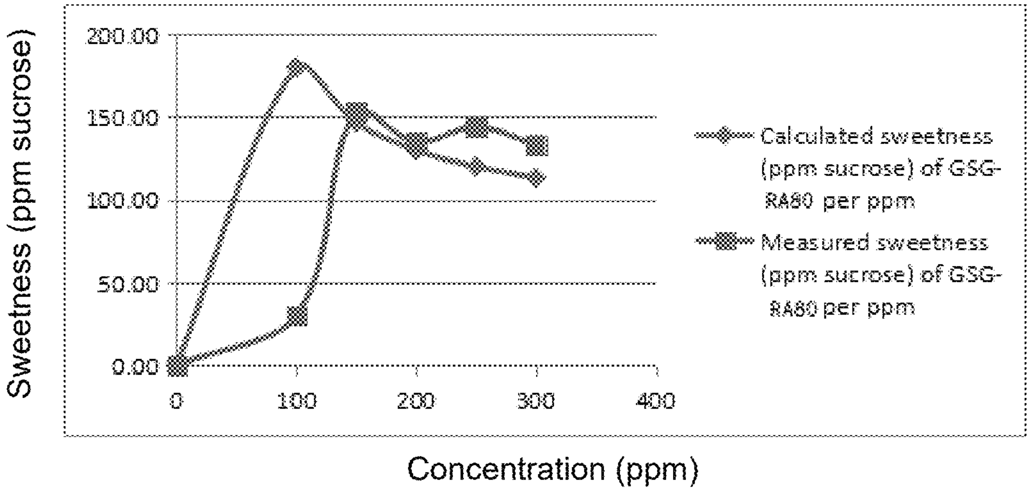
FIG. 63 is a graphical illustration showing the calculated and measured sweetness of GSG-RA80 per ppm in 400 ppm GSG-RA80 and RA80/RB10/RD6 compositions.

The data are shown in FIG. 63.

It is found that at 400 ppm total solid content, with the increase of the amount of GSG-RA80, its measured contribution of sweetness was higher than calculated value. Significant synergistic effect was found when GSG-RA80>150 ppm, although the optimized range was 250-300 ppm.

Example 37. Evaluating the Taste Profile of Compositions of GSG-RA50 and RA75/RB15 to Find Out the Optimized Ratio with the Best Synergistic Taste Effects The samples were tested in aqueous solution of citric acid at pH 3.8.

The control sample was RA75/RB15 at 400 ppm, corresponding to 7.0% SE.

The samples were as follows:

TABLE 85

| RA75/RB15 | GSG-RA50 | total GSG |
|---|---|---|
| 400 ppm | — | |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 64:
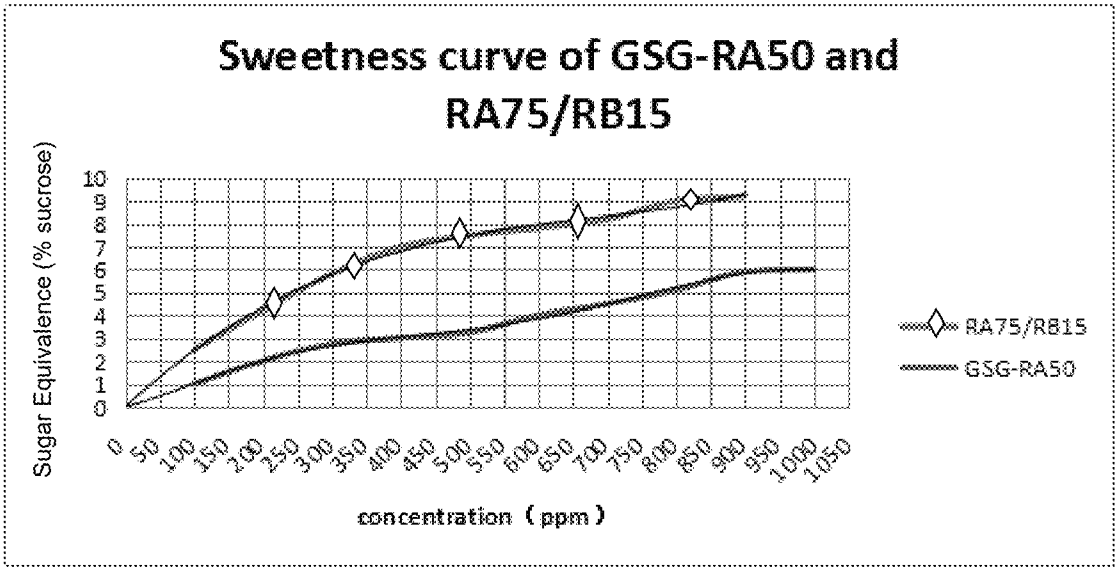
FIG. 64 is a graphical illustration showing the sweetness curve of GSG-RA50 and RA75/RB15.

Sweetness curves of GSG-RA50 and RA75/RB15 are shown in FIG. 64.

A taste profile of the RA75/RB15/GSG-RA50 composition is shown in Table 86.

TABLE 86

| RA75/ RB15 | GSG- RA50 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.8% | 4.5 | 0 | 0.5 | 1 |
| 250 ppm | 150 ppm | 8.0% | 4.5 | 0 | 0.5 | 1 |
| 200 ppm | 200 ppm | 7.8% | 4 | 0 | 1 | 1.5 |
| 150 ppm | 250 ppm | 7.0% | 4.5 | 0 | 0.5 | 0.5 |
| 100 ppm | 300 ppm | 6.4% | 4.5 | 0 | 0.5 | 0.5 |

As for the synergistic effect, it can be found in Table 87.

TABLE 87

| RA75/ RB15 concentration | Calculated SE of RB75/ RB15 | GSG- RA50 concentration | Calculated SE of GSG- RA50 | Calculated SE of the composition | Measured SE of the composition | Calculated sweetness (ppm sucrose) of GSG-RA50 per ppm | Measured sweetness (ppm sucrose) of GSG- RA50 per ppm |
|---|---|---|---|---|---|---|---|
| 400 ppm | | 0 | | | | 0.00 | 0 |
| 300 ppm | 5.80% | 100 | 1% | 6.80% | 7.80% | 100.00 | 200.00 |
| 250 ppm | 5% | 150 | 1.50% | 6.50% | 8.00% | 100.00 | 200.00 |
| 200 ppm | 4% | 200 | 2% | 6.20% | 7.80% | 100.00 | 180.00 |
| 150 ppm | 3.40% | 250 | 2.40% | 5.80% | 7.00% | 96.00 | 144.00 |
| 100 ppm | 3% | 300 | 2.75% | 5.25% | 6.40% | 91.67 | 130.00 |

Calculated sweetness (ppm sugar) of GSG-RA50 per ppm=calculated SE of GSG-RA50/concentration of GSG-RA50.

Measured sweetness (ppm sugar) of GSG-RA50 per ppm=(Measured SE-calculated SE of RA75/RB15)/concentration of GSG-RA50.

Figure 65:
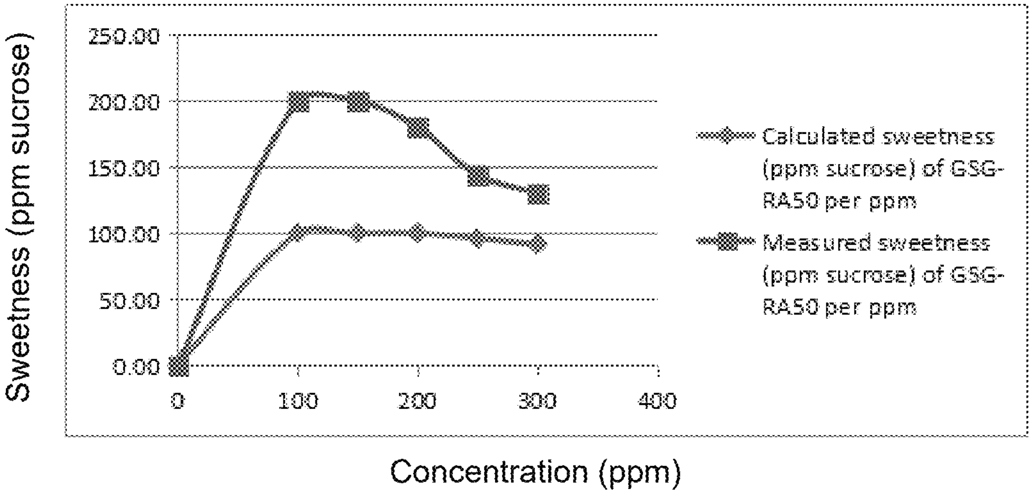
FIG. 65 is a graphical illustration showing the calculated and measured sweetness of GSG-RA50 per ppm in 400 ppm GSG-RA50 and RA75/RB15 compositions.

The data are shown in FIG. 65.

It is found that at 400 ppm total solid content, with the increase of the amount of GSG-RA50, its measured contribution of sweetness was higher than calculated value. Significant synergistic effect was found when GSG-RA50>100 ppm, although the optimized range was 100-200 ppm.

Example 38. Evaluating the Taste Profile of Compositions of GSG-RA50 and RA/RD to Find Out the Optimized Ratio with the Best Synergistic Taste Effects The samples were tested in aqueous solution of citric acid at pH 3.8.

The control sample was RA/RD at 400 ppm, corresponding to 6.5% SE.

The samples were as follows:

TABLE 88

| RA/RD | GSG-RA50 | total GSG |
|---|---|---|
| 400 ppm | — | |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 66:
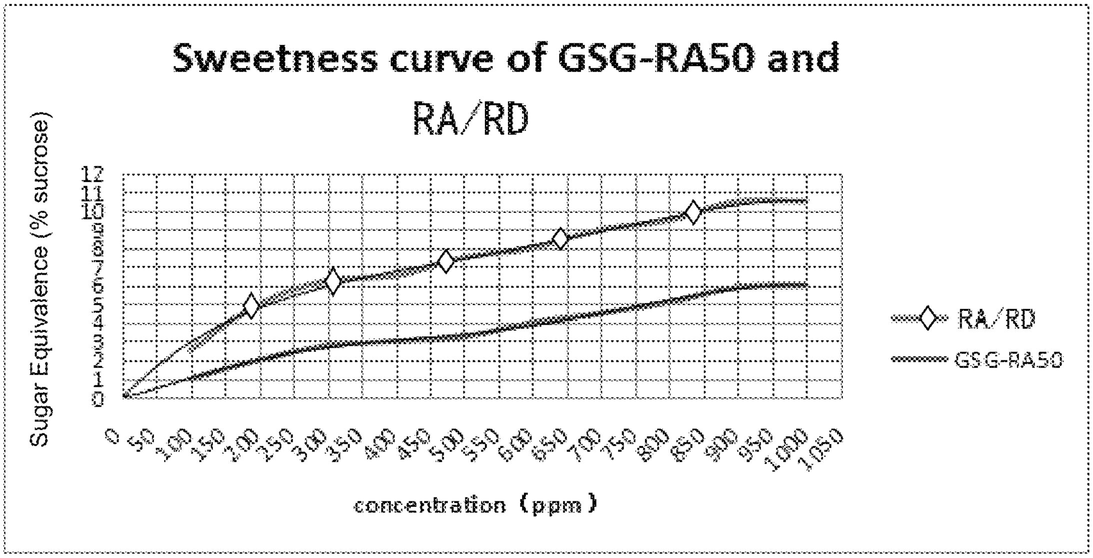
FIG. 66 is a graphical illustration showing the sweetness curve of GSG-RA50 and RA/RD.

Sweetness curves of GSG-RA50 and RA/RD are shown in FIG. 66.

A taste profile of the RA/RD/GSG-RA50 composition is shown in Table 89.

TABLE 89

| RA/RD | GSG-RA50 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.8% | 4 | 1 | 1 | 1 |
| 250 ppm | 150 ppm | 8.0% | 4 | 0.5 | 1 | 1 |
| 200 ppm | 200 ppm | 7.5% | 4.5 | 0 | 0.5 | 0.5 |
| 150 ppm | 250 ppm | 7.0% | 4.5 | 0 | 0.5 | 0.5 |
| 100 ppm | 300 ppm | 7.0% | 4.5 | 0 | 0.5 | 1 |

The taste of RA/RD was improved by GSG-RA50 by reducing the bitterness and lingering.

As for the synergistic effect, it can be found in Table 90.

TABLE 90

| RA/RD concentration | Calculated SE of RA/RD | GSG-RA50 concentration | Calculated SE of GSG-RA50 | Calculated SE of the composition | Measured SE of the composition | Calculated sweetness (ppm sucrose) of GSG-RA50 per ppm | Measured sweetness (ppm sucrose) of GSG-RA50 per ppm |
|---|---|---|---|---|---|---|---|
| 400 ppm | | 0 | | | | 0.00 | 0 |
| 300 ppm | 6.00% | 100 | 1% | 7.00% | 7.80% | 100.00 | 180.00 |
| 250 ppm | 5.50% | 150 | 1.50% | 7.00% | 8.00% | 100.00 | 166.67 |
| 200 ppm | 4.80% | 200 | 2% | 6.80% | 7.50% | 100.00 | 135.00 |
| 150 ppm | 4.00% | 250 | 2.40% | 6.40% | 7.00% | 96.00 | 120.00 |
| 100 ppm | 3.00% | 300 | 2.75% | 5.75% | 7.00% | 91.67 | 133.33 |

Calculated sweetness (ppm sugar) of GSG-RA50 per ppm=calculated SE of GSG-RA50/concentration of GSG-RA50.

Measured sweetness (ppm sugar) of GSG-RA50 per ppm=(Measured SE-calculated SE of RA/RD)/concentration of GSG-RA50.

Figure 67:
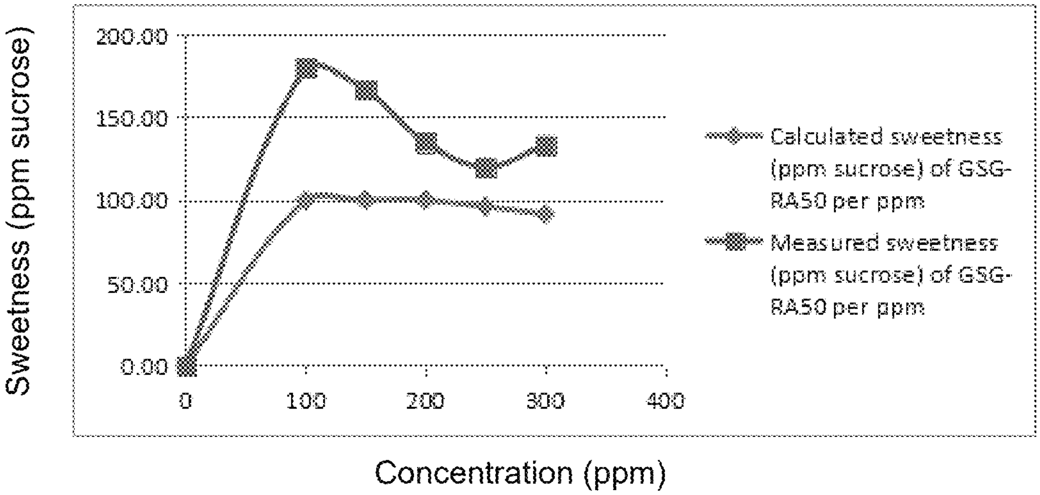
FIG. 67 is a graphical illustration showing the calculated and measured sweetness of GSG-RA50 per ppm in 400 ppm GSG-RA50 and RA/RD compositions.

The data are shown in FIG. 67.

It is found that at 400 ppm total solid content, with the increase of the amount of GSG-RA50, its measured contribution of sweetness was higher than calculated value. Significant synergistic effect was found when GSG-RA50>100 ppm, although the optimized range was 100-200 ppm.

Example 39. Evaluating the Taste Profile of Compositions of GSG-RA50 and RA80/RB10/RD6 to Find Out the Optimized Ratio with the Best Synergistic Taste Effects The samples were tested in aqueous solution of citric acid at pH 3.8.

The control sample was RA80/RB10/RD6 at 400 ppm, corresponding to 8.3% SE.

The samples were as follows:

TABLE 91

| RA80/RB10/RD6 | GSG-RA50 | total GSG |
|---|---|---|
| 400 ppm | — | |
| 300 ppm | 100 ppm | 22.34% |
| 250 ppm | 150 ppm | 33.51% |
| 200 ppm | 200 ppm | 44.68% |
| 150 ppm | 250 ppm | 55.84% |
| 100 ppm | 300 ppm | 67.01% |

Figure 68:
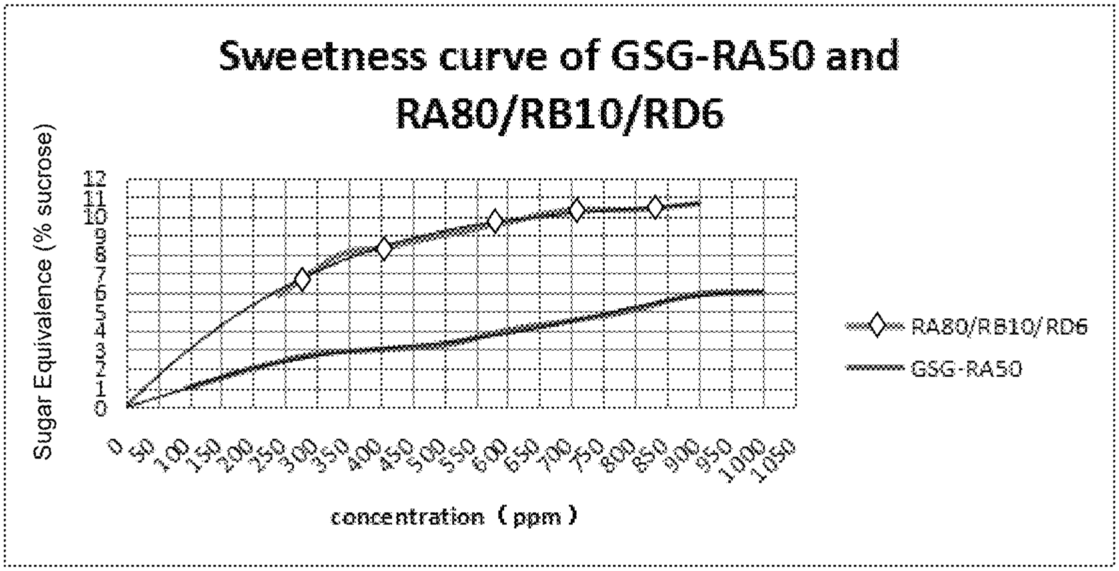
FIG. 68 is a graphical illustration showing the sweetness curve of GSG-RA50 and RA80/RB10/RD6.

Sweetness curves of GSG-RA50 and RA80/RB10/RD6 are shown in FIG. 68.

A taste profile of the RA80/RB10/RD6/GSG-RA50 composition is shown in Table 92.

As for the synergistic effect, it can be found in Table 93.

TABLE 93

| RA80/ RB10/ RD6 concentration | Calculated SE of RA80/ RB10/ RD6 | GSG-RA80 concentration | Calculated SE of GSG-RA80 | Calculated SE of the composition | Measured SE of the composition | Calculated sweetness (ppm sucrose) of GSG-RA80 per ppm | Measured sweetness (ppm sucrose) of GSG-RA80 per ppm |
|---|---|---|---|---|---|---|---|
| 400 ppm | | 0 | | | | 0.00 | 0 |
| 300 ppm | 7.20% | 100 | 1% | 8.20% | 7.80% | 100.00 | 60.00 |
| 250 ppm | 6.00% | 150 | 1.50% | 7.50% | 8.00% | 100.00 | 133.33 |
| 200 ppm | 5.40% | 200 | 2% | 7.40% | 7.80% | 100.00 | 120.00 |
| 150 ppm | 4.20% | 250 | 2.40% | 6.60% | 7.00% | 96.00 | 112.00 |
| 100 ppm | 3.00% | 300 | 2.75% | 5.75% | 6.50% | 91.67 | 116.67 |

Calculated sweetness (ppm sugar) of GSG-RA50 per ppm=calculated SE of GSG-RA50/concentration of GSG-RA50.

Measured sweetness (ppm sugar) of GSG-RA50 per ppm=(Measured SE-calculated SE of RA80/RB10/RD6)/concentration of GSG-RA50.

Figure 69:
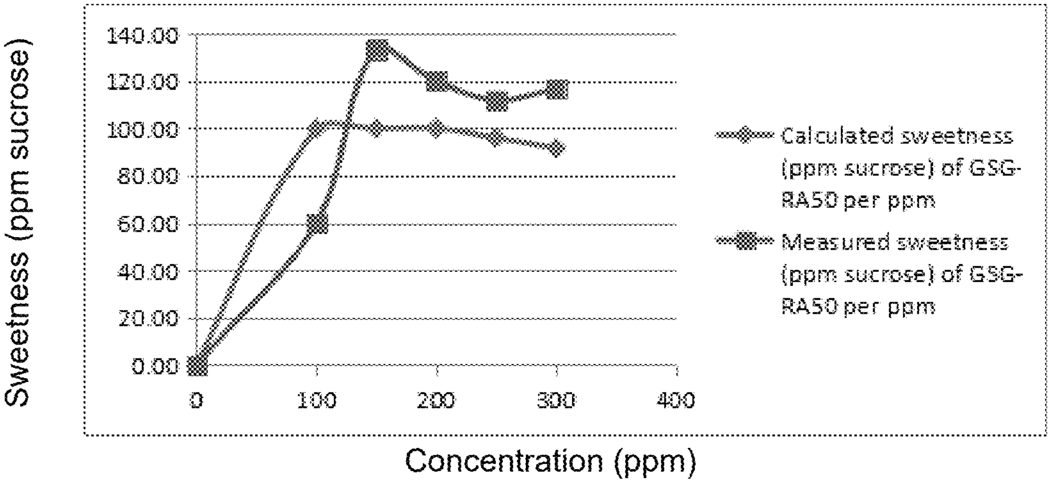
FIG. 69 is a graphical illustration showing the calculated and measured sweetness of GSG-RA50 per ppm in 400 ppm GSG-RA50 and RA80/RB10/RD6 compositions.

The data are shown in FIG. 69.

It was found that at 400 ppm total solid content, with the increase of the amount of GSG-RA50, its measured contribution of sweetness was higher than calculated value. A significant synergistic effect was found when GSG-RA50>150 ppm, although the optimized range was 150-200 ppm.

Example 40. Evaluating the Taste Profile of Compositions of GSG-RA40 and RA75/RB15 to Find Out the Optimized Ratio with the Best Synergistic Taste Effects The samples were tested in aqueous solution of citric acid at pH 3.8.

The control sample was RA75/RB15 at 400 ppm, corresponding to 7.0% SE.

The samples were as follows:

TABLE 94

| RA75/RB15 | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 70:
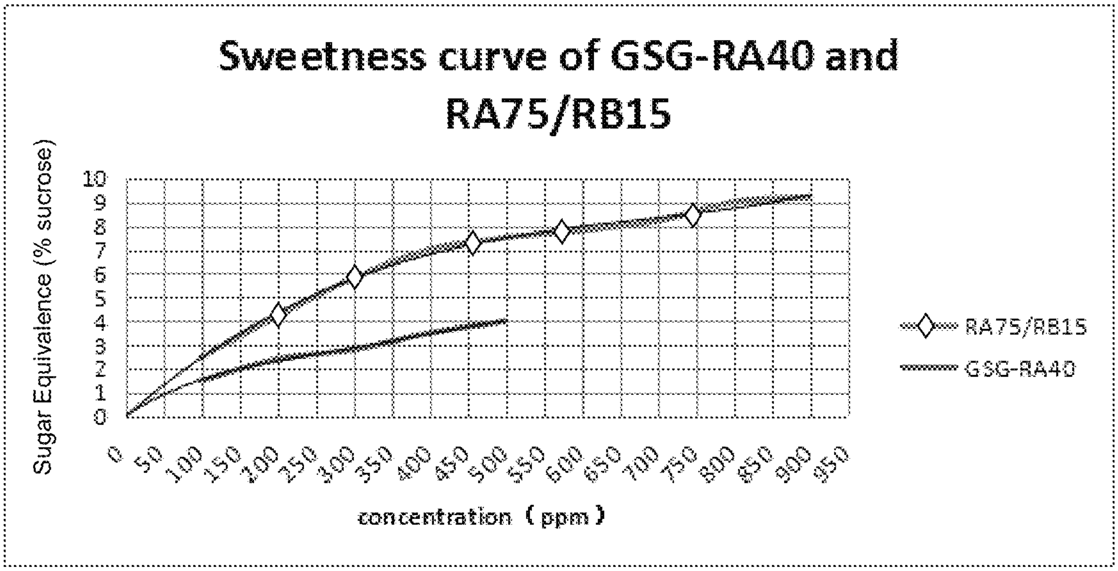
FIG. 70 is a graphical illustration showing the sweetness curve of GSG-RA40 and RA75/RB15.

Sweetness curves of GSG-RA40 and RA75/RB15 are shown in FIG. 70.

A taste profile of the RA75/RB15/GSG-RA40 composition is shown in Table 95.

TABLE 95

| RA75/ RB15 | GSG- RA40 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.4% | 4 | 0 | 1 | 1 |
| 250 ppm | 150 ppm | 7.5% | 4 | 0 | 1 | 1 |
| 200 ppm | 200 ppm | 7.0% | 3.5 | 0 | 2 | 2 |
| 150 ppm | 250 ppm | 6.8% | 3.5 | 0 | 1.5 | 1.5 |
| 100 ppm | 300 ppm | 6.5% | 4 | 0 | 1 | 1 |

As for the synergistic effect, it can be found in Table 96.

TABLE 96

| RA75/ RB15 concentration | Calculated SE of RA75/ RB15 | GSG- RA40 concentration | Calculated SE of GSG- RA40 | Calculated SE of the composition | Measured SE of the composition | Calculated sweetness (ppm sucrose) of GSG-RA40 per ppm | Measured sweetness (ppm sucrose) of GSG- RA40 per ppm |
|---|---|---|---|---|---|---|---|
| 400 ppm | | 0 | | | | 0.00 | 0 |
| 300 ppm | 5.80% | 100 | 1.50% | 7.30% | 7.40% | 150.00 | 160.00 |
| 250 ppm | 5% | 150 | 2.00% | 7.00% | 7.50% | 133.33 | 166.67 |
| 200 ppm | 4% | 200 | 2.40% | 6.60% | 7.00% | 120.00 | 140.00 |
| 150 ppm | 3.40% | 250 | 2.70% | 6.10% | 6.80% | 108.00 | 136.00 |
| 100 ppm | 3% | 300 | 2.80% | 5.30% | 6.50% | 93.33 | 133.33 |

Calculated sweetness (ppm sugar) of GSG-RA40 per ppm=calculated SE of GSG-RA40/concentration of GSG-RA40.

Measured sweetness (ppm sugar) of GSG-RA40 per ppm=(Measured SE-calculated SE of RA75/RB15)/concentration of GSG-RA40.

Figure 71:
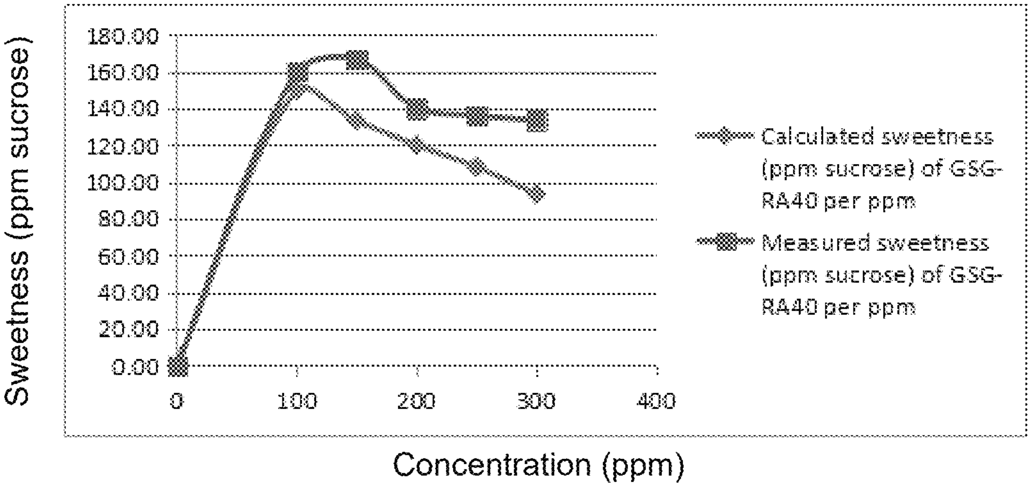
FIG. 71 is a graphical illustration showing the calculated and measured sweetness of GSG-RA40 per ppm in 400 ppm GSG-RA40 and RA75/RB15, compositions.

The data are shown in FIG. 71.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-200 ppm.

Example 41. Evaluating the Taste Profile of Compositions of GSG-RA40 and RA/RD to Find Out the Optimized Ratio with the Best Synergistic Taste Effects The samples were tested in aqueous solution of citric acid at pH 3.8.

The control sample was RA/RD at 400 ppm, corresponding to 6.5% SE.

The samples were as follows:

TABLE 97

| RA/RD | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 72:
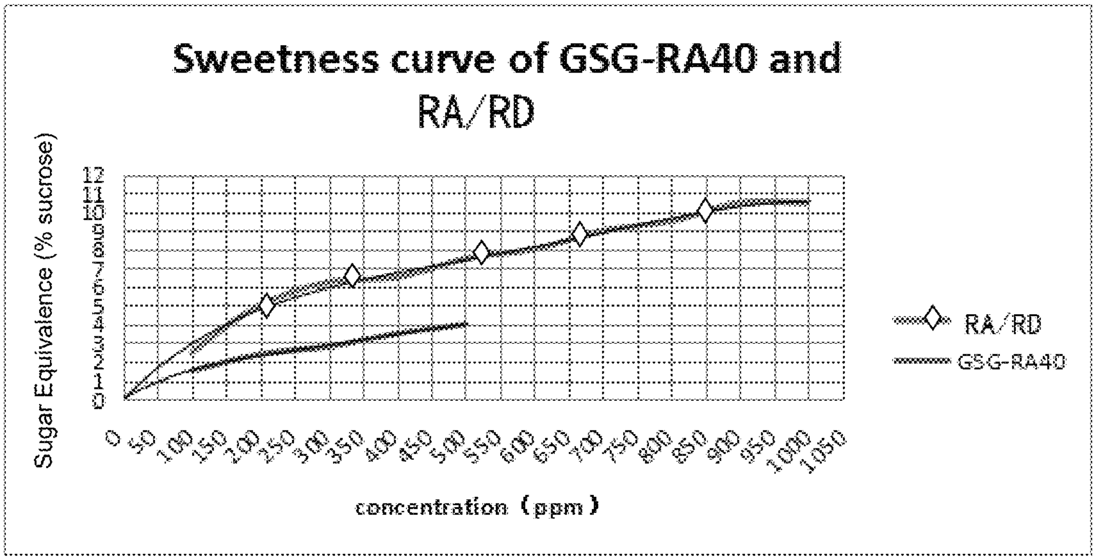
FIG. 72 is a graphical illustration showing the sweetness curve of GSG-RA40 and RA/RD.

Sweetness curves of GSG-RA40 and RA/RD are shown in FIG. 72.

A taste profile of the RA/RD/GSG-RA40 composition is shown in Table 98.

TABLE 98

| RA/RD | GSG- RA40 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.2% | 3.5 | 0.5 | 1.5 | 2 |
| 250 ppm | 150 ppm | 7.8% | 3.5 | 1 | 1 | 1.5 |
| 200 ppm | 200 ppm | 7.5% | 3 | 0.5 | 2 | 2 |

TABLE 98-continued

| RA/RD | GSG-RA40 | SE | Sugar like | Bitterness | Aftertaste | Lingering |
|---|---|---|---|---|---|---|
| 150 ppm | 250 ppm | 7.2% | 4 | 0.5 | 1 | 1.5 |
| 100 ppm | 300 ppm | 6.5% | 3.5 | 0.5 | 2 | 1.5 |

As for the synergistic effect, it can be found in Table 99.

TABLE 99

| RA/RD concentration | Calculated SE of RA/RD | GSG-RA40 concentration | Calculated SE of GSG-RA40 | Calculated SE of the composition | Measured SE of the composition | Calculated sweetness (ppm sucrose) of GSG-RA40 per ppm | Measured sweetness (ppm sucrose) of GSG-RA40 per ppm |
|---|---|---|---|---|---|---|---|
| 400 ppm | | 0 | | | | 0.00 | 0 |
| 300 ppm | 6.00% | 100 | 1.50% | 7.50% | 7.20% | 150.00 | 120.00 |
| 250 ppm | 5.50% | 150 | 2.00% | 7.50% | 7.80% | 133.33 | 153.33 |
| 200 ppm | 4.80% | 200 | 2.40% | 7.20% | 7.50% | 120.00 | 135.00 |
| 150 ppm | 4.00% | 250 | 2.70% | 6.70% | 7.20% | 108.00 | 128.00 |
| 100 ppm | 3.00% | 300 | 2.80% | 5.80% | 6.50% | 93.33 | 116.67 |

Calculated sweetness (ppm sugar) of GSG-RA40 per ppm=calculated SE of GSG-RA40/concentration of GSG-RA40.

Measured sweetness (ppm sugar) of GSG-RA40 per ppm=(Measured SE-calculated SE of RA/RD)/concentration of GSG-RA40.

Figure 73:
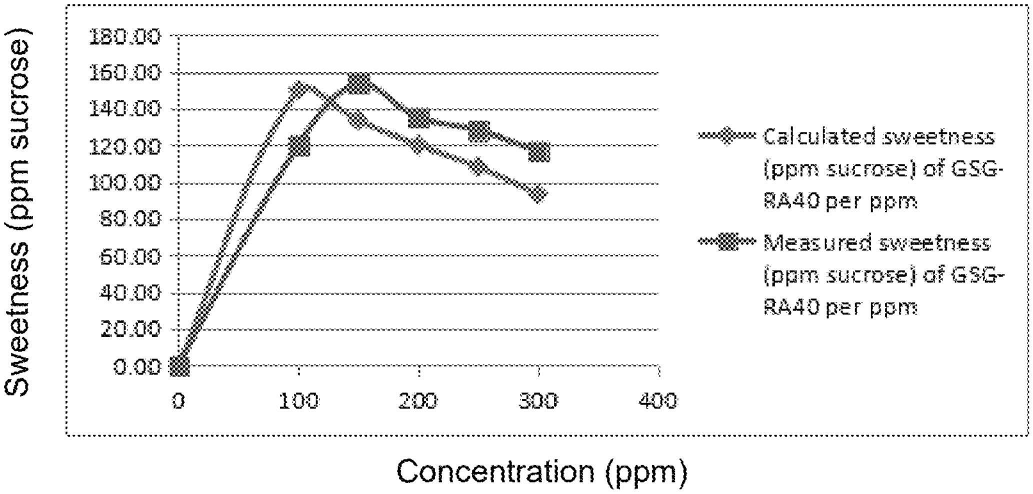
FIG. 73 is a graphical illustration showing the calculated and measured sweetness of GSG-RA40 per ppm in 400 ppm GSG-RA40 and RA/RD compositions.

The data are shown in FIG. 73.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-250 ppm.

Example 42. Evaluating the Taste Profile of Compositions of GSG-RA40 and RA80/RB10/RD6 to Find Out the Optimized Ratio with the Best Synergistic Taste Effects The samples were tested in aqueous solution of citric acid at pH 3.8.

The control sample was RA80/RB10/RD6 at 400 ppm, corresponding to 8.3% SE.

The samples were as follows:

TABLE 100

| RA80/RB10/RD6 | GSG-RA40 |
|---|---|
| 400 ppm | — |
| 300 ppm | 100 ppm |
| 250 ppm | 150 ppm |
| 200 ppm | 200 ppm |
| 150 ppm | 250 ppm |
| 100 ppm | 300 ppm |

Figure 74:
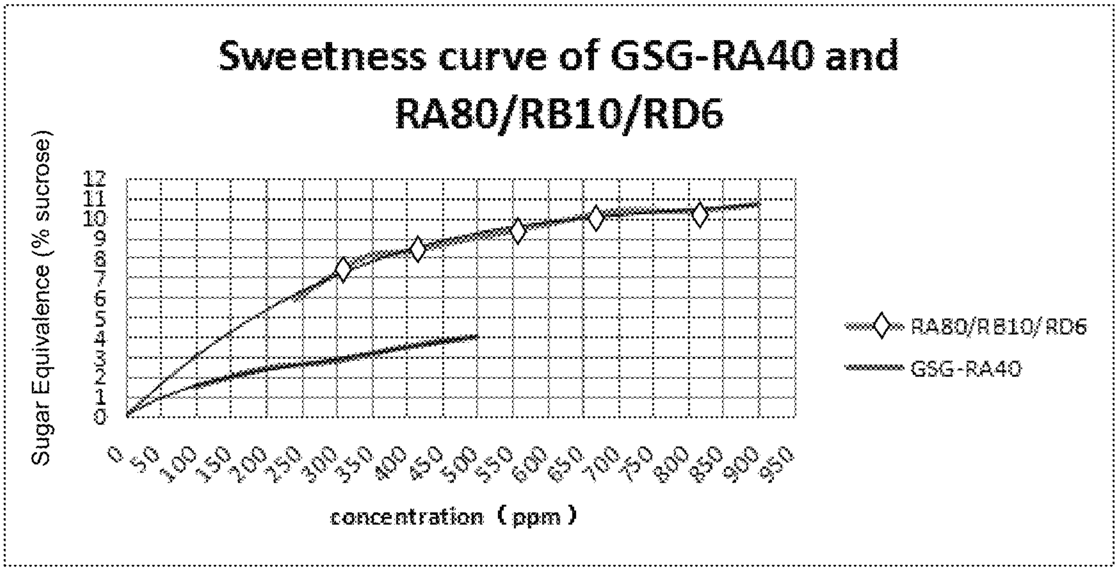
FIG. 74 is a graphical illustration showing the sweetness curve of GSG-RA40 and RA80/RB10/RD6.

Sweetness curves of GSG-RA40 and RA80/RB10/RD6 are shown as FIG. 74.

A taste profile of the RA80/RB10/RD6/GSG-RA40 composition is shown in Table 101.

TABLE 101

| RA80/RB10/RD6 | GSG-RA40 | SE | Sugar like | Bitterness | Aftertaste | Lingering |
|---|---|---|---|---|---|---|
| 400 ppm | — | 8.3% | 4.5 | 0 | 0 | 0.5 |
| 300 ppm | 100 ppm | 8.1% | 3.5 | 0 | 2 | 2 |
| 250 ppm | 150 ppm | 8.5% | 4 | 0 | 1 | 1 |
| 200 ppm | 200 ppm | 8.2% | 4 | 0 | 1 | 1 |
| 150 ppm | 250 ppm | 7.5% | 4 | 0 | 1 | 1 |
| 100 ppm | 300 ppm | 7.0% | 3 | 0 | 2.5 | 2 |

As for the synergistic effect, it can be found in Table 102.

TABLE 102

| RA80/RA10/RD6 concentration | Calculated SE of RA80/RA10/RD6 | GSG-RA40 concentration | Calculated SE of GSG-RA40 | Calculated SE of the composition | Measured SE of the composition | Calculated sweetness (ppm sucrose) of GSG-RA40 per ppm | Measured sweetness (ppm sucrose) of GSG-RA40 per ppm |
|---|---|---|---|---|---|---|---|
| 400 ppm | | 0 | | | | 0.00 | 0 |
| 300 ppm | 7.20% | 100 | 1.50% | 8.70% | 8.10% | 150.00 | 90.00 |
| 250 ppm | 6.00% | 150 | 2.00% | 8.00% | 8.50% | 133.33 | 166.67 |
| 200 ppm | 5.40% | 200 | 2.40% | 7.80% | 8.20% | 120.00 | 140.00 |
| 150 ppm | 4.20% | 250 | 2.70% | 6.90% | 7.50% | 108.00 | 132.00 |
| 100 ppm | 3.00% | 300 | 2.80% | 5.80% | 7.00% | 93.33 | 133.33 |

Calculated sweetness (ppm sugar) of GSG-RA40 per ppm=calculated SE of GSG-RA40/concentration of GSG-RA40.

Measured sweetness (ppm sugar) of GSG-RA40 per ppm=(Measured SE-calculated SE of RA80/RB10/RD6)/concentration of GSG-RA40.

Figure 75:
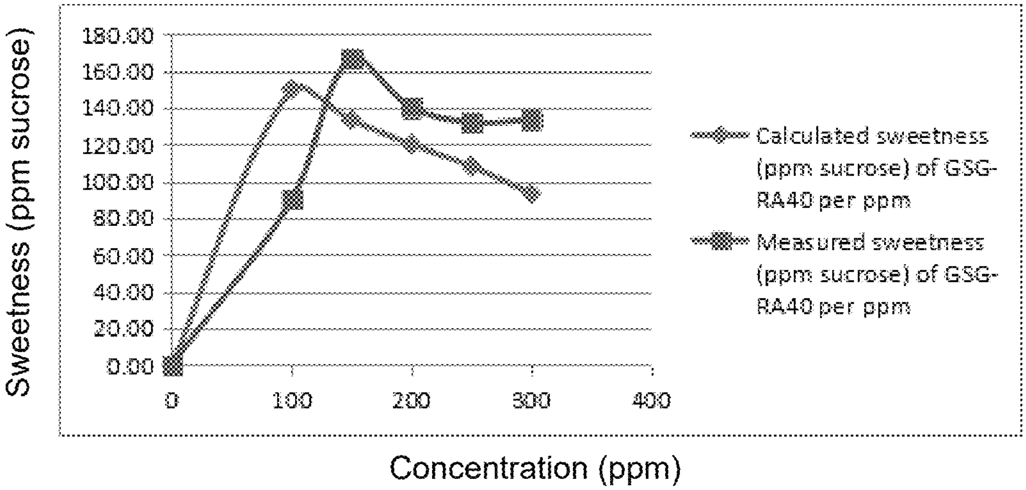
FIG. 75 is a graphical illustration showing the calculated and measured sweetness of GSG-RA40 per ppm in 400 ppm GSG-RA40 and RA80/RB10/RD6 compositions.

The data are shown in FIG. 75.

It is found that at 400 ppm total solid content, with the increase of the amount of GSG-RA40, its measured contribution of sweetness was higher than calculated value. Significant synergistic effect was found when GSG-RA40>150 ppm, although the optimized range was 150-250 ppm.

Example 43. Evaluating the Taste Profile of Compositions of GSG-RA20 and RA75/RB15 to Find Out the Optimized Ratio with the Best Synergistic Taste Effects The samples were tested in aqueous solution of citric acid at pH 3.8.

The control sample was RA75/RB15 at 400 ppm, corresponding to 7.0% SE.

The samples were as follows:

TABLE 103

| RA75/RB15 | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 76:
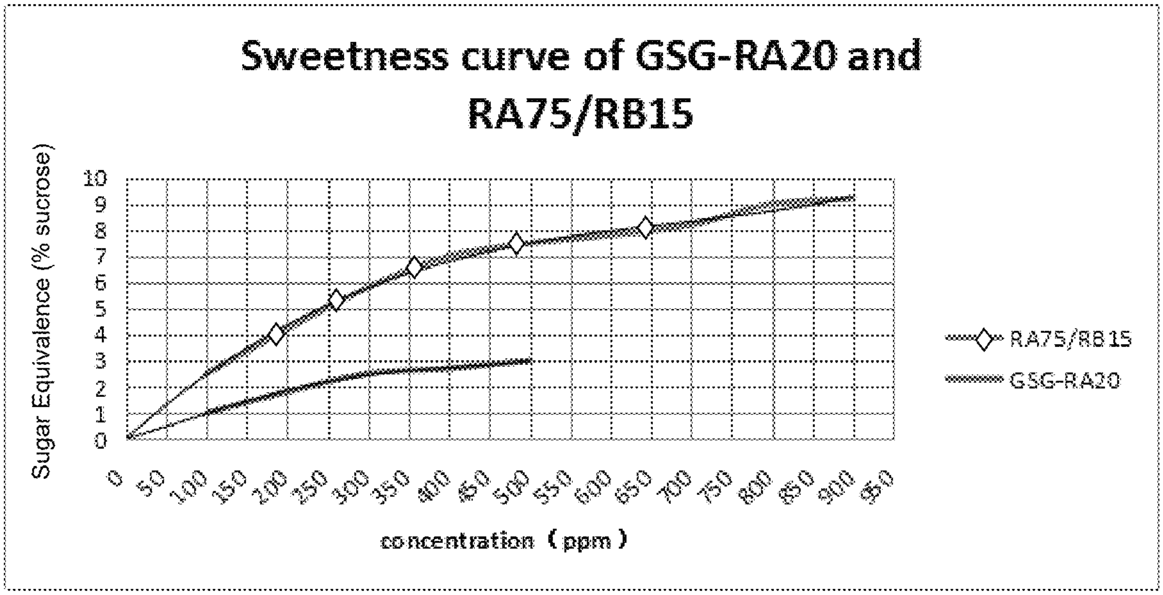
FIG. 76 is a graphical illustration showing the sweetness curve of GSG-RA20 and RA75/RB15.

Sweetness curves of GSG-RA20 and RA75/RB15 are shown as FIG. 76.

A taste profile of the RA75/RB15/GSG-RA20 composition is shown in Table 104.

TABLE 104

| RA75/ RB15 | GSG- RA20 | SE | Sugar like | Bitterness | Aftertaste | Lingering |
|---|---|---|---|---|---|---|
| 400 ppm | — | 7.0% | 4.5 | 0 | 1.5 | 1.5 |
| 300 ppm | 100 ppm | 7.2% | 4 | 0 | 1 | 1 |
| 250 ppm | 150 ppm | 7.5% | 4 | 0 | 1 | 1 |
| 200 ppm | 200 ppm | 6.8% | 3.5 | 0 | 2 | 2 |
| 150 ppm | 250 ppm | 6.9% | 3.5 | 0 | 1.5 | 1.5 |
| 100 ppm | 300 ppm | 6.5% | 4 | 0 | 1 | 1 |

As for the synergistic effect, it can be found in Table 105.

TABLE 105

| RA75/ RA15 concentration | Calculated SE of RA75/ RB15 | GSG- RA20 concentration | Calculated SE of GSG- RA20 | Calculated SE of the composition | Measured SE of the composition | Calculated sweetness (ppm sucrose) of GSG-RA20 per ppm | Measured sweetness (ppm sucrose) of GSG- RA20 per ppm |
|---|---|---|---|---|---|---|---|
| 400 ppm | | 0 | | | | 0.00 | 0 |
| 300 ppm | 5.80% | 100 | 1.00% | 6.80% | 7.20% | 100.00 | 140.00 |
| 250 ppm | 5% | 150 | 1.40% | 6.40% | 7.50% | 93.33 | 166.67 |
| 200 ppm | 4% | 200 | 1.80% | 6.00% | 6.80% | 90.00 | 130.00 |
| 150 ppm | 3.40% | 250 | 2.20% | 5.60% | 6.90% | 88.00 | 140.00 |
| 100 ppm | 3% | 300 | 2.60% | 5.10% | 6.50% | 86.67 | 133.33 |

Calculated sweetness (ppm sugar) of GSG-RA20 per ppm=calculated SE of GSG-RA20/concentration of GSG-RA20.

Measured sweetness (ppm sugar) of GSG-RA20 per ppm=(Measured SE-calculated SE of RA75/RB15)/concentration of GSG-RA20.

Figure 77:
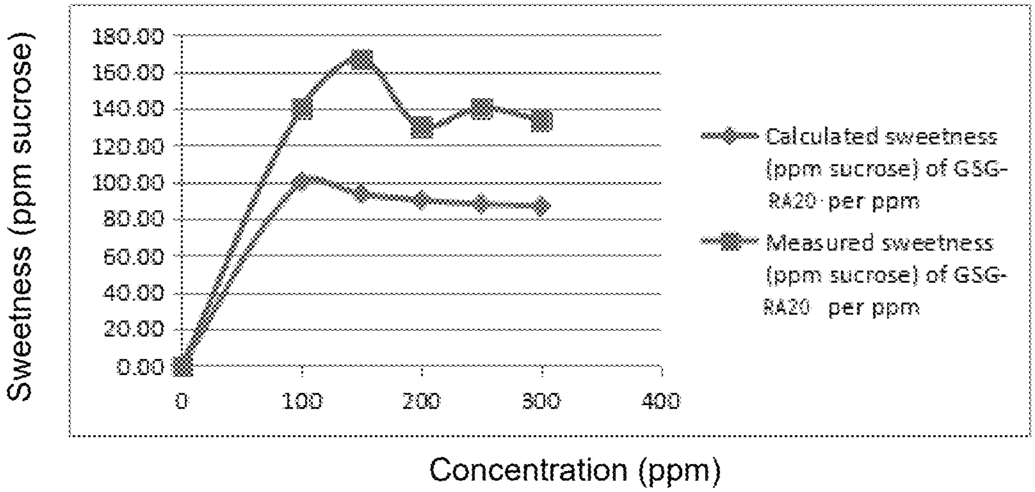
FIG. 77 is a graphical illustration showing the calculated and measured sweetness of GSG-RA20 per ppm in 400 ppm GSG-RA20 and RA75/RB15 compositions.

The data are shown in FIG. 77.

It is found that at 400 ppm total solid content, with the increase of the amount of GSG-RA20, its measured contribution of sweetness was higher than calculated value. Significant synergistic effect was found when GSG-RA20>100 ppm, although the optimized range was 100-200 ppm.

Example 44. Evaluating the Taste Profile of Compositions of GSG-RA20 and RA/RD to Find Out the Optimized Ratio with the Best Synergistic Taste Effects The samples were tested in aqueous solution of citric acid at pH 3.8.

The control sample was RA/RD at 400 ppm, corresponding to 6.5% SE.

The samples were as follows:

TABLE 106

| RA/RD | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 78:
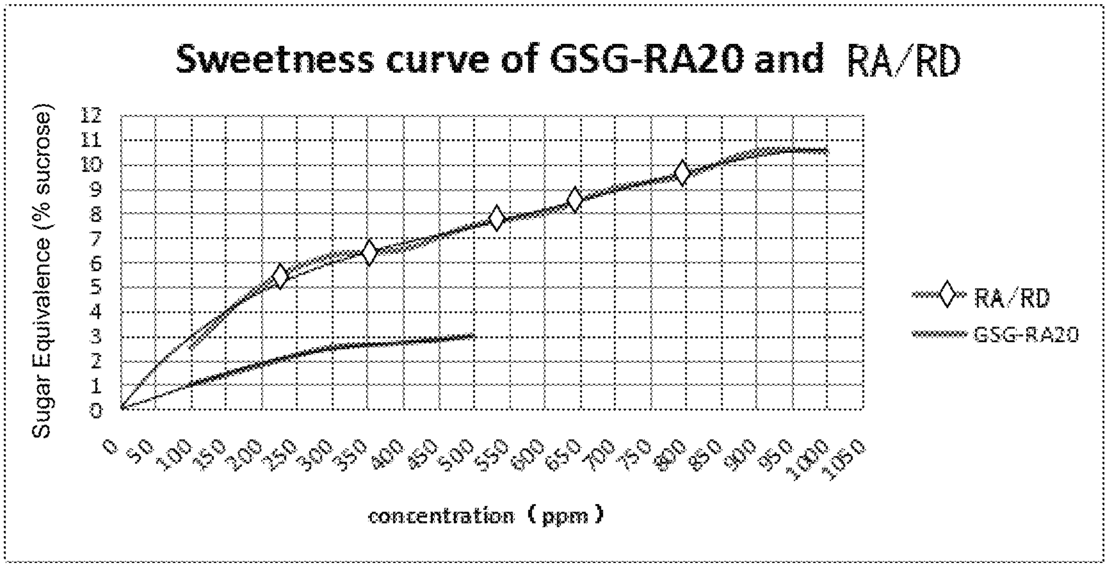
FIG. 78 is a graphical illustration showing the sweetness curve of GSG-RA20 and RA/RD.

Sweetness curves of GSG-RA20 and RA/RD are shown in FIG. 78.

A taste profile of the RA/RD/GSG-RA20 composition is shown in Table 107.

TABLE 107

| RA/RD | GSG-RA20 | SE | Sugar like | Bitterness | Aftertaste | Lingering |
|---|---|---|---|---|---|---|
| 400 ppm | — | 6.5% | 3.5 | 1 | 1 | 1.5 |
| 300 ppm | 100 ppm | 7.0% | 4 | 0 | 1 | 1 |
| 250 ppm | 150 ppm | 7.4% | 4 | 0 | 1 | 1 |
| 200 ppm | 200 ppm | 7.1% | 4.5 | 0 | 0.5 | 1 |
| 150 ppm | 250 ppm | 6.9% | 4 | 0 | 1 | 1 |
| 100 ppm | 300 ppm | 6.2% | 3.5 | 0 | 2 | 1.5 |

As for the synergistic effect, it can be found in Table 108.

TABLE 108

| RA/RD concentration | Calculated SE of RA/RD | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | | | 0.00 | 0 |
| 300 ppm | 6.00% | 100 | 1.00% | 7.00% | 7.00% | 100.00 | 100.00 |
| 250 ppm | 5.50% | 150 | 1.40% | 6.90% | 7.40% | 93.33 | 126.67 |
| 200 ppm | 4.80% | 200 | 1.80% | 6.60% | 7.10% | 90.00 | 115.00 |
| 150 ppm | 4.00% | 250 | 2.20% | 6.20% | 6.90% | 88.00 | 116.00 |
| 100 ppm | 3.00% | 300 | 2.60% | 5.60% | 6.20% | 86.67 | 106.67 |

Calculated sweetness (ppm sugar) of GSG-RA20 per ppm=calculated SE of GSG-RA20/concentration of GSG-RA20.

Measured sweetness (ppm sugar) of GSG-RA20 per ppm=(Measured SE-calculated SE of RA/RD)/concentration of GSG-RA20.

Figure 79:
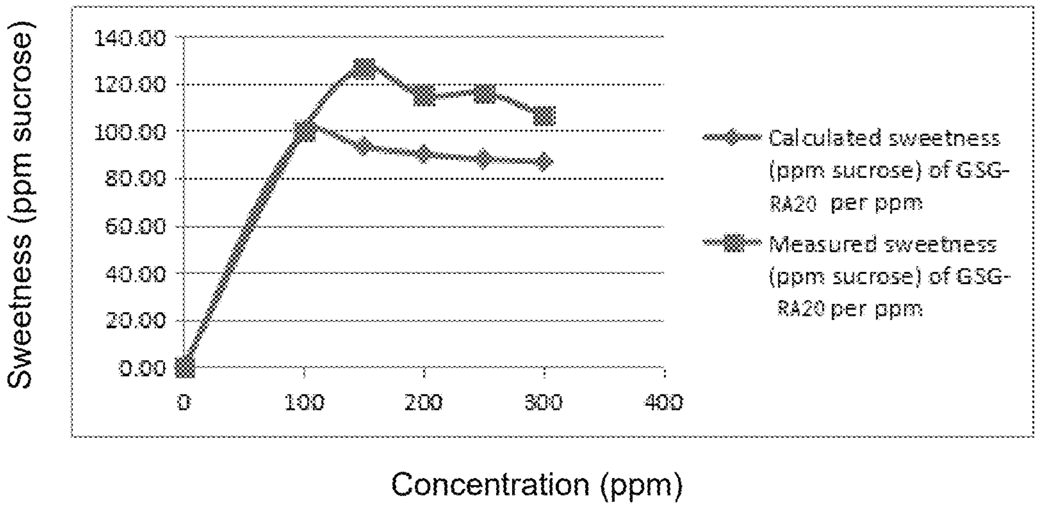
FIG. 79 is a graphical illustration showing the calculated and measured sweetness of GSG-RA20 per ppm in 400 ppm GSG-RA20 and RA/RD compositions.

The data are shown in FIG. 79.

It is found that at 400 ppm total solid content, with the increase of the amount of GSG-RA20, its measured contribution of sweetness was higher than calculated value. Significant synergistic effect was found when GSG-RA20>150 ppm, although the optimized range was 150-250 ppm.

Example 45. Evaluating the Taste Profile of Compositions of GSG-RA20 and RA80/RB10/RD6 to Find Out the Optimized Ratio with the Best Synergistic Taste Effects The samples were tested in aqueous solution of citric acid at pH 3.8.

The control sample was RA80/RB10/RD6 at 400 ppm, corresponding to 8.3% SE.

The samples were as follows:

TABLE 109

| RA80/RB10/RD6 | GSG-RA20 | total GSG |
|---|---|---|
| 400 ppm | — | |
| 300 ppm | 100 ppm | 18.56% |
| 250 ppm | 150 ppm | 27.84% |
| 200 ppm | 200 ppm | 37.13% |
| 150 ppm | 250 ppm | 46.41% |
| 100 ppm | 300 ppm | 55.69% |

Figure 80:
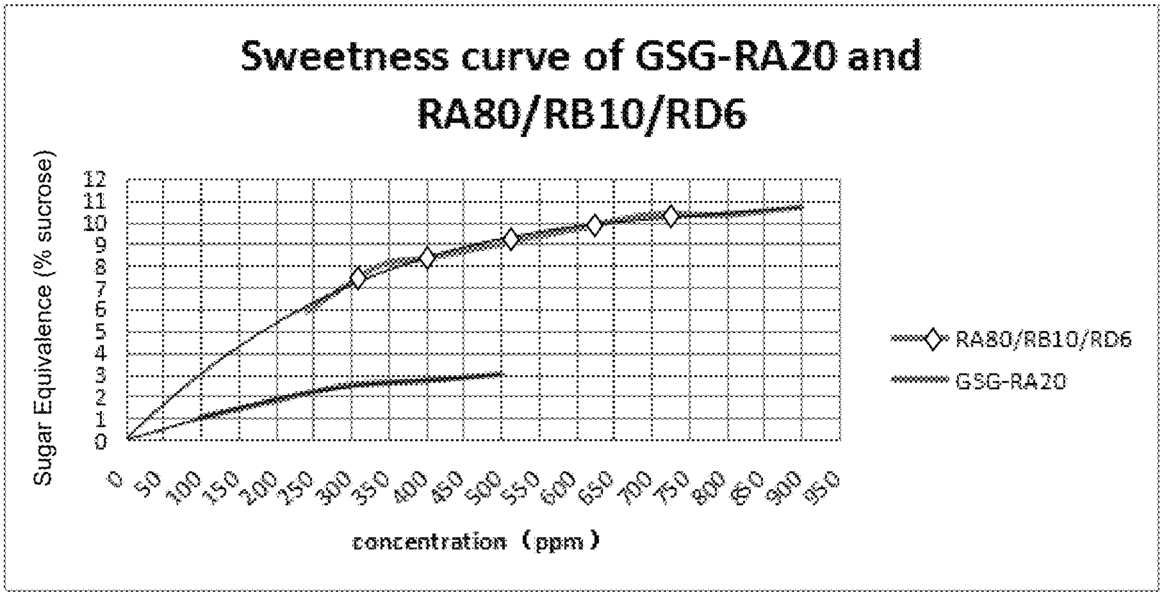
FIG. 80 is a graphical illustration showing the sweetness curve of GSG-RA20 and RA80/RB10/RD6.

Sweetness curves of GSG-RA20 and RA80/RB10/RD6 are shown in FIG. 80.

A taste profile of the RA80/RB10/RD6/GSG-RA20 composition is shown in Table 110.

TABLE 110

| RA80/ RB10/ RD6 | GSG-RA20 | SE | Sugar like | Bitterness | Aftertaste | Lingering |
|---|---|---|---|---|---|---|
| 400 ppm | — | 8.3% | 4.5 | 0 | 0 | 0.5 |
| 360 ppm | 100 ppm | 7.8% | 4.5 | 0 | 0.5 | 0.5 |
| 250 ppm | 150 ppm | 7.5% | 4 | 0 | 1 | 1 |
| 200 ppm | 200 ppm | 7.5% | 3.5 | 0 | 1.5 | 1.5 |
| 150 ppm | 250 ppm | 7.0% | 4 | 0 | 0.5 | 1 |
| 100 ppm | 300 ppm | 6.5% | 3.5 | 0 | 1.5 | 1.5 |

As for the synergistic effect, it can be found in Table 111.

TABLE 111

| RA80/ RB10/ RD6 concentration | Calculated SE of RA80/ RB10/ RD6 | GSG-RA20 concentration | Calculated SE of GSG-RA20 | Calculated SE of the composition | Measured SE of the composition | Calculated sweetness (ppm sucrose) of GSG-RA20 per ppm | Measured sweetness (ppm sucrose) of GSG-RA20 per ppm |
|---|---|---|---|---|---|---|---|
| 400 ppm | | 0 | | | | 0.00 | 0 |
| 300 ppm | 7.20% | 100 | 1.00% | 8.20% | 7.80% | 100.00 | 60.00 |
| 250 ppm | 6.00% | 150 | 1.40% | 7.40% | 7.50% | 93.33 | 100.00 |
| 200 ppm | 5.40% | 200 | 1.80% | 7.20% | 7.50% | 90.00 | 105.00 |
| 150 ppm | 4.20% | 250 | 2.20% | 6.40% | 7.00% | 88.00 | 112.00 |
| 100 ppm | 3.00% | 300 | 2.60% | 5.60% | 6.50% | 86.67 | 116.67 |

Calculated sweetness (ppm sugar) of GSG-RA20 per ppm=calculated SE of GSG-RA20/concentration of GSG-RA20.

Measured sweetness (ppm sugar) of GSG-RA20 per ppm=(Measured SE-calculated SE of RA80/RB10/RD6)/concentration of GSG-RA20.

Figure 81:
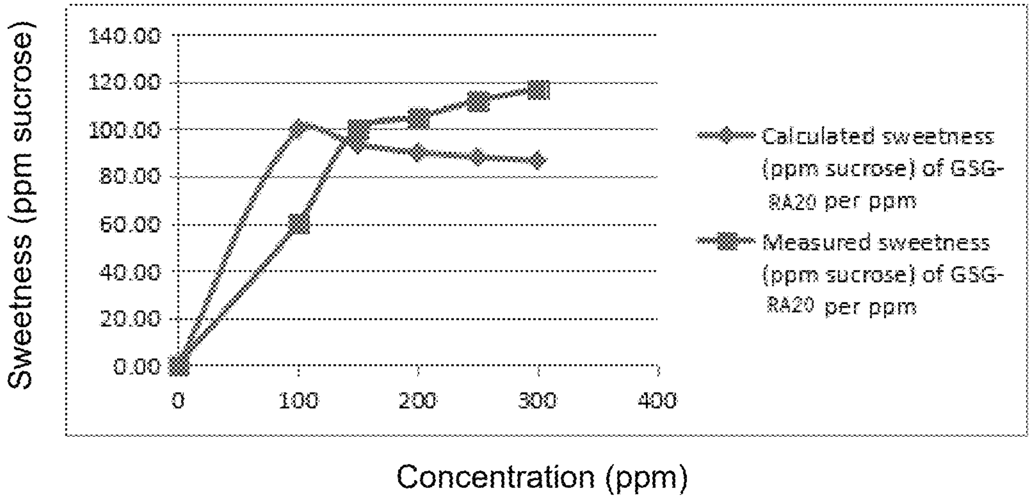
FIG. 81 is a graphical illustration showing the calculated and measured sweetness of GSG-RA20 per ppm in 400 ppm GSG-RA20 and RA80/RB10/RD6 compositions.

The data are shown in FIG. 81.

It is found that at 400 ppm total solid content, with the increase of the amount of GSG-RA20, its measured contribution of sweetness was higher than calculated value. Significant synergistic effect was found when GSG-RA20>150 ppm, although the optimized range was 200-300 ppm.

Example 46. Evaluating the Taste Profile of Compositions of GSG-RA20, RA97 and Sugar in Order to Find Out the Optimized Ratio with the Best Synergistic Taste Effects The samples were tested in aqueous solution of citric acid at pH 3.8.

The samples were as follows:

TABLE 112

| RA97 | GSG-RA20 | sugar | total GSG |
|---|---|---|---|
| 250 ppm | 100 ppm | 3% | 21.21% |
| 200 ppm | 150 ppm | 3% | 31.82% |
| 150 ppm | 200 ppm | 3% | 42.43% |

A taste profile of the RA97/GSG-RA20/sugar composition is shown in Table 113.

TABLE 113

| RA97 | GSG-RA20 | sugar | SE | Taste profile |
|---|---|---|---|---|
| 250 ppm | 100 ppm | 3% | 12% | Taste is as same as sugar |
| 200 ppm | 150 ppm | 3% | 13% | Taste is as same as sugar |
| 150 ppm | 200 ppm | 3% | 11.5% | Taste is as same as sugar |

As for the synergistic effect, it can be found in Table 114.

TABLE 114

| RA97 concentration | Calculated SE of RA97 | GSG-RA20 concentration | Calculated SE of GSG-RA20 | Calculated SE of GSG-RA20 plus RA97 | sugar concentration | Calculated SE of the composition | Measured SE of the composition | Calculated sweetness (ppm sucrose) of GSG-RA20 plus RA97 per ppm | Measured sweetness (ppm sucrose) of GSG-RA20 plus RA97 per ppm |
|---|---|---|---|---|---|---|---|---|---|
| 250 ppm | 6.00% | 100 ppm | 1.50% | 7.5% | 3% | 10.5% | 12% | 214.29 | 257.14 |
| 200 ppm | 5.00% | 150 ppm | 2.00% | 7.0% | 3% | 10.0% | 13% | 200.00 | 285.71 |
| 150 ppm | 4.00% | 200 ppm | 2.40% | 6.4% | 3% | 9.4% | 11.50% | 182.86 | 242.86 |

Calculated sweetness (ppm sugar) of GSG-RA20 plus RA97 per ppm=calculated SE of GSG-RA20 plus RA97/concentration of GSG-RA20 plus RA97.

Measured sweetness (ppm sugar) of GSG-RA20 plus RA97 per ppm=(Measured SE of GSG-RA20 plus RA97-sugar concentration)/concentration of GSG-RA20 plus RA97.

It is found that at 350 ppm total GSG-RA20 plus RA97 content, when blend with 3% sugar, its measured contribution of sweetness was higher than calculated value. The composition of GSG-RA20 plus RA97 has significant synergistic effect to the sweetness of sugar.

Example 47. Evaluating the Taste Profiles of Compositions of GSG-RA20, RA75/RB15 and Sugar in Order to Find Out the Optimized Ratio with the Best Synergistic Taste Effects The samples were tested in aqueous solution of citric acid at pH 3.8.

The samples were as follows:

TABLE 115

| RA75/RB15 | GSG-RA20 | sugar | total GSG |
|---|---|---|---|
| 300 ppm | 100 ppm | 3% | 18.56% |
| 200 ppm | 200 ppm | 3% | 37.13% |
| 100 ppm | 300 ppm | 3% | 55.69% |

The taste profile of the RA75/RB15/GSG-RA20/sugar composition is shown in Table 116.

TABLE 116

| RA75/RB15 | GSG-RA20 | sugar | SE | Taste profile |
|---|---|---|---|---|
| 300 ppm | 100 ppm | 3% | 12.5% | Taste is as same as sugar |
| 200 ppm | 200 ppm | 3% | 12.5% | Taste is as same as sugar |
| 100 ppm | 300 ppm | 3% | 12% | Taste is as same as sugar |

Evidence for a synergistic effect can be found in Table 117.

TABLE 117

| RA75/RB15 concentration | Calculated SE of RA75/RB15 | GSG-RA20 concentration | Calculated SE of GSG-RA20 | Calculated SE of GSG-RA20 plus RA75/RB15 | sugar concentration | Calculated SE of the composition | Measured SE of the composition | Calculated sweetness (ppm sucrose) of GSG-RA20 plus RA75/RB15 per ppm | Measured sweetness (ppm sucrose) of GSG-RA20 plus RA75/RB15 per ppm |
|---|---|---|---|---|---|---|---|---|---|
| 300 ppm | 5.8% | 100 ppm | 1.50% | 7.3% | 3% | 10.3% | 12.50% | 208.57 | 271.43 |
| 200 ppm | 4.2% | 200 ppm | 2.40% | 6.6% | 3% | 9.6% | 12.50% | 188.57 | 271.43 |
| 100 ppm | 3.0% | 300 ppm | 2.80% | 5.8% | 3% | 8.8% | 12% | 165.71 | 257.14 |

In Table 117, the calculated sweetness (ppm sugar) of GSG-RA20 plus RA75/RB15 per ppm is equivalent to the calculated SE of GSG-RA20 plus RA75/RB15 concentration of GSG-RA20 plus RA75/RB15. Additionally, the measured sweetness (ppm sugar) of GSG-RA20 plus RA75/RB15 per ppm is equivalent to the measured SE of GSG-RA20 plus RA75/RB15-sugar concentration)/concentration of GSG-RA20 plus RA75/RB15.

At a total GSG-RA20 plus RA75/RB15 content of 400 ppm, when blended with 3% sugar, the measured contribution of sweetness was higher than the calculated value. The composition of GSG-RA20 plus RA75/RB15 has a significant synergistic effect relative to the sweetness of sugar.

Example 48. Evaluating the Taste Profiles of Compositions of GSG-RA20, RA80/RB10/RD6 and Sugar in Order to Find Out the Optimized Ratio with the Best Synergistic Taste Effects The samples were tested in aqueous solution of citric acid at pH 3.8.

The samples were as follows:

TABLE 118

| RA80/RB10/RD6 | GSG-RA20 | sugar | total GSG |
|---|---|---|---|
| 300 ppm | 100 ppm | 3% | 18.56% |
| 200 ppm | 200 ppm | 3% | 37.13% |
| 100 ppm | 300 ppm | 3% | 55.69% |

The taste profile of the RA80/RB10/RD6/GSG-RA20/sugar composition is shown in Table 119.

TABLE 119

| RA80/RB10/ RD6 | GSG-RA20 | sugar | SE | Taste profile |
|---|---|---|---|---|
| 300 ppm | 100 ppm | 3% | 13% | Taste is as same as sugar |
| 200 ppm | 200 ppm | 3% | 12.5% | Taste is as same as sugar |
| 100 ppm | 300 ppm | 3% | 12% | Taste is as same as sugar |

Evidence for a synergistic effect can be found in Table 120.

TABLE 120

| RA80/RB10/ RD6 concentration | Calculated SE of RA80/RB10/ RD6 | GSG-RA20 concentration | Calculated SE of GSG-RA20 | Calculated SE of GSG-RA20 plus RA80/RB10/ RD6 | sugar concentration | Calculated SE of the composition | Measured SE of the composition | Calculated sweetness (ppm sucrose) of GSG-RA20 plus RA80/RB10/ RD6 per ppm | Measured sweetness (ppm sucrose) of GSG-RA20 plus RA80/RB10/ RD6 per ppm |
|---|---|---|---|---|---|---|---|---|---|
| 300 ppm | 7.2% | 100 ppm | 1.50% | 8.7% | 3% | 11.7% | 13% | 248.57 | 285.71 |
| 200 ppm | 5.4% | 200 ppm | 2.40% | 7.8% | 3% | 10.8% | 12.50% | 222.86 | 271.43 |
| 100 ppm | 3.0% | 300 ppm | 2.80% | 5.8% | 3% | 8.8% | 12% | 165.71 | 257.14 |

In Table 120, the calculated sweetness (ppm sugar) of GSG-RA20 plus RA80/RB10/RD6 per ppm is equivalent to the calculated SE of GSG-RA20 plus RA80/RB10/RD6/concentration of GSG-RA20 plus RA80/RB10/RD6. Additionally, the measured sweetness (ppm sugar) of GSG-RA20 plus RA80/RB10/RD6 per ppm is equivalent to the measured SE of GSG-RA20 plus RA80/RB10/RD6-sugar concentration)/concentration of GSG-RA20 plus RA RA80/RB10/RD6.

At a total GSG-RA20 plus RA80/RB10/RD6 content of 400 ppm, when blended with 3% sugar, the measured contribution of sweetness was higher than calculated value. The composition of GSG-RA20 plus RA80/RB10/RD6 has a significant synergistic effect relative to the sweetness of sugar.

Example 49. Evaluate the Taste Profiles of Compositions of GSG-RA50, RA97 and Sugar in Order to Find Out the Optimized Ratio with the Best Synergistic Taste Effects The samples were tested in aqueous solution of citric acid at pH 3.8.

The samples were as follows:

TABLE 121

| RA97 | GSG-RA50 | sugar | total GSG |
|---|---|---|---|
| 250 ppm | 100 ppm | 3% | 25.53% |
| 200 ppm | 150 ppm | 3% | 38.29% |
| 150 ppm | 200 ppm | 3% | 51.06% |

A taste profile of THE RA97/GSG-RA50/sugar composition is shown in Table 122.

TABLE 122

| RA97 | GSG-RA50 | sugar | SE | Taste profile |
|---|---|---|---|---|
| 250 ppm | 100 ppm | 3% | 13% | Taste is as same as sugar |
| 200 ppm | 150 ppm | 3% | 13% | Taste is as same as sugar |
| 150 ppm | 200 ppm | 3% | 12% | Taste is as same as sugar |

Evidence for a synergistic effect can be found in Table 123.

TABLE 123

| RA97 concentration | Calculated SE of RA97 | GSG-RA50 concentration | Calculated SE of GSG-RA50 | Calculated SE of GSG-RA50 plus RA97 | sugar concentration | Calculated SE of the composition | Measured SE of the composition | Calculated sweetness (ppm sucrose) of GSG-RA50 plus RA97 per ppm | Measured sweetness (ppm sucrose) of GSG-RA50 plus RA97 per ppm |
|---|---|---|---|---|---|---|---|---|---|
| 250 ppm | 6.00% | 100 ppm | 1.00% | 7.0% | 3% | 10.0% | 13% | 200.00 | 285.71 |
| 200 ppm | 5.00% | 150 ppm | 1.50% | 6.5% | 3% | 9.5% | 13% | 185.71 | 285.71 |
| 150 ppm | 4.00% | 200 ppm | 2.00% | 6.0% | 3% | 9.0% | 12% | 171.43 | 257.14 |

In Table 123, the calculated sweetness (ppm sugar) of GSG-RA50 plus RA97 per ppm is equivalent to the calculated SE of GSG-RA50 plus RA97/concentration of GSG-RA50 plus RA97. Additionally, the measured sweetness (ppm sugar) of GSG-RA50 plus RA97 per ppm is equivalent to the measured SE of GSG-RA50 plus RA97-sugar concentration/concentration of GSG-RA50 plus RA97.

At a total GSG-RA50 plus RA97 content of 350 ppm, when blended with 3% sugar, the measured contribution of sweetness was higher than the calculated value. The composition of GSG-RA50 plus RA97 has a significant synergistic effect relative to the sweetness of sugar.

Example 50. Evaluating the Taste Profiles of Compositions of GSG-RA50, RA75/RB15 and Sugar in Order to Find Out the Optimized Ratio with the Best Synergistic Taste Effects The samples were tested in aqueous solution of citric acid at pH 3.8.

The samples were as follows:

TABLE 124

| RA75/RB15 | GSG-RA50 | sugar | total GSG |
|---|---|---|---|
| 300 ppm | 100 ppm | 3% | 25.53% |
| 200 ppm | 200 ppm | 3% | 38.29% |
| 100 ppm | 300 ppm | 3% | 51.06% |

A taste profile of the RA75/RB15/GSG-RA50/sugar composition is shown in Table 125.

TABLE 125

| RA75/RB15 | GSG-RA50 | sugar | SE | Taste profile |
|---|---|---|---|---|
| 300 ppm | 100 ppm | 3% | 13.5% | Taste is as same as sugar |
| 200 ppm | 200 ppm | 3% | 13% | Taste is as same as sugar |
| 100 ppm | 300 ppm | 3% | 12% | Taste is as same as sugar |

Evidence for a synergistic effect can be found in Table 126.

TABLE 126

| RA75/RB15 concentration | Calculated SE of RA75/RB15 | GSG-RA50 concentration | Calculated SE of GSG-RA50 | Calculated SE of GSG-RA50 plus RA75/RB15 | sugar concentration | Calculated SE of the composition | Measured SE of the composition | Calculated sweetness (ppm sucrose) of GSG-RA50 plus RA75/RB15 per ppm | Measured sweetness (ppm sucrose) of GSG-RA50 plus RA75/RB15 per ppm |
|---|---|---|---|---|---|---|---|---|---|
| 300 ppm | 5.8% | 100 ppm | 1.00% | 6.8% | 3% | 9.8% | 13.5% | 194.29 | 300.00 |
| 200 ppm | 4.2% | 200 ppm | 2.00% | 6.2% | 3% | 9.2% | 13% | 177.14 | 285.71 |
| 100 ppm | 3.0% | 300 ppm | 2.75% | 5.8% | 3% | 8.8% | 12% | 164.29 | 257.14 |

In Table 126, the calculated sweetness (ppm sugar) of GSG-RA50 plus RA75/RB15 per ppm is equivalent to the calculated SE of GSG-RA50 plus RA75/RB15/concentration of GSG-RA50 plus RA75/RB15. In addition, the measured sweetness (ppm sugar) of GSG-RA50 plus RA75/RB15 per ppm is equivalent to the measured SE of GSG-RA50 plus RA75/RB15-sugar concentration/concentration of GSG-RA50 plus RA75/RB15.

At a total GSG-RA50 plus RA75/RB15 content of 400 ppm, when blended with 3% sugar, the measured contribution of sweetness was higher than the calculated value. The composition of GSG-RA50 plus RA75/RB15 has a significant synergistic effect relative to the sweetness of sugar.

Example 51. Evaluating the Taste Profiles of Compositions of GSG-RA50, RA80/RB10/RD6 and Sugar to Determine Optimized Ratios with the Best Synergistic Taste Effects The samples were tested in aqueous solution of citric acid at pH 3.8.

The samples were as follows:

TABLE 127

| RA80/RB10/RD6 | GSG-RA50 | sugar | total GSG |
|---|---|---|---|
| 300 ppm | 100 ppm | 3% | 25.53% |
| 200 ppm | 200 ppm | 3% | 38.29% |
| 100 ppm | 300 ppm | 3% | 51.06% |

A taste profile of the RA80/RB10/RD6/GSG-RA50/sugar composition is shown in Table 128.

TABLE 128

| RA80/RB10/ RD6 | GSG-RA50 | sugar | SE | Taste profile |
|---|---|---|---|---|
| 300 ppm | 100 ppm | 3% | 12% | Taste is as same as sugar |
| 200 ppm | 200 ppm | 3% | 11% | Taste is as same as sugar |
| 100 ppm | 300 ppm | 3% | 11.5% | Taste is as same as sugar |

Evidence for a synergistic effect can be found in Table 129.

TABLE 129

| RA80/RB10/ RD6 concentration | Calculated SE of RA80/RB10/ RD6 | GSG-RA50 concentration | Calculated SE of GSG-RA50 | Calculated SE of GSG-RA50 plus RA80/RB10/ RD6 | sugar concentration | Calculated SE of the composition | Measured SE of the composition | Calculated sweetness (ppm sucrose) of GSG-RA50 plus RA80/RB10/ RD6 per ppm | Measured sweetness (ppm sucrose) of GSG-RA50 plus RA80/RB10/ RD6 per ppm |
|---|---|---|---|---|---|---|---|---|---|
| 300 ppm | 7.2% | 100 pm | 1.00% | 8.2% | 3% | 11.2% | 12% | 234.29 | 257.14 |
| 200 ppm | 5.4% | 200 pm | 2.00% | 7.4% | 3% | 10.4% | 11% | 211.43 | 228.57 |
| 100 ppm | 3.0% | 300 pm | 2.75% | 5.8% | 3% | 8.8% | 11.50% | 164.29 | 242.86 |

Calculated sweetness (ppm sugar) of GSG-RA50 plus RA80/RB10/RD6 per ppm=calculated SE of GSG-RA50 plus RA80/RB10/RD6/concentration of GSG-RA50 plus RA80/RB10/RD6.

Measured sweetness (ppm sugar) of GSG-RA50 plus RA80/RB10/RD6 per ppm=(Measured SE of GSG-RA50 plus RA80/RB10/RD6-sugar concentration)/concentration of GSG-RA50 plus RA RA80/RB10/RD6.

At a total GSG-RA50 plus RA80/RB10/RD6 content of 400 ppm, when blended with 3% sugar, the measured contribution of sweetness was higher than the calculated value. The composition of GSG-RA50 plus RA80/RB10/RD6 has a significant synergistic effect relative to the sweetness of sugar.

Example 52. Evaluate the Taste Profiles of Compositions of GSG-RA95, RA97 and Sugar to Determine Optimized Ratios with the Best Synergistic Taste Effects The samples were tested in aqueous solution of citric acid at pH 3.8.

The samples were as follows:

TABLE 130

| RA97 | GSG-RA95 | sugar | total GSG |
|---|---|---|---|
| 250 ppm | 100 ppm | 3% | 25.89% |
| 200 ppm | 150 ppm | 3% | 38.83% |
| 150 ppm | 200 ppm | 3% | 51.77% |

A taste profile of the RA97/GSG-RA95/sugar composition is shown in Table 131.

TABLE 131

| RA97 | GSG-RA95 | sugar | SE | Taste profile |
|---|---|---|---|---|
| 250 ppm | 100 ppm | 3% | 12.5% | Taste is as same as sugar |
| 200 ppm | 150 ppm | 3% | 11.8% | Taste is as same as sugar |
| 150 ppm | 200 ppm | 3% | 12.8% | Taste is as same as sugar |

Evidence for a synergistic effect can be found in Table 132.

TABLE 132

| RA97 concentration | Calculated SE of RA97 | GSG-RA95 concentration | Calculated SE of GSG-RA95 | Calculated SE of GSG-RA95 plus RA97 | sugar concentration | Calculated SE of the composition | Measured SE of the composition | Calculated sweetness (ppm sucrose) of GSG-RA95 plus RA97 per ppm | Measured sweetness (ppm sucrose) of GSG-RA95 plus RA97 per ppm |
|---|---|---|---|---|---|---|---|---|---|
| 250 ppm | 6.00% | 100 ppm | 1.80% | 7.8% | 3% | 10.8% | 12.50% | 222.86 | 271.43 |
| 200 ppm | 5.00% | 150 ppm | 2.20% | 7.2% | 3% | 10.2% | 11.80% | 205.71 | 251.43 |
| 150 ppm | 4.00% | 200 ppm | 2.60% | 6.6% | 3% | 9.6% | 12.80% | 188.57 | 280.00 |

In Table 132, the calculated sweetness (ppm sugar) of GSG-RA95 plus RA97 per ppm is equivalent to the calculated SE of GSG-RA95 plus RA97/concentration of GSG-RA95 plus RA97. In addition, the measured sweetness (ppm sugar) of GSG-RA95 plus RA97 per ppm is equivalent to the measured SE of GSG-RA95 plus RA97-sugar concentration/concentration of GSG-RA95 plus RA97.

At a total GSG-RA95 plus RA97 content of 350 ppm, when blended with 3% sugar, the measured contribution of sweetness was higher than the calculated value. The composition of GSG-RA95 plus RA97 has a significant synergistic effect relative to the sweetness of sugar.

Example 53. Evaluating the Taste Profiles of Compositions of GSG-RA95, RA75/RB15 and Sugar to Determine Optimized Ratios with the Best Synergistic Taste Effects The samples were tested in aqueous solution of citric acid at pH 3.8.

The samples were as follows:

TABLE 133

| RA75/RB15 | GSG-RA95 | sugar | total GSG |
|---|---|---|---|
| 300 ppm | 100 ppm | 3% | 22.65% |
| 200 ppm | 200 ppm | 3% | 45.3% |
| 100 ppm | 300 ppm | 3% | 67.95% |

A taste profile of the RA75/RB15/GSG-RA95/sugar composition is shown in Table 134.

TABLE 134

| RA75/RB15 | GSG-RA95 | sugar | SE | Taste profile |
|---|---|---|---|---|
| 300 ppm | 100 ppm | 3% | 13% | Taste is as same as sugar |
| 200 ppm | 200 ppm | 3% | 12.2% | Taste is as same as sugar |
| 100 ppm | 300 ppm | 3% | 11.5% | Taste is as same as sugar |

Evidence for a synergistic effect can be found in Table 135.

TABLE 135

| RA75/RB15 concentration | Calculated SE of RA75/RB15 | GSG-RA95 concentration | Calculated SE of GSG-RA95 | Calculated SE of GSG-RA95 plus RA75/RB15 | sugar concentration | Calculated SE of the composition | Measured SE of the composition | Calculated sweetness (ppm sucrose) of GSG-RA95 plus RA75/RB15 per ppm | Measured sweetness (ppm sucrose) of GSG-RA95 plus RA75/RB15 per ppm |
|---|---|---|---|---|---|---|---|---|---|
| 300 ppm | 5.8% | 100 ppm | 1.80% | 7.6% | 3% | 10.6% | 13.0% | 217.14 | 285.71 |
| 200 ppm | 4.2% | 200 ppm | 2.60% | 6.8% | 3% | 9.8% | 12.2% | 194.29 | 262.86 |
| 100 ppm | 3.0% | 300 ppm | 3.40% | 6.4% | 3% | 9.4% | 11.5% | 182.86 | 242.86 |

In Table 135, the calculated sweetness (ppm sugar) of GSG-RA95 plus RA75/RB15 per ppm is equivalent to the calculated SE of GSG-RA95 plus RA75/RB15/concentration of GSG-RA95 plus RA75/RB15. In addition, the measured sweetness (ppm sugar) of GSG-RA95 plus RA75/RB15 per ppm is equivalent to the measured SE of GSG-RA95 plus RA75/RB15-sugar concentration/concentration of GSG-RA95 plus RA75/RB15.

At a total GSG-RA95 plus RA75/RB15 content of 400 ppm, when blended with 3% sugar, the measured contribution of sweetness was higher than the calculated value. The composition of GSG-RA95 plus RA75/RB15 has a significant synergistic effect to the sweetness of sugar.

Example 54. Evaluating the Taste Profiles of Compositions of GSG-RA95, RA80/RB10/RD6 and Sugar to Determine Optimized Ratios with the Best Synergistic Taste Effects The samples were tested in aqueous solution of citric acid at pH 3.8.

The samples were as follows:

TABLE 136

| RA80/RB10/RD6 | GSG-RA95 | sugar | total GSG |
|---|---|---|---|
| 300 ppm | 100 ppm | 3% | 22.65% |
| 200 ppm | 200 ppm | 3% | 45.3% |
| 100 ppm | 300 ppm | 3% | 67.95% |

A taste profile of the RA80/RB10/RD6/GSG-RA95/sugar composition is shown in Table 137.

TABLE 137

| RA80/RB10/ RD6 | GSG-RA95 | sugar | SE | Taste profile |
|---|---|---|---|---|
| 300 ppm | 100 ppm | 3% | 12.5% | Taste is as same as sugar |
| 200 ppm | 200 ppm | 3% | 11.5% | Taste is as same as sugar |
| 100 ppm | 300 ppm | 3% | 11% | Taste is as same as sugar |

Evidence for a synergistic effect can be found in Table 138.

TABLE 138

| RA80/RB10/ RD6 concentration | Calculated SE of RA80/RB10/ RD6 | GSG-RA95 concentration | Calculated SE of GSG-RA95 | Calculated SE of GSG-RA95 plus RA80/RB10/ RD6 | sugar concentration | Calculated SE of the composition | Measured SE of the composition | Calculated sweetness (ppm sucrose) of GSG-RA95 plus RA80/RB10/ RD6 per ppm | Measured sweetness (ppm sucrose) of GSG-RA95 plus RA80/RB10/ RD6 per ppm |
|---|---|---|---|---|---|---|---|---|---|
| 300 ppm | 7.2% | 100 ppm | 1.80% | 9.0% | 3% | 12.0% | 12.5% | 257.14 | 271.43 |
| 200 ppm | 5.4% | 200 ppm | 2.60% | 8.0% | 3% | 11.0% | 11.5% | 228.57 | 242.86 |
| 100 ppm | 3.0% | 300 ppm | 3.40% | 6.4% | 3% | 9.4% | 11.0% | 182.86 | 228.57 |

In Table 138, the calculated sweetness (ppm sugar) of GSG-RA95 plus RA80/RB10/RD6 per ppm is equivalent to the calculated SE of GSG-RA95 plus RA80/RB10/RD6/concentration of GSG-RA95 plus RA80/RB10/RD6. In addition, the measured sweetness (ppm sugar) of GSG-RA95 plus RA80/RB10/RD6 per ppm is equivalent to the measured SE of GSG-RA95 plus RA80/RB10/RD6-sugar concentration/concentration of GSG-RA95 plus RA RA80/RB10/RD6.

At a total GSG-RA95 plus RA80/RB10/RD6 content of 400 ppm, when blended with 3% sugar, the measured contribution of sweetness was higher than the calculated value. The composition of GSG-RA95 plus RA80/RB10/RD6 has a significant synergistic effect relative to the sweetness of sugar.

Example 55. Evaluating the Taste Profiles of Compositions of GSG-RA20, RA97 and Salt to Determine the Taste Improvement The samples were tested in aqueous solution of citric acid at pH 3.8.

The samples were as follows:

TABLE 139

| RA97 | GSG-RA95 | Salt (NaCl) | total GSG |
|---|---|---|---|
| 200 ppm | 200 ppm | — | 45.30% |
| 200 ppm | 200 ppm | 100 ppm | 45.30% |
| 200 ppm | 200 ppm | 200 ppm | 45.30% |

A taste profile of the RA97/GSG-RA20/sugar composition is shown in Table 140.

TABLE 140

| RA97 | GSG-RA20 | Salt (NaCl) | SE | Sugar like | Bitterness | Afterness | Lingering |
|---|---|---|---|---|---|---|---|
| 200 ppm | 200 ppm | — | 8% | 4 | 0 | 1 | 1.5 |
| 200 ppm | 200 ppm | 100 ppm | 8% | 4.5 | 0 | 0.5 | 0.5 |
| 200 ppm | 200 ppm | 200 ppm | 8% | 4.5 | 0 | 0.5 | 1 |

At a total GSG-RA20 plus RA97 content of 400 ppm, when blended with salt, the sweetness did not increase, but the taste profile was improved as reflected in a reduction in the aftertaste and lingering.

Example 56

GSG-RA20 was mixed with RA, RB, RD or ST at a ratio of 1:1 by weight so as to obtain a mixture. A certain amount of a solvent, such as water or an ethanol/water mixture was added to the mixture, heated to a certain temperature until the mixture was completely dissolved, and kept at that temperature for an hour. The solution was treated by spray drying to obtain a composition comprising GSG and SG. Compared with the solubility of RA, RB, RD or ST alone, the solubility of this composition is shown in Table 141.

TABLE 141

| water | GSG-RA20 | RA | RB | RD | SS | Stable time |
|---|---|---|---|---|---|---|
| 10 ml | | 1 g | | | | 2 h |
| 10 ml | 1 g | 1 g | | | | >14 d |
| 10 ml | | | | | 0.05 g | insoluble |
| 10 ml | 0.05 g | | | | 0.05 g | 14 d |
| 10 ml | | | | | 0.25 g | insoluble |
| 10 ml | 0.25 g | | | | 0.25 g | 2 d |
| 10 ml | | | 0.01 g | | | insoluble |
| 10 ml | 0.01 g | | 0.01 g | | | 1 d |
| 10 ml | | | | 0.01 g | | insoluble |
| 10 ml | 0.01 g | | | 0.01 g | | >14 d |

As shown in Table 141, GSG-RA20 improved the solubility of SGs.

Example 57

GSG-RA20 was mixed with RA, RB, RD or ST as the ratio of 1:1 by weight so as to obtain a mixture. The obtained mixture was mixed with γ-cyclodextrin at a ratio of 1:1 by weight. A certain amount of a solvent, such as water or an ethanol/water mixture was added into the mixture, heated to a certain temperature until the mixture was completely dissolved, and kept at that temperature for an hour. The solution was treated by spray drying to obtain a composition comprising GSG, SG and γ-cyclodextrin. Compared with the solubility of GSG and SG alone, the solubility of this composition is shown in Table 142.

TABLE 142

| water | GSG-RA20 | γ-CD | RB | RD | SS | Stable time |
|---|---|---|---|---|---|---|
| 10 ml | 0.05 g | | 0.05 g | | | insoluble |
| 10 ml | 0.05 g | 0.1 g | 0.05 g | | | 2 d |
| 10 ml | 0.05 g | | | 0.05 g | | insoluble |
| 10 ml | 0.05 g | 0.1 g | | 0.05 g | | >14 d |
| 10 ml | 0.05 g | | | | 0.05 g | 14 d |
| 10 ml | 0.05 g | 0.1 g | | | 0.05 g | >14 d |

It can be concluded that γ-cyclodextrin can further improve the solubility of the compositions comprising GSG and SG.

Example 58. Preparation of inventive GSG Flavor Composition No. 1

A composition of the present application was prepared as follows. Tapioca dextrin (35 g) was dissolved in 2 L water and 100 g *Stevia* extract (RA 24.05%; total steviol glycosides 73.38%, based on the 9 steviol glycosides, Rebaudioside A, Stevioside, Rebaudioside B, Rebaudioside C, Rebaudioside D, Rebaudioside F, Dulcoside A, Rubusoside, Steviolbioside) was added to liquefied dextrin to obtain a mixture in which the dextrin to *Stevia* extract ratio was 26:74. 5 ml cyclodextrin glycosyl transferase (CGTase) enzyme was added to the mixture and incubated at 60° C. for 24 hours to glycosylate SGs with glucose molecules derived from Tapioca dextrin. After a desired ratio of GSG and residual SG contents was achieved, the reaction mixture was heated to 95° C. for 30 min to inactivate the CGTase, which was then removed by filtration. The resulting solution of GSGs, residual SGs and dextrin was decolored and spray dried, yielding 130 g white powder as Composition No. 1. The residual SGs (based on the 9 SGs), residual dextrin, and total GSG contents were found to be 20.98%, 15.04%, and 63.98%, respectively. The composition of this product is shown in Table 143.

Example 59. Preparation of Inventive GSG Flavor Composition No. 2

A composition of the present application was prepared as follows. Tapioca dextrin (50 g) was dissolved in 2 L water and 100 g *Stevia* extract (RA 23.13%; total steviol glycosides 63.20%, based on the 9 steviol glycosides, Rebaudioside A, Stevioside, Rebaudioside B, Rebaudioside C, Rebaudioside D, Rebaudioside F, Dulcoside A, Rubusoside, Steviolbioside) was added to liquefied dextrin to obtain a mixture in which the dextrin to *Stevia* extract ratio was 33:67. 5 ml CGTase enzyme was added to the mixture and incubated at 60° C. for 24 hours to glycosylate SGs with glucose molecules derived from Tapioca dextrin. After a desired ratio of GSG and residual SG contents was achieved, the reaction mixture was heated to 95° C. for 30 min to inactivate the CGTase, which was then removed by filtration. The resulting solution of GSGs, residual SGs and dextrin was decolored and spray dried, yielding 145 g white powder as Composition No. 2. The residual SGs (based on the 9 SGs), residual dextrin, and total GSG contents were found to be 19.62%, 17.36%, and 61.35%, respectively. The composition of this product is shown in Table 143.

Example 60. Preparation of Inventive GSG Flavor Composition No. 3

A composition of the present application was prepared as follows. Tapioca dextrin (60 g) was dissolved in 2 L water and 100 g *Stevia* extract (RA 24.05%; total steviol glycosides 73.38%, based on the 9 steviol glycosides, Rebaudioside A, Stevioside, Rebaudioside B, Rebaudioside C, Rebaudioside D, Rebaudioside F, Dulcoside A, Rubusoside, Steviolbioside) was added to liquefied dextrin to obtain a mixture in which the dextrin to *Stevia* extract ratio was 37.5:62.5. 5 ml CGTase enzyme was added to the mixture and incubated at 60° C. for 24 hours to glycosylate SGs with glucose molecules derived from Tapioca dextrin. After a desired ratio of GSG and residual SG contents was achieved, the reaction mixture was heated to 95° C. for 30 min to inactivate the CGTase, which was then removed by filtration. The resulting solution of GSGs, residual SGs and dextrin was decolored and spray dried, yielding 155 g white powder as Composition No. 3. The residual SGs (based on the 9 SGs), residual dextrin, and total GSG contents were found to be 17.26%, 19.31%, and 63.43%, respectively. The composition of this product is shown in Table 143.

TABLE 143

| | % RA | % STV | % residual steviol glycosides* | % total glycosylated steviol glycosides | % residual dextrin |
|---|---|---|---|---|---|
| Composition No. 1 (Example 58) | 7.56 | 5.61 | 20.98 | 63.98 | 15.04 |
| Composition No. 2 (Example 59) | 9.55 | 4.59 | 19.62 | 61.35 | 17.36 |
| Composition No. 3 (Example 60) | 8.97 | 4.46 | 17.26 | 63.43 | 19.31 |

*the steviol glycosides refer to the 9 steviol glycosides, Rebaudioside A, Stevioside, Rebaudioside B, Rebaudioside C, Rebaudioside D, Rebaudioside F, Dulcoside A, Rubusoside, and Steviolbioside.

The *Stevia* extract of example 58, 59 and 60 is available from Sweet Green Fields. And the content of each ingredient in *Stevia* extract and the content of each unreacted SG are listed as follows:

| | Lot No. | RD | RA | STV | RF | RC | DA | RU | RB | SB | Total SG (9) (unreacted) | Total GSG | Dextrin residue* |
|---|---|---|---|---|---|---|---|---|---|---|---|---|---|
| Material of EX. 58 and EX. 60 | 20160118 | 2.05 | 23.13 | 17.79 | 2.25 | 10.46 | 1.55 | 2.36 | 1.79 | 1.82 | 63.2 | / | / |
| Material of EX. 59 | 20160106 | 1.97 | 24.05 | 28.03 | 2.07 | 12.38 | 1.9 | 1.38 | 1.28 | 0.32 | 73.38 | / | / |
| Composition No. 1 | | \ | 7.56 | 5.61 | 0.57 | 3.75 | 0.99 | 0.53 | 1.28 | 0.68 | 20.98 | 63.98 | 15.04 |
| Composition No. 2 | | 0.50 | 9.55 | 4.59 | 0.39 | 2.10 | 0.80 | 0.14 | 1.08 | 0.47 | 19.62 | 61.35 | 17.36 |
| Composition No. 3 | | 0.41 | 8.97 | 4.46 | 1.18 | 1.26 | 0.50 | \ | 0.91 | \ | 17.26 | 63.43 | 19.31 |

Example 61. Preparation of GSG Control Sample

A GSG control sample was prepared as follows. Tapioca dextrin (100 g) was dissolved in 2 L water and 100 g *Stevia* extract (RA 52%; total steviol glycosides 95.5%, based on the 9 steviol glycosides, Rebaudioside A, Stevioside, Rebaudioside B, Rebaudioside C, Rebaudioside D, Rebaudioside F, Dulcoside A, Rubusoside, Steviolbioside) was added to liquefied dextrin to obtain a mixture in which the dextrin to *Stevia* extract ratio was 50:50. 5 ml CGTase enzyme was added to the mixture and incubated at 60° C. for 24 hours to glycosylate SGs with glucose moieties present in Tapioca dextrin. After a desired ratio of GSG and residual SG contents was achieved, the reaction mixture was heated to 95° C. for 30 min to inactivate the CGTase, which was then removed by filtration. The resulting solution of GSGs, residual SGs and dextrin was decolored and spray dried, yielding 192 g of white powder as a Control Composition. The residual SG, residual dextrin, and total glycosylation SG contents were found to be 9.15%, 19.5%, and 71.35%, respectively. The control sample conforms to the specification of FEMA GRAS 4728.

Example 62. Evaluating the Sweetness Threshold of GSG Flavor Composition No. 1

Composition No. 1 from Example 58 was dissolved in deionized water and 7 serial dilutions of Composition No. 1 were prepared as shown in Table 144.

TABLE 144

| Sample # | Concentration (ppm) |
|---|---|
| 674 | 25 |
| 539 | 50 |
| 216 | 100 |
| 314 | 150 |
| 963 | 200 |
| 607 | 250 |
| 872 | 300 |

To evaluate the sweetness threshold of GSG Flavor Composition No. 1, each person from a 9 person test panel was asked to sort the solution samples based on the sweetness level and to remove the non-sweet solution samples. The judgment standard for a "non-sweet" sample was a person's perception that the solution is not sweet.

The test results are shown in Table 145.

TABLE 145

| Person # | Order of sweetness (from low to high) | | | | | | |
|---|---|---|---|---|---|---|---|
| 1 | 674 | 539 | 216 | 314 | 963 | 607 | 872 |
| 2 | 539 | 674 | 314 | 216 | 607 | 963 | 872 |
| 3 | 539 | 674 | 216 | 963 | 314 | 872 | 607 |
| 4 | 674 | 539 | 216 | 314 | 963 | 607 | 872 |
| 5 | 539 | 314 | 674 | 216 | 963 | 607 | 872 |
| 6 | 674 | 539 | 216 | 314 | 963 | 607 | 872 |
| 7 | 963 | 539 | 674 | 216 | 314 | 607 | 872 |
| 8 | 674 | 216 | 539 | 314 | 607 | 963 | 872 |
| 9 | 674 | 539 | 963 | 216 | 314 | 607 | 872 |

In Table 145, the shaded portions refer to solution samples that were considered "not sweet." In Table 146, the data in Table 145 was used to determine the percentage of panel members deeming a particular solution sample as "sweet" or "not sweet."

TABLE 146

| Composition No. 1 (ppm) | % panel deeming sample not sweet | % panel deeming sample sweet |
|---|---|---|
| 25 | 100.0% | 0.0% |
| 50 | 100.0% | 0.0% |
| 100 | 77.8% | 22.2% |
| 150 | 55.6% | 44.4% |
| 200 | 22.2% | 77.8% |
| 250 | 0.0% | 100.0% |
| 300 | 0.0% | 100.0% |

Figure 83:
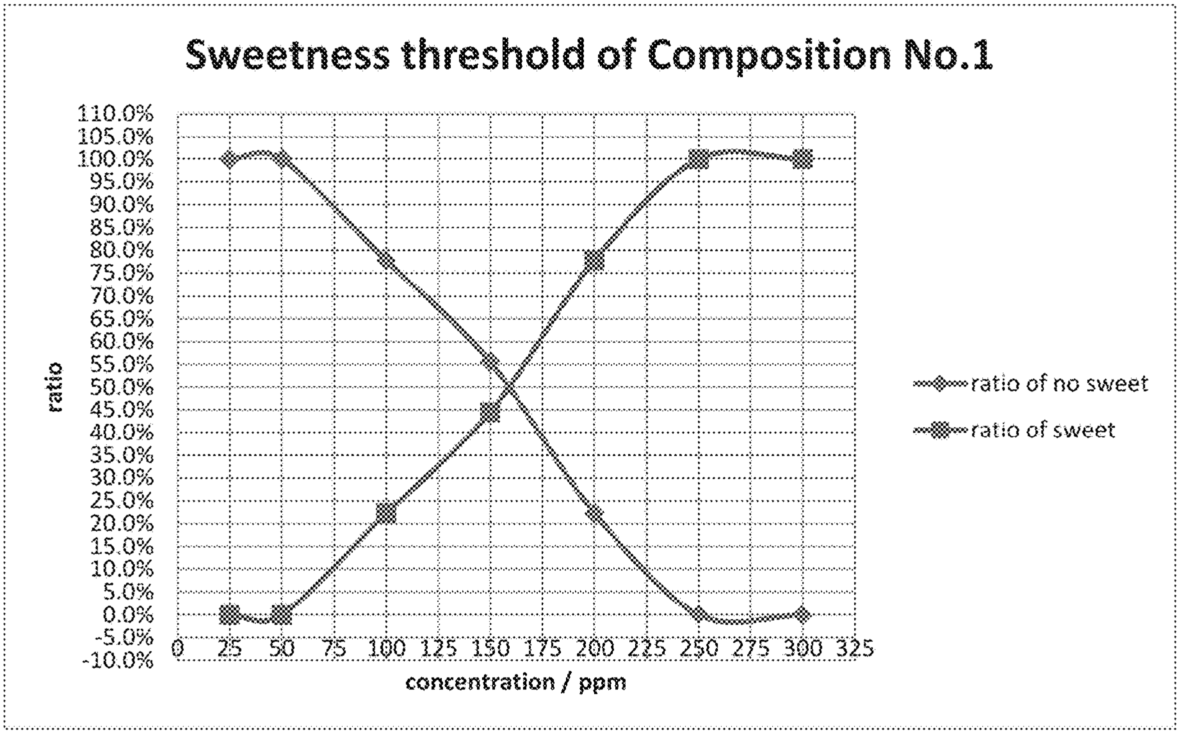
FIGS. 83 and 84 are graphical illustrations showing sweetness threshold determinations for sucrose in a lemon-lime carbonated soft drink.

By plotting the percentage of people deeming the samples "not sweet" or "sweet" relative to the sample concentrations, it was determined that at concentration of 160 ppm 50% of the panel did not rate the sample as sweet (FIG. 83). Further, at a concentration of 105 ppm, it was determined that 75% of the panel did not rate the sample as sweet. These results suggest that the average usual use level/average maximum use level can be set to between about 100-150 ppm.

Example 63. Evaluating the Sweetness Thresholds of Composition Nos. 2 and 3

Sweetness thresholds for GSG Flavor Composition Nos. 2 and 3 (as prepared in Examples 59 and 60, respectively) were determined according to the method in Example 62. The results of this analysis were consistent with the conclusion that the average normal use level of Compositions Nos. 1-3 can be set between about 100-150 ppm.

Example 64. Evaluation of Synergistic Taste Effect of GSG-Inventive Composition Nos. 1-3 Relative to Sugar To evaluate the synergistic taste effects of the inventive Composition Nos. 1-3 to sugar, 4 solutions were prepared. Three solutions were prepared containing 150 ppm of Composition No. 1 (Example 58), Composition No. 2 (Example 59), and Composition No. 3 (Example 60) and one solution was prepared containing 175 ppm (the average maximum use level of FEMA No. 4728) of the GSG-Control sample. These 4 solutions were evaluated by a panel of eight people to determine the relative level of sweetness. Six of the eight people thought that the solution of GSG-Control was sweeter, while the other two people thought that GSG Flavor Composition No. 1 was sweeter. This indicates that 150 ppm of GSG Flavor Composition No. 1 can be considered the average maximum use level.

The eight person panel further evaluated the effect of sugar reduction by tasting the six samples depicted in Table 147. The panel determined that that the sweetness of the 6 samples was very similar.

TABLE 147

| Sample # | Sugar | Composition No. 1 (Example 58) | Composition No. 2 (Example 59) | Composition No. 3 (Example 60) | Control Composition (Example 61) |
|---|---|---|---|---|---|
| 610 | 10% | | | | |
| 539 | 8% | 100 ppm | | | |
| 674 | 7% | 150 ppm | | | |
| 774 | 8% | | 100 ppm | | |
| 377 | 8% | | | 100 ppm | |
| 238 | 8% | | | | 175 ppm |

Conclusion. Compared to the GSG-Control sample, the inventive GSG Flavor Compositions exhibit a use level lower than that of the GSG-Control sample. For example, 150 ppm of GSG Flavor Composition No. 1 can replace 3% sugar, while 100 ppm of GSG Flavor Composition No. 1 can replace 2% sugar. However, the GSG-Control sample cannot replace 3% sugar at its average maximum use level (175 ppm), but only can replace 2% sugar. In other words, 100 ppm of GSG Flavor Composition No. 1 can provide the same sugar reduction effect as 175 ppm of the GSG-Control. In view of its lower use level for the same sugar reduction effect, the cost for using GSG Flavor Composition No. 1 is about 30% lower than the cost for the GSG-Control.

Example 65. Evaluating the Taste Profiles of GSG Flavor Composition Nos. 1-3

The taste profiles of 5 solution samples were evaluated. As shown in Table 148, the samples included GSG Flavor Composition Nos. 1-3, the GSG-Control, and a RA50/SG95 sample available from Sweet Green Fields. These samples were dissolved in aqueous citric acid (pH 3.8) with ultrasound at room temperature and were further left undisturbed for 30 min.

TABLE 148

| # | Sample | Concentration |
|---|---|---|
| 772 | RA50/SG95 (available from Sweet Green Fields) | 300 ppm |
| 109 | Composition No. 1 (Example 58) | 300 ppm |
| 297 | Composition No. 2 (Example 59) | 300 ppm |
| 971 | Composition No. 3 (Example 60) | 300 ppm |
| 528 | GSG-Control Composition (Example 61) | 300 ppm |

A panel of 4 people tasted each of the 5 samples, which were scored 0-5 according to sweetness, sugar like, bitterness, after-taste and lingering taste profiles. The results were recorded as the mean value of the results provided by the panel and are presented in Table 148.

TABLE 149

| Sample No. | Sweetness | Sugar like | Bitterness | Aftertaste | Lingering |
|---|---|---|---|---|---|
| 772 | 4 | 2 | 3 | 3 | 4 |
| 109 | 3 | 4 | 0 | 2 | 2 |
| 297 | 3 | 4 | 0 | 2 | 2 |
| 971 | 3 | 3.5 | 0 | 2 | 2 |
| 528 | 2.5 | 3.5 | 0 | 2.5 | 2 |

Conclusion. The results in Table 149 show that glycosylation can significantly improve the taste profile of *Stevia* extracts. However, as the degree of glycosylation increases, the sweetness decreases, while a metallic after-taste increases. Overall, the taste of the inventive GSG Flavor Compositions is cleaner and sweeter than the GSG-Control.

Example 66. Evaluating Taste Improvement by GSG Flavor Composition No. 1

Two samples as described in Table 150 were dissolved in deionized water with ultrasound at room temperature and were further left undisturbed for 30 min.

TABLE 150

| # | Sample | Concentration |
|---|---|---|
| 156 | Sugar | 10% |
| 421 | Composition No. 1 (Example 58) | 500 ppm |
| | Sugar | 5% |

A 4 person panel compared and described the taste of the two samples in Table 150 and evaluated the taste profiles of each sample on a scale from 0-5 according to increasing sweetness, body, bitterness, aftertaste and lingering taste profiles. The results were recorded in Table 151 as the mean value of the results provided by the panel.

TABLE 151

| Sample No. | Taste profile | Sweetness | Body | Bitterness | Aftertaste | Lingering |
|---|---|---|---|---|---|---|
| 156 | 1. Quick onsite; 2. Full-body | 5 | 4.5 | 0 | 0 | 1 |
| 421 | 1. More full-body than 156; 2. Pleasant herbal small and taste | 5 | 5 | 0 | 0 | 1 |

The results in Table 151 show that the inventive Composition No. 1 can be used to reduce usage of sugar. At the sugar equivalence (SE) of 10%, the inventive Composition No. 1 can reduce 50% of sugar usage, can maintain the mouth feel of sugar, and can even provide a more full-body mouth feel. In addition, it can supply a pleasant herbal taste.

Figure 82:
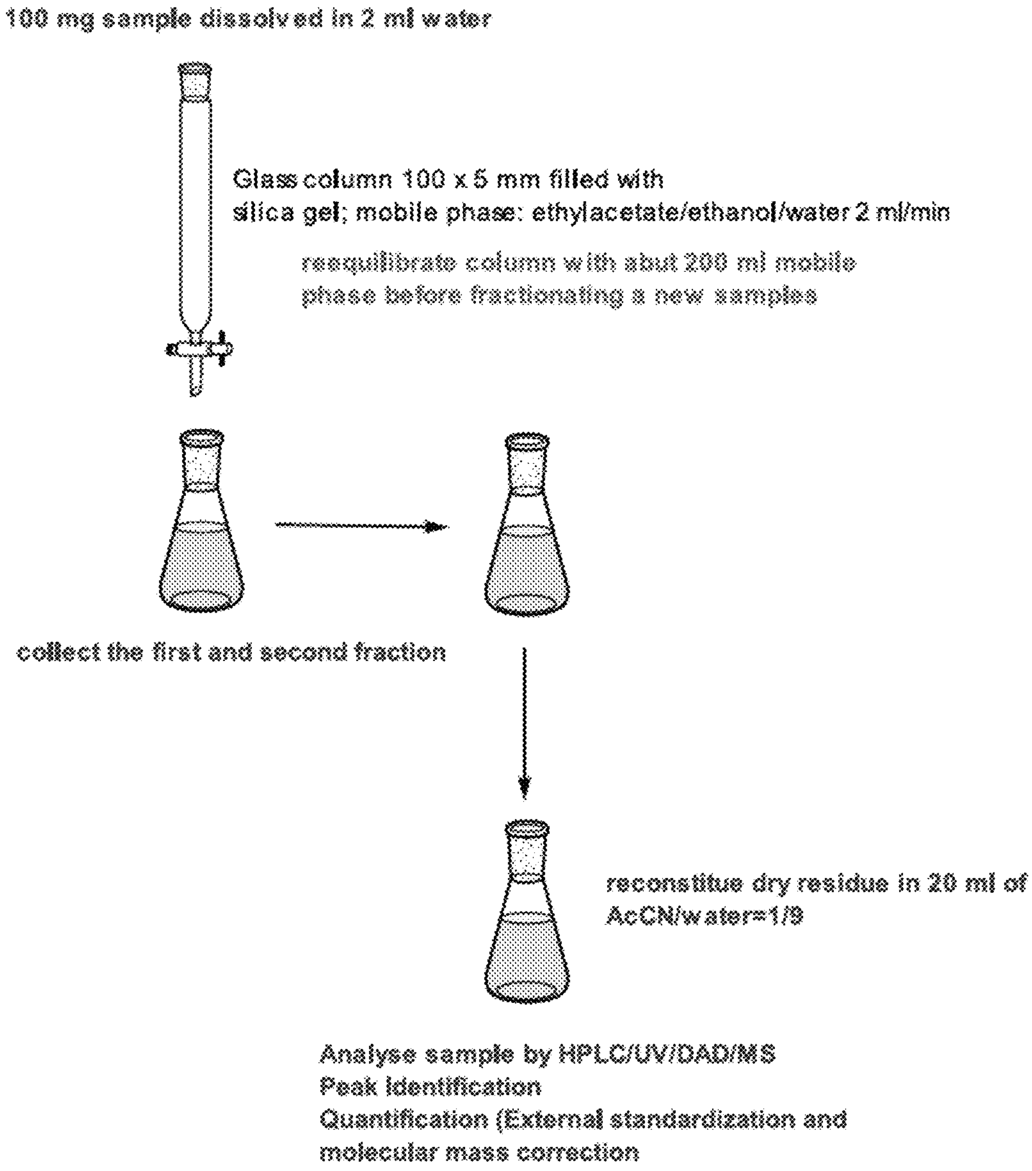
FIG. 82 is a graphical illustration showing an analytical methodology for determining the steviol glycosides and their amounts in a sample composition.

Example 67. Methodology for Determining Distribution and Content of Unreacted and Reacted Products FIG. 82 depicts an analytical methodology for evaluating the distribution and content of reaction products formed from SG starting materials subjected to glycosylation.

Materials: Reference standards for steviolglycosides (Reb A, Reb B, Reb C, Reb D, Reb E, Reb F, Reb G, Reb I, Reb M, Reb N, Reb O, Isoreb A, IsoST) were obtained from Chromadex (LGC Germany). Solvents and reagents (HPLC grade) were obtained from VWR (Vienna) or Sigma-Aldrich (Vienna). Davisil Grade 633 (high-purity grade silica gel, pore size 60 Å, 200-425 mesh particle size was obtained from Sigma-Aldrich (Vienna).

Sample Preparation: All samples were fractionated over a glass column (100×5 mm) filled with Davisil Grade 633. The column was equilibrated with ethylacetate/Acetic acid/H2O=8/3/2 (v/v/v). 100 mg sample, dissolved in 2 ml H2O, were loaded on the column and eluted with ethylacetate/Acetic acid/H2O=8/3/2 at a flow rate of 2 ml/min. The first 6 ml of the eluate were discarded and the next 30 ml containing unreacted steviol-glycosides were collected. Enzymatically reacted steviol-glycosides eluted in the range of 36-70 ml and were again collected.

After fractionation of 3 samples, the pooled eluates were evaporated to dryness and reconstituted in 20 ml Acetonitrile/H2O=9/1 (v/v) corresponding to an equivalent sample concentration of 150 mg sample/10 ml.

The method was qualified by fractionation of steviolglycoside standards and enzymatically reacted steviol-glycosides. An elution yield of >97% of steviol-glycosides and of >95% enzymatically reacted steviol-glycosides was observed, the carry over between the fraction was calculated to less than 3%. The pooled, evaporated samples were used for further analysis.

HPLC Method: The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with $H_2O$.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NH4-Acetate buffer (native pH) with 0.1% acetic acid, 0.05% trimethylamine and 0.001% dichloromethane. Mobile Phase B consisted of 0.01 molar NH4-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 μl.

The detectors were set to 210 nm (VWD), to 205 and 254 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V). Detection at 205 and 210 nm were used to quantify the chromatograms, the MS-spectra were used to determine the molar mass and structural information of individual peaks. Detection at 254 nm was used to identify non-steviolglycoside peaks.

Samples were quantified by external standardization against reference compounds, in case where no authentic reference standard was available, the peak area was quantified against the reference standard with the most similar mass and corrected for the molar mass differences. The maximum calibration range of reference standards was in a range 0.1-50 mg/10 ml (dissolved in Acetonitrile/$H_2O$=9/1 (v/v)).

Identification and Quantification: Steviol-glycosides and enzymatically reacted steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against the reference standard with the most similar molar mass.

Example 68. Distribution and Percentage (Wt/Wt) of GSGs (Reacted SGs) and Unreacted SGs Produced from Steviol Starting Materials for Use as Sweetening Compositions

A. Experiment 1

Twelve sample lot numbers of SG starting materials were glycosylated according to the method described in Example 61 and the distribution and percentage (wt/wt) of specific unreacted SGs and reacted SGs (i.e., GSGs) in these sample lot numbers was determined using the methodology described in Example 67.

Table 152 shows the results of this analysis for sample lot numbers 20171101, 20171102, 20171103 and 20171104. In Table 152 and the subsequent tables that follow, the SG-Group defines a base structure. For example, in Table 152, "SG-4G" refers to a steviol-glycoside with 4 additional glucose units added. An SG-group is composed of unreacted SGs and reacted GSGs. Within an SG-group, the reacted GSG is formed from one or more parental SG(s). Thus, in the case of the SG-4G group, the resulting GSGs are formed from Reb-A, Reb-E, Reb-A2 or Reb-H1. In the tables which follow below, "mg/10 ml" corresponds to the test raw result; "% (m/m)" is calculated as mg/10 ml divided by the sample weight dissolved in 10 ml.

TABLE 152

| | | | | Lot number | | | | | | | |
|---|---|---|---|---|---|---|---|---|---|---|---|
| | | SG-{ }-Added | | 20171101 | | 20171102 | | 20171103 | | 20171104 | |
| SG-group | Individual SG (unreacted part) | Glucose (reacted part) | [Mr] | mg/10 ml | % (m/m) | mg/10 ml | % (m/m) | mg/10 ml | % (m/m) | mg/10 ml | % (m/m) |
| SG-2G | Rubusoside | — | 642 | 1.75 | 1.17 | 2.41 | 1.60 | 2.91 | 1.94 | 2.33 | 1.55 |
| | Stev-Bios | — | 642 | 0.46 | 0.31 | 0.53 | 0.35 | 0.44 | 0.29 | 0.52 | 0.35 |
| SG-3G | Reb-B | — | 804 | 0.96 | 0.64 | 0.66 | 0.44 | 0.59 | 0.39 | 0.38 | 0.26 |
| | Reb-G | — | 804 | 1.14 | 0.76 | 0.83 | 0.55 | 0.83 | 0.55 | 0.97 | 0.65 |
| | Stevioside | — | 804 | 6.03 | 4.02 | 4.07 | 2.71 | 4.46 | 2.97 | 4.59 | 3.06 |
| | Reb-KA | — | 804 | <0.05 | <0.05 | <0.05 | <0.05 | <0.05 | <0.05 | <0.05 | <0.05 |
| | Stevioside B | — | 804 | <0.05 | <0.05 | <0.05 | <0.05 | <0.05 | <0.05 | <0.05 | <0.05 |
| | | GSG-3G-2 | 1128 | 12.85 | 8.57 | 9.44 | 6.29 | 5.49 | 3.66 | 8.37 | 5.58 |
| | | GSG-3G-3 | 1290 | 5.04 | 3.36 | 4.81 | 3.21 | 3.44 | 2.29 | 4.61 | 3.07 |
| | | GSG-3G-4 | 1452 | 2.48 | 1.65 | 2.71 | 1.81 | 2.22 | 1.48 | 2.90 | 1.94 |
| | | GSG-3G-7 | 1938 | 2.22 | 1.48 | 1.56 | 1.04 | 3.82 | 2.55 | 2.99 | 1.99 |
| | | GSG-3G-8 | 2100 | 4.31 | 2.87 | 3.41 | 2.28 | 5.26 | 3.51 | 3.38 | 2.26 |
| SG-4G | Reb-A | — | 966 | 4.32 | 2.88 | 3.48 | 2.32 | 3.82 | 2.55 | 5.79 | 3.86 |
| | Reb-E | — | 966 | 2.08 | 1.38 | 1.52 | 1.01 | 1.33 | 0.89 | 2.25 | 1.50 |
| | Reb-A2 | — | 966 | <0.05 | <0.05 | <0.05 | <0.05 | <0.05 | <0.05 | <0.05 | <0.05 |
| | Reb-H1 | — | 966 | <0.05 | <0.05 | <0.05 | <0.05 | <0.05 | <0.05 | <0.05 | <0.05 |
| | | GSG-4G-1 | 1128 | 14.03 | 9.35 | 9.72 | 6.48 | 10.36 | 6.91 | 14.15 | 9.43 |
| | | GSG-4G-2 | 1290 | 1.65 | 1.10 | 1.51 | 1.00 | 1.69 | 1.13 | 1.53 | 1.02 |
| | | GSG-4G-3 | 1452 | 1.60 | 1.07 | 1.47 | 0.98 | 2.09 | 1.39 | 1.78 | 1.19 |
| | | GSG-4G-7 | 2100 | 4.40 | 2.93 | 8.45 | 5.63 | 6.98 | 4.65 | 4.90 | 3.27 |
| SG-5G | Reb-D | — | 1128 | 0.58 | 0.80 | 0.63 | 0.80 | 0.58 | 0.80 | 0.31 | 0.80 |
| | Reb I | — | 1128 | <0.05 | <0.05 | <0.05 | <0.05 | <0.05 | <0.05 | <0.05 | <0.05 |
| | Reb L | — | 1128 | <0.05 | <0.05 | <0.05 | <0.05 | <0.05 | <0.05 | <0.05 | <0.05 |
| | Reb Q | — | 1128 | <0.05 | <0.05 | <0.05 | <0.05 | <0.05 | <0.05 | <0.05 | <0.05 |
| | Reb I2 | — | 1128 | <0.05 | <0.05 | <0.05 | <0.05 | <0.05 | <0.05 | <0.05 | <0.05 |
| | | GSG-5G-1 | 1290 | 0.38 | 0.25 | 0.35 | 0.23 | 0.39 | 0.26 | 0.53 | 0.35 |
| | | GSG-5G-2 | 1452 | 0.08 | 0.05 | 0.47 | 0.31 | 0.13 | 0.09 | 0.51 | 0.34 |
| | | GSG-5G-3 | 1614 | 1.45 | 0.97 | 1.69 | 1.13 | 1.52 | 1.01 | 2.54 | 1.70 |
| | | GSG-5G-4 | 1776 | 0.16 | 0.11 | 0.11 | 0.08 | 0.13 | 0.09 | 0.11 | 0.08 |
| | | GSG-5G-5 | 1938 | 0.67 | 0.45 | 4.63 | 3.09 | 3.29 | 2.19 | 1.40 | 0.93 |
| SG-6G | Reb-M | — | 1290 | 0.29 | 0.19 | 0.15 | 0.10 | 0.30 | 0.20 | 0.117 | 0.08 |
| | | GSG-6G-3 | 1776 | 0.88 | 0.58 | 2.23 | 1.49 | 1.15 | 0.77 | 2.71 | 1.81 |
| SG-2G1R | Dulcoside A | — | 788 | 0.59 | 0.40 | 1.35 | 0.90 | 0.91 | 0.61 | 0.317 | 0.21 |
| | Dulcoside B | — | 788 | 0.97 | 0.65 | 1.82 | 1.22 | 1.82 | 1.22 | 2.28 | 1.52 |
| SG-3G1R | Reb-C | — | 950 | 4.32 | 2.88 | 3.48 | 2.32 | 3.82 | 2.55 | 5.79 | 3.86 |
| | Reb-S | — | 950 | 0.41 | 0.50 | 0.67 | 0.50 | 0.42 | 0.50 | 1.06 | 0.50 |
| | Reb-H | — | 950 | <0.05 | <0.05 | <0.05 | <0.05 | <0.05 | <0.05 | <0.05 | <0.05 |
| | | GSG-3G1R-3a | 1436 | 1.34 | 0.89 | 2.14 | 1.43 | 3.82 | 2.54 | 1.57 | 1.05 |
| | | GSG-3G1R-3b | 1436 | 5.00 | 3.34 | 4.43 | 2.95 | 3.14 | 2.09 | 4.98 | 3.32 |
| SG-4G1R | Reb J | — | 1112 | <0.05 | <0.05 | <0.05 | <0.05 | <0.05 | <0.05 | <0.05 | <0.05 |
| | Reb K | — | 1112 | <0.05 | <0.05 | <0.05 | <0.05 | <0.05 | <0.05 | <0.05 | <0.05 |
| | Reb K2 | — | 1112 | <0.05 | <0.05 | <0.05 | <0.05 | <0.05 | <0.05 | <0.05 | <0.05 |
| | | GSG-4G1R-2 | 1436 | 1.00 | 0.67 | 0.85 | 0.56 | 1.00 | 0.67 | 1.19 | 0.79 |
| | | GSG-4G1R-3 | 1598 | 0.34 | 0.23 | 0.71 | 0.48 | 0.39 | 0.26 | 0.54 | 0.36 |
| | | GSG-4G1R-4 | 1760 | 2.86 | 1.90 | 3.16 | 2.10 | 2.90 | 1.93 | 3.41 | 2.28 |
| | | GSG-4G1R-6 | 2084 | 1.13 | 0.76 | 6.00 | 4.00 | 9.65 | 6.44 | 3.58 | 2.39 |
| SG-5G1R | Reb-N | — | 1274 | <0.05 | <0.05 | <0.05 | <0.05 | <0.05 | <0.05 | <0.05 | <0.05 |
| | | GSG-5G1R-4 | 1922 | 5.25 | 3.50 | 4.33 | 2.89 | 5.00 | 3.34 | 6.49 | 4.32 |
| SG-6G1R | Reb-O | — | 1436 | 0.26 | 0.17 | 0.20 | 0.13 | 0.21 | 0.14 | 0.27 | 0.18 |
| | | GSG-6G1R-1a | 1598 | 0.83 | 0.56 | 0.83 | 0.56 | 0.88 | 0.58 | 0.62 | 0.41 |
| | | GSG-6G1R-1b | 1598 | 0.79 | 0.53 | 0.42 | 0.28 | 1.31 | 0.87 | 0.43 | 0.29 |
| | | GSG-6G1R-2 | 1760 | 0.68 | 0.45 | 1.19 | 0.79 | 1.63 | 1.09 | 0.90 | 0.60 |
| SG-3G1X | Reb-F | — | 936 | 1.47 | 0.98 | 2.79 | 1.86 | 2.08 | 1.39 | 1.21 | 0.81 |
| | Reb-R | — | 936 | 0.79 | 0.53 | 1.14 | 0.76 | 1.45 | 0.96 | 0.71 | 0.47 |
| | | GSG-3G1X-4 | 1584 | 4.61 | 3.08 | 4.09 | 2.73 | 4.03 | 2.69 | 5.41 | 3.61 |
| | | GSG-3G1X-5 | 1746 | 1.10 | 0.74 | 2.41 | 1.61 | 2.10 | 1.40 | 1.66 | 1.11 |
| SG-4G1X | Reb U | — | 1098 | <0.05 | <0.05 | <0.05 | <0.05 | <0.05 | <0.05 | <0.05 | <0.05 |
| | Reb T | — | 1098 | <0.05 | <0.05 | <0.05 | <0.05 | <0.05 | <0.05 | <0.05 | <0.05 |
| | Reb W | — | 1098 | <0.05 | <0.05 | <0.05 | <0.05 | <0.05 | <0.05 | <0.05 | <0.05 |
| | Reb W2 | — | 1098 | <0.05 | <0.05 | <0.05 | <0.05 | <0.05 | <0.05 | <0.05 | <0.05 |
| | | GSG-4G1X-1 | 1260 | 2.39 | 1.60 | 1.77 | 1.18 | 0.98 | 0.65 | 2.27 | 1.51 |
| | | GSG-4G1X-2 | 1422 | 1.58 | 1.06 | 2.47 | 1.65 | 2.02 | 1.34 | 2.16 | 1.44 |
| | | GSG-4G1X-3 | 1584 | 4.07 | 2.72 | 4.77 | 3.18 | 3.05 | 2.03 | 3.33 | 2.22 |
| | | GSG-4G1X-4 | 1746 | 1.57 | 1.05 | 1.20 | 0.80 | 1.27 | 0.85 | 1.50 | 1.00 |
| SG-5G1X | Reb V | — | 1260 | <0.05 | <0.05 | <0.05 | <0.05 | <0.05 | <0.05 | <0.05 | <0.05 |
| | | GSG-5G1X-1 | 1422 | 2.80 | 1.87 | 2.52 | 1.68 | 3.00 | 2.00 | 3.03 | 2.02 |

Table 153 provides a summary of descriptive statistics corresponding to sample lot numbers 20171101, 20171102, 20171103 and 20171104 (n=4) tested.

TABLE 153

| SG-group | Individual SG (unreacted part) | SG-{ }-Added Glucose (reacted part) | [Mr] | Mean Value | s.d. | Median | Min | Max |
|---|---|---|---|---|---|---|---|---|
| SG-2G | Rubusoside | — | 642 | 1.56 | 0.32 | 1.58 | 1.17 | 1.94 |
| | Stev-Bios | — | 642 | 0.32 | 0.03 | 0.33 | 0.29 | 0.35 |
| SG-3G | Reb-B | — | 804 | 0.43 | 0.16 | 0.42 | 0.26 | 0.64 |
| | Reb-G | — | 804 | 0.63 | 0.10 | 0.60 | 0.55 | 0.76 |
| | Stevioside | — | 804 | 3.19 | 0.57 | 3.02 | 2.71 | 4.02 |
| | Reb-KA | — | 804 | — | — | — | — | — |
| | Stevioside B | — | 804 | — | — | — | — | — |
| | | GSG-3G-2 | 1128 | 6.03 | 2.03 | 5.94 | 3.66 | 8.57 |
| | | GSG-3G-3 | 1290 | 2.98 | 0.48 | 3.14 | 2.29 | 3.36 |
| | | GSG-3G-4 | 1452 | 1.72 | 0.20 | 1.73 | 1.48 | 1.94 |
| | | GSG-3G-7 | 1938 | 1.77 | 0.65 | 1.74 | 1.04 | 2.55 |
| | | GSG-3G-8 | 2100 | 2.73 | 0.59 | 2.58 | 2.26 | 3.51 |
| SG-4G | Reb-A | — | 966 | 2.90 | 0.68 | 2.71 | 2.32 | 3.86 |
| | Reb-E | — | 966 | 1.20 | 0.29 | 1.20 | 0.89 | 1.50 |
| | Reb-A2 | — | 966 | — | — | — | — | — |
| | Reb-H1 | — | 966 | — | — | — | — | — |
| | | GSG-4G-1 | 1128 | 8.04 | 1.57 | 8.13 | 6.48 | 9.43 |
| | | GSG-4G-2 | 1290 | 1.06 | 0.06 | 1.06 | 1.00 | 1.13 |
| | | GSG-4G-3 | 1452 | 1.16 | 0.18 | 1.13 | 0.98 | 1.39 |
| | | GSG-4G-7 | 2100 | 4.12 | 1.25 | 3.96 | 2.93 | 5.63 |
| SG-5G | Reb-D | — | 1128 | 0.80 | 0.00 | 0.80 | 0.80 | 0.80 |
| | Reb I | — | 1128 | — | — | — | — | — |
| | Reb L | — | 1128 | — | — | — | — | — |
| | Reb Q | — | 1128 | — | — | — | — | — |
| | Reb I2 | — | 1128 | — | — | — | — | — |
| | | GSG-5G-1 | 1290 | 0.27 | 0.05 | 0.26 | 0.23 | 0.35 |
| | | GSG-5G-2 | 1452 | 0.20 | 0.15 | 0.20 | 0.05 | 0.34 |
| | | GSG-5G-3 | 1614 | 1.20 | 0.34 | 1.07 | 0.97 | 1.70 |
| | | GSG-5G-4 | 1776 | 0.09 | 0.01 | 0.08 | 0.08 | 0.11 |
| | | GSG-5G-5 | 1938 | 1.67 | 1.20 | 1.56 | 0.45 | 3.09 |
| SG-6G | Reb-M | — | 1290 | 0.14 | 0.06 | 0.14 | 0.08 | 0.20 |
| | | GSG-6G-3 | 1776 | 1.16 | 0.58 | 1.13 | 0.58 | 1.81 |
| SG-2G1R | Dulcoside A | — | 788 | 0.53 | 0.29 | 0.50 | 0.21 | 0.90 |
| | Dulcoside B | — | 788 | 1.15 | 0.36 | 1.22 | 0.65 | 1.52 |
| SG-3G1R | Reb-C | — | 950 | 2.90 | 0.68 | 2.71 | 2.32 | 3.86 |
| | Reb-S | — | 950 | 0.50 | 0.00 | 0.50 | 0.50 | 0.50 |
| | Reb-H | — | 950 | — | — | — | — | — |
| | | GSG-3G1R-3a | 1436 | 1.48 | 0.75 | 1.24 | 0.89 | 2.54 |
| | | GSG-3G1R-3b | 1436 | 2.93 | 0.58 | 3.14 | 2.09 | 3.34 |
| SG-4G1R | Reb J | — | 1112 | — | — | — | — | — |
| | Reb K | — | 1112 | — | — | — | — | — |
| | Reb K2 | — | 1112 | — | — | — | — | — |
| | | GSG-4G1R-2 | 1436 | 0.67 | 0.09 | 0.67 | 0.56 | 0.79 |
| | | GSG-4G1R-3 | 1598 | 0.33 | 0.11 | 0.31 | 0.23 | 0.48 |
| | | GSG-4G1R-4 | 1760 | 2.05 | 0.17 | 2.02 | 1.90 | 2.28 |
| | | GSG-4G1R-6 | 2084 | 3.39 | 2.42 | 3.19 | 0.76 | 6.44 |
| SG-5G1R | Reb-N | — | 1274 | — | — | — | — | — |
| | | GSG-5G1R-4 | 1922 | 3.51 | 0.60 | 3.42 | 2.89 | 4.32 |
| SG-6G1R | Reb-O | — | 1436 | 0.16 | 0.02 | 0.16 | 0.13 | 0.18 |
| | | GSG-6G1R-1a | 1598 | 0.53 | 0.08 | 0.56 | 0.41 | 0.58 |
| | | GSG-6G1R-1b | 1598 | 0.49 | 0.28 | 0.41 | 0.28 | 0.87 |
| | | GSG-6G1R-2 | 1760 | 0.73 | 0.27 | 0.70 | 0.45 | 1.09 |
| SG-3G1X | Reb-F | — | 936 | 1.26 | 0.47 | 1.18 | 0.81 | 1.86 |
| | Reb-R | — | 936 | 0.68 | 0.23 | 0.64 | 0.47 | 0.96 |
| | | GSG-3G1X-4 | 1584 | 3.02 | 0.43 | 2.90 | 2.69 | 3.61 |
| | | GSG-3G1X-5 | 1746 | 1.21 | 0.38 | 1.25 | 0.74 | 1.61 |
| SG-4G1X | Reb U | — | 1098 | — | — | — | — | — |
| | Reb T | — | 1098 | — | — | — | — | — |
| | Reb W | — | 1098 | — | — | — | — | — |
| | Reb W2 | — | 1098 | — | — | — | — | — |
| | | GSG-4G1X-1 | 1260 | 1.23 | 0.43 | 1.34 | 0.65 | 1.60 |
| | | GSG-4G1X-2 | 1422 | 1.37 | 0.25 | 1.39 | 1.06 | 1.65 |
| | | GSG-4G1X-3 | 1584 | 2.54 | 0.52 | 2.47 | 2.03 | 3.18 |
| | | GSG-4G1X-4 | 1746 | 0.92 | 0.12 | 0.92 | 0.80 | 1.05 |
| SG-5G1X | Reb V | — | 1260 | — | — | — | — | — |
| | | GSG-5G1X-1 | 1422 | 1.89 | 0.16 | 1.94 | 1.68 | 2.02 |

Table 154 describes the distribution and percentage (wt/wt) of specific unreacted SGs and reacted SGs (i.e., GSGs) following glycosylation of the starting materials in sample lot numbers 3017153, 3017276, 3017308, 3017195 and 3017215:

TABLE 154

| SG-group | Individual SG (unreacted part) | SG-{ }-Added Glucose (reacted part) | [Mr] | Lot number 3017153 mg/10 ml | 3017153 % (m/m) | 3017276 mg/10 ml | 3017276 % (m/m) | 3017308 mg/10 ml | 3017308 % (m/m) | 3017195 mg/10 ml | 3017195 % (m/m) | 3017215 mg/10 ml | 3017215 % (m/m) |
|---|---|---|---|---|---|---|---|---|---|---|---|---|---|
| SG-2G | Rubusoside | — | 642 | 0.14 | 0.10 | 1.16 | 0.77 | 1.33 | 0.89 | 0.70 | 0.46 | <0.05 | <0.05 |
| | Stev-Bios | — | 642 | 1.39 | 0.93 | 0.41 | 0.27 | 1.50 | 1.00 | 0.21 | 0.14 | 1.28 | 0.85 |
| SG-3G | Reb-B | — | 804 | 1.88 | 1.25 | 1.29 | 0.86 | 1.24 | 0.82 | 0.95 | 0.63 | 1.28 | 0.86 |
| | Reb-G | — | 804 | 0.38 | 0.26 | 0.83 | 0.55 | 0.49 | 0.33 | 0.93 | 0.62 | 0.35 | 0.23 |
| | Stevioside | — | 804 | 5.07 | 3.38 | 5.05 | 3.36 | 4.78 | 3.19 | 4.49 | 3.00 | 4.25 | 2.84 |
| | Reb-KA | — | 804 | <0.05 | <0.05 | <0.05 | <0.05 | <0.05 | <0.05 | <0.05 | <0.05 | <0.05 | <0.05 |
| | Stevioside B | — | 804 | <0.05 | <0.05 | <0.05 | <0.05 | <0.05 | <0.05 | <0.05 | <0.05 | <0.05 | <0.05 |
| | | GSG-3G-2 | 1128 | 12.22 | 8.15 | 13.02 | 8.68 | 11.97 | 7.98 | 3.10 | 2.07 | 11.83 | 7.89 |
| | | GSG-3G-3 | 1290 | 5.49 | 3.66 | 4.50 | 3.00 | 4.74 | 3.16 | 7.69 | 5.13 | 6.83 | 4.56 |
| | | GSG-3G-4 | 1452 | 2.30 | 1.54 | 2.25 | 1.50 | 1.20 | 0.80 | 2.83 | 1.89 | 2.85 | 1.90 |
| | | GSG-3G-7 | 1938 | 1.62 | 1.08 | 3.72 | 2.48 | 2.77 | 1.85 | 0.79 | 0.52 | 0.42 | 0.28 |
| | | GSG-3G-8 | 2100 | 3.36 | 2.24 | 4.43 | 2.96 | 3.70 | 2.47 | 3.02 | 2.01 | 1.94 | 1.30 |
| SG-4G | Reb-A | — | 966 | 3.97 | 2.65 | 4.67 | 3.11 | 4.25 | 2.84 | 3.74 | 2.49 | 3.75 | 2.50 |
| | Reb-E | — | 966 | 1.80 | 1.20 | 1.33 | 0.88 | 1.71 | 1.14 | 1.52 | 1.02 | 1.71 | 1.14 |
| | Reb-A2 | — | 966 | <0.05 | <0.05 | <0.05 | <0.05 | <0.05 | <0.05 | <0.05 | <0.05 | <0.05 | <0.05 |
| | Reb-H1 | — | 966 | <0.05 | <0.05 | <0.05 | <0.05 | <0.05 | <0.05 | <0.05 | <0.05 | <0.05 | <0.05 |
| | | GSG-4G-1 | 1128 | 12.06 | 8.04 | 8.60 | 5.73 | 11.51 | 7.68 | 8.17 | 5.45 | 12.06 | 8.04 |
| | | GSG-4G-2 | 1290 | 2.17 | 1.45 | 1.47 | 0.98 | 0.72 | 0.48 | 1.64 | 1.10 | 1.95 | 1.30 |
| | | GSG-4G-3 | 1452 | 1.40 | 0.93 | 1.89 | 1.26 | 1.57 | 1.04 | 1.10 | 0.73 | 2.12 | 1.41 |
| | | GSG-4G-7 | 2100 | 6.40 | 4.26 | 4.93 | 3.29 | 5.15 | 3.44 | 4.22 | 2.81 | 4.48 | 2.99 |
| SG-5G | Reb-D | — | 1128 | 0.88 | 0.58 | 0.96 | 0.64 | 0.60 | 0.40 | 0.81 | 0.54 | 0.91 | 0.60 |
| | Reb I | — | 1128 | <0.05 | <0.05 | <0.05 | <0.05 | <0.05 | <0.05 | <0.05 | <0.05 | <0.05 | <0.05 |
| | Reb L | — | 1128 | <0.05 | <0.05 | <0.05 | <0.05 | <0.05 | <0.05 | <0.05 | <0.05 | <0.05 | <0.05 |
| | Reb Q | — | 1128 | <0.05 | <0.05 | <0.05 | <0.05 | <0.05 | <0.05 | <0.05 | <0.05 | <0.05 | <0.05 |
| | Reb 12 | — | 1128 | <0.05 | <0.05 | <0.05 | <0.05 | <0.05 | <0.05 | <0.05 | <0.05 | <0.05 | <0.05 |
| | | GSG-5G-1 | 1290 | 0.53 | 0.35 | 0.42 | 0.28 | 0.34 | 0.23 | 0.51 | 0.34 | 0.50 | 0.33 |
| | | GSG-5G-2 | 1452 | 0.17 | 0.12 | 0.23 | 0.15 | 0.58 | 0.39 | 0.07 | 0.05 | 0.26 | 0.17 |
| | | GSG-5G-3 | 1614 | 1.82 | 1.22 | 1.90 | 1.27 | 1.45 | 0.96 | 1.67 | 1.11 | 2.60 | 1.73 |
| | | GSG-5G-4 | 1776 | 0.11 | 0.07 | 0.09 | 0.06 | 0.44 | 0.29 | 0.13 | 0.09 | 0.18 | 0.12 |
| | | GSG-5G-5 | 1938 | 3.94 | 2.63 | 4.14 | 2.76 | 3.66 | 2.44 | 5.29 | 3.53 | 3.33 | 2.22 |
| SG-6G | Reb-M | — | 1290 | 0.21 | 0.14 | 0.36 | 0.24 | 0.23 | 0.15 | 0.33 | 0.22 | 0.21 | 0.14 |
| | | GSG-6G-3 | 1776 | 0.39 | 0.26 | 0.15 | 0.10 | 0.47 | 0.31 | 1.30 | 0.87 | 0.26 | 0.18 |
| SG-2G1R | Dulcoside A | — | 788 | 0.49 | 0.32 | 0.33 | 0.22 | <0.1 | — | 0.73 | 0.48 | 0.72 | 0.48 |
| | Dulcoside B | — | 788 | 2.51 | 1.67 | 2.35 | 1.57 | 1.81 | 1.21 | 1.93 | 1.29 | 2.39 | 1.59 |
| SG-3G1R | Reb-C | — | 950 | 1.28 | 0.85 | 0.92 | 0.62 | 1.42 | 0.94 | 0.82 | 0.55 | 1.39 | 0.93 |
| | Reb-S | — | 950 | 1.04 | 0.69 | 2.18 | 1.46 | 1.86 | 1.24 | 3.44 | 2.29 | 2.43 | 1.62 |
| | Reb-H | — | 950 | <0.05 | <0.05 | <0.05 | <0.05 | <0.05 | <0.05 | <0.05 | <0.05 | <0.05 | <0.05 |
| | | GSG-3G1R-3a | 1436 | 1.64 | 1.09 | 0.78 | 0.52 | 1.03 | 0.69 | 1.28 | 0.85 | 1.34 | 0.89 |
| | | GSG-3G1R-3b | 1436 | 4.71 | 3.14 | 4.25 | 2.83 | 6.37 | 4.25 | 5.59 | 3.73 | 3.12 | 2.08 |
| SG-4G1R | Reb J | — | 1112 | <0.05 | <0.05 | <0.05 | <0.05 | <0.05 | <0.05 | <0.05 | <0.05 | <0.05 | <0.05 |
| | Reb K | — | 1112 | <0.05 | <0.05 | <0.05 | <0.05 | <0.05 | <0.05 | <0.05 | <0.05 | <0.05 | <0.05 |
| | Reb K2 | — | 1112 | <0.05 | <0.05 | <0.05 | <0.05 | <0.05 | <0.05 | <0.05 | <0.05 | <0.05 | <0.05 |
| | | GSG-4G1R-2 | 1436 | 1.09 | 0.73 | 0.65 | 0.44 | 0.91 | 0.61 | 0.88 | 0.58 | 0.90 | 0.60 |
| | | GSG-4G1R-3 | 1598 | 0.17 | 0.11 | 0.33 | 0.22 | 0.14 | 0.09 | 0.22 | 0.14 | 0.32 | 0.21 |
| | | GSG-4G1R-4 | 1760 | 2.98 | 1.98 | 1.67 | 1.12 | 3.92 | 2.61 | 4.52 | 3.01 | 5.27 | 3.51 |
| | | GSG-4G1R-6 | 2084 | 2.89 | 1.92 | 2.75 | 1.84 | 3.56 | 2.37 | 0.94 | 0.63 | 2.23 | 1.48 |
| SG-5G1R | Reb-N | — | 1274 | <0.05 | <0.05 | <0.05 | <0.05 | <0.05 | <0.05 | <0.05 | <0.05 | <0.05 | <0.05 |
| | | GSG-5G1R-4 | 1922 | 5.35 | 3.57 | 4.72 | 3.15 | 4.32 | 2.88 | 6.70 | 4.47 | 6.74 | 4.49 |
| SG-6G1R | Reb-O | — | 1436 | 0.31 | 0.21 | 0.32 | 0.21 | 0.26 | 0.17 | 0.37 | 0.25 | 0.35 | 0.23 |
| | | GSG-6G1R-1a | 1598 | 0.40 | 0.26 | 0.81 | 0.54 | 0.85 | 0.56 | 0.82 | 0.55 | 0.63 | 0.42 |
| | | GSG-6G1R-1b | 1598 | 0.67 | 0.45 | 0.77 | 0.52 | 0.83 | 0.55 | 2.25 | 1.50 | 0.72 | 0.48 |
| | | GSG-6G1R-2 | 1760 | 1.16 | 0.77 | 1.72 | 1.14 | 0.83 | 0.55 | 1.88 | 1.26 | 1.18 | 0.79 |
| SG-3G1X | Reb-F | — | 936 | 1.07 | 0.71 | 0.81 | 0.54 | 0.71 | 0.47 | 0.95 | 0.63 | 1.05 | 0.70 |
| | Reb-R | — | 936 | 0.36 | 0.24 | 0.75 | 0.50 | 0.84 | 0.56 | 0.44 | 0.29 | 0.22 | 0.15 |
| | | GSG-3G1X-4 | 1584 | 5.01 | 3.34 | 4.93 | 3.29 | 4.94 | 3.30 | 6.02 | 4.02 | 4.28 | 2.85 |
| | | GSG-3G1X-5 | 1746 | 1.27 | 0.85 | 1.86 | 1.24 | 1.27 | 0.85 | 1.55 | 1.04 | 1.39 | 0.92 |
| SG-4G1X | Reb U | — | 1098 | <0.05 | <0.05 | <0.05 | <0.05 | <0.05 | <0.05 | <0.05 | <0.05 | <0.05 | <0.05 |
| | Reb T | — | 1098 | <0.05 | <0.05 | <0.05 | <0.05 | <0.05 | <0.05 | <0.05 | <0.05 | <0.05 | <0.05 |
| | Reb W | — | 1098 | <0.05 | <0.05 | <0.05 | <0.05 | <0.05 | <0.05 | <0.05 | <0.05 | <0.05 | <0.05 |
| | Reb W2 | — | 1098 | <0.05 | <0.05 | <0.05 | <0.05 | <0.05 | <0.05 | <0.05 | <0.05 | <0.05 | <0.05 |
| | | GSG-4G1X-1 | 1260 | 2.22 | 1.48 | 1.34 | 0.89 | 2.28 | 1.52 | 1.94 | 1.29 | 2.13 | 1.42 |
| | | GSG-4G1X-2 | 1422 | 1.69 | 1.12 | 1.10 | 0.73 | 1.10 | 0.73 | 1.16 | 0.78 | 1.65 | 1.10 |
| | | GSG-4G1X-3 | 1584 | 5.22 | 3.48 | 5.89 | 3.93 | 6.87 | 4.58 | 7.35 | 4.90 | 3.74 | 2.50 |
| | | GSG-4G1X-4 | 1746 | 1.90 | 1.27 | 1.73 | 1.15 | 0.41 | 0.27 | 1.96 | 1.31 | 2.07 | 1.38 |

TABLE 154-continued

| SG-group | Individual SG (unreacted part) | SG-{ }-Added Glucose (reacted part) | [Mr] | Lot number 3017153 mg/10 ml | 3017153 % (m/m) | 3017276 mg/10 ml | 3017276 % (m/m) | 3017308 mg/10 ml | 3017308 % (m/m) | 3017195 mg/10 ml | 3017195 % (m/m) | 3017215 mg/10 ml | 3017215 % (m/m) |
|---|---|---|---|---|---|---|---|---|---|---|---|---|---|
| SG-5G1X | Reb V | — | 1260 | <0.05 | <0.05 | <0.05 | <0.05 | <0.05 | <0.05 | <0.05 | <0.05 | <0.05 | <0.05 |
| | | GSG-5G1X-1 | 1422 | 2.85 | 1.90 | 2.94 | 1.96 | 2.16 | 1.44 | 3.59 | 2.39 | 2.81 | 1.87 |

Table 155 provides a summary of descriptive statistics corresponding to sample lot numbers 3017153, 3017276, 3017308, 3017195 and 3017215 (n=5) tested.

TABLE 155

| SG-group | Individual SG (unreacted part) | SG-{ }-Added Glucose (reacted part) | [Mr] | Mean Value | s.d. | Median | Min | Max |
|---|---|---|---|---|---|---|---|---|
| SG-2G | Rubusoside | — | 642 | 0.56 | 0.35 | 0.62 | 0.10 | 0.89 |
| | Stev-Bios | — | 642 | 0.64 | 0.40 | 0.85 | 0.14 | 1.00 |
| SG-3G | Reb-B | — | 804 | 0.88 | 0.23 | 0.86 | 0.63 | 1.25 |
| | Reb-G | — | 804 | 0.40 | 0.18 | 0.33 | 0.23 | 0.62 |
| | Stevioside | — | 804 | 3.15 | 0.24 | 3.19 | 2.84 | 3.38 |
| | Reb-KA | — | 804 | — | — | — | — | — |
| | Stevioside B | — | 804 | — | — | — | — | — |
| | | GSG-3G-2 | 1128 | 6.95 | 2.75 | 7.98 | 2.07 | 8.68 |
| | | GSG-3G-3 | 1290 | 3.90 | 0.92 | 3.66 | 3.00 | 5.13 |
| | | GSG-3G-4 | 1452 | 1.52 | 0.45 | 1.54 | 0.80 | 1.90 |
| | | GSG-3G-7 | 1938 | 1.24 | 0.92 | 1.08 | 0.28 | 2.48 |
| | | GSG-3G-8 | 2100 | 2.20 | 0.61 | 2.24 | 1.30 | 2.96 |
| SG-4G | Reb-A | — | 966 | 2.72 | 0.26 | 2.65 | 2.49 | 3.11 |
| | Reb-E | — | 966 | 1.08 | 0.13 | 1.14 | 0.88 | 1.20 |
| | Reb-A2 | — | 966 | — | — | — | — | — |
| | Reb-H1 | — | 966 | — | — | — | — | — |
| | | GSG-4G-1 | 1128 | 6.99 | 1.29 | 7.68 | 5.45 | 8.04 |
| | | GSG-4G-2 | 1290 | 1.06 | 0.37 | 1.10 | 0.48 | 1.45 |
| | | GSG-4G-3 | 1452 | 1.08 | 0.27 | 1.04 | 0.73 | 1.41 |
| | | GSG-4G-7 | 2100 | 3.36 | 0.56 | 3.29 | 2.81 | 4.26 |
| SG-5G | Reb-D | — | 1128 | 0.55 | 0.09 | 0.58 | 0.40 | 0.64 |
| | Reb I | — | 1128 | — | — | — | — | — |
| | Reb L | — | 1128 | — | — | — | — | — |
| | Reb Q | — | 1128 | — | — | — | — | — |
| | Reb I2 | — | 1128 | — | — | — | — | — |
| | | GSG-5G-1 | 1290 | 0.31 | 0.05 | 0.33 | 0.23 | 0.35 |
| | | GSG-5G-2 | 1452 | 0.18 | 0.13 | 0.15 | 0.05 | 0.39 |
| | | GSG-5G-3 | 1614 | 1.26 | 0.29 | 1.22 | 0.96 | 1.73 |
| | | GSG-5G-4 | 1776 | 0.13 | 0.09 | 0.09 | 0.06 | 0.29 |
| | | GSG-5G-5 | 1938 | 2.72 | 0.50 | 2.63 | 2.22 | 3.53 |
| SG-6G | Reb-M | — | 1290 | 0.18 | 0.05 | 0.15 | 0.14 | 0.24 |
| | | GSG-6G-3 | 1776 | 0.34 | 0.30 | 0.26 | 0.10 | 0.87 |
| SG-2G1R | Dulcoside A | — | 788 | 0.38 | 0.13 | 0.40 | 0.22 | 0.48 |
| | Dulcoside B | — | 788 | 1.46 | 0.20 | 1.57 | 1.21 | 1.67 |
| SG-3G1R | Reb-C | — | 950 | 0.78 | 0.18 | 0.85 | 0.55 | 0.94 |
| | Reb-S | — | 950 | 1.46 | 0.58 | 1.46 | 0.69 | 2.29 |
| | Reb-H | — | 950 | — | — | — | — | — |
| | | GSG-3G1R-3a | 1436 | 0.81 | 0.22 | 0.85 | 0.52 | 1.09 |
| | | GSG-3G1R-3b | 1436 | 3.21 | 0.83 | 3.14 | 2.08 | 4.25 |
| SG-4G1R | Reb J | — | 1112 | — | — | — | — | — |
| | Reb K | — | 1112 | — | — | — | — | — |
| | Reb K2 | — | 1112 | — | — | — | — | — |
| | | GSG-4G1R-2 | 1436 | 0.59 | 0.10 | 0.60 | 0.44 | 0.73 |
| | | GSG-4G1R-3 | 1598 | 0.16 | 0.06 | 0.14 | 0.09 | 0.22 |
| | | GSG-4G1R-4 | 1760 | 2.45 | 0.93 | 2.61 | 1.12 | 3.51 |
| | | GSG-4G1R-6 | 2084 | 1.65 | 0.65 | 1.84 | 0.63 | 2.37 |
| SG-5G1R | Reb-N | — | 1274 | — | — | — | — | — |
| | | GSG-5G1R-4 | 1922 | 3.71 | 0.74 | 3.57 | 2.88 | 4.49 |
| SG-6G1R | Reb-O | — | 1436 | 0.22 | 0.03 | 0.21 | 0.17 | 0.25 |
| | | GSG-6G1R-1a | 1598 | 0.47 | 0.13 | 0.54 | 0.26 | 0.56 |
| | | GSG-6G1R-1b | 1598 | 0.70 | 0.45 | 0.52 | 0.45 | 1.50 |
| | | GSG-6G1R-2 | 1760 | 0.90 | 0.29 | 0.79 | 0.55 | 1.26 |
| SG-3G1X | Reb-F | — | 936 | 0.61 | 0.10 | 0.63 | 0.47 | 0.71 |
| | Reb-R | — | 936 | 0.35 | 0.18 | 0.29 | 0.15 | 0.56 |
| | | GSG-3G1X-4 | 1584 | 3.36 | 0.42 | 3.30 | 2.85 | 4.02 |
| | | GSG-3G1X-5 | 1746 | 0.98 | 0.16 | 0.92 | 0.85 | 1.24 |

TABLE 155-continued

| SG-group | Individual SG (unreacted part) | SG-{ }-Added Glucose (reacted part) | [Mr] | Mean Value | s.d. | Median | Min | Max |
|---|---|---|---|---|---|---|---|---|
| SG-4G1X | Reb U | — | 1098 | — | — | — | — | — |
| | Reb T | — | 1098 | — | — | — | — | — |
| | Reb W | — | 1098 | — | — | — | — | — |
| | Reb W2 | — | 1098 | — | — | — | — | — |
| | | GSG-4G1X-1 | 1260 | 1.32 | 0.25 | 1.42 | 0.89 | 1.52 |
| | | GSG-4G1X-2 | 1422 | 0.89 | 0.20 | 0.78 | 0.73 | 1.12 |
| | | GSG-4G1X-3 | 1584 | 3.88 | 0.95 | 3.93 | 2.50 | 4.90 |
| | | GSG-4G1X-4 | 1746 | 1.08 | 0.46 | 1.27 | 0.27 | 1.38 |
| SG-5G1X | Reb V | — | 1260 | — | — | — | — | — |
| | | GSG-5G1X-1 | 1422 | 1.91 | 0.34 | 1.90 | 1.44 | 2.39 |

Table 156 describes the distribution and percentage (wt/wt) of specific unreacted SGs and reacted SGs (i.e., GSGs) following glycosylation of the starting materials in sample lot numbers 23201701, 23201702, 23201703:

TABLE 156

| SG-group | Individual SG (unreacted part) | SG-{ }-Added Glucose (reacted part) | [Mr] | Lot number 23201701 mg/10 ml | 23201701 % (m/m) | 23201702 mg/10 ml | 23201702 % (m/m) | 23201703 mg/10 ml | 23201703 % (m/m) |
|---|---|---|---|---|---|---|---|---|---|
| SG-2G | Rubusoside | — | 642 | 0.43 | 0.29 | 2.40 | 0.58 | 2.91 | 0.15 |
| | Stev-Bios | — | 642 | 0.36 | 0.24 | 0.53 | 0.38 | 0.44 | 0.23 |
| SG-3G | Reb-B | — | 804 | 1.78 | 1.19 | 0.66 | 0.64 | 0.59 | 0.63 |
| | Reb-G | — | 804 | 0.48 | 0.32 | 0.83 | 0.11 | 0.83 | 0.05 |
| | Stevioside | — | 804 | 6.06 | 4.04 | 4.07 | 4.09 | 4.46 | 4.93 |
| | Reb-KA | — | 804 | <0.05 | <0.05 | <0.05 | <0.05 | <0.05 | <0.05 |
| | Stevioside B | — | 804 | <0.05 | <0.05 | <0.05 | <0.05 | <0.05 | <0.05 |
| | | GSG-3G-2 | 1128 | 11.09 | 7.39 | 13.42 | 8.95 | 4.53 | 3.02 |
| | | GSG-3G-3 | 1290 | 4.42 | 2.95 | 5.38 | 3.59 | 3.56 | 2.37 |
| | | GSG-3G-4 | 1452 | 2.51 | 1.67 | 2.53 | 1.68 | 2.23 | 1.48 |
| | | GSG-3G-7 | 1938 | 1.86 | 1.24 | 2.15 | 1.43 | 3.28 | 2.19 |
| | | GSG-3G-8 | 2100 | 4.86 | 3.24 | 3.97 | 2.64 | 5.20 | 3.47 |
| SG-4G | Reb-A | — | 966 | 14.33 | 9.55 | 3.48 | 9.68 | 3.82 | 11.28 |
| | Reb-E | — | 966 | 1.42 | 0.94 | 1.52 | 0.67 | 1.33 | 0.52 |
| | Reb-A2 | — | 966 | <0.05 | <0.05 | <0.05 | <0.05 | <0.05 | <0.05 |
| | Reb-H1 | — | 966 | <0.05 | <0.05 | <0.05 | <0.05 | <0.05 | <0.05 |
| | | GSG-4G-1 | 1128 | 12.68 | 8.45 | 16.03 | 10.69 | 8.53 | 5.69 |
| | | GSG-4G-2 | 1290 | 1.72 | 1.15 | 1.66 | 1.11 | 1.63 | 1.09 |
| | | GSG-4G-3 | 1452 | 1.51 | 1.01 | 1.66 | 1.10 | 1.94 | 1.30 |
| | | GSG-4G-7 | 2100 | 4.37 | 2.91 | 4.65 | 3.10 | 7.60 | 5.04 |
| SG-5G | Reb-D | — | 1128 | 0.88 | 0.59 | 0.63 | 0.41 | 0.58 | 0.39 |
| | Reb I | — | 1128 | <0.05 | <0.05 | <0.05 | <0.05 | <0.05 | <0.05 |
| | Reb L | — | 1128 | <0.05 | <0.05 | <0.05 | <0.05 | <0.05 | <0.05 |
| | Reb Q | — | 1128 | <0.05 | <0.05 | <0.05 | <0.05 | <0.05 | <0.05 |
| | Reb I2 | — | 1128 | <0.05 | <0.05 | <0.05 | <0.05 | <0.05 | <0.05 |
| | | GSG-5G-1 | 1290 | 0.43 | 0.29 | 0.36 | 0.24 | 0.34 | 0.23 |
| | | GSG-5G-2 | 1452 | 0.10 | 0.07 | 0.08 | 0.05 | 0.15 | 0.10 |
| | | GSG-5G-3 | 1614 | 1.73 | 1.15 | 1.40 | 0.93 | 1.41 | 0.94 |
| | | GSG-5G-4 | 1776 | 0.18 | 0.12 | 0.15 | 0.10 | 0.13 | 0.09 |
| | | GSG-5G-5 | 1938 | 0.82 | 0.54 | 0.70 | 0.47 | 2.68 | 1.79 |
| SG-6G | Reb-M | — | 1290 | 0.54 | 0.36 | 0.15 | 0.44 | 0.30 | 0.48 |
| | | GSG-6G-3 | 1776 | 0.95 | 0.64 | 0.87 | 0.58 | 0.98 | 0.65 |
| SG-2G1R | Dulcoside A | — | 788 | 1.13 | 0.76 | 1.35 | 0.61 | 0.91 | 0.23 |
| | Dulcoside B | — | 788 | 0.95 | 0.63 | 1.82 | 0.71 | 1.82 | 0.53 |
| SG-3G1R | Reb-C | — | 950 | 1.37 | 0.91 | 3.48 | 0.99 | 3.82 | 0.94 |
| | Reb-S | — | 950 | 0.99 | 0.66 | 0.67 | 0.59 | 0.42 | 0.38 |
| | Reb-H | — | 950 | <0.05 | <0.05 | <0.05 | <0.05 | <0.05 | <0.05 |
| | | GSG-3G1R-3a | 1436 | 1.58 | 1.05 | 1.47 | 0.98 | 3.54 | 2.36 |
| | | GSG-3G1R-3b | 1436 | 6.03 | 4.02 | 4.65 | 3.10 | 3.37 | 2.25 |
| SG-4G1R | Reb J | — | 1112 | <0.05 | <0.05 | <0.05 | <0.05 | <0.05 | <0.05 |
| | Reb K | — | 1112 | <0.05 | <0.05 | <0.05 | <0.05 | <0.05 | <0.05 |
| | Reb K2 | — | 1112 | <0.05 | <0.05 | <0.05 | <0.05 | <0.05 | <0.05 |
| | | GSG-4G1R-2 | 1436 | 1.10 | 0.73 | 0.96 | 0.64 | 1.11 | 0.74 |
| | | GSG-4G1R-3 | 1598 | 0.28 | 0.19 | 0.34 | 0.22 | 0.40 | 0.27 |
| | | GSG-4G1R-4 | 1760 | 3.32 | 2.21 | 2.63 | 1.75 | 2.57 | 1.71 |
| | | GSG-4G1R-6 | 2084 | 1.29 | 0.86 | 1.13 | 0.75 | 8.42 | 5.61 |
| SG-5G1R | Reb-N | — | 1274 | <0.05 | <0.05 | <0.05 | <0.05 | <0.05 | <0.05 |
| | | GSG-5G1R-4 | 1922 | 5.45 | 3.63 | 5.54 | 3.69 | 4.24 | 2.83 |

TABLE 156-continued

| SG-group (unreacted part) | Individual SG (unreacted part) | SG-{ }-Added Glucose (reacted part) | [Mr] | Lot number 23201701 mg/10 ml | % (m/m) | 23201702 mg/10 ml | % (m/m) | 23201703 mg/10 ml | % (m/m) |
|---|---|---|---|---|---|---|---|---|---|
| SG-6G1R | Reb-O | — | 1436 | 0.11 | 0.07 | 0.20 | 0.09 | 0.21 | 0.07 |
| | | GSG-6G1R-1a | 1598 | 0.88 | 0.58 | 0.79 | 0.52 | 0.84 | 0.56 |
| | | GSG-6G1R-1b | 1598 | 0.93 | 0.62 | 0.87 | 0.58 | 1.30 | 0.87 |
| | | GSG-6G1R-2 | 1760 | 0.79 | 0.53 | 0.67 | 0.45 | 1.42 | 0.95 |
| SG-3G1X | Reb-F | — | 936 | 0.80 | 0.53 | 2.79 | 0.50 | 2.08 | 0.12 |
| | Reb-R | — | 936 | 0.58 | 0.38 | 1.14 | 0.50 | 1.45 | 0.45 |
| | | GSG-3G1X-4 | 1584 | 5.69 | 3.80 | 4.24 | 2.83 | 3.45 | 2.30 |
| | | GSG-3G1X-5 | 1746 | 0.93 | 0.62 | 1.18 | 0.79 | 2.29 | 1.53 |
| SG-4G1X | Reb U | — | 1098 | <0.05 | <0.05 | <0.05 | <0.05 | <0.05 | <0.05 |
| | Reb T | — | 1098 | <0.05 | <0.05 | <0.05 | <0.05 | <0.05 | <0.05 |
| | Reb W | — | 1098 | <0.05 | <0.05 | <0.05 | <0.05 | <0.05 | <0.05 |
| | Reb W2 | — | 1098 | <0.05 | <0.05 | <0.05 | <0.05 | <0.05 | <0.05 |
| | | GSG-4G1X-1 | 1260 | 2.50 | 1.66 | 2.67 | 1.78 | 0.98 | 0.66 |
| | | GSG-4G1X-2 | 1422 | 2.11 | 1.41 | 1.71 | 1.14 | 1.93 | 1.28 |
| | | GSG-4G1X-3 | 1584 | 3.64 | 2.43 | 4.12 | 2.75 | 2.93 | 1.95 |
| | | GSG-4G1X-4 | 1746 | 1.32 | 0.88 | 1.44 | 0.96 | 1.02 | 0.68 |
| SG-5G1X | Reb V | — | 1260 | <0.05 | <0.05 | <0.05 | <0.05 | <0.05 | <0.05 |
| | | GSG-5G1X-1 | 1422 | 3.10 | 2.07 | 2.66 | 1.77 | 3.07 | 2.05 |

Table 157 provides a summary of descriptive statistics corresponding to sample lot numbers 23201701, 23201702 and 23201703 (n=3) tested, whereby the cited mean, median, minimum (min) and maximum (max) values are expressed in % m/m.

TABLE 157

| SG-group | Individual SG (unreacted part) | SG-{ }-Added Glucose (reacted part) | [Mr] | Mean Value | s.d. | Median | Min | Max |
|---|---|---|---|---|---|---|---|---|
| SG-2G | Rubusoside | — | 642 | 0.34 | 0.22 | 0.29 | 0.15 | 0.58 |
| | Stev-Bios | — | 642 | 0.28 | 0.09 | 0.24 | 0.23 | 0.38 |
| SG-3G | Reb-B | — | 804 | 0.82 | 0.32 | 0.64 | 0.63 | 1.19 |
| | Reb-G | — | 804 | 0.16 | 0.14 | 0.11 | 0.05 | 0.32 |
| | Stevioside | — | 804 | 4.35 | 0.50 | 4.09 | 4.04 | 4.93 |
| | Reb-KA | — | 804 | — | — | — | — | — |
| | Stevioside B | — | 804 | — | — | — | — | — |
| | | GSG-3G-2 | 1128 | 6.45 | 3.07 | 7.39 | 3.02 | 8.95 |
| | | GSG-3G-3 | 1290 | 2.97 | 0.61 | 2.95 | 2.37 | 3.59 |
| | | GSG-3G-4 | 1452 | 1.61 | 0.11 | 1.67 | 1.48 | 1.68 |
| | | GSG-3G-7 | 1938 | 1.62 | 0.50 | 1.43 | 1.24 | 2.19 |
| | | GSG-3G-8 | 2100 | 3.12 | 0.43 | 3.24 | 2.64 | 3.47 |
| SG-4G | Reb-A | — | 966 | 10.17 | 0.96 | 9.68 | 9.55 | 11.28 |
| | Reb-E | — | 966 | 0.71 | 0.21 | 0.67 | 0.52 | 0.94 |
| | Reb-A2 | — | 966 | — | — | — | — | — |
| | Reb-H1 | — | 966 | — | — | — | — | — |
| | | GSG-4G-1 | 1128 | 8.28 | 2.51 | 8.45 | 5.69 | 10.69 |
| | | GSG-4G-2 | 1290 | 1.11 | 0.03 | 1.11 | 1.09 | 1.15 |
| | | GSG-4G-3 | 1452 | 1.14 | 0.15 | 1.10 | 1.01 | 1.30 |
| | | GSG-4G-7 | 2100 | 3.68 | 1.18 | 3.10 | 2.91 | 5.04 |
| SG-5G | Reb-D | — | 1128 | 0.46 | 0.11 | 0.41 | 0.39 | 0.59 |
| | Reb I | — | 1128 | — | — | — | — | — |
| | Reb L | — | 1128 | — | — | — | — | — |
| | Reb Q | — | 1128 | — | — | — | — | — |
| | Reb I2 | — | 1128 | — | — | — | — | — |
| | | GSG-5G-1 | 1290 | 0.25 | 0.03 | 0.24 | 0.23 | 0.29 |
| | | GSG-5G-2 | 1452 | 0.07 | 0.03 | 0.07 | 0.05 | 0.10 |
| | | GSG-5G-3 | 1614 | 1.01 | 0.13 | 0.94 | 0.93 | 1.15 |
| | | GSG-5G-4 | 1776 | 0.10 | 0.02 | 0.10 | 0.09 | 0.12 |
| | | GSG-5G-5 | 1938 | 0.93 | 0.74 | 0.54 | 0.47 | 1.79 |
| SG-6G | Reb-M | — | 1290 | 0.43 | 0.06 | 0.44 | 0.36 | 0.48 |
| | | GSG-6G-3 | 1776 | 0.62 | 0.04 | 0.64 | 0.58 | 0.65 |
| SG-2G1R | Dulcoside A | — | 788 | 0.53 | 0.27 | 0.61 | 0.23 | 0.76 |
| | Dulcoside B | — | 788 | 0.62 | 0.09 | 0.63 | 0.53 | 0.71 |
| SG-3G1R | Reb-C | — | 950 | 0.95 | 0.04 | 0.94 | 0.91 | 0.99 |
| | Reb-S | — | 950 | 0.54 | 0.14 | 0.59 | 0.38 | 0.66 |
| | Reb-H | — | 950 | — | — | — | — | — |
| | | GSG-3G1R-3a | 1436 | 1.46 | 0.78 | 1.05 | 0.98 | 2.36 |
| | | GSG-3G1R-3b | 1436 | 3.12 | 0.89 | 3.10 | 2.25 | 4.02 |

TABLE 157-continued

| SG-group | Individual SG (unreacted part) | SG-{ }-Added Glucose (reacted part) | [Mr] | Mean Value | s.d. | Median | Min | Max |
|---|---|---|---|---|---|---|---|---|
| SG-4G1R | Reb J | — | 1112 | — | — | — | — | — |
| | Reb K | — | 1112 | — | — | — | — | — |
| | Reb K2 | — | 1112 | — | — | — | — | — |
| | | GSG-4G1R-2 | 1436 | 0.70 | 0.06 | 0.73 | 0.64 | 0.74 |
| | | GSG-4G1R-3 | 1598 | 0.23 | 0.04 | 0.22 | 0.19 | 0.27 |
| | | GSG-4G1R-4 | 1760 | 1.89 | 0.28 | 1.75 | 1.71 | 2.21 |
| | | GSG-4G1R-6 | 2084 | 2.41 | 2.78 | 0.86 | 0.75 | 5.61 |
| SG-5G1R | Reb-N | — | 1274 | — | — | — | — | — |
| | | GSG-5G1R-4 | 1922 | 3.38 | 0.48 | 3.63 | 2.83 | 3.69 |
| SG-6G1R | Reb-O | — | 1436 | 0.08 | 0.01 | 0.07 | 0.07 | 0.09 |
| | | GSG-6G1R-1a | 1598 | 0.56 | 0.03 | 0.56 | 0.52 | 0.58 |
| | | GSG-6G1R-1b | 1598 | 0.69 | 0.16 | 0.62 | 0.58 | 0.87 |
| | | GSG-6G1R-2 | 1760 | 0.64 | 0.27 | 0.53 | 0.45 | 0.95 |
| SG-3G1X | Reb-F | — | 936 | 0.38 | 0.23 | 0.50 | 0.12 | 0.53 |
| | Reb-R | — | 936 | 0.44 | 0.06 | 0.45 | 0.38 | 0.50 |
| | | GSG-3G1X-4 | 1584 | 2.97 | 0.76 | 2.83 | 2.30 | 3.80 |
| | | GSG-3G1X-5 | 1746 | 0.98 | 0.48 | 0.79 | 0.62 | 1.53 |
| SG-4G1X | Reb U | — | 1098 | — | — | — | — | — |
| | Reb T | — | 1098 | — | — | — | — | — |
| | Reb W | — | 1098 | — | — | — | — | — |
| | Reb W2 | — | 1098 | — | — | — | — | — |
| | | GSG-4G1X-1 | 1260 | 1.37 | 0.62 | 1.66 | 0.66 | 1.78 |
| | | GSG-4G1X-2 | 1422 | 1.28 | 0.13 | 1.28 | 1.14 | 1.41 |
| | | GSG-4G1X-3 | 1584 | 2.37 | 0.40 | 2.43 | 1.95 | 2.75 |
| | | GSG-4G1X-4 | 1746 | 0.84 | 0.14 | 0.88 | 0.68 | 0.96 |
| SG-5G1X | Reb V | — | 1260 | — | — | — | — | — |
| | | GSG-5G1X-1 | 1422 | 1.96 | 0.16 | 2.05 | 1.77 | 2.07 |

Table 158 provides a summary of unreacted, reacted and total steviol-glycosides (% m/m), including the percentage of residual RD and glycosylated RM, from the 12 sample lot numbers above.

TABLE 158

| Lot # | Unreacted Steviol-glycosides % (m/m) | Reacted Steviol-glycosides (GSGs), % (m/m) | Total SGs + GSGs % (m/m) | Maltodextrin % (m/m) |
|---|---|---|---|---|
| #20171101 | 15.37 | 59.72 | 75.09 | ≤20 |
| #20171102 | 15.26 | 63.90 | 79.16 | ≤20 |
| #20171103 | 15.39 | 62.76 | 78.15 | ≤20 |
| #20171104 | 15.79 | 63.67 | 79.46 | ≤20 |
| #3017153 | 15.18 | 63.46 | 78.64 | ≤20 |
| #3017276 | 15.80 | 60.00 | 75.80 | ≤20 |

TABLE 158-continued

| Lot # | Unreacted Steviol-glycosides % (m/m) | Reacted Steviol-glycosides (GSGs), % (m/m) | Total SGs + GSGs % (m/m) | Maltodextrin % (m/m) |
|---|---|---|---|---|
| #3017308 | 15.35 | 61.38 | 76.73 | ≤20 |
| #3017195 | 14.89 | 60.14 | 75.03 | ≤20 |
| #3017215 | 14.85 | 61.42 | 76.27 | ≤20 |
| #23201701 | 21.46 | 60.10 | 81.56 | ≤20 |
| #23201702 | 21.00 | 61.36 | 82.36 | ≤20 |
| #23201703 | 21.39 | 58.03 | 79.42 | ≤20 |

Table 159 provides a summary of descriptive statistics corresponding to all 12 sample lot numbers (n=12) tested above, whereby the cited mean, median, minimum (min) and maximum (max) values are expressed in % m/m.

TABLE 159

| SG-group | Individual SG (unreacted part) | SG-{ }-Added Glucose (reacted part) | [Mr] | Mean | s.d. | Median | Min | Max |
|---|---|---|---|---|---|---|---|---|
| SG-2G | Rubusoside | — | 642 | 0.86 | 0.63 | 0.77 | 0.10 | 1.94 |
| | Stev-Bios | — | 642 | 0.45 | 0.30 | 0.33 | 0.14 | 1.00 |
| SG-3G | Reb-B | — | 804 | 0.72 | 0.30 | 0.64 | 0.26 | 1.25 |
| | Reb-G | — | 804 | 0.41 | 0.23 | 0.44 | 0.05 | 0.76 |
| | Stevioside) | — | 804 | 3.47 | 0.66 | 3.28 | 2.71 | 4.93 |
| | Reb-KA | — | 804 | <0.05 | — | <0.05 | — | — |
| | Stevioside B | — | 804 | <0.05 | — | <0.05 | — | — |
| | | GSG-3G-2 | 1128 | 6.52 | 2.40 | 7.64 | 2.07 | 8.95 |
| | | GSG-3G-3 | 1290 | 3.36 | 0.81 | 3.18 | 2.29 | 5.13 |
| | | GSG-3G-4 | 1452 | 1.61 | 0.31 | 1.66 | 0.80 | 1.94 |
| | | GSG-3G-7 | 1938 | 1.51 | 0.73 | 1.46 | 0.28 | 2.55 |
| | | GSG-3G-8 | 2100 | 2.60 | 0.65 | 2.56 | 1.30 | 3.51 |

TABLE 159-continued

| SG-group | Individual SG (unreacted part) | SG-{ }-Added Glucose (reacted part) | [Mr] | | s.d. | Median | Min | Max |
|---|---|---|---|---|---|---|---|---|
| SG-4G | Reb-A | — | 966 | 4.64 | 3.38 | 2.86 | 2.32 | 11.28 |
| | Reb A2 | — | 966 | 1.03 | 0.28 | 1.01 | 0.52 | 1.50 |
| | Reb-E | — | 966 | <0.05 | — | <0.05 | — | — |
| | Reb H1 | — | 966 | <0.05 | — | <0.05 | — | — |
| | | GSG-4G-1 | 1128 | 7.66 | 1.67 | 7.86 | 5.45 | 10.69 |
| | | GSG-4G-2 | 1290 | 1.07 | 0.23 | 1.10 | 0.48 | 1.45 |
| | | GSG-4G-3 | 1452 | 1.12 | 0.20 | 1.08 | 0.73 | 1.41 |
| | | GSG-4G-7 | 2100 | 3.69 | 0.96 | 3.28 | 2.81 | 5.63 |
| SG-5G | Reb D | — | 1128 | 0.61 | 0.16 | 0.59 | 0.39 | 0.80 |
| | Reb I | — | 1128 | <0.05 | — | <0.05 | — | — |
| | Reb L | — | 1128 | <0.05 | — | <0.05 | — | — |
| | Reb Q | — | 1128 | <0.05 | — | <0.05 | — | — |
| | Reb I2 | — | 1128 | <0.05 | — | <0.05 | — | — |
| | | GSG-5G-1 | 1290 | 0.28 | 0.05 | 0.27 | 0.23 | 0.35 |
| | | GSG-5G-2 | 1452 | 0.16 | 0.12 | 0.11 | 0.05 | 0.39 |
| | | GSG-5G-3 | 1614 | 1.18 | 0.27 | 1.12 | 0.93 | 1.73 |
| | | GSG-5G-4 | 1776 | 0.11 | 0.06 | 0.09 | 0.06 | 0.29 |
| | | GSG-5G-5 | 1938 | 1.92 | 1.08 | 2.21 | 0.45 | 3.53 |
| SG-6G | Reb M | — | 1290 | 0.23 | 0.13 | 0.19 | 0.08 | 0.48 |
| | | GSG-6G-3 | 1776 | 0.69 | 0.51 | 0.61 | 0.10 | 1.81 |
| SG-2G1R | Dulcoside A | — | 788 | 0.47 | 0.23 | 0.48 | 0.21 | 0.90 |
| | Dulcoside B | — | 788 | 1.15 | 0.42 | 1.22 | 0.53 | 1.67 |
| SG-3G1R | Reb C | — | 950 | 1.53 | 1.08 | 0.94 | 0.55 | 3.86 |
| | Reb S | — | 950 | 0.91 | 0.60 | 0.62 | 0.38 | 2.29 |
| | Reb H | — | 950 | <0.05 | — | <0.05 | — | — |
| | | GSG-3G1R-3 | 1436 | 4.29 | 1.34 | 4.13 | 2.60 | 6.79 |
| | | | | Mean Value | | | | |
| SG-4G1R | Reb J | — | 1112 | <0.05 | — | <0.05 | — | — |
| | Reb K | — | 1112 | <0.05 | — | <0.05 | — | — |
| | Reb K2 | — | 1112 | <0.05 | — | <0.05 | — | — |
| | | GSG-4G1R-6 | 2084 | 2.42 | 1.94 | 1.88 | 0.63 | 6.44 |
| | | GSG-4G1R-4 | 1760 | 2.18 | 0.63 | 2.04 | 1.12 | 3.51 |
| | | SG-4G1R-3 | 1598 | 0.23 | 0.11 | 0.22 | 0.09 | 0.48 |
| | | GSG-4G1R-2 | 1436 | 0.65 | 0.10 | 0.65 | 0.44 | 0.79 |
| SG-5G1R | Reb N | — | 1274 | <0.05 | — | <0.05 | — | — |
| | | GSG-5G1R-4 | 1922 | 3.56 | 0.60 | 3.54 | 2.83 | 4.49 |
| SG-6G1R | Reb O | — | 1436 | 0.16 | 0.06 | 0.17 | 0.07 | 0.25 |
| | | GSG-6G1R-2 | 1760 | 0.78 | 0.28 | 0.78 | 0.45 | 1.26 |
| | | GSG-6G1R-1 | 1598 | 1.14 | 0.43 | 1.09 | 0.54 | 2.09 |
| SG-3G1X | Reb F | — | 936 | 0.77 | 0.46 | 0.66 | 0.12 | 1.86 |
| | Reb R | — | 936 | 0.48 | 0.22 | 0.49 | 0.15 | 0.96 |
| | | GSG-3G1X-5 | 1746 | 1.06 | 0.32 | 0.98 | 0.62 | 1.61 |
| | | GSG-3G1X-4 | 1584 | 3.15 | 0.50 | 3.18 | 2.30 | 4.02 |
| SG-4G1X | Reb U | — | 1098 | <0.05 | — | <0.05 | — | — |
| | Reb T | — | 1098 | <0.05 | — | <0.05 | — | — |
| | Reb W | — | 1098 | <0.05 | — | <0.05 | — | — |
| | Reb W2 | — | 1098 | <0.05 | — | <0.05 | — | — |
| | | GSG-4G1X-4 | 1746 | 0.97 | 0.31 | 0.98 | 0.27 | 1.38 |
| | | GSG-4G1X-3 | 1584 | 3.05 | 0.98 | 2.73 | 1.95 | 4.90 |
| | | GSG-4G1X-2 | 1422 | 1.15 | 0.29 | 1.13 | 0.73 | 1.65 |
| | | GSG-4G1X-1 | 1260 | 1.30 | 0.38 | 1.45 | 0.65 | 1.78 |
| SG-5G1X | Reb V | — | 1260 | <0.05 | — | <0.05 | — | — |
| | | GSG-5G1X-1 | 1422 | 1.92 | 0.23 | 1.93 | 1.44 | 2.39 |

The raw materials which is used to prepare GSG are given as follows:

| GSG | Corresponding material |
|---|---|
| 20171101 | SCJ20171009 |
| 20171102 | SCJ20171008 |
| 20171103 | SCJ20170220-24 |
| 20171104 | SCJ20170625-26 |
| 3017153 | SCJ20170220-24 |
| 3017276 | SCJ20170220-24 |
| 3017308 | SCJ20170220-24 |
| 3017195 | SCJ20170220-24 |
| 3017215 | SCJ20170220-24 |

-continued

| GSG | Corresponding material |
|---|---|
| 23201701 | 20160118 |
| 23201702 | 20160106 |
| 23201703 | SCJ20170220-24 |

The contents of each ingredient of Lot 20160118 and 20160106 are the same as that of example 58 and example 59. The contents of each ingredient of other lot numbers are detected by HPLC-MS, and the results are as follows:

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| Steviol-glycosides in sample SCJ20171009 (sample weight 149.7 mg/10 ml) | | | | | | | | |
| 15.71 | 235.4 | 0.853 | 0.58 | 1127 803 641 | 1127 | Reb I3 (MS) | [Glcβ(1-2)Glcβ(1-6)] Glcβ1- | Glcβ(1-2)Glcβ1- |
| 16.13 | 277.8 | 1.42 | 0.97 | 803 (?) | 803 | SG-EPC01 | | |
| 16.44 | 331.0 | 0.950 | 0.65 | 1435 965 641 | 1435 | Reb-O (MS) | Glcβ(1-3)Rhaα(1-2)[Glcβ(1-3)]Glcβ1- | Glcβ(1-2)[Glcβ(1-3)]Glcβ1- |
| 17.32 | 1313.9 | 4.88 | 3.32 | 1127 803 | 1127 | Reb-D (Std) | Glcβ(1-2)Glcβ1- | Glcβ(1-2)[Glcβ(1-3)]Glcβ1- |
| 18.05 | 344.0 | 1.10 | 0.75 | 1289 1127 965 803 641 | 1289 | Reb-M (Std) | Glcβ(1-2)[Glcβ(1-3)]Glcβ1- | Glcβ(1-2)[Glcβ(1-3)]Glcβ1- |
| 18.34 | 266.9 | 0.859 | 0.58 | 1273 1111 803 | 1273 | Reb-N (Std) | Rhaα(1-2)[Glcβ(1-3)]Glcβ1- | Glcβ(1-2)[Glcβ(1-3)]Glcβ1- |
| 18.53 | 408.3 | 1.75 | 1.19 | 965 803 641 | 965 | Reb-E (Std) | Glcβ(1-2)Glcβ1- | Glcβ(1-2)Glcβ1- |
| 18.91 | 135.3 | 0.486 | 0.33 | 1111 949 803 641 | 1111 | Reb-K (MS) | Glcβ(1-2)Glcβ1- | Rhaα(1-2)[Glcβ(1-3)]Glcβ1- |
| 19.17 | 10.7 | 0.0120 | 0.01 | 1259 1097 965 803 479 | 1259 | Reb-Y (MS) | Glcβ(1-2)[Araβ(1-3)]Glcβ1- | Glcβ(1-2)[Glcβ(1-3)]Glcβ1- |
| 19.88 | 130.8 | 0.469 | 0.32 | 1111 949 803 641 | 1111 | Reb-J (MS) | Rhaα(1-2)Glcβ1- | Glcβ(1-2)[Glcβ(1-3)]Glcβ1- |
| 20.06 | 97.0 | 0.300 | 0.20 | 1259 1111 803 641 | 1259 | Reb-V (MS) | Glcβ(1-2)[Glcβ(1-3)]Glcβ1- | Xylβ(1-2)[Glcβ(1-3)]-Glcβ1- |
| 20.48 | 35.2 | 0.094 | 0.06 | 1259 965 803 641 | 1259 | Reb-V2 (MS) | Xylβ(1-2)[Glcβ(1-3)]-Glcβ1- | Glcβ(1-2)[Glcβ(1-3)]Glcβ1- |
| 20.89 | 94.7 | 0.332 | 0.23 | 1111 949 803 | 1111 | Reb-H (MS) | Glcβ1- | Glcβ(1-3)Rhaα(1-2)[Glcβ(1-3)]Glcβ1- |
| 21.12 | 160.0 | 0.571 | 0.39 | 1127 965 803 641 | 1127 | Reb-1 (MS) | Glcβ(1-3)Glcβ1- | Glcβ(1-2)[Glcβ(1-3)]Glcβ1- |
| 21.45 | 62.0 | 0.21 | 0.14 | 1097 965 803 641 | 1097 | Reb U (MS) | Araα(1-2)-Glcβ1- | Glcβ(1-2)[Glcβ(1-3)]Glcβ1- |
| 21.96 | 125.6 | 0.443 | 0.30 | 1127 965 803 641 | 1127 | Reb L (MS) | Glcβ1- | Glcβ(1-6)Glcβ(1-2)[Glcβ(1-3)]Glcβ1- |
| 22.16 | 6771.1 | 29.5 | 20.07 | 965 803 641 | 965 | Reb-A (Std) | Glcβ1- | Glcβ(1-2)[Glcβ(1-3)]Glcβ1- |
| 22.46 | 6656.4 | 34.9 | 23.71 | 803 641 | 803 | Stevioside (Std) | Glcβ1- | Glcβ(1-2)Glcβ1- |
| 23.40 | 415.9 | 1.84 | 1.20 | 935 773 625 | 935 | Reb-R (MS) | Glcβ1- | Glcβ(1-2)[Glcβ(1-3)]Xylβ1- |
| 23.51 | 280.3 | 1.23 | 0.80 | 935 773 625 | 935 | Reb-F (Std) | Glcβ1- | Xylβ(1-2)[Glcβ(1-3)]Glcβ1- |
| 23.69 | 427.4 | 1.86 | 1.27 | 949 787 | 949 | Reb-C (Std) | Glcβ1- | Rhaα(1-2)[Glcβ(1-3)]Glcβ1- |
| 24.22 | 104.3 | 0.520 | 0.35 | 787 625 479 | 787 | Dulcoside A (Std) | Glcβ1- | Rhaα(1-2)Glcβ1- |
| 24.47 | 856.1 | 4.45 | 3.03 | 803 641 479 | 803 | Reb-G (Std) | Glcβ1- | Glcβ(1-3)Glcβ1- |
| 24.97 | 523.5 | 2.29 | 1.56 | 949 787 479 | 949 | Reb-S (MS) | H- | Glcβ(1-3)Rhaα(1-2)[Glcβ(1-3)]Glcβ1- |
| 25.64 | 535.6 | 3.47 | 2.36 | 641 479 | 641 | Rubusoside (Std) | Glcβ1- | Glcβ1- |
| 26.38 | 15.2 | 0.0435 | 0.03 | 787 625 | 787 | Stevioside B (MS) | Glcβ1- | Glcβ(1-2)6-deoxyGlcβ1- |
| 27.10 | 888.6 | 4.62 | 3.14 | 804 | 803 | Reb-B (Std) | H- | Glcβ(1-2)[Glcβ(1-3)]Glcβ1- |
| 27.82 | 1013.4 | 6.61 | 4.49 | 641 479 | 641 | Reb G1 (MS) | H- | Glcβ(1-3)Glcβ1- |
| 28.41 | 738.2 | 3.91 | 2.66 | 787 641 | 787 | Dulcoside B (MS) | H- | Rhaα(1-2)[Glcβ(1-3)]Glcβ1- |
| 28.77 | 538.6 | 3.5 | 2.37 | 641 | 641 | Steviolbioside (MS) | H- | Glcβ(1-2)Glcβ1- |
| 29.32 | 136.9 | 0.707 | 0.48 | 773 | 773 | Reb-R1 (MS) | H- | Glcβ(1-2)[Glcβ(1-3)]Xylβ1- |
| 30.33 | 1161.2 | 6.28 | 4.27 | 773 625 | 773 | Reb-F1 (MS) | H- | Xylβ(1-2)[Glcβ(1-3)]Glcβ1- |
| 31.78 | 36.96929 | 0.196 | 0.13 | 641 | 641 | Iso-Steviolbioside | H- | Glcβ(1-2)Glcβ1- |

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| Steviol-glycosides in sample SCJ20171008 (sample weight 150.5 mg/10 ml) | | | | | | | | |
| 15.67 | 218.2 | 0.789 | 0.52 | 1127 803 641 | 1127 | Reb I3 (MS) | [Glcβ(1-2)Glcβ(1-6)] Glcβ1- | Glcβ(1-2)Glcβ1- |
| 16.09 | 225.7 | 1.15 | 0.76 | 803 (?) | 803 | SG-EPC01 | | |
| 16.85 | 132.9 | 0.369 | 0.25 | 1435 965 641 | 1435 | Reb-O (MS) | Glcβ(1-3)Rnaα(1-2)[Glcβ(1-3)]Glcβ1- | Glcβ(1-2)[Glcβ(1-3)]Glcβ1- |

-continued

Steviol-glycosides in sample SCJ20171008 (sample weight 150.5 mg/10 ml)

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| 17.28 | 1394.2 | 5.18 | 3.44 | 1127 803 | 1127 | Reb-D (Std) | Glcβ(1-2)Glcβ1- | Glcβ(1-2)[Glcβ(1-3)]Glcβ1- |
| 18.02 | 423.6 | 1.36 | 0.90 | 1289 1127 965 803 641 | 1289 | Reb-M (Std) | Glcβ(1-2)[Glcβ(1-3)]Glcβ1- | Glcβ(1-2)[Glcβ(1-3)]Glcβ1- |
| 18.40 | 238.5 | 0.765 | 0.51 | 1273 1111 803 | 1273 | Reb-N (Std) | Rhaα(1-2)[Glcβ(1-3)]Glcβ1- | Glcβ(1-2)[Glcβ(1-3)]Glcβ1- |
| 18.65 | 385.4 | 1.65 | 1.10 | 965 803 641 | 965 | Reb-E (Std) | Glcβ(1-2)Glcβ1- | Glcβ(1-2)Glcβ1- |
| 18.86 | 308.6 | 1.14 | 0.76 | 1111 949 803 641 | 1111 | Reb-K (MS) | Glcβ(1-2)Glcβ1- | Rhaα(1-2)[Glcβ(1-3)]Glcβ1- |
| 19.15 | 95.4 | 0.295 | 0.20 | 1259 1097 965 803 479 | 1259 | Reb-Y (MS) | Glcβ(1-2)[Araβ(1-3)]Glcβ1- | Glcβ(1-2)[Glcβ(1-3)]Glcβ1- |
| 19.83 | 268.5 | 0.990 | 0.66 | 1111 949 803 641 | 1111 | Reb-J (MS) | Rhaα(1-2)Glcβ1- | Glcβ(1-2)[Glcβ(1-3)]Glcβ1- |
| 20.00 | 152.1 | 0.485 | 0.32 | 1259 1111 803 641 | 1259 | Reb-V (MS) | Glcβ(1-2)[Glcβ(1-3)]Glcβ1- | Xylβ(1-2)[Glcβ(1-3)]-Glcβ1- |
| 20.20 | 136.9 | 0.434 | 0.29 | 1259 965 803 641 | 1259 | Reb-V2 (MS) | Xylβ(1-2)[Glcβ(1-3)]-Glcβ1- | Glcβ(1-2)[Glcβ(1-3)]Glcβ1- |
| 20.47 | 15.6 | 0.0322 | 0.02 | 1111 949 803 | 1111 | Reb-H (MS) | Glcβ1- | Glcβ(1-3)Rhaα(1-2)[Glcβ(1-3)]Glcβ1- |
| 20.84 | 137.1 | 0.485 | 0.32 | 1127 965 803 641 | 1127 | Reb-I (MS) | Glcβ(1-3)Glcβ1- | Glcβ(1-2)[Glcβ(1-3)]Glcβ1- |
| 21.07 | 165.2 | 0.607 | 0.40 | 1097 965 803 641 | 1097 | Reb U (MS) | Araα(1-2)-Glcβ1- | Glcβ(1-2)[Glcβ(1-3)]Glcβ1- |
| 21.50 | 59.5 | 0.196 | 0.13 | 1127 965 803 641 | 1127 | Reb L (MS) | Glcβ1- | Glcβ(1-6)Glcβ(1-2)[Glcβ(1-3)]Glcβ1- |
| 22.12 | 7069.2 | 30.8 | 20.47 | 965 803 641 | 965 | Reb-A (Std) | Glcβ1- | Glcβ(1-2)[Glcβ(1-3)]Glcβ1- |
| 22.42 | 7181.1 | 37.6 | 24.98 | 803 641 | 803 | Stevioside (Std) | Glcβ1- | Glcβ(1-2)Glcβ1- |
| 23.37 | 415.9 | 1.84 | 1.22 | 935 773 625 | 935 | Reb-R (MS) | Glcβ1- | Glcβ(1-2)[Glcβ(1-3)]Xylβ1- |
| 23.43 | 280.3 | 1.23 | 0.82 | 935 773 625 | 935 | Reb-F (Std) | Glcβ1- | Xylβ(1-2)[Glcβ(1-3)]Glcβ1- |
| 23.66 | 1308.2 | 5.77 | 3.83 | 949 787 | 949 | Reb-C (Std) | Glcβ1- | Rhaα(1-2)[Glcβ(1-3)]Glcβ1- |
| 24.19 | 98.2 | 0.487 | 0.32 | 787 625 479 | 787 | Dulcoside A (Std) | Glcβ1- | Rhaα(1-2)Glcβ1- |
| 24.44 | 579.5 | 3.00 | 1.99 | 803 641 479 | 803 | Reb-G (Std) | Glcβ1- | Glcβ(1-3)Glcβ1- |
| 24.94 | 516.7 | 2.26 | 1.50 | 949 787 479 | 949 | Reb-S (MS) | H- | Glcβ(1-3)Rhaα(1-2)[Glcβ(1-3)]Glcβ1- |
| 25.61 | 537.1 | 3.48 | 2.31 | 641 479 | 641 | Rubusoside (Std) | Glcβ1- | Glcβ1- |
| 26.32 | 224.8 | 1.16 | 0.77 | 787 625 | 787 | Stevioside B (MS) | Glcβ1- | Glcβ(1-2)6-deoxyGlcβ1- |
| 27.04 | 457.4 | 2.36 | 1.57 | 804 | 803 | Reb-B (Std) | H- | Glcβ(1-2)[Glcβ(1-3)]Glcβ1- |
| 27.76 | 606.9 | 3.94 | 2.62 | 641 479 | 641 | Reb G1 (MS) | H- | Glcβ(1-3)Glcβ1- |
| 28.40 | 465.2 | 2.45 | 1.63 | 787 641 | 787 | Dulcoside B (MS) | H- | Rhaα(1-2)[Glcβ(1-3)]Glcβ1- |
| 28.70 | 360.4 | 2.32 | 1.54 | 641 | 641 | Steviolbioside (MS) | H- | Glcβ(1-2)Glcβ1- |
| 29.32 | 103.7 | 0.526 | 0.35 | 773 | 773 | Reb-R1 (MS) | H- | Glcβ(1-2)[Glcβ(1-3)]Xylβ1- |
| 30.27 | 1191.7 | 6.45 | 4.29 | 773 625 | 773 | Reb-F1 (MS) | H- | Xylβ(1-2)[Glcβ(1-3)]Glcβ1- |
| 31.06 | 140.2 | 0.874 | 0.58 | 641 479 | 641 | | | |

Steviol-glycosides in sample SCJ20170220-24 (sample weight 147.2 mg/10 ml)

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| 15.74 | 288.1 | 1.05 | 0.71 | 1127 803 641 | 1127 | Reb I3 (MS) | [Glcβ(1-2)Glcβ(1-6)]Glcβ1- | Glcβ(1-2)Glcβ1- |
| 16.16 | 310.7 | 1.59 | 1.08 | 803 (?) | 803 | SG-EPC01 | | |
| 16.94 | 211.1 | 0.449 | 0.31 | 1435 965 641 | 1435 | Reb-O (MS) | Glcβ(1-3)Rhaα(1-2)[Glcβ(1-3)]Glcβ1- | Glcβ(1-2)[Glcβ(1-3)]Glcβ1- |
| 17.38 | 1423.5 | 3.84 | 2.61 | 1127 803 | 1127 | Reb-D (Std) | Glcβ(1-2)Glcβ1- | Glcβ(1-2)[Glcβ(1-3)]Glcβ1- |
| 18.12 | 803.9 | 1.44 | 0.98 | 1289 1127 965 803 641 | 1289 | Reb-M (Std) | Glcβ(1-2)[Glcβ(1-3)]Glcβ1- | Glcβ(1-2)[Glcβ(1-3)]Glcβ1- |

-continued

Steviol-glycosides in sample SCJ20170220-24 (sample weight 147.2 mg/10 ml)

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| 18.59 | 45.3 | 0.765 | 0.52 | 1273 1111 803 | 1273 | Reb-N (Std) | Rhaα(1-2)[Glcβ(1-3)]Glcβ1- | Glcβ(1-2)[Glcβ(1-3)]Glcβ1- |
| 18.79 | 70.8 | 1.86 | 1.27 | 965 803 641 | 965 | Reb-E (Std) | Glcβ(1-2)Glcβ1- | Glcβ(1-2)Glcβ1- |
| 18.97 | 203.0 | 0.742 | 0.50 | 1111 949 803 641 | 1111 | Reb-K (MS) | Glcβ(1-2)Glcβ1- | Rhaα(1-2)[Glcβ(1-3)]Glcβ1- |
| 19.23 | 71.3 | 0.215 | 0.15 | 1259 1097 965 803 479 | 1259 | Reb-Y (MS) | Glcβ(1-2)[Araβ(1-3)]Glcβ1- | Glcβ(1-2)[Glcβ(1-3)]Glcβ1- |
| 19.96 | 99.1 | 0.349 | 0.24 | 1111 949 803 641 | 1111 | Reb-J (MS) | Rhaα(1-2)Glcβ1- | Glcβ(1-2)[Glcβ(1-3)]Glcβ1- |
| 20.08 | 103.0 | 0.321 | 0.22 | 1259 1111 803 641 | 1259 | Reb-V (MS) | Glcβ(1-2)[Glcβ(1-3)]Glcβ1- | Xylβ(1-2)[Glcβ(1-3)]-Glcβ1- |
| 20.31 | 148.0 | 0.471 | 0.32 | 1259 965 803 641 | 1259 | Reb-V2 (MS) | Xylβ(1-2)[Glcβ(1-3)]-Glcβ1- | Glcβ(1-2)[Glcβ(1-3)]Glcβ1- |
| 20.56 | 34.5 | 0.104 | 0.07 | 1111 949 803 | 1111 | Reb-H (MS) | Glcβ1- | Glcβ(1-3)Rhaα(1-2)[Glcβ(1-3)]Glcβ1- |
| 20.93 | 138.4 | 0.491 | 0.33 | 1127 965 803 641 | 1127 | Reb-I (MS) | Glcβ(1-3)Glcβ1- | Glcβ(1-2)[Glcβ(1-3)]Glcβ1- |
| 21.19 | 68.2 | 0.234 | 0.16 | 1097 965 803 641 | 1097 | Reb U (MS) | Araα(1-2)-Glcβ1- | Glcβ(1-2)[Glcβ(1-3)]Glcβ1- |
| 21.52 | 39.3 | 0.120 | 0.08 | 1127 965 803 641 | 1127 | Reb L (MS) | Glcβ1- | Glcβ(1-6)Glcβ(1-2)[Glcβ(1-3)]Glcβ1- |
| 22.23 | 8047.9 | 33.3 | 22.65 | 965 803 641 | 965 | Reb-A (Std) | Glcβ1- | Glcβ(1-2)[Glcβ(1-3)]Glcβ1- |
| 22.50 | 5733.0 | 32.2 | 21.90 | 803 641 | 803 | Stevioside (Std) | Glcβ1- | Glcβ(1-2)Glcβ1- |
| 23.48 | 1195.2 | 2.33 | 1.52 | 935 773 625 | 935 | Reb-R (MS) | Glcβ1- | Glcβ(1-2)[Glcβ(1-3)]Xylβ1- |
| 23.58 | 267.1 | 1.56 | 1.02 | 935 773 625 | 935 | Reb-F (Std) | Glcβ1- | Xylβ(1-2)[Glcβ(1-3)]Glcβ1- |
| 23.77 | 5863.0 | 8.48 | 5.77 | 949 787 | 949 | Reb-C (Std) | Glcβ1- | Rhaα(1-2)[Glcβ(1-3)]Glcβ1- |
| 24.30 | 652.3 | 0.487 | 0.33 | 787 625 479 | 787 | Dulcoside A (Std) | Glcβ1- | Rhaα(1-2)Glcβ1- |
| 24.54 | 1029.5 | 5.60 | 3.81 | 803 641 479 | 803 | Reb-G (Std) | Glcβ1- | Glcβ(1-3)Glcβ1- |
| 25.03 | 605.5 | 2.05 | 1.39 | 949 787 479 | 949 | Reb-S (MS) | H- | Glcβ(1-3)Rhaα(1-2)[Glcβ(1-3)]Glcβ1- |
| 25.71 | 723.9 | 3.25 | 2.21 | 641 479 | 641 | Rubusoside (Std) | Glcβ1- | Glcβ1- |
| 26.41 | 13.3 | 0.0332 | 0.02 | 787 625 | 787 | Stevioside B (MS) | Glcβ1- | Glcβ(1-2)6-deoxyGlcβ1- |
| 27.18 | 1656.0 | 2.48 | 1.69 | 804 | 803 | Reb-B (Std) | H- | Glcβ(1-2)[Glcβ(1-3)]Glcβ1- |
| 27.90 | 637.5 | 4.14 | 2.82 | 641 479 | 641 | Reb G1 (MS) | H- | Glcβ(1-3)Glcβ1- |
| 28.53 | 201.8 | 4.10 | 2.79 | 787 641 | 787 | Dulcoside B (MS) | H- | Rhaα(1-2)[Glcβ(1-3)]Glcβ1- |
| 28.75 | 139.4 | 4.87 | 3.31 | 641 | 641 | Steviolbioside (MS) | H- | Glcβ(1-2)Glcβ1- |
| 29.28 | 263.6 | 1.40 | 0.95 | 773 | 773 | Reb-R1 (MS) | H- | Glcβ(1-2)[Glcβ(1-3)]Xylβ1- |
| 30.40 | 953.9 | 5.16 | 3.51 | 773 625 | 773 | Reb-F1 (MS) | H- | Xylβ(1-2)[Glcβ(1-3)]Glcβ1- |
| 31.06 | 140.1985 | 0.87 | 0.59 | 641 | 641 | Iso-Steviolbioside | H- | Glcβ(1-2)Glcβ1- |

Steviol-glycosides in sample SCJ2017625-26 (sample weight 149.3 mg/10 ml)

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| 15.65 | 580.5 | 2.14 | 1.46 | 1127 803 641 | 1127 | Reb I3 (MS) | [Glcβ(1-2)Glcβ(1-6)]Glcβ1- | Glcβ(1-2)Glcβ1- |
| 16.38 | 89.0 | 0.429 | 0.29 | 803 (?) | 803 | SG-EPC01 | | |
| 16.93 | 328.6 | 0.943 | 0.64 | 1435 965 641 | 1435 | Reb-O (MS) | Glcβ(1-3)Rhaα(1-2)[Glcβ(1-3)]Glcβ1- | Glcβ(1-2)[Glcβ(1-3)]Glcβ1- |
| 17.36 | 1276.4 | 4.74 | 3.22 | 1127 803 | 1127 | Reb-D (Std) | Glcβ(1-2)Glcβ1- | Glcβ(1-2)[Glcβ(1-3)]Glcβ1- |
| 18.10 | 717.6 | 2.32 | 1.58 | 1289 1127 965 803 641 | 1289 | Reb-M (Std) | Glcβ(1-2)[Glcβ(1-3)]Glcβ1- | Glcβ(1-2)[Glcβ(1-3)]Glcβ1- |
| 18.77 | 298.7 | 0.964 | 0.66 | 1273 1111 803 | 1273 | Reb-N (Std) | Rhaα(1-2)[Glcβ(1-3)]Glcβ1- | Glcβ(1-2)[Glcβ(1-3)]Glcβ1- |

-continued

Steviol-glycosides in sample SCJ2017625-26 (sample weight 149.3 mg/10 ml)

| Rt | Area 210 nm | mg/ 10 ml | % m/m | MS information (m/z) | [M − H]⁻ | Identified compound | R1 (C-19) | R2 (C-13) |
|---|---|---|---|---|---|---|---|---|
| 18.95 | 369.4 | 1.58 | 1.07 | 965 803 641 | 965 | Reb-E (Std) | Glcβ(1-2)Glcβ1- | Glcβ(1-2)Glcβ1- |
| 19.04 | 308.1 | 1.14 | 0.78 | 1111 949 803 641 | 1111 | Reb-K (MS) | Glcβ(1-2)Glcβ1- | Rhaα(1-2)[Glcβ(1-3)]Glcβ1- |
| 19.38 | 167.2 | 0.535 | 0.36 | 1259 1097 965 803 479 | 1259 | Reb-Y (MS) | Glcβ(1-2)[Araβ(1-3)]Glcβ1- | Glcβ(1-2)[Glcβ(1-3)]Glcβ1- |
| 19.76 | 59.7 | 0.199 | 0.14 | 1111 949 803 641 | 1111 | Reb-J (MS) | Rhaα(1-2)Glcβ1- | Glcβ(1-2)[Glcβ(1-3)]Glcβ1- |
| 20.08 | 14.5 | 0.0248 | 0.02 | 1259 1111 803 641 | 1259 | Reb-V (MS) | Glcβ(1-2)[Glcβ(1-3)]Glcβ1- | Xylβ(1-2)[Glcβ(1-3)]-Glcβ1- |
| 20.94 | 221.0 | 0.715 | 0.49 | 1259 965 803 641 | 1259 | Reb-V2 (MS) | Xylβ(1-2)[Glcβ(1-3)]-Glcβ1- | Glcβ(1-2)[Glcβ(1-3)]Glcβ1- |
| 21.04 | 28.6 | 0.0815 | 0.06 | 1111 949 803 | 1111 | Reb-H (MS) | Glcβ1- | Glcβ(1-3)Rhaα(1-2)[Glcβ(1-3)]Glcβ1- |
| 21.10 | 109.1 | 0.381 | 0.26 | 1127 965 803 641 | 1127 | Reb-I (MS) | Glcβ(1-3)Glcβ1- | Glcβ(1-2)[Glcβ(1-3)]Glcβ1- |
| 21.18 | 150.5 | 0.550 | 0.37 | 1097 965 803 641 | 1097 | Reb U (MS) | Araα(1-2)-Glcβ1- | Glcβ(1-2)[Glcβ(1-3)]Glcβ1- |
| 21.48 | 45.1 | 0.142 | 0.10 | 1127 965 803 641 | 1127 | Reb L (MS) | Glcβ1- | Glcβ(1-6)Glcβ(1-2)[Glcβ(1-3)]Glcβ1- |
| 22.22 | 6541.9 | 28.5 | 19.39 | 965 803 641 | 965 | Reb-A (Std) | Glcβ1- | Glcβ(1-2)[Glcβ(1-3)]Glcβ1- |
| 22.53 | 5597.5 | 29.3 | 19.93 | 803 641 | 803 | Stevioside (Std) | Glcβ1- | Glcβ(1-2)Glcβ1- |
| 23.46 | 435.9 | 1.93 | 1.26 | 935 773 625 | 935 | Reb-R (MS) | Glcβ1- | Glcβ(1-2)[Glcβ(1-3)]Xylβ1- |
| 23.61 | 1200.1 | 5.37 | 3.51 | 935 773 625 | 935 | Reb-F (Std) | Glcβ1- | Xylβ(1-2)[Glcβ(1-3)]Glcβ1- |
| 23.74 | 730.9 | 3.21 | 2.18 | 949 787 | 949 | Reb-C (Std) | Glcβ1- | Rhaα(1-2)[Glcβ(1-3)]Glcβ1- |
| 24.27 | 129.8 | 0.656 | 0.45 | 787 625 479 | 787 | Dulcoside A (Std) | Glcβ1- | Rhaα(1-2)Glcβ1- |
| 24.52 | 823.7 | 4.28 | 2.91 | 803 641 479 | 803 | Reb-G (Std) | Glcβ1- | Glcβ(1-3)Glcβ1- |
| 25.02 | 431.0 | 1.88 | 1.28 | 949 787 479 | 949 | Reb-S (MS) | H- | Glcβ(1-3)Rhaα(1-2)[Glcβ(1-3)]Glcβ1- |
| 25.30 | 544.7 | 3.53 | 2.40 | 641 479 | 641 | Rubusoside (Std) | Glcβ1- | Glcβ1- |
| 26.40 | 16.8 | 0.0519 | 0.04 | 787 625 | 787 | Stevioside B (MS) | Glcβ1- | Glcβ(1-2)6-deoxyGlcβ1- |
| 27.15 | 816.1 | 4.24 | 2.88 | 804 | 803 | Reb-B (Std) | H- | Glcβ(1-2)[Glcβ(1-3)]Glcβ1- |
| 27.87 | 813.9 | 5.30 | 3.60 | 641 479 | 641 | Reb G1 (MS) | H- | Glcβ(1-3)Glcβ1- |
| 28.73 | 577.4 | 3.05 | 2.07 | 787 641 | 787 | Dulcoside B (MS) | H- | Rhaα(1-2)[Glcβ(1-3)]Glcβ1- |
| 29.28 | 983.4 | 6.41 | 4.36 | 641 | 641 | Steviolbioside (MS) | H- | Glcβ(1-2)Glcβ1- |
| 30.38 | 824.5 | 4.45 | 3.03 | 773 | 773 | Reb-R1 (MS) | H- | Glcβ(1-2)[Glcβ(1-3)]Xylβ1- |
| 30.95 | 9.2 | 0.0115 | 0.01 | 773 625 | 773 | Reb-F1 (MS) | H- | Xylβ(1-2)[Glcβ(1-3)]Glcβ1- |
| 31.04 | 13.418 | 0.0415 | 0.03 | 641 | 641 | Iso-Steviolbioside | H- | Glcβ(1-2)Glcβ1- |

B. Experiment 2

Nine sample lot numbers of SG starting materials were glycosylated according to the method described in Example 61. Each of these 9 sample lot numbers, specifically, EPC-178-05-01, EPC-174-73-01, EPC-174-73-02, 150207, EPC-171-38-01, 141118, EPC-171-36-01, EPC-171-34-01 and S150311 represented a different starting composition. Glycosylation of these starting compositions, respectively, RA40+RB8, RA30/RC15, RA50/RC5, RA95, RA90, RA80, RA70, RA60, RA50, resulted in glycosylated compositions corresponding to GSG-(RA40+RB8), GSG-(RA30+RC15), GSG-RA50/RC5, GSG-RA95, GSG-RA90, GSG-RA80, GSG-RA70, GSG-RA60, GSG-RA50. The distribution and percentage (wt/wt) of specific unreacted SGs and reacted SGs (i.e., GSGs) in these sample lot numbers was determined using the methodology described in Example 67.

The starting compositions are available from Sweet Green Fields. And the content of each ingredient of starting compositions are listed as follows:

| Material | Lot No. | RD | RA | STV | RF | RC | DA | RU | RB | SB | Total SG (9) |
|---|---|---|---|---|---|---|---|---|---|---|---|
| RA50/RC5 | 20141215-1 | 2.94 | 55.01 | 16.61 | 1.14 | 5.65 | / | 0.35 | 0.5 | / | 82.62 |
| RA30/RC15 | 20140604 | 2.6 | 29.8 | 13.44 | 2.98 | 17.62 | 1.1 | 0.97 | 4.14 | 1.36 | 74.07 |
| RA60 | 20150203 | 1.0 | 62.4 | 25.4 | 0.8 | 4.1 | 0.2 | 0.3 | 0.8 | 0.4 | 95.3 |
| RA70 | M140301-2 | 0.55 | 76.42 | 9.65 | / | 4.74 | / | 0.32 | 0.68 | / | 92.58 |

-continued

| Material | Lot No. | RD | RA | STV | RF | RC | DA | RU | RB | SB | Total SG (9) |
|---|---|---|---|---|---|---|---|---|---|---|---|
| RA80 | 3060365 | 2.20 | 84.1 | 7.95 | 0.39 | 1.60 | / | / | 0.93 | / | 97.17 |
| RA95 | 3060044 | 0.12 | 96.55 | 1.43 | 0.44 | 0.41 | / | / | 0.20 | / | 99.15 |

RA90 is prepared by mixing RA80 with RA95 in a ratio of 1:2.

Table 160 shows the results of this analysis for RA40+RB8 (EPC-178-05-01).

TABLE 160

| | | SG-{ }-Added | | Product Name: GSG(RA40 + RB8) Lot No.: EPC178-05-01 | |
|---|---|---|---|---|---|
| SG-group | Individual SG (unreacted part) | Glucose (reacted part) | [Mr] | mg/ 10 ml | % (m/m) |
| SG-2G | Rubusoside | — | 642 | 0.51 | 0.34 |
| | Stev-Bios | — | 642 | 0.44 | 0.29 |
| SG-3G | Reb-B | — | 804 | 0.94 | 0.62 |
| | Reb-G | — | 804 | 0.53 | 0.35 |
| | Stevioside | — | 804 | 1.56 | 1.04 |
| | Reb-KA | — | 804 | <0.05 | <0.05 |
| | Stevioside B | — | 804 | <0.05 | <0.05 |
| | | GSG-3G-2 | 1128 | 7.31 | 4.87 |
| | | GSG-3G-3 | 1290 | 3.92 | 2.61 |
| | | GSG-3G-4 | 1452 | 3.02 | 2.01 |
| | | GSG-3G-7 | 1938 | 5.23 | 3.48 |
| | | GSG-3G-8 | 2100 | 5.63 | 3.75 |
| SG-4G | Reb-A | — | 966 | 2.04 | 1.36 |
| | Reb-E | — | 966 | 1.33 | 0.89 |
| | Reb-A2 | — | 966 | <0.05 | <0.05 |
| | Reb-H1 | — | 966 | <0.05 | <0.05 |
| | | GSG-4G-1 | 1128 | 12.76 | 8.51 |
| | | GSG-4G-2 | 1290 | 1.73 | 1.16 |
| | | GSG-4G-3 | 1452 | 1.51 | 2.02 |
| | | GSG-4G-7 | 2100 | 7.15 | 4.77 |
| SG-5G | Reb-D | — | 1128 | 0.62 | 0.41 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.48 | 0.32 |
| | | GSG-5G-2 | 1452 | 0.17 | 0.11 |
| | | GSG-5G-3 | 1614 | 2.25 | 1.50 |
| | | GSG-5G-4 | 1776 | 0.19 | 0.13 |
| | | GSG-5G-5 | 1938 | 0.82 | 3.01 |
| SG-6G | Reb-M | — | 1290 | 0.30 | 0.20 |
| | | GSG-6G-3 | 1776 | 1.46 | 0.97 |
| SG-2G1R | Dulcoside A | — | 788 | 0.31 | 0.21 |
| | Dulcoside B | — | 788 | 0.82 | 37.00 |
| SG-3G1R | Reb-C | — | 950 | 0.82 | 0.55 |
| | Reb-S | — | 950 | 0.47 | 0.31 |
| | Reb-H | — | 950 | <0.05 | <0.05 |
| | | GSG-3G1R-3a | 1436 | 5.78 | 3.85 |
| | | GSG-3G1R-3b | 1436 | 4.66 | 3.11 |
| | Reb J | — | 1112 | <0.05 | <0.05 |
| | Reb K | — | 1112 | <0.05 | <0.05 |
| | Reb K2 | — | 1112 | <0.05 | <0.05 |
| SG-4G1R | | GSG-4G1R-2 | 1436 | 1.07 | 0.71 |
| | | GSG-4G1R-3 | 1598 | 0.53 | 0.35 |
| | | GSG-4G1R-4 | 1760 | 3.88 | 2.59 |
| | | GSG-4G1R-6 | 2084 | 11.31 | 7.54 |
| SG-5G1R | Reb-N | — | 1274 | <0.05 | <0.05 |
| | | GSG-5G1R-4 | 1922 | 5.21 | 3.47 |
| SG-6G1R | Reb-O | — | 1436 | 0.21 | 0.14 |
| | | GSG-6G1R-1a | 1598 | 1.33 | 0.89 |
| | | GSG-6G1R-1b | 1598 | 1.53 | 1.02 |
| | | GSG-6G1R-2 | 1760 | 2.04 | 1.36 |
| SG-3G1X | Reb-F | — | 936 | 0.21 | 0.14 |
| | Reb-R | — | 936 | 0.14 | 0.10 |
| | | GSG-3G1X-4 | 1584 | 5.06 | 3.37 |
| | | GSG-3G1X-5 | 1746 | 3.08 | 2.05 |

TABLE 160-continued

| | | SG-{ }-Added | | Product Name: GSG(RA40 + RB8) Lot No.: EPC178-05-01 | |
|---|---|---|---|---|---|
| SG-group | Individual SG (unreacted part) | Glucose (reacted part) | [Mr] | mg/ 10 ml | % (m/m) |
| SG-4G1X | Reb U | — | 1098 | <0.05 | <0.05 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.20 | 0.80 |
| | | GSG-4G1X-2 | 1422 | 2.61 | 1.74 |
| | | GSG-4G1X-3 | 1584 | 4.18 | 2.78 |
| | | GSG-4G1X-4 | 1746 | 1.88 | 1.25 |
| SG-5G1X | Reb V | — | 1260 | <0.05 | <0.05 |
| | | GSG-5G1X-1 | 1422 | 3.43 | 2.29 |
| | | Sum Unreacted: | | 11.55 | 6.73 |
| | | Sum Reacted: | | 112.41 | 78.41 |

Table 161 shows the results of this analysis for RA30+RC15 (EPC-174-73-01).

TABLE 161

| | | SG-{ }-Added | | Product Name: GSG(RA30 + RC15) Lot No.: EPC174-73-01 | |
|---|---|---|---|---|---|
| SG-group | Individual SG (unreacted part) | Glucose (reacted part) | [Mr] | mg/ 10 ml | % (m/m) |
| SG-2G | Rubusoside | — | 642 | <0.05 | 0.20 |
| | Stev-Bios | — | 642 | <0.05 | <0.05 |
| SG-3G | Reb-B | — | 804 | 1.16 | 0.77 |
| | Reb-G | — | 804 | 0.27 | 0.18 |
| | Stevioside | — | 804 | 2.91 | 1.94 |
| | Reb-KA | — | 804 | <0.05 | <0.05 |
| | Stevioside B | — | 804 | <0.05 | <0.05 |
| | | GSG-3G-2 | 1128 | 17.43 | 11.62 |
| | | GSG-3G-3 | 1290 | 5.76 | 3.84 |
| | | GSG-3G-4 | 1452 | 2.82 | 1.88 |
| | | GSG-3G-7 | 1938 | 2.28 | 1.52 |
| | | GSG-3G-8 | 2100 | 5.67 | 3.78 |
| SG-4G | Reb-A | — | 966 | 4.89 | 3.26 |
| | Reb-E | — | 966 | 0.20 | 0.13 |
| | Reb-A2 | — | 966 | <0.05 | <0.05 |
| | Reb-H1 | — | 966 | <0.05 | <0.05 |
| | | GSG-4G-1 | 1128 | 20.11 | 13.40 |
| | | GSG-4G-2 | 1290 | 2.28 | 1.52 |
| | | GSG-4G-3 | 1452 | 1.51 | 1.33 |
| | | GSG-4G-7 | 2100 | 6.05 | 4.03 |
| SG-5G | Reb-D | — | 1128 | 0.75 | 0.50 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.55 | 0.37 |
| | | GSG-5G-2 | 1452 | 0.11 | 0.07 |
| | | GSG-5G-3 | 1614 | 2.14 | 1.43 |
| | | GSG-5G-4 | 1776 | 0.19 | 0.12 |
| | | GSG-5G-5 | 1938 | 0.82 | 0.46 |
| SG-6G | Reb-M | — | 1290 | 0.11 | 0.07 |
| | | GSG-6G-3 | 1776 | 1.32 | 0.88 |
| SG-2G1R | Dulcoside A | — | 788 | <0.05 | <0.05 |
| | Dulcoside B | — | 788 | <0.05 | <0.05 |

TABLE 161-continued

| | | SG-{ }-Added | | Product Name: GSG(RA30 + RC15) Lot No.: EPC174-73-01 | |
|---|---|---|---|---|---|
| SG-group | Individual SG (unreacted part) | Glucose (reacted part) | [Mr] | mg/ 10 ml | % (m/m) |
| SG-3G1R | Reb-C | — | 950 | 2.69 | 1.79 |
| | Reb-S | — | 950 | <0.05 | <0.05 |
| | Reb-H | — | 950 | <0.05 | <0.05 |
| | | GSG-3G1R-3a | 1436 | 1.74 | 1.16 |
| | | GSG-3G1R-3b | 1436 | 5.94 | 3.96 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 1.35 | 0.90 |
| | | GSG-4G1R-3 | 1598 | 0.42 | 0.28 |
| | | GSG-4G1R-4 | 1760 | 4.31 | 2.87 |
| | | GSG-4G1R-6 | 2084 | 1.57 | 1.05 |
| SG-5G1R | Reb-N | — | 1274 | <0.05 | <0.05 |
| | | GSG-5G1R-4 | 1922 | 6.15 | 4.10 |
| | Reb-O | — | 1436 | 0.13 | 0.09 |
| SG-6G1R | | GSG-6G1R-1a | 1598 | 1.17 | 0.78 |
| | | GSG-6G1R-1b | 1598 | 1.07 | 0.71 |
| | | GSG-6G1R-2 | 1760 | 0.77 | 0.51 |
| SG-3G1X | Reb-F | — | 936 | 0.14 | 0.09 |
| | Reb-R | — | 936 | 0.09 | 0.06 |
| | | GSG-3G1X-4 | 1584 | 5.93 | 3.95 |
| | | GSG-3G1X-5 | 1746 | 1.33 | 0.89 |
| SG-4G1X | Reb U | — | 1098 | 0.47 | 0.31 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 3.21 | 2.14 |
| | | GSG-4G1X-2 | 1422 | 1.67 | 1.12 |
| | | GSG-4G1X-3 | 1584 | 4.66 | 3.11 |
| | | GSG-4G1X-4 | 1746 | 2.01 | 1.34 |
| SG-5G1X | Reb V | — | 1260 | <0.05 | <0.05 |
| | | GSG-5G1X-1 | 1422 | 2.91 | 1.94 |
| | | Sum Unreacted: | | 15.10 | 9.39 |
| | | Sum Reacted: | | 115.21 | 77.05 |

Table 162 shows the results of this analysis for RA50+ RC5 (EPC-174-73-02).

TABLE 162

| | | SG-{}-Added | | Product Name: GSG(RA50 + RC5) Lot No.: EPC174-73-02 | |
|---|---|---|---|---|---|
| SG-group | Individual SG (unreacted part) | Glucose (reacted part) | [Mr] | mg/ 10 ml | % (m/m) |
| SG-2G | Rubusoside | — | 642 | <0.05 | 0.17 |
| | Stev-Bios | — | 642 | <0.05 | <0.05 |
| SG-3G | Reb-B | — | 804 | <0.05 | <0.05 |
| | Reb-G | — | 804 | 0.39 | 0.26 |
| | Stevioside | — | 804 | 3.00 | 2.00 |
| | Reb-KA | — | 804 | <0.05 | <0.05 |
| | Stevioside B | — | 804 | <0.05 | <0.05 |
| | | GSG-3G-2 | 1128 | 17.26 | 11.51 |
| | | GSG-3G-3 | 1290 | 5.42 | 3.61 |
| | | GSG-3G-4 | 1452 | 3.51 | 2.34 |
| | | GSG-3G-7 | 1938 | 2.81 | 1.88 |
| | | GSG-3G-8 | 2100 | 6.39 | 4.26 |
| SG-4G | Reb-A | — | 966 | 9.32 | 6.21 |
| | Reb-E | — | 966 | 0.58 | 0.38 |
| | Reb-A2 | — | 966 | <0.05 | <0.05 |
| | Reb-H1 | — | 966 | <0.05 | <0.05 |
| | | GSG-4G-1 | 1128 | 19.62 | 13.08 |
| | | GSG-4G-2 | 1290 | 1.84 | 1.23 |
| | | GSG-4G-3 | 1452 | 1.51 | 1.17 |
| | | GSG-4G-7 | 2100 | 5.47 | 3.65 |

TABLE 162-continued

| | | SG-{}-Added | | Product Name: GSG(RA50 + RC5) Lot No.: EPC174-73-02 | |
|---|---|---|---|---|---|
| SG-group | Individual SG (unreacted part) | Glucose (reacted part) | [Mr] | mg/ 10 ml | % (m/m) |
| SG-5G | Reb-D | — | 1128 | 0.75 | 0.50 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.53 | 0.35 |
| | | GSG-5G-2 | 1452 | 0.09 | 0.06 |
| | | GSG-5G-3 | 1614 | 1.97 | 1.31 |
| | | GSG-5G-4 | 1776 | 0.24 | 0.16 |
| | | GSG-5G-5 | 1938 | 0.82 | 0.58 |
| SG-6G | Reb-M | — | 1290 | 0.11 | 0.07 |
| | | GSG-6G-3 | 1776 | 1.20 | 0.80 |
| SG-2G1R | Dulcoside A | — | 788 | 0.14 | 0.09 |
| | Dulcoside B | — | 788 | 0.19 | 0.12 |
| SG-3G1R | Reb-C | — | 950 | 0.75 | 0.50 |
| | Reb-S | — | 950 | <0.05 | <0.05 |
| | Reb-H | — | 950 | <0.05 | <0.05 |
| | | GSG-3G1R-3a | 1436 | 1.96 | 1.31 |
| | | GSG-3G1R-3b | 1436 | 6.05 | 4.03 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 1.29 | 0.86 |
| | | GSG-4G1R-3 | 1598 | 0.35 | 0.24 |
| | | GSG-4G1R-4 | 1760 | 4.06 | 2.71 |
| | | GSG-4G1R-6 | 2084 | 1.31 | 0.87 |
| SG-5G1R | Reb-N | — | 1274 | <0.05 | <0.05 |
| | | GSG-5G1R-4 | 1922 | 5.64 | 3.76 |
| SG-6G1R | Reb-O | — | 1436 | 0.26 | 0.17 |
| | | GSG-6G1R-1a | 1598 | 1.10 | 0.73 |
| | | GSG-6G1R-1b | 1598 | 0.84 | 0.56 |
| | | GSG-6G1R-2 | 1760 | 0.95 | 0.63 |
| SG-3G1X | Reb-F | — | 936 | <0.05 | <0.05 |
| | Reb-R | — | 936 | 0.35 | 0.23 |
| | | GSG-3G1X-4 | 1584 | 5.90 | 3.93 |
| | | GSG-3G1X-5 | 1746 | 1.66 | 1.11 |
| SG-4G1X | Reb U | — | 1098 | <0.05 | <0.05 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 2.88 | 1.92 |
| | | GSG-4G1X-2 | 1422 | 2.05 | 1.37 |
| | | GSG-4G1X-3 | 1584 | 5.03 | 3.35 |
| | | GSG-4G1X-4 | 1746 | 1.64 | 1.09 |
| SG-5G1X | Reb V | — | 1260 | <0.05 | <0.05 |
| | | GSG-5G1X-1 | 1422 | 3.63 | 2.42 |
| | | Sum Unreacted: | | 16.69 | 10.49 |
| | | Sum Reacted: | | 115.03 | 76.88 |

Table 163 shows the results of this analysis for GSG-RA95 (Lot 150207).

TABLE 163

| | | SG-{ }-Added | | Product Name: GSG-RA95 Lot No.: 150207 | |
|---|---|---|---|---|---|
| SG-group | Individual SG (unreacted part) | Glucose (reacted part) | [Mr] | mg/ 10 ml | % (m/m) |
| SG-2G | Rubusoside | — | 642 | 0.42 | 0.28 |
| | Stev-Bios | — | 642 | 0.26 | 0.17 |
| SG-3G | Reb-B | — | 804 | 0.99 | 0.66 |
| | Reb-G | — | 804 | 0.17 | 0.11 |
| | Stevioside | — | 804 | 0.09 | 0.06 |
| | Reb-KA | — | 804 | <0.05 | <0.05 |
| | Stevioside B | — | 804 | <0.05 | <0.05 |
| | | GSG-3G-2 | 1128 | 21.37 | 14.25 |
| | | GSG-3G-3 | 1290 | 8.41 | 5.61 |

TABLE 163-continued

| SG-group | Individual SG (unreacted part) | SG-{ }-Added Glucose (reacted part) | [Mr] | Product Name: GSG-RA95 Lot No.: 150207 mg/ 10 ml | % (m/m) |
|---|---|---|---|---|---|
| | | GSG-3G-4 | 1452 | 3.55 | 2.37 |
| | | GSG-3G-7 | 1938 | 3.18 | 2.12 |
| | | GSG-3G-8 | 2100 | 6.52 | 4.35 |
| SG-4G | Reb-A | — | 966 | 9.00 | 6.00 |
| | Reb-E | — | 966 | 0.70 | 0.47 |
| | Reb-A2 | — | 966 | <0.05 | <0.05 |
| | Reb-H1 | — | 966 | <0.05 | <0.05 |
| | | GSG-4G-1 | 1128 | 20.75 | 13.83 |
| | | GSG-4G-2 | 1290 | 2.78 | 1.85 |
| | | GSG-4G-3 | 1452 | 1.51 | 1.63 |
| | | GSG-4G-7 | 2100 | 7.15 | 4.77 |
| SG-5G | Reb-D | — | 1128 | 0.19 | 0.126 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.49 | 0.33 |
| | | GSG-5G-2 | 1452 | 0.10 | 0.07 |
| | | GSG-5G-3 | 1614 | 2.17 | 1.45 |
| | | GSG-5G-4 | 1776 | 0.27 | 0.18 |
| | | GSG-5G-5 | 1938 | 0.82 | 0.67 |
| SG-6G | Reb-M | — | 1290 | 0.19 | 0.126 |
| | | GSG-6G-3 | 1776 | 1.28 | 0.86 |
| SG-2G1R | Dulcoside A | — | 788 | 0.17 | 0.11 |
| | Dulcoside B | — | 788 | <0.05 | <0.05 |
| SG-3G1R | Reb-C | — | 950 | 0.12 | 0.08 |
| | Reb-S | — | 950 | <0.05 | <0.05 |
| | Reb-H | — | 950 | <0.05 | <0.05 |
| | | GSG-3G1R-3a | 1436 | 1.85 | 1.23 |
| | | GSG-3G1R-3b | 1436 | 8.19 | 5.46 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 1.13 | 0.75 |
| | | GSG-4G1R-3 | 1598 | 0.43 | 0.29 |
| | | GSG-4G1R-4 | 1760 | 3.59 | 2.39 |
| | | GSG-4G1R-6 | 2084 | 1.49 | 0.99 |
| SG-5G1R | Reb-N | — | 1274 | <0.05 | <0.05 |
| | | GSG-5G1R-4 | 1922 | 8.81 | 5.87 |
| SG-6G1R | Reb-O | — | 1436 | 0.14 | 0.09 |
| | | GSG-6G1R-1a | 1598 | 1.42 | 0.95 |
| | | GSG-6G1R-1b | 1598 | 1.39 | 0.92 |
| | | GSG-6G1R-2 | 1760 | 0.77 | 0.51 |
| SG-3G1X | Reb-F | — | 936 | 0.30 | 0.20 |
| | Reb-R | — | 936 | 0.15 | 0.10 |
| | | GSG-3G1X-4 | 1584 | 6.51 | 4.34 |
| | | GSG-3G1X-5 | 1746 | 1.48 | 0.99 |
| SG-4G1X | Reb U | — | 1098 | 0.17 | 0.11 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 3.07 | 2.04 |
| | | GSG-4G1X-2 | 1422 | 2.77 | 1.85 |
| | | GSG-4G1X-3 | 1584 | 4.85 | 3.23 |
| | | GSG-4G1X-4 | 1746 | 2.02 | 1.35 |
| SG-5G1X | Reb V | — | 1260 | <0.05 | <0.05 |
| | | GSG-5G1X-1 | 1422 | 3.76 | 2.51 |
| | | Sum Unreacted: | | 12.88 | 8.59 |
| | | Sum Reacted: | | 133.90 | 90.01 |

Table 164 shows the results of this analysis for GSG-RA90 (Lot EPC171-38-01).

TABLE 164

| SG-group | Individual SG (unreacted part) | SG-{ }-Added Glucose (reacted part) | [Mr] | Product Name: GSG-RA90 Lot No.: EPC171-38-01 mg/ 10 ml | % (m/m) |
|---|---|---|---|---|---|
| SG-2G | Rubusoside | — | 642 | <0.05 | <0.05 |
| | Stev-Bios | — | 642 | <0.05 | <0.05 |
| SG-3G | Reb-B | — | 804 | 0.87 | 0.58 |
| | Reb-G | — | 804 | 0.26 | 0.17 |
| | Stevioside | — | 804 | 0.21 | 0.14 |
| | Reb-KA | — | 804 | <0.05 | <0.05 |
| | Stevioside B | — | 804 | <0.05 | <0.05 |
| | | GSG-3G-2 | 1128 | 8.13 | 5.42 |
| | | GSG-3G-3 | 1290 | 4.92 | 3.28 |
| | | GSG-3G-4 | 1452 | 3.48 | 2.32 |
| | | GSG-3G-7 | 1938 | 5.29 | 3.53 |
| | | GSG-3G-8 | 2100 | 6.97 | 4.64 |
| SG-4G | Reb-A | — | 966 | 8.13 | 5.42 |
| | Reb-E | — | 966 | 0.29 | 0.20 |
| | Reb-A2 | — | 966 | <0.05 | <0.05 |
| | Reb-H1 | — | 966 | <0.05 | <0.05 |
| | | GSG-4G-1 | 1128 | 14.17 | 9.45 |
| | | GSG-4G-2 | 1290 | 3.09 | 2.06 |
| | | GSG-4G-3 | 1452 | 1.51 | 2.37 |
| | | GSG-4G-7 | 2100 | 12.84 | 8.56 |
| SG-5G | Reb-D | — | 1128 | <0.05 | <0.05 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.63 | 0.42 |
| | | GSG-5G-2 | 1452 | 0.23 | 0.15 |
| | | GSG-5G-3 | 1614 | 1.96 | 1.31 |
| | | GSG-5G-4 | 1776 | 0.22 | 0.15 |
| | | GSG-5G-5 | 1938 | 0.82 | 3.04 |
| SG-6G | Reb-M | — | 1290 | 0.36 | 0.24 |
| | | GSG-6G-3 | 1776 | 1.67 | 1.11 |
| SG-2G1R | Dulcoside A | — | 788 | 0.15 | 0.10 |
| | Dulcoside B | — | 788 | 0.11 | 0.08 |
| SG-3G1R | Reb-C | — | 950 | 0.18 | 0.12 |
| | Reb-S | — | 950 | 0.10 | 0.07 |
| | Reb-H | — | 950 | <0.05 | <0.05 |
| | | GSG-3G1R-3a | 1436 | 4.80 | 3.20 |
| | | GSG-3G1R-3b | 1436 | 6.67 | 4.45 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 1.78 | 1.19 |
| | | GSG-4G1R-3 | 1598 | 0.63 | 0.42 |
| | | GSG-4G1R-4 | 1760 | 4.04 | 2.69 |
| | | GSG-4G1R-6 | 2084 | 12.61 | 8.41 |
| SG-5G1R | Reb-N | — | 1274 | <0.05 | <0.05 |
| | | GSG-5G1R-4 | 1922 | 7.29 | 4.86 |
| SG-6G1R | Reb-O | — | 1436 | 0.22 | 0.15 |
| | | GSG-6G1R-1a | 1598 | 1.09 | 0.73 |
| | | GSG-6G1R-1b | 1598 | 1.93 | 1.29 |
| | | GSG-6G1R-2 | 1760 | 1.77 | 1.18 |
| SG-3G1X | Reb-F | — | 936 | <0.05 | <0.05 |
| | Reb-R | — | 936 | 0.11 | 0.08 |
| | | GSG-3G1X-4 | 1584 | 4.44 | 2.96 |
| | | GSG-3G1X-5 | 1746 | 3.85 | 2.57 |
| SG-4G1X | Reb U | — | 1098 | 0.20 | 0.13 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.36 | 0.90 |
| | | GSG-4G1X-2 | 1422 | 2.63 | 1.75 |
| | | GSG-4G1X-3 | 1584 | 5.00 | 3.34 |
| | | GSG-4G1X-4 | 1746 | 1.21 | 0.81 |
| SG-5G1X | Reb V | — | 1260 | <0.05 | <0.05 |
| | | GSG-5G1X-1 | 1422 | 4.99 | 3.33 |
| | | Sum Unreacted: | | 12.60 | 7.29 |
| | | Sum Reacted: | | 132.02 | 91.88 |

Table 165 shows the results of this analysis for GSG-RA80 (Lot 141118).

TABLE 165

| SG-group | Individual SG (unreacted part) | SG-{ }-Added Glucose (reacted part) | [Mr] | Product Name: GSG-RA80 Lot No.: 141118 mg/ 10 ml | % (m/m) |
|---|---|---|---|---|---|
| SG-2G | Rubusoside | — | 642 | <0.05 | <0.05 |
| | Stev-Bios | — | 642 | <0.05 | <0.05 |
| SG-3G | Reb-B | — | 804 | 0.63 | 0.42 |
| | Reb-G | — | 804 | 0.36 | 0.24 |
| | Stevioside | — | 804 | 0.65 | 0.43 |
| | Reb-KA | — | 804 | <0.05 | <0.05 |
| | Stevioside B | — | 804 | <0.05 | <0.05 |
| | | GSG-3G-2 | 1128 | 6.22 | 4.15 |
| | | GSG-3G-3 | 1290 | 5.48 | 3.65 |
| | | GSG-3G-4 | 1452 | 3.47 | 2.31 |
| | | GSG-3G-7 | 1938 | 5.83 | 3.89 |
| | | GSG-3G-8 | 2100 | 7.59 | 5.06 |
| SG-4G | Reb-A | — | 966 | 6.35 | 4.23 |
| | Reb-E | — | 966 | 0.35 | 0.23 |
| | Reb-A2 | — | 966 | <0.05 | <0.05 |
| | Reb-H1 | — | 966 | <0.05 | <0.05 |
| | | GSG-4G-1 | 1128 | 11.35 | 7.57 |
| | | GSG-4G-2 | 1290 | 2.92 | 1.95 |
| | | GSG-4G-3 | 1452 | 1.51 | 2.01 |
| | | GSG-4G-7 | 2100 | 12.30 | 8.20 |
| SG-5G | Reb-D | — | 1128 | 0.09 | 0.06 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.44 | 0.30 |
| | | GSG-5G-2 | 1452 | 0.21 | 0.14 |
| | | GSG-5G-3 | 1614 | 2.60 | 1.73 |
| | | GSG-5G-4 | 1776 | 0.24 | 0.16 |
| | | GSG-5G-5 | 1938 | 0.82 | 2.28 |
| SG-6G | Reb-M | — | 1290 | 0.61 | 0.41 |
| | | GSG-6G-3 | 1776 | 1.01 | 0.67 |
| SG-2G1R | Dulcoside A | — | 788 | 0.15 | 0.10 |
| | Dulcoside B | — | 788 | <0.05 | <0.05 |
| SG-3G1R | Reb-C | — | 950 | 0.32 | 0.21 |
| | Reb-S | — | 950 | 0.14 | 0.09 |
| | Reb-H | — | 950 | <0.05 | <0.05 |
| | | GSG-3G1R-3a | 1436 | 7.27 | 4.84 |
| | | GSG-3G1R-3b | 1436 | 6.76 | 4.51 |
| SG-4G1R | Reb J | — | 1112 | <0.05 | <0.05 |
| | Reb K | — | 1112 | 0.17 | 0.11 |
| | Reb K2 | — | 1112 | <0.05 | <0.05 |
| | | GSG-4G1R-2 | 1436 | 1.92 | 1.28 |
| | | GSG-4G1R-3 | 1598 | 0.70 | 0.47 |
| | | GSG-4G1R-4 | 1760 | 3.20 | 2.13 |
| | | GSG-4G1R-6 | 2084 | 13.70 | 9.14 |
| SG-5G1R | Reb-N | — | 1274 | <0.05 | <0.05 |
| | | GSG-5G1R-4 | 1922 | 5.91 | 3.94 |
| SG-6G1R | Reb-O | — | 1436 | 0.24 | 0.16 |
| | | GSG-6G1R-1a | 1598 | 1.19 | 0.79 |
| | | GSG-6G1R-1b | 1598 | 1.64 | 1.09 |
| | | GSG-6G1R-2 | 1760 | 1.70 | 1.13 |
| SG-3G1X | Reb-F | — | 936 | <0.05 | <0.05 |
| | Reb-R | — | 936 | 0.22 | 0.15 |
| | | GSG-3G1X-4 | 1584 | 4.58 | 3.05 |
| | | GSG-3G1X-5 | 1746 | 3.79 | 2.53 |
| SG-4G1X | Reb U | — | 1098 | 0.24 | 0.16 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.44 | 0.96 |
| | | GSG-4G1X-2 | 1422 | 2.76 | 1.84 |
| | | GSG-4G1X-3 | 1584 | 4.46 | 2.97 |
| | | GSG-4G1X-4 | 1746 | 1.20 | 0.80 |
| SG-5G1X | Reb V | — | 1260 | <0.05 | <0.05 |
| | | GSG-5G1X-1 | 1422 | 4.51 | 3.01 |
| | | Sum Unreacted: | | 11.36 | 6.90 |
| | | Sum Reacted: | | 128.71 | 88.55 |

Table 166 shows the results of this analysis for GSG-RA70 (Lot EPC171-36-01).

TABLE 166

| SG-group | Individual SG (unreacted part) | SG-{ }-Added Glucose (reacted part) | [Mr] | Product Name: GSG-RA70 Lot No.: EPC171-36-01 mg/ 10 ml | % (m/m) |
|---|---|---|---|---|---|
| SG-2G | Rubusoside | — | 642 | <0.05 | <0.05 |
| | Stev-Bios | — | 642 | 0.09 | 0.06 |
| SG-3G | Reb-B | — | 804 | 0.65 | 0.43 |
| | Reb-G | — | 804 | 0.25 | 0.16 |
| | Stevioside | — | 804 | 1.17 | 0.78 |
| | Reb-KA | — | 804 | <0.05 | <0.05 |
| | Stevioside B | — | 804 | <0.05 | <0.05 |
| | | GSG-3G-2 | 1128 | 5.86 | 3.91 |
| | | GSG-3G-3 | 1290 | 5.45 | 3.63 |
| | | GSG-3G-4 | 1452 | 3.15 | 2.10 |
| | | GSG-3G-7 | 1938 | 6.12 | 4.08 |
| | | GSG-3G-8 | 2100 | 8.37 | 5.58 |
| SG-4G | Reb-A | — | 966 | 5.97 | 3.98 |
| | Reb-E | — | 966 | 0.49 | 0.32 |
| | Reb-A2 | — | 966 | <0.05 | <0.05 |
| | Reb-H1 | — | 966 | <0.05 | <0.05 |
| | | GSG-4G-1 | 1128 | 11.14 | 7.43 |
| | | GSG-4G-2 | 1290 | 2.77 | 1.85 |
| | | GSG-4G-3 | 1452 | 1.51 | 1.93 |
| | | GSG-4G-7 | 2100 | 14.33 | 9.55 |
| SG-5G | Reb-D | — | 1128 | 0.09 | 0.06 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.56 | 0.37 |
| | | GSG-5G-2 | 1452 | 0.28 | 0.19 |
| | | GSG-5G-3 | 1614 | 2.62 | 1.75 |
| | | GSG-5G-4 | 1776 | 0.19 | 0.13 |
| | | GSG-5G-5 | 1938 | 0.82 | 3.26 |
| SG-6G | Reb-M | — | 1290 | 0.52 | 0.35 |
| | | GSG-6G-3 | 1776 | 1.15 | 0.77 |
| SG-2G1R | Dulcoside A | — | 788 | 0.19 | 0.13 |
| | Dulcoside B | — | 788 | <0.05 | 0.13 |
| SG-3G1R | Reb-C | — | 950 | 0.38 | 0.25 |
| | Reb-S | — | 950 | 0.12 | 0.08 |
| | Reb-H | — | 950 | <0.05 | <0.05 |
| | | GSG-3G1R-3a | 1436 | 5.17 | 3.45 |
| | | GSG-3G1R-3b | 1436 | 6.63 | 4.42 |
| SG-4G1R | Reb J | — | 1112 | <0.05 | <0.05 |
| | Reb K | — | 1112 | 0.11 | 0.07 |
| | Reb K2 | — | 1112 | <0.05 | <0.05 |
| | | GSG-4G1R-2 | 1436 | 1.92 | 1.28 |
| | | GSG-4G1R-3 | 1598 | 0.57 | 0.38 |
| | | GSG-4G1R-4 | 1760 | 3.93 | 2.62 |
| | | GSG-4G1R-6 | 2084 | 14.21 | 9.47 |
| SG-5G1R | Reb-N | — | 1274 | <0.05 | <0.05 |
| | | GSG-5G1R-4 | 1922 | 6.04 | 4.03 |
| SG-6G1R | Reb-O | — | 1436 | 0.25 | 0.17 |
| | | GSG-6G1R-1a | 1598 | 1.57 | 1.05 |
| | | GSG-6G1R-1b | 1598 | 2.27 | 1.51 |
| | | GSG-6G1R-2 | 1760 | 2.65 | 1.77 |
| SG-3G1X | Reb-F | — | 936 | 0.14 | 0.09 |
| | Reb-R | — | 936 | 0.22 | 0.15 |
| | | GSG-3G1X-4 | 1584 | 5.38 | 3.59 |
| | | GSG-3G1X-5 | 1746 | 2.63 | 1.76 |
| SG-4G1X | Reb U | — | 1098 | 0.21 | 0.14 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.51 | 1.01 |
| | | GSG-4G1X-2 | 1422 | 2.65 | 1.77 |
| | | GSG-4G1X-3 | 1584 | 4.41 | 2.94 |
| | | GSG-4G1X-4 | 1746 | 1.58 | 1.05 |
| SG-5G1X | Reb V | — | 1260 | <0.05 | <0.05 |
| | | GSG-5G1X-1 | 1422 | 4.36 | 2.91 |
| | | Sum Unreacted: | | 11.80 | 7.10 |
| | | Sum Reacted: | | 131.84 | 91.53 |

Table 167 shows the results of this analysis for GSG-RA60 (Lot EPC171-34-01).

TABLE 167

| SG-group | Individual SG (unreacted part) | SG-{ }-Added Glucose (reacted part) | [Mr] | Product Name: GSG-RA60 Lot No.: EPC171-34-01 mg/ 10 ml | % (m/m) |
|---|---|---|---|---|---|
| SG-2G | Rubusoside | — | 642 | 0.31 | 0.20 |
| | Stev-Bios | — | 642 | 0.12 | 0.08 |
| SG-3G | Reb-B | — | 804 | 0.51 | 0.34 |
| | Reb-G | — | 804 | 0.08 | 0.05 |
| | Stevioside | — | 804 | 1.61 | 1.07 |
| | Reb-KA | — | 804 | <0.05 | <0.05 |
| | Stevioside B | — | 804 | <0.05 | <0.05 |
| | | GSG-3G-2 | 1128 | 7.69 | 5.13 |
| | | GSG-3G-3 | 1290 | 5.25 | 3.50 |
| | | GSG-3G-4 | 1452 | 3.93 | 2.62 |
| | | GSG-3G-7 | 1938 | 5.01 | 3.34 |
| | | GSG-3G-8 | 2100 | 7.31 | 4.88 |
| SG-4G | Reb-A | — | 966 | 4.83 | 3.22 |
| | Reb-E | — | 966 | 0.79 | 0.52 |
| | Reb-A2 | — | 966 | <0.05 | <0.05 |
| | Reb-H1 | — | 966 | <0.05 | <0.05 |
| | | GSG-4G-1 | 1128 | 15.66 | 10.44 |
| | | GSG-4G-2 | 1290 | 2.57 | 1.71 |
| | | GSG-4G-3 | 1452 | 1.51 | 2.26 |
| | | GSG-4G-7 | 2100 | 10.10 | 6.73 |
| SG-5G | Reb-D | — | 1128 | <0.05 | <0.05 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.65 | 0.43 |
| | | GSG-5G-2 | 1452 | 0.26 | 0.17 |
| | | GSG-5G-3 | 1614 | 2.34 | 1.56 |
| | | GSG-5G-4 | 1776 | 0.23 | 0.15 |
| | | GSG-5G-5 | 1938 | 0.82 | 2.60 |
| SG-6G | Reb-M | — | 1290 | 0.52 | 0.35 |
| | | GSG-6G-3 | 1776 | 1.61 | 1.07 |
| SG-2G1R | Dulcoside A | — | 788 | 0.19 | 0.13 |
| | Dulcoside B | — | 788 | <0.05 | 0.13 |
| SG-3G1R | Reb-C | — | 950 | 0.47 | 0.31 |
| | Reb-S | — | 950 | 0.12 | 0.08 |
| | Reb-H | — | 950 | <0.05 | <0.05 |
| | | GSG-3G1R-3a | 1436 | 6.37 | 4.25 |
| | | GSG-3G1R-3b | 1436 | 6.81 | 4.54 |
| SG-4G1R | Reb J | — | 1112 | <0.05 | <0.05 |
| | Reb K | — | 1112 | 0.11 | 0.07 |
| | Reb K2 | — | 1112 | <0.05 | <0.05 |
| | | GSG-4G1R-2 | 1436 | 1.74 | 1.16 |
| | | GSG-4G1R-3 | 1598 | 0.78 | 0.52 |
| | | GSG-4G1R-4 | 1760 | 3.09 | 2.06 |
| | | GSG-4G1R-6 | 2084 | 12.05 | 8.04 |
| SG-5G1R | Reb-N | — | 1274 | <0.05 | <0.05 |
| | | GSG-5G1R-4 | 1922 | 6.85 | 4.57 |
| SG-6G1R | Reb-O | — | 1436 | 0.10 | 0.07 |
| | | GSG-6G1R-1a | 1598 | 1.19 | 0.79 |
| | | GSG-6G1R-1b | 1598 | 1.79 | 1.20 |
| | | GSG-6G1R-2 | 1760 | 2.34 | 1.56 |
| SG-3G1X | Reb-F | — | 936 | 0.14 | 0.09 |
| | Reb-R | — | 936 | 0.22 | 0.15 |
| | | GSG-3G1X-4 | 1584 | 5.25 | 3.50 |
| | | GSG-3G1X-5 | 1746 | 2.94 | 1.96 |
| SG-4G1X | Reb U | — | 1098 | 0.26 | 0.17 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.24 | 0.83 |
| | | GSG-4G1X-2 | 1422 | 2.42 | 1.61 |
| | | GSG-4G1X-3 | 1584 | 3.64 | 2.43 |
| | | GSG-4G1X-4 | 1746 | 1.30 | 0.87 |
| SG-5G1X | Reb V | — | 1260 | <0.05 | <0.05 |
| | | GSG-5G1X-1 | 1422 | 3.97 | 2.64 |
| | | Sum Unreacted: | | 11.78 | 6.78 |
| | | Sum Reacted: | | 128.73 | 89.13 |

Table 168 shows the results of this analysis for GSG-RA50 (Lot S150311).

TABLE 168

| SG-group | Individual SG (unreacted part) | SG-{ }-Added Glucose (reacted part) | [Mr] | Product Name: GSG-RA50 Lot No.: S150311 mg/ 10 ml | % (m/m) |
|---|---|---|---|---|---|
| SG-2G | Rubusoside | — | 642 | 0.23 | 0.16 |
| | Stev-Bios | — | 642 | 0.17 | 0.11 |
| SG-3G | Reb-B | — | 804 | 0.38 | 0.25 |
| | Reb-G | — | 804 | 0.30 | 0.20 |
| | Stevioside | — | 804 | 2.09 | 1.39 |
| | Reb-KA | — | 804 | <0.05 | <0.05 |
| | Stevioside B | — | 804 | <0.05 | <0.05 |
| | | GSG-3G-2 | 1128 | 14.83 | 9.89 |
| | | GSG-3G-3 | 1290 | 8.13 | 5.42 |
| | | GSG-3G-4 | 1452 | 3.65 | 2.43 |
| | | GSG-3G-7 | 1938 | 2.87 | 1.91 |
| | | GSG-3G-8 | 2100 | 7.13 | 4.75 |
| SG-4G | Reb-A | — | 966 | 3.59 | 2.39 |
| | Reb-E | — | 966 | 0.37 | 0.24 |
| | Reb-A2 | — | 966 | <0.05 | <0.05 |
| | Reb-H1 | — | 966 | <0.05 | <0.05 |
| | | GSG-4G-1 | 1128 | 17.48 | 11.65 |
| | | GSG-4G-2 | 1290 | 2.40 | 1.60 |
| | | GSG-4G-3 | 1452 | 1.51 | 1.62 |
| | | GSG-4G-7 | 2100 | 7.34 | 4.89 |
| SG-5G | Reb-D | — | 1128 | <0.05 | <0.05 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.59 | 0.39 |
| | | GSG-5G-2 | 1452 | 0.18 | 0.12 |
| | | GSG-5G-3 | 1614 | 3.19 | 2.13 |
| | | GSG-5G-4 | 1776 | 0.33 | 0.22 |
| | | GSG-5G-5 | 1938 | 0.82 | 0.98 |
| SG-6G | Reb-M | — | 1290 | 0.11 | 0.07 |
| | | GSG-6G-3 | 1776 | 1.62 | 1.08 |
| SG-2G1R | Dulcoside A | — | 788 | <0.05 | <0.05 |
| | Dulcoside B | — | 788 | <0.05 | <0.05 |
| SG-3G1R | Reb-C | — | 950 | 0.57 | 0.38 |
| | Reb-S | — | 950 | <0.05 | <0.05 |
| | Reb-H | — | 950 | <0.05 | <0.05 |
| | | GSG-3G1R-3a | 1436 | 2.14 | 1.43 |
| | | GSG-3G1R-3b | 1436 | 8.17 | 5.45 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 1.75 | 1.16 |
| | | GSG-4G1R-3 | 1598 | 0.44 | 0.29 |
| | | GSG-4G1R-4 | 1760 | 6.24 | 4.16 |
| | | GSG-4G1R-6 | 2084 | 1.81 | 1.21 |
| SG-5G1R | Reb-N | — | 1274 | <0.05 | <0.05 |
| | | GSG-5G1R-4 | 1922 | 6.63 | 4.42 |
| SG-6G1R | Reb-O | — | 1436 | 0.11 | 0.07 |
| | | GSG-6G1R-1a | 1598 | 1.36 | 0.91 |
| | | GSG-6G1R-1b | 1598 | 1.73 | 1.16 |
| | | GSG-6G1R-2 | 1760 | 1.50 | 1.00 |
| SG-3G1X | Reb-F | — | 936 | 0.27 | 0.18 |
| | Reb-R | — | 936 | 0.13 | 0.08 |
| | | GSG-3G1X-4 | 1584 | 9.72 | 6.48 |
| | | GSG-3G1X-5 | 1746 | 1.10 | 0.74 |
| SG-4G1X | Reb U | — | 1098 | 0.26 | 0.17 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 3.25 | 2.17 |
| | | GSG-4G1X-2 | 1422 | 3.60 | 2.40 |
| | | GSG-4G1X-3 | 1584 | 4.43 | 2.95 |
| | | GSG-4G1X-4 | 1746 | 2.19 | 1.46 |
| SG-5G1X | Reb V | — | 1260 | <0.05 | <0.05 |
| | | GSG-5G1X-1 | 1422 | 4.52 | 3.01 |
| | | Sum Unreacted: | | 8.56 | 5.70 |
| | | Sum Reacted: | | 132.64 | 89.47 |

Table 169 provides a summary of descriptive statistics corresponding to the nine sample lot number (n=9) tested in Experiment 2.

TABLE 169

| SG-group | Individual SG (unreacted part) | SG-{ }-Added Glucose (reacted part) | [Mr] | Statistics (% m/m) Mean Value | s.d. | Median | Min | Max | n |
|---|---|---|---|---|---|---|---|---|---|
| SG-2G | Rubusoside | — | 642 | 0.22 | 0.07 | 0.20 | 0.16 | 0.34 | 6 |
| | Stev-Bios | — | 642 | 0.14 | 0.09 | 0.11 | 0.06 | 0.29 | 5 |
| SG-3G | Reb-B | — | 804 | 0.51 | 0.18 | 0.51 | 0.25 | 0.77 | 8 |
| | Reb-G | — | 804 | 0.19 | 0.09 | 0.18 | 0.05 | 0.35 | 9 |
| | Stevioside | — | 804 | 0.98 | 0.71 | 1.04 | 0.06 | 2.00 | 9 |
| | Reb-KA | — | 804 | — | — | — | — | — | 0 |
| | Stevioside B | — | 804 | — | — | — | — | — | 0 |
| | | GSG-3G-2 | 1128 | 7.86 | 3.94 | 5.42 | 3.91 | ### | 9 |
| | | GSG-3G-3 | 1290 | 3.91 | 0.98 | 3.63 | 2.61 | 5.61 | 9 |
| | | GSG-3G-4 | 1452 | 2.26 | 0.23 | 2.32 | 1.88 | 2.62 | 9 |
| | | GSG-3G-7 | 1938 | 2.86 | 0.99 | 3.34 | 1.52 | 4.08 | 9 |
| | | GSG-3G-8 | 2100 | 4.56 | 0.59 | 4.64 | 3.75 | 5.58 | 9 |
| SG-4G | Reb-A | — | 966 | 4.01 | 1.65 | 3.98 | 1.36 | 6.21 | 9 |
| | Reb-E | — | 966 | 0.38 | 0.23 | 0.32 | 0.13 | 0.89 | 9 |
| | Reb-A2 | — | 966 | — | — | — | — | — | 0 |
| | Reb-H1 | — | 966 | — | — | — | — | — | 0 |
| | | GSG-4G-1 | 1128 | 10.60 | 2.51 | 10.44 | 7.43 | ### | 9 |
| | | GSG-4G-2 | 1290 | 1.66 | 0.31 | 1.71 | 1.16 | 2.06 | 9 |
| | | GSG-4G-3 | 1452 | 1.81 | 0.41 | 1.93 | 1.17 | 2.37 | 9 |
| | | GSG-4G-7 | 2100 | 6.13 | 2.18 | 4.89 | 3.65 | 9.55 | 9 |
| SG-5G | Reb-D | — | 1128 | 0.28 | 0.22 | 0.27 | 0.06 | 0.50 | 6 |
| | Reb I | — | 1128 | — | — | — | — | — | 0 |
| | Reb L | — | 1128 | — | — | — | — | — | 0 |
| | Reb Q | — | 1128 | — | — | — | — | — | 0 |
| | Reb I2 | — | 1128 | — | — | — | — | — | 0 |
| | | GSG-5G-1 | 1290 | 0.36 | 0.05 | 0.37 | 0.30 | 0.43 | 9 |
| | | GSG-5G-2 | 1452 | 0.12 | 0.05 | 0.12 | 0.06 | 0.19 | 9 |
| | | GSG-5G-3 | 1614 | 1.57 | 0.26 | 1.50 | 1.31 | 2.13 | 9 |
| | | GSG-5G-4 | 1776 | 0.16 | 0.03 | 0.15 | 0.12 | 0.22 | 9 |
| | | GSG-5G-5 | 1938 | 1.88 | 1.18 | 2.28 | 0.46 | 3.26 | 9 |
| SG-6G | Reb-M | — | 1290 | 0.21 | 0.13 | 0.20 | 0.07 | 0.41 | 9 |
| | | GSG-6G-3 | 1776 | 0.91 | 0.16 | 0.88 | 0.67 | 1.11 | 9 |
| SG-2G1R | Dulcoside A | — | 788 | 0.12 | 0.04 | 0.11 | 0.09 | 0.21 | 7 |
| | Dulcoside B | — | 788 | 7.49 | ### | 0.13 | 0.08 | ### | 5 |
| SG-3G1R | Reb-C | — | 950 | 0.47 | 0.52 | 0.31 | 0.08 | 1.79 | 9 |
| | Reb-S | — | 950 | 0.13 | 0.10 | 0.08 | 0.07 | 0.31 | 5 |
| | Reb-H | — | 950 | — | — | — | — | — | 0 |
| | | GSG-3G1R-3a | 1436 | 2.75 | 1.47 | 3.20 | 1.16 | 4.84 | 9 |
| | | GSG-3G1R-3b | 1436 | 4.44 | 0.73 | 4.45 | 3.11 | 5.46 | 9 |
| SG-4G1R | Reb J | — | 1112 | — | — | — | — | — | 0 |
| | Reb K | — | 1112 | 0.08 | 0.02 | 0.07 | 0.07 | 0.11 | 3 |
| | Reb K2 | — | 1112 | — | — | — | — | — | 0 |
| | | GSG-4G1R-2 | 1436 | 1.03 | 0.23 | 1.16 | 0.71 | 1.28 | 9 |
| | | GSG-4G1R-3 | 1598 | 0.36 | 0.10 | 0.35 | 0.24 | 0.52 | 9 |
| | | GSG-4G1R-4 | 1760 | 2.69 | 0.61 | 2.62 | 2.06 | 4.16 | 9 |
| | | GSG-4G1R-6 | 2084 | 5.19 | 3.99 | 7.54 | 0.87 | 9.47 | 9 |
| SG-5G1R | Reb-N | — | 1274 | — | — | — | — | — | 0 |
| | | GSG-5G1R-4 | 1922 | 4.34 | 0.71 | 4.10 | 3.47 | 5.87 | 9 |
| SG-6G1R | Reb-O | — | 1436 | 0.12 | 0.04 | 0.14 | 0.07 | 0.17 | 9 |
| | | GSG-6G1R-1a | 1598 | 0.85 | 0.11 | 0.79 | 0.73 | 1.05 | 9 |
| | | GSG-6G1R-1b | 1598 | 1.05 | 0.29 | 1.09 | 0.56 | 1.51 | 9 |
| | | GSG-6G1R-2 | 1760 | 1.07 | 0.45 | 1.13 | 0.51 | 1.77 | 9 |
| SG-3G1X | Reb-F | — | 936 | 0.13 | 0.05 | 0.12 | 0.09 | 0.20 | 6 |
| | Reb-R | — | 936 | 0.12 | 0.05 | 0.10 | 0.06 | 0.23 | 9 |
| | | GSG-3G1X-4 | 1584 | 3.91 | 1.06 | 3.59 | 2.96 | 6.48 | 9 |
| | | GSG-3G1X-5 | 1746 | 1.62 | 0.71 | 1.76 | 0.74 | 2.57 | 9 |
| SG-4G1X | Reb U | — | 1098 | 0.17 | 0.07 | 0.16 | 0.11 | 0.31 | 7 |
| | Reb T | — | 1098 | — | — | — | — | — | 0 |
| | Reb W | — | 1098 | — | — | — | — | — | 0 |
| | Reb W2 | — | 1098 | — | — | — | — | — | 0 |
| | | GSG-4G1X-1 | 1260 | 1.42 | 0.62 | 1.01 | 0.80 | 2.17 | 9 |
| | | GSG-4G1X-2 | 1422 | 1.72 | 0.35 | 1.75 | 1.12 | 2.40 | 9 |
| | | GSG-4G1X-3 | 1584 | 3.01 | 0.29 | 2.97 | 2.43 | 3.35 | 9 |
| | | GSG-4G1X-4 | 1746 | 1.11 | 0.25 | 1.09 | 0.80 | 1.46 | 9 |
| SG-5G1X | Reb V | — | 1260 | — | — | — | — | — | 0 |
| | | GSG-5G1X-1 | 1422 | 2.67 | 0.43 | 2.64 | 1.94 | 3.33 | 9 |

C. Experiment 3

Two sample lot numbers of GSGs (EPC-230-36-03, EPC-230-35-06) were glycosylated according to the method described in Example 59. The reaction conditions, including feed *Stevia* glycosides and reaction time were adjusted to obtain the designated products as they are. Glycosylation of these two starting compositions resulted in glycosylated compositions corresponding to New Flavor I and New Flavor II. The distribution and percentage (wt/wt) of specific unreacted SGs and reacted SGs (i.e., GSGs) in these sample lot numbers was determined using the methodology described in Example 67.

The two starting compositions are available from Sweet Green Fields. The content of each ingredient is listed as follows:

| Product Lot No. | Material Lot No. | RD | RA | STV | RF | RC | DA | RU | RB | SB | Total SG (9) |
|---|---|---|---|---|---|---|---|---|---|---|---|
| EPC-230-36-03 | 20160118 | 2.05 | 23.13 | 17.79 | 2.25 | 10.46 | 1.55 | 2.36 | 1.79 | 1.82 | 63.2 |
| EPC-230-35-06 | The blend of 2060118 and RA60/SG95(20150203) with the ratio of 10:3 | 1.81 | 32.19 | 19.55 | 1.92 | 8.99 | 1.24 | 1.88 | 1.56 | 1.49 | 70.61 |

The technical effect of two sample lot numbers of GSGs (EPC-230-36-03, EPC-230-35-06) is the same as that of example 59.

Table 170 shows the results of this analysis for New Flavor I (Lot EPC-230-36-03).

TABLE 170

| | | SG-{ }-Added | | EPC-230-36-03 New Flavor I | | |
|---|---|---|---|---|---|---|
| SG-group | Individual SG (unreacted part) | Glucose (reacted part) | [Mr] | mg/10 ml | % (m/m) | ±s.d. % (m/m) |
| SG-2G | Rubusoside | — | 642 | 2.03 | 1.28 | 0.19 |
| | Stev-Bios | — | 642 | 0.96 | 0.61 | 0.12 |
| SG-3G | Reb-B | — | 804 | 0.90 | 0.57 | 0.11 |
| | Reb-G | — | 804 | 0.71 | 0.45 | 0.09 |
| | Stevioside | — | 804 | 5.93 | 3.74 | 0.56 |
| | Reb-KA | — | 804 | <0.01 | <0.01 | <0.01 |
| | Stevioside B | — | 804 | <0.01 | <0.01 | <0.01 |
| | | GSG-3G-2 | 1128 | 4.73 | 2.98 | 0.45 |
| | | GSG-3G-3 | 1290 | 3.85 | 2.43 | 0.36 |
| | | GSG-3G-4 | 1452 | 2.55 | 1.61 | 0.24 |
| | | GSG-3G-7 | 1938 | 3.39 | 2.14 | 0.32 |
| | | GSG-3G-8 | 2100 | 6.15 | 3.88 | 0.58 |
| SG-4G | Reb-A | — | 966 | 14.20 | 8.96 | 1.34 |
| | Reb-E | — | 966 | 0.23 | 0.15 | 0.03 |
| | Reb-A2 | — | 966 | <0.01 | <0.01 | <0.01 |
| | Reb-H1 | — | 966 | <0.01 | <0.01 | <0.01 |
| | | GSG-4G-1 | 1128 | 13.75 | 8.68 | 1.30 |
| | | GSG-4G-2 | 1290 | 1.74 | 1.10 | 0.16 |
| | | GSG-4G-3 | 1452 | 1.77 | 1.12 | 0.17 |
| | | GSG-4G-7 | 2100 | 6.79 | 4.28 | 0.64 |
| SG-5G | Reb-D | — | 1128 | 1.26 | 0.79 | 0.16 |
| | Reb I | — | 1128 | <0.01 | <0.01 | <0.01 |
| | Reb L | — | 1128 | <0.01 | <0.01 | <0.01 |
| | Reb Q | — | 1128 | <0.01 | <0.01 | <0.01 |
| | Reb I2 | — | 1128 | <0.01 | <0.01 | <0.01 |
| | | GSG-5G-1 | 1290 | 0.42 | 0.26 | 0.05 |
| | | GSG-5G-2 | 1452 | 0.37 | 0.23 | 0.05 |
| | | GSG-5G-3 | 1614 | 1.84 | 1.16 | 0.17 |
| | | GSG-5G-4 | 1776 | 0.11 | 0.07 | 0.01 |
| | | GSG-5G-5 | 1938 | 2.97 | 1.87 | 0.28 |

TABLE 170-continued

| SG-group | Individual SG (unreacted part) | SG-{ }-Added Glucose (reacted part) | [Mr] | EPC-230-36-03 New Flavor I mg/10 ml | % (m/m) | ±s.d. % (m/m) |
|---|---|---|---|---|---|---|
| SG-6G | Reb-M | — | 1290 | 2.16 | 1.36 | 0.20 |
| | | GSG-6G-3 | 1776 | 1.38 | 0.87 | 0.17 |
| SG-2G1R | Dulcoside A | — | 788 | 0.27 | 0.17 | 0.03 |
| | Dulcoside B | — | 788 | 0.19 | 0.12 | 0.02 |
| SG-3G1R | Reb-C | — | 950 | 3.12 | 1.97 | 0.30 |
| | Reb-S | — | 950 | 0.32 | 0.20 | 0.04 |
| | Reb-H | — | 950 | <0.01 | <0.01 | <0.01 |
| | | GSG-3G1R-3a | 1436 | 3.75 | 2.37 | 0.35 |
| | | GSG-3G1R-3b | 1436 | 3.88 | 2.45 | 0.37 |
| SG-4G1R | Reb J | — | 1112 | <0.01 | <0.01 | <0.01 |
| | Reb K | — | 1112 | <0.01 | <0.01 | <0.01 |
| | Reb K2 | — | 1112 | <0.01 | <0.01 | <0.01 |
| | | GSG-4G1R-2 | 1436 | 0.79 | 0.50 | 0.10 |
| | | GSG-4G1R-3 | 1598 | 0.42 | 0.26 | 0.05 |
| | | GSG-4G1R-4 | 1760 | 3.15 | 1.99 | 0.30 |
| | | GSG-4G1R-6 | 2084 | 11.7 | 7.38 | 1.11 |
| SG-5G1R | Reb-N | — | 1274 | 0.68 | 0.43 | 0.09 |
| | | GSG-5G1R-4 | 1922 | 6.16 | 3.89 | 0.58 |
| SG-6G1R | Reb-O | — | 1436 | 1.02 | 0.64 | 0.13 |
| | | GSG-6G1R-1a | 1598 | 0.94 | 0.59 | 0.12 |
| | | GSG-6G1R-1b | 1598 | 0.99 | 0.62 | 0.12 |
| | | GSG-6G1R-2 | 1760 | 1.67 | 1.05 | 0.16 |
| SG-3G1X | Reb-F | — | 936 | 2.67 | 1.68 | 0.25 |
| | Reb-R | — | 936 | <0.01 | <0.01 | <0.01 |
| | | GSG-3G1X-4 | 1584 | 3.87 | 2.44 | 0.37 |
| | | GSG-3G1X-5 | 1746 | 1.65 | 1.04 | 0.16 |
| SG-4G1X | Reb U | — | 1098 | <0.01 | <0.01 | <0.01 |
| | Reb T | — | 1098 | <0.01 | <0.01 | <0.01 |
| | Reb W | — | 1098 | <0.01 | <0.01 | <0.01 |
| | Reb W2 | — | 1098 | <0.01 | <0.01 | <0.01 |
| | | GSG-4G1X-1 | 1260 | 1.17 | 0.74 | 0.15 |
| | | GSG-4G1X-2 | 1422 | 2.16 | 1.36 | 0.20 |
| | | GSG-4G1X-3 | 1584 | 3.23 | 2.04 | 0.31 |
| | | GSG-4G1X-4 | 1746 | 1.74 | 1.10 | 0.16 |
| SG-5G1X | Reb V | — | 1260 | <0.01 | <0.01 | <0.01 |
| | | GSG-5G1X-1 | 1422 | 3.70 | 2.33 | 0.35 |

Table 171 shows the results of this analysis for New Flavor II (Lot EPC-230-35-06).

TABLE 171

| SG-group | Individual SG (unreacted part) | SG-{ }-Added Glucose (reacted part) | [Mr] | EPC-230-35-06 New Flavor II mg/10 ml | % (m/m) | ±s.d. % (m/m) |
|---|---|---|---|---|---|---|
| SG-2G | Rubusoside | — | 642 | 1.38 | 0.87 | 0.17 |
| | Stev-Bios | — | 642 | 0.47 | 0.30 | 0.06 |
| SG-3G | Reb-B | — | 804 | 0.31 | 0.20 | 0.04 |
| | Reb-G | — | 804 | 0.51 | 0.32 | 0.06 |
| | Stevioside | — | 804 | 14.69 | 9.27 | 1.39 |
| | Reb-KA | — | 804 | <0.01 | <0.01 | <0.01 |
| | Stevioside B | — | 804 | <0.01 | <0.01 | <0.01 |
| | | GSG-3G-2 | 1128 | 3.85 | 2.43 | 0.36 |
| | | GSG-3G-3 | 1290 | 3.24 | 2.04 | 0.31 |
| | | GSG-3G-4 | 1452 | 2.28 | 1.44 | 0.22 |
| | | GSG-3G-7 | 1938 | 2.56 | 1.62 | 0.24 |
| | | GSG-3G-8 | 2100 | 2.93 | 1.85 | 0.28 |
| SG-4G | Reb-A | — | 966 | 29.34 | 18.51 | 2.78 |
| | Reb-E | — | 966 | 0.11 | 0.07 | 0.01 |
| | Reb-A2 | — | 966 | <0.01 | <0.01 | <0.01 |
| | Reb-H1 | — | 966 | <0.01 | <0.01 | <0.01 |
| | | GSG-4G-1 | 1128 | 8.21 | 5.18 | 0.78 |
| | | GSG-4G-2 | 1290 | 1.41 | 0.89 | 0.18 |
| | | GSG-4G-3 | 1452 | 1.37 | 0.86 | 0.17 |
| | | GSG-4G-7 | 2100 | 3.56 | 2.25 | 0.34 |

TABLE 171-continued

| SG-group | Individual SG (unreacted part) | SG-{ }-Added Glucose (reacted part) | [Mr] | EPC-230-35-06 New Flavor II mg/10 ml | % (m/m) | ±s.d. % (m/m) |
|---|---|---|---|---|---|---|
| SG-5G | Reb-D | — | 1128 | 1.05 | 0.66 | 0.13 |
| | Reb I | — | 1128 | <0.01 | <0.01 | <0.01 |
| | Reb L | — | 1128 | <0.01 | <0.01 | <0.01 |
| | Reb Q | — | 1128 | <0.01 | <0.01 | <0.01 |
| | Reb I2 | — | 1128 | <0.01 | <0.01 | <0.01 |
| | | GSG-5G-1 | 1290 | 0.42 | 0.26 | 0.05 |
| | | GSG-5G-2 | 1452 | 0.40 | 0.25 | 0.05 |
| | | GSG-5G-3 | 1614 | 1.67 | 1.05 | 0.16 |
| | | GSG-5G-4 | 1776 | 0.09 | 0.06 | 0.01 |
| | | GSG-5G-5 | 1938 | 1.1 | 0.69 | 0.14 |
| SG-6G | Reb-M | — | 1290 | 2.37 | 1.50 | 0.22 |
| | | GSG-6G-3 | 1776 | 1.31 | 0.83 | 0.17 |
| SG-2G1R | Dulcoside A | — | 788 | 0.17 | 0.11 | 0.02 |
| | Dulcoside B | — | 788 | 0.10 | 0.06 | 0.01 |
| SG-3G1R | Reb-C | — | 950 | 3.23 | 2.04 | 0.31 |
| | Reb-S | — | 950 | 0.16 | 0.10 | 0.02 |
| | Reb-H | — | 950 | <0.01 | <0.01 | <0.01 |
| | | GSG-3G1R-3a | 1436 | 1.24 | 0.78 | 0.16 |
| | | GSG-3G1R-3b | 1436 | 3.33 | 2.10 | 0.32 |
| SG-4G1R | Reb J | — | 1112 | <0.01 | <0.01 | <0.01 |
| | Reb K | — | 1112 | <0.01 | <0.01 | <0.01 |
| | Reb K2 | — | 1112 | <0.01 | <0.01 | <0.01 |
| | | GSG-4G1R-2 | 1436 | 0.76 | 0.48 | 0.10 |
| | | GSG-4G1R-3 | 1598 | 0.35 | 0.22 | 0.04 |
| | | GSG-4G1R-4 | 1760 | 2.65 | 1.67 | 0.25 |
| | | GSG-4G1R-6 | 2084 | 2.85 | 1.80 | 0.27 |
| SG-5G1R | Reb-N | — | 1274 | 0.32 | 0.20 | 0.04 |
| | | GSG-5G1R-4 | 1922 | 5.73 | 3.62 | 0.54 |
| SG-6G1R | Reb-O | — | 1436 | 0.99 | 0.62 | 0.12 |
| | | GSG-6G1R-1a | 1598 | 0.43 | 0.27 | 0.05 |
| | | GSG-6G1R-1b | 1598 | 0.36 | 0.23 | 0.05 |
| | | GSG-6G1R-2 | 1760 | 0.65 | 0.41 | 0.08 |
| SG-3G1X | Reb-F | — | 936 | 2.35 | 1.48 | 0.22 |
| | Reb-R | — | 936 | <0.01 | <0.01 | <0.01 |
| | | GSG-3G1X-4 | 1584 | 2.65 | 1.67 | 0.25 |
| | | GSG-3G1X-5 | 1746 | 1.05 | 0.66 | 0.13 |
| SG-4G1X | Reb U | — | 1098 | <0.01 | <0.01 | <0.01 |
| | Reb T | — | 1098 | <0.01 | <0.01 | <0.01 |
| | Reb W | — | 1098 | <0.01 | <0.01 | <0.01 |
| | Reb W2 | — | 1098 | <0.01 | <0.01 | <0.01 |
| | | GSG-4G1X-1 | 1260 | 1.34 | 0.85 | 0.17 |
| | | GSG-4G1X-2 | 1422 | 2.03 | 1.28 | 0.19 |
| | | GSG-4G1X-3 | 1584 | 1.99 | 1.26 | 0.19 |
| | | GSG-4G1X-4 | 1746 | 1.35 | 0.85 | 0.17 |
| SG-5G1X | Reb V | — | 1260 | <0.01 | <0.01 | <0.01 |
| | | GSG-5G1X-1 | 1422 | 2.71 | 1.71 | 0.26 |

Example 69. Evaluating the Sweetness and Flavor Enhancing Properties of GSG Composition No. 2

A GSG sample with lot number EPC-230-36-02 was prepared according to the method described in Example 59 to form GSG-Composition No. 2.

Given that Composition 2 is unlikely to be used only in water, without other flavor systems, it was of interest to explore its use with other test media, such carbonated lemon and lime soda. Therefore, protocols as recommended in ASTMS E679 and ASTMS E1432 were utilized to determine sweetness concentration thresholds in a lemon and lime test medium.

In this case, the sweetness concentration threshold of sucrose in a lemon and lime carbonated soft drink (CSD) was first determined as prescribed by FEMA. 12 consumer panelists with previous experience in tasting sucrose, *Stevia* and sucrose/*Stevia* combinations in beverages were given coded samples containing either 1.0%, 1.5%, 2.0%, and 2.5% or 3.0% sucrose by weight in a carbonated lemon and lime beverage. The samples were given in random order and the order was randomized between individual panelists. On a simple yes/no record sheet, the panelists were instructed to circle "YES" if sweetness could be identified in the sample and to circle "NO" if the sample was deemed to lack any detectable sweetness. The panelists were further reminded that initial tasting impressions are generally considered most accurate. Panelists were allowed to spend as much time as necessary to come to a decision for all of the samples.

Table 172 shows the results of the individual panelists' choices. "Yes" answers were coded as "1", while "NO" answers were coded as "0." Columns to the right in Table 172 show the percentage of panelists that could or could not detect sweetness at a particular sucrose concentration. As shown in Table 172, at 2.0% sucrose, 42% of the panelists could detect sweetness, while at 2.5% sucrose 67% of the panelists could detect sweetness.

TABLE 172

| Sample # | % Sucrose | Panelists 1 | 2 | 3 | 4 | 5 | 6 | 7 | 8 | 9 | 10 | 11 | 12 | % detected sweetness | % did not detect sweetness |
|---|---|---|---|---|---|---|---|---|---|---|---|---|---|---|---|
| 732 | 1 | 0 | 0 | 0 | 0 | 0 | 0 | 0 | 0 | 0 | 0 | 0 | 0 | 0% | 100% |
| 794 | 1.5 | 0 | 0 | 0 | 1 | 0 | 0 | 1 | 0 | 1 | 0 | 0 | 0 | 25% | 75% |
| 579 | 2 | 0 | 0 | 0 | 1 | 0 | 0 | 1 | 1 | 1 | 0 | 1 | 0 | 42% | 58% |
| 797 | 2.5 | 1 | 1 | 1 | 1 | 0 | 0 | 1 | 1 | 1 | 0 | 1 | 0 | 67% | 33% |
| 243 | 3 | 1 | 1 | 1 | 1 | 0 | 1 | 1 | 1 | 1 | 1 | 1 | 0 | 83% | 17% |

Figure 84:
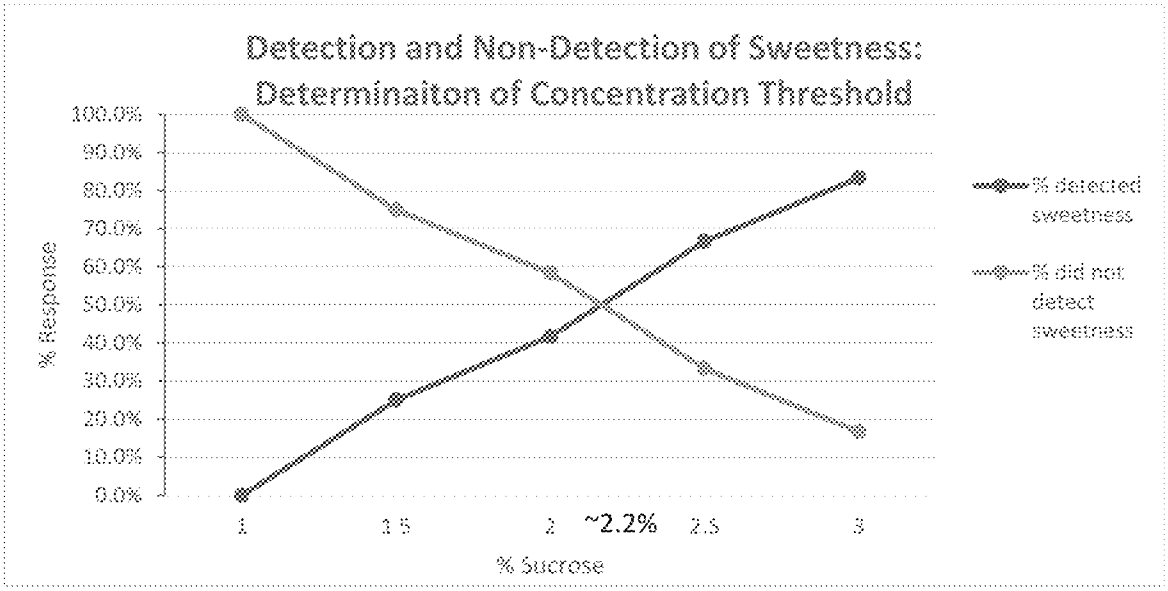

Based on these results, the sweetness concentration threshold was determined to be between 2.0-2.5% sucrose. The threshold concentration is considered to be that concentration at which 50% of panelists detect sweetness and 50% of panelists do not detect sweetness. To determine the sweetness concentration threshold, the % of panelists detecting sweetness or not detecting sweetness was plotted on a graph against the concentration as shown in FIG. 84. From FIG. 84, it was determined that the sweetness concentration threshold in a carbonated lemon and lime beverage was approximately 2.2%.

Test 1: Determination of Functional Sweetness of Composition 2 at Average Maximum Use Level.

To determine the functional sweetness of Composition 2 at the average maximum use level, FEMA guidelines were employed in a sensory experiment to determine whether 100 ppm Composition 2 was considered significantly less sweet than 1.5% sucrose in a lemon and lime carbonated beverage. Eleven consumer panelists with previous experience in tasting sucrose, *Stevia* and sucrose/*Stevia* combinations in beverages were given coded samples containing 100 ppm Composition 2 in a carbonated lemon and lime beverage. They were also given a control sample containing 1.5% sucrose in a lemon and lime carbonated beverage.

Panelists were instructed to taste each sample alongside the control and circle “YES” if the sample is less sweet than the control and circle “NO” if the sample is the same or more sweet than the control. The panelists were further reminded that initial tasting impressions are generally considered most accurate. Panelists were allowed to spend as much time as necessary to come to a decision for all of the samples. Taste comparisons by each panelist were replicated 3 separate times (with different sample codes) for each test sample.

Table 173 shows the results of the individual panelists' determinations where “1” represents “YES” (less sweet than control) and “0” represents “NO” (same or more sweet than control).

TABLE 173

| Sample # | Sample | Panelists 1 | 2 | 3 | 4 | 5 | 6 | 7 | 8 | 9 | 10 | 11 | Less Sweet? # YES | # NO |
|---|---|---|---|---|---|---|---|---|---|---|---|---|---|---|
| 480 | 100 ppm Composition 2 | 1 | 1 | 1 | 1 | 1 | 1 | 1 | 1 | 0 | 1 | 1 | 30 | 3 |
| 917 | 100 ppm Composition 2 | 1 | 0 | 1 | 1 | 1 | 1 | 1 | 1 | 1 | 1 | 1 | | |
| 615 | 100 ppm Composition 2 | 1 | 1 | 1 | 1 | 1 | 1 | 1 | 1 | 1 | 1 | 0 | | |

As shown in Table 173, 30 out of the 33 separate trials (90.9%) indicated that 100 ppm of Composition 2 was less sweet than the 1.5% sucrose control.

Using the Qi Statistical package (www.qistatistics.co.uk/software-downloads.asp), a beta binomial statistical analysis revealed a gamma value of very close to 0 (1×10-8) for this data set. Therefore, using that value against Table 1.2 in the beta-binomial tables for 2-AFC methods (two sided) in the publication by Bi and Ennis, 1999 (8) provided a minimum number of choice responses for significance at $\alpha \le 0.05$, $\gamma = 0$ or $\gamma = 0.1$ of 23. Therefore, a result of 30, in this case, provides clear statistical evidence that the test sample was significantly less sweet than the control sample.

Test 2: Determination of Sweetness Enhancing Properties of Composition 2 at the Anticipated Maximum Use Level FEMA guidelines were employed in a sensory experiment to determine whether Composition 2 was sweetness enhancing at the 100 ppm average maximum usage level in non-alcoholic beverages. In this case, a control carbonated lemon and lime beverage containing 5% by weight sucrose was used as a comparative control. Given that Test 1 above showed that Composition 2 at 100 ppm was not a functional sweetener, this amount was added to the control and then compared with the control for sweetness. Twelve consumer panelists with previous experience in tasting sucrose, *Stevia* and sucrose/*Stevia* combinations in beverages were given random coded samples containing 100 ppm Composition 2 or a comparative control sample containing 5% sucrose in a lemon and lime carbonated beverage without Composition 2.

For the sweetness enhancing test, panelists were instructed to taste each sample alongside the control and circle "YES" if the sample is less sweet than the control and circle "NO" if the sample is the same or more sweet than the control. The panelists were further reminded that initial tasting impressions are generally considered most accurate. Taste comparisons by each panelist were replicated 3 separate times (with different sample codes) for each test sample.

Table 174 shows the results of this analysis.

TABLE 174

| Sample # | Sample in 5% sucrose/lemon-lime CSD base | Panelists 1 | 2 | 3 | 4 | 5 | 6 | 7 | 8 | 9 | 10 | 11 | 12 | More Sweet? # YES | # NO |
|---|---|---|---|---|---|---|---|---|---|---|---|---|---|---|---|
| 685 | 100 ppm Composition 2 | 0 | 1 | 1 | 1 | 1 | 1 | 0 | 0 | 1 | 1 | 0 | 1 | 27 | 9 |
| 337 | 100 ppm Composition 2 | 1 | 0 | 1 | 1 | 0 | 1 | 1 | 1 | 1 | 1 | 1 | 0 | | |
| 409 | 100 ppm Composition 2 | 1 | 1 | 1 | 0 | 1 | 1 | 1 | 1 | 0 | 1 | 1 | 1 | | |

As shown in Table 174, 27 out of the 36 (75%) separate trials indicated that 100 ppm Composition 2 was sweeter than the 5% sucrose sweetened control.

Using the Qi Statistical package (www.qistatistics.co.uk/software-downloads.asp), a beta binomial statistical analysis revealed a gamma value of very close to 0 (1×10-8) for this data set. Therefore, using that value against Table 1.2 in the beta-binomial tables for 2-AFC methods (two sided) in the publication by Bi and Ennis, 1999 (8) provided a minimum number of choice responses for significance at α≤40.05, γ=0 or γ=0.1 of 25. Therefore, a result of 27, in this case, provides clear statistical evidence that the test sample was significantly sweeter than the 5% sucrose sweetened control sample.

Test 3: Determination of Flavor Enhancing Properties of Composition 2 at the Anticipated Average Maximum Use Level.

Using the same methodology outlined above and employed for the sweetness enhancing test described above, Composition 2 was compared with a control sample to determine if it possessed flavor enhancing properties. For the flavor enhancing test, panelists were instructed to taste each sample and circle "YES" if the sample was considered to have more flavor than the 5% sucrose sweetened control sample and to circle "NO" if the sample was considered to have less flavor than the control. The panelists were further reminded that initial tasting impressions are generally considered most accurate. Taste comparisons by each panelist (n=12) were replicated 3 separate times (with different sample codes) for each test sample. The results of this analysis are shown in Table 175.

TABLE 175

| Sample # | Sample in 5% sucrose/lemon-lime CSD base | Panelists 1 | 2 | 3 | 4 | 5 | 6 | 7 | 8 | 9 | 10 | 11 | 12 | More Flavor? # YES | # NO |
|---|---|---|---|---|---|---|---|---|---|---|---|---|---|---|---|
| 344 | 100 ppm Composition 2 | 0 | 1 | 1 | 1 | 1 | 1 | 1 | 1 | 0 | 1 | 1 | 1 | 31 | 5 |
| 148 | 100 ppm Composition 2 | 1 | 1 | 1 | 0 | 1 | 0 | 1 | 1 | 1 | 1 | 1 | 1 | | |
| 856 | 100 ppm Composition 2 | 1 | 1 | 1 | 1 | 1 | 1 | 1 | 1 | 1 | 1 | 0 | 1 | | |

As shown in Table 175, 31 out of the 36 (86%) separate trials indicated that 100 ppm Composition 2 had more flavor than the 5% sucrose sweetened control.

Using the Qi Statistical package (www.qistatistics.co.uk/software-downloads.asp), a beta binomial statistical analysis revealed a gamma value of very close to 0 (1×10-8) for this data set. Therefore, using that value against Table 1.2 in the beta-binomial tables for 2-AFC methods (two sided) in the publication by Bi and Ennis, 1999 (8) provided a minimum number of choice responses for significance at α≤0.05, γ=0 or γ=0.1 of 25. Therefore, a result of 31, in this case, provides clear statistical evidence that the test sample had significantly more flavor than the 5% sucrose sweetened control sample.

The sensory tests described herein above demonstrate with a high degree of statistical significance that the glucosylated Composition 2 extract qualifies as a sweetness and flavor enhancer in non-alcoholic beverages.

Example 70. Evaluating the Sweetness and Flavor Enhancing Properties of GSG RA20

A sample lot number of SG starting materials (Lot#12261967) were glycosylated according to the method described in Example 61 to form a GSG-20 composition. Given that GSG-20 is unlikely to be used only in water, without other flavor systems, it was of interest to explore its use with other test media, such carbonated lemon and lime soda. Therefore, protocols as recommended in ASTMS E679 and ASTMS E1432 were utilized to determine sweetness concentration thresholds in a lemon and lime test medium.

First, the sweetness concentration threshold of sucrose in a lemon and lime carbonated soft drink (CSD) was determined as described in Example 69. From FIG. 84, it was determined that the sweetness concentration threshold in a carbonated lemon and lime beverage was approximately 2.2%.

Another way to determine the sweetness concentration threshold is to determine the sucrose concentration immediately below that concentration at which the panelist could detect that the sample is sweet. Using this approach, the average sweetness concentration threshold was 1.92% (SE (SD/i n)=0.21%). The FEMA guidelines for determining the recognition threshold concentration allow for the adjustment of the concentration upward by one standard error (reference 2, section 1.4.2). Therefore the sweetness concentration threshold was set at 2.13%

Test 1: Determination of Functional Sweetness of GSG-RA20 at Average Maximum Use Level.

To determine the functional sweetness of GSG-RA20 at the average maximum use level, FEMA guidelines were employed in a sensory experiment to determine whether 250 ppm GSG-20 was considered significantly less sweet than 2.13% sucrose in a lemon and lime carbonated beverage. Twelve consumer panelists with previous experience in tasting sucrose, *Stevia* and sucrose/*Stevia* combinations in beverages were given coded samples containing 250 ppm GSG-20 in a carbonated lemon and lime beverage. They were also given a control sample containing 2.13% sucrose in a lemon and lime carbonated beverage.

Panelists were instructed to taste each sample alongside the control and circle "YES" if the sample is less sweet than the control and circle "NO" if the sample is the same or more sweet than the control. The panelists were further reminded that initial tasting impressions are generally considered most accurate. Panelists were allowed to spend as much time as necessary to come to a decision for all of the samples. Taste comparisons by each panelist were replicated 3 separate times (with different sample codes) for each test sample.

Table 177 shows the results of the individual panelists' determinations where "1" represents "YES" (less sweet than control) and "0" represents "NO" (same or more sweet than control).

TABLE 177

| | | | | | | | | | | | | | | Less Sweet? | |
|---|---|---|---|---|---|---|---|---|---|---|---|---|---|---|---|
| | | Panelists | | | | | | | | | | | | # | # |
| Sample # | Sample | 1 | 2 | 3 | 4 | 5 | 6 | 7 | 8 | 9 | 10 | 11 | 12 | YES | NO |
| 425 | GSG-RA20 (250 ppm) | 1 | 1 | 1 | 1 | 1 | 1 | 1 | 0 | 1 | 1 | 1 | 1 | 30 | 6 |
| 256 | GSG-RA20 (250 ppm) | 1 | 1 | 1 | 1 | 1 | 1 | 0 | 1 | 0 | 1 | 1 | 1 | | |
| 620 | GSG-RA20 (250 ppm) | 1 | 1 | 0 | 1 | 1 | 1 | 0 | 1 | 0 | 1 | 1 | 1 | | |

As shown in Table 177, 30 out of the 36 separate trials (83.3%) indicated that 250 ppm GSG-20 was less sweet than the 2.13% sucrose control.

Using the Qi Statistical package (www.qistatistics.co.uk/software-downloads.asp), a beta binomial statistical analysis revealed a gamma value of 0.2329 for this data set. Therefore, using that value against Table 1.2 in the beta-binomial tables for 2-AFC methods (two sided) in the publication by Bi and Ennis, 1999 (8) provided a minimum number of choice responses for significance at $\alpha \leq 0.05$, $\gamma = 0.2$ of 25. Therefore, a result of 30, in this case, provides clear statistical evidence that the test sample was significantly less sweet than the control sample.

Test 2: Determination of Sweetness or Flavor Enhancing Properties of GSG-20 at Average Maximum Use Level FEMA guidelines were employed in a sensory experiment to determine whether 250 ppm GSG-20 was considered sweetness or flavor enhancing at the 250 ppm average maximum usage level.

A control carbonated lemon and lime beverage containing 5% by weight sucrose was used as the comparative control. Given that GSG-20 at 250 ppm was shown not to be a functional sweetener in Test 1 above, this amount was added to the control and then compared with the control for sweetness. Twelve consumer panelists with previous experience in tasting sucrose, *Stevia* and sucrose/*Stevia* combinations in beverages were given random coded samples containing 250 ppm GSG-20 in a carbonated lemon and lime beverage containing 5% by weight sucrose. The panelists were also given a comparative control sample containing 5% sucrose in a lemon and lime carbonated beverage without RA20.

Panelists were asked to determine the sweetness and flavor intensity of the test beverage compared with the control and rated the intensity from 1 to 9 on a score sheet, where the control was already marked at 5 out of 9 for both attributes. Taste comparisons were replicated three separate times for each test compound (GSG-20) and the replication order was randomized for each panelist so that panelists did not all receive the same sample at the same time or in the same order.

Table 178 shows a summary of the results for each of the rated flavor attributes compared to the control.

TABLE 178

| Sample in 5% sucrose/lemon-lime CSD base | # Samplings | Average rating | SE | Statistical Significance (p-value) at 95% confidence interval compared to Control |
|---|---|---|---|---|
| Sweetness Enhancement | | | | |
| Control | 36 | 5 | 0.00 | |
| GSG-RA20 (250 ppm) | 36 | 6.63 | 0.24 | 1.60E−09 |
| Flavor Enhancement | | | | |
| Control | 36 | 5 | 0.00 | |
| GSG-RA20 (250 ppm) | 36 | 5.80 | 0.23 | 7.00E−04 |

SE = Standard Error
Statistical significance comparing a single sample against the control.
A p-value < 0.05 (95% confidence level) is considered statistically significant.

As shown in Table 178, addition of 250 ppm GSG-20 to a carbonated lemon and lime beverage containing 5% by weight sucrose, caused a highly statistically significant increase in perceived sweetness and flavor.

Although the aspects of the present application have been described with reference to preferred embodiments, persons skilled in the art will recognize that changes may be made in form and detail without departing from the spirit and scope of the application. All references cited throughout the specification, including those in the background, are incorporated by reference herein in their entirety. Those skilled in the art will recognize, or be able to ascertain, using no more than routine experimentation, many equivalents to specific embodiments of the application described specifically herein. Such equivalents are intended to be encompassed in the scope of the following claims.

What is claimed is:

1. A composition comprising one or more glycosylated steviol glycosides (GSGs), four or more steviol glycosides (SGs), and one or more dextrins, wherein the four or more SGs are in a total amount of about 10 wt. % to about 40 wt. % of the composition, wherein the one or more GSGs are in a total amount of about 40 wt. % to about 70 wt. % of the composition, wherein the one or more dextrins are in a total amount of about 10 wt. % to about 25 wt. % of the composition, wherein the four or more SGs comprise, relative to the total amount of the four or more SGs, ≥25 wt. % rebaudioside A, ≥0.5 wt. % rebaudioside C, ≥10 wt. % stevioside and at least one further steviol glycoside, such that the total content of rebaudioside A, rebaudioside C and stevioside is from 50 to 99 wt. % of the total amount of the four or more SGs, and wherein the one or more GSGs are formed from the glycosylation of a *stevia* extract selected from the group consisting of RA20, RA30, RA40 and, RA50.

2. The composition of claim 1, wherein the four or more SGs comprise at least one SG selected from the group consisting of Related SG#1,SG-4, iso-steviolbioside, Related SG#3, rebaudioside R1, stevioside F, dulcoside B, SG-3, iso-rebaudioside B, iso-stevioside, rebaudioside KA, SG-13, stevioside B, rebaudioside R, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, rebaudioside I3, rebaudioside Q, rebaudioside Q2, rebaudioside Q3, rebaudioside I2, rebaudioside T1, Related SG#4, rebaudioside V, rebaudioside V2, rebaudioside Y, 15α-OH-rebaudioside M and rebaudioside O2.

3. The composition of claim 1, wherein the four or more SGs are selected from the group consisting of: RA20, RA40, RA50, RA60, RA80, RB8, RB10, RB15, RC15, RD6 and combinations thereof, and combinations of any of the aforementioned with any of RA90, RA95, RA97, RA98, RA99 and/or RA99.5.

4. The composition of claim 1, wherein the four or more SGs comprise 45-55 wt. % Reb-A, 20-40 wt. % Stevioside, 2-6 wt. % Reb-C, 0.5-3 wt. % Reb-B, and 0.5-3 wt. % Reb-D.

5. The composition of claim 4, wherein the four or more SGs further comprise one or more members selected from the group consisting of: 0.1-3 wt. % Related SG#5, 0.05-1.5 wt. % Reb-R1, 0.0.05-1.5 wt. % Reb-K2, 0.05-1.5 wt. % Reb-E, 0.01-1 wt. % Dulcoside A, 0.01-1 wt. % Dulcoside B, 0.01-1 wt. % Rubusoside, 0.01-1 wt. % Steviolbioside, 0.01-1 wt. % Iso-steviolbioside, 0.01-1 wt. % Stevioside-B, 0.01-1 wt. % Related SG#3, 0.01-1 wt. % Related SG#2, 0.01-1 wt. % Reb-G, 0.01-1 wt. % Reb-F, and 0.01-1 wt. % Reb-W.

6. The composition of claim 1, wherein the one or more GSGs comprise glycosylation products from one or more SGs selected from the group consisting of: Related SG#1, SG-4, iso-steviolbioside, Related SG#3, rebaudioside R1, stevioside F, dulcoside B, SG-3, iso-rebaudioside B, iso-stevioside, rebaudioside KA, SG-13, stevioside B, rebaudioside R, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside H1, Related SG#2, Related SG#5, rebaudioside U2, rebaudioside T, rebaudioside W, rebaudioside W2, rebaudioside W3, rebaudioside U, SG-12, rebaudioside K2, rebaudioside I3, rebaudioside Q, rebaudioside Q2, rebaudioside Q3, rebaudioside I2, rebaudioside T1, Related SG#4, rebaudioside V, rebaudioside V2, rebaudioside Y, 15α-OH-rebaudioside M and rebaudioside O2.

7. The composition of claim 1, wherein the one or more GSGs comprise at least one GSG selected from the group consisting of: GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5 and GSG-6G-3.

8. The composition of claim 7, wherein the one or more GSGs further comprise at least one GSG selected from the group consisting of: GSG-3G1R-3a, GSG-3G1R-3b, GSG-4G1R-2, GSG-4G1R-3, GSG-4G1R-4, GSG-4G1R-6, GSG-5G1R-4, GSG-6G1R-1a, GSG-6G1R-1b and GSG-6G1R-2.

9. The composition of claim 1, wherein the one or more GSGs comprise one or more xylose moieties, arabinose moieties, or a combination thereof.

10. The composition of claim 8, wherein the one or more GSGs further comprise at least one GSG selected from the group consisting of: GSG-3G1X-4, GSG-3G1X-5, GSG-4G1X-1, GSG-4G1X-2, GSG-4G1X-3, GSG-4G1X-4 and GSG-5G1X-1.

11. The composition of claim 1, wherein at least one of the one or more GSGs has a molecular weight equal to or greater than 1922 daltons.

12. The composition of claim 1, comprising 10-30 wt. % SGs, 50-70 wt. % GSGs, and 60-90 wt. % total glycosides.

13. A method for enhancing sweetness of an orally consumable composition, the method comprising adding an effective amount of the composition of claim 1 to the orally consumable composition.

14. A method for improving the taste profile or flavor of an orally consumable composition, the method comprising adding an effective amount of the composition of claim 1 to the orally consumable composition.

15. A method for the preparation of a glycosylated steviol glycoside (GSG) composition, comprising the steps of:

(a) dissolving a dextrin in water to form a liquefied dextrin;

(b) adding a steviol glycoside (SG) composition to the liquefied dextrin to obtain a reaction mixture;

(c) adding an effective amount of an enzyme to the reaction mixture, wherein the enzyme catalyzes the transfer of glucose moieties from the dextrin to SGs in the SG composition in the reaction mixture;

(d) incubating at a desired temperature for a desired length of reaction time to glycosylate SGs of the SG composition with glucose moieties present in the dextrin;

(e) inactivating the enzyme;

(f) removing the enzyme from the reaction mixture; and (g) drying the resulting solution of GSGs, residual SGs and dextrins to obtain a composition that comprises:

(1) one or more GSGs;

(2) four or more SGs; and (3) one or more dextrins, wherein the four or more SGs are in a total amount of about 10 wt. % to about 40 wt. % of the composition, wherein the one or more GSGs are in a total amount of about 40 wt. % to about 70 wt. % of the composition, wherein the one or more dextrins are in a total amount of about 10 wt. % to about 25 wt. % of the composition, wherein the four or more SGs comprise, relative to the total amount of the four or more SGs, ≥25 wt. % rebaudioside A, ≥0.5 wt. % rebaudioside C, ≥10 wt. % stevioside and at least one further steviol glycoside, such that the total content of rebaudioside A, rebaudioside C and stevioside is from 50 to 99 wt. % of the total amount of the four or more SGs, and wherein the one or more GSGs are formed from the glycosylation of a *stevia* extract selected from the group consisting of RA20 and RA30.

16. The method of claim 15, wherein the water is reverse osmosis purified water.

17. The method of claim 15, wherein in the reaction mixture the % wt. ratio of dextrin to the SG composition is between 10:90 and 40:60.

18. The method of claim 15, wherein the enzyme is cyclodextrin glycosyl transferase (CGTase).

19. The method of claim 15, further comprising decoloring the reaction mixture between steps (f) and (g).

20. The method of claim 15, wherein step (f) is carried out by spray drying the solution.

21. The composition of claim 1, wherein the four or more SGs are in a total amount of about 10 wt. % to about 30 wt. % of the composition.

22. The composition of claim 21, wherein the four or more SGs are in a total amount of about 15 wt. % to about 25 wt. % of the composition.

23. The composition of claim 1, wherein the one or more GSGs are in a total amount of about 50 wt. % to about 70 wt. % of the composition.

24. The composition of claim 23, wherein the one or more GSGs are in a total amount of about 60 wt. % to about 65 wt. % of the composition.

25. The composition of claim 1, wherein the one or more dextrins are in a total amount of about 15 wt. % to about 20 wt. % of the composition.

26. The composition of claim 1, wherein the four or more SGs are selected from Table A or Table B, and wherein the four or more SGs conform to at least one SG-group selected from the group consisting of SG-1G, SG-2G, SG-3G, SG-4G, SG-5G, SG-6G, SG-1G1R, SG-2G1R, SG-3G1R, SG-4G1R, SG-5G1R, SG-6G1R, SG-1G1X, SG-2G1X, SG-3G1X, SG-4G1X and SG-5G1X.

27. The composition of claim 1, wherein the one or more GSGs comprise one or more rhamnose moieties, one or more deoxyhexose moieties, or a combination thereof.

28. The composition of claim 1, wherein the one or more dextrins comprise tapioca dextrin.

29. The composition of claim 1, wherein the four or more SGs further comprise Rebaudioside B, Rebaudioside F and Dulcoside A.

30. The composition of claim 29, wherein the four or more SGs further comprise Rebaudioside D, Rubusoside and/or Steviolbioside.

31. The method of claim 17, wherein in the reaction mixture the % wt. ratio of dextrin to the SG composition is between 20:80 and 40:60.

32. The composition of claim 1, wherein the weight ratio of rebaudioside A:stevioside is from 25:40 to 45:10.

33. The composition of claim 1, wherein the weight ratio of rebaudioside A:stevioside is from 57:43 to 68:32.

* * * * *